US012173575B1

(12) United States Patent
Alexander

(10) Patent No.: US 12,173,575 B1
(45) Date of Patent: Dec. 24, 2024

(54) IN SITU GROUNDWATER TREATMENT AND FLOW DIVERSION SYSTEM

(71) Applicant: Alexander Innovations, LLC, Chapel Hill, NC (US)

(72) Inventor: W. Joseph Alexander, Chapel Hill, NC (US)

(73) Assignee: Alexander Innovations, LLC, Chapel Hill, NC (US)

( * ) Notice: Subject to any disclaimer, the term of this patent is extended or adjusted under 35 U.S.C. 154(b) by 0 days.

(21) Appl. No.: 18/456,232

(22) Filed: Aug. 25, 2023

Related U.S. Application Data

(63) Continuation-in-part of application No. 17/559,138, filed on Dec. 22, 2021, now Pat. No. 11,813,650, and a continuation-in-part of application No. 17/537,696, filed on Nov. 30, 2021, now Pat. No. 11,773,680.

(60) Provisional application No. 63/129,100, filed on Dec. 22, 2020, provisional application No. 63/119,285, filed on Nov. 30, 2020.

(51) Int. Cl.
*E21B 23/06* (2006.01)
*C02F 1/00* (2023.01)
*E21B 33/12* (2006.01)
*C02F 103/06* (2006.01)

(52) U.S. Cl.
CPC .............. *E21B 23/06* (2013.01); *C02F 1/001* (2013.01); *E21B 33/12* (2013.01); *C02F 2103/06* (2013.01)

(58) Field of Classification Search
CPC .......... E21B 33/12; E21B 43/12; E21B 23/06; C02F 1/001; C02F 2103/06
See application file for complete search history.

(56) References Cited

U.S. PATENT DOCUMENTS

| | | | | | |
|---|---|---|---|---|---|
| 2,849,070 | A * | 8/1958 | Maly | E21B 33/12 | 165/178 |
| 3,038,542 | A * | 6/1962 | Loomis | E21B 33/1216 | 166/187 |
| 3,647,230 | A * | 3/1972 | Smedley | F16J 15/3228 | 277/335 |
| 3,734,179 | A * | 5/1973 | Smedley | E21B 33/12 | 166/106 |
| 9,937,537 | B2 * | 4/2018 | Alexander | E03B 3/18 | |
| 10,556,260 | B2 * | 2/2020 | Alexander | E03F 1/002 | |

(Continued)

OTHER PUBLICATIONS

USPTO; Non-Final Action for U.S. Appl. No. 17/537,696 dated Oct. 19, 2022, 12 pages.

(Continued)

*Primary Examiner* — Steven A Macdonald
(74) *Attorney, Agent, or Firm* — NK Patent Law

(57) ABSTRACT

The purpose of the invention is to provide in situ treatment and flow diversion of contaminated groundwater without the need for an external energy source. The primary means by which contaminated groundwater is treated in situ within a subsurface environment is through the use of the use of the modular SubflowR$_x$ and interrelated components that work together or independently to control groundwater flow outside the system as well as diverting contaminated groundwater inside the system for extended treatment. The present disclosure provides embodiments, examples, and advantages of how the components work to achieve this common purpose.

20 Claims, 89 Drawing Sheets

(56) References Cited

U.S. PATENT DOCUMENTS

2015/0233228 A1* 8/2015 Roth .................... E21B 43/122
166/372

OTHER PUBLICATIONS

USPTO; Final Action for U.S. Appl. No. 17/537,696 dated Jan. 30, 2023, 7 pages.
USPTO; Non-Final Action for U.S. Appl. No. 17/559,138 dated Jan. 3, 2023, 10 pages.

* cited by examiner

200

220

285
1
202
2
210
275
3
201
4
219
5

301
305

IN SITU GROUNDWATER TREATMENT AND FLOW DIVERSION SYSTEM

CROSS-REFERENCE TO RELATED APPLICATIONS

This application is related to and claims priority from the following U.S. patents and patent applications: this application is a continuation in part of U.S. application Ser. No. 17/537,696, filed on Nov. 30, 2021, which claims priority to U.S. provisional application No. 63/119,285, filed on Nov. 30, 2020. The application is also a continuation in part of U.S. application Ser. No. 17/559,138, filed on Dec. 22, 2021, which claims priority to U.S. provisional application No. 63/129,100, filed on Dec. 22, 2020. The content of each of the U.S. Applications mentioned above is incorporated herein by reference in its entirety.

Relevant patents issued by the USPTO to the inventor are also cross-referenced in the present disclosure (U.S. Pat. No. 9,937,537 B2 and U.S. Pat. No. 10,556,260 B2), specifically with respect to a subsurface cylindrical casing, an interconnected physical subsurface vertical barrier wall, and an in situ groundwater treatment cartridge inside the subsurface cylindrical casing.

TECHNICAL FIELD

The present disclosure relates to mechanical packers. More particularly, the present disclosure relates to devices, tools, and methods for positioning and operating mechanical packer systems in casings for the purpose of controlling fluid flow in a subsurface environment.

The present disclosure relates to multipurpose devices and methods for use in cylindrical casings installed in a subsurface environment. More particularly, the present disclosure relates to devices that can be positioned and operated in cylindrical casings for different purposes, such as 1) sealing off the flow of fluids that may enter a casing from an elevation for hydraulic testing or other purposes, such as the integration with a fluid-treatment cartridge, 2) measuring physical or chemical properties of a fluid at a specific elevation in a casing, and/or 3) surging fluids in casings that have external openings that may periodically need to be cleaned.

The present disclosure also relates to permeable reactive barriers (referred to in the present disclosure as "PRBs"). More specifically, the present disclosure relates to an innovative PRB (referred to in the present disclosure as a "SubflowR$_x$"). The three key components of the SubflowR$_x$ related to the present disclosure include: 1) a cylindrical subsurface casing (referred to as the "PileGate" in the present disclosure) with vertical interlocks and discrete well screens at selected elevations on opposite sides of the casing which serves as a flow-through gate in an impervious wall typically created by sheet piling, 2) a replaceable fluid treatment cartridge (referred to as the "CartridgeR$_x$" in the present disclosure) with a perforated top and bottom that seals inside the PileGate, between the well screens and contains solid, permeable, reactive media customized for site-specific contaminants, and 3) interlocking sheet piles which form an impervious wall that diverts groundwater flow towards one or more integrated PileGates, depending on the site-specific remedial design. These three components of the SubflowR$_x$ are described in more detail in U.S. Pat. No. 9,937,537 B2 and U.S. Pat. No. 10,556,260 B2, each of which is herein incorporated by reference in its entirety.

The present disclosure further relates to additional components that may be used in conjunction with the mechanical packer, the multipurpose casing devices, and the SubflowR$_x$. More specifically, the first component includes a dedicated drive point injection tool to aid in the installation of the SubflowR$_x$ and allow injection of chemicals below the installation. More specifically, a second component includes a two-part polymer/coagulant mixture that is injected below the SubflowR$_x$ to seal off and divert potential groundwater underflow. More specifically, a third component includes a spiral-shaped treatment device to increase the contact and reaction time of contaminated groundwater with the in situ treatment media as an alternative to the CartridgeR$_x$.

BACKGROUND

Packers have a wide range of industrial applications such as in oil and gas exploration, geotechnical investigations, and environmental evaluations, where it is often necessary to seal or isolate a specific interval within casings, pipes, boreholes, cartridges, or similar conduits (commonly referred to in the present disclosure as casings). Packers generally have flexible elastomeric elements that expand radially outwardly typically by either pneumatic or mechanical forces. Pneumatic, sometimes referred to as inflatable packers, rely on pumping a fluid from an external source usually conveyed by tubing into the cavity of a flexible hollow bladder that outwardly expands to isolate and seal an interval in a casing. Conventional mechanical packers generally have plates on either side of a flexible elastomeric material that expands outwardly when the plates are compressed toward each other, usually by torquing a threaded device or by use of clamping methods.

Inflation requirements need to be carefully followed for pneumatic packers and pressures need to be monitored and adjusted as necessary for optimal operation and safety. Conventional compression-based mechanical packers are simple in operation; however, many are limited in application to relatively shallow depths below the ground surface.

The applicant identified a need for a mechanical packer (referred to in the present disclosure as an "MP") that overcomes some of the limitations of pneumatic and mechanical packers while providing other advantageous features such as: 1) the ability for the system to maintain a substantial seal in a casing and thereby prevent the flow of fluids for a long period of time (i.e., months) without the need for monitoring and adjusting fluid pressure as typical of pneumatic packers; 2) the ability to radially extend the circumference of the packer assembly further than that typically achieved by conventional compression-based mechanical packers thereby offering a substantial seal as well as structural support of other devices that may be seated on the packer (such as a liquid-treatment cartridge); 3) an easy-to-use tool for positioning a first packer assembly in a casing that also accommodates a separate easy-to-use-tool for actuating not only a first packer assembly but a second packer assembly that resides on one of the tools and may be installed at a different location in the same casing; 4) an easy-to-use tool that permits an activated packer assembly to return to its deactivated state; 5) the ability of a packer assembly and associated tools to be functionally integrated with other devices that may be incorporated with the packer system, such as a liquid-treatment cartridge; 6) the ability of the packer actuation tools to serve other purposes in a casing, such as a supporting a second packer assembly, measuring fluid pressure, and/or obtaining a liquid sample for a laboratory analysis of physical or chemical properties;

7) a packer system that is not depth limited as common in conventional compression-based mechanical packers; and 8) the ability to remove other devices from a casing (e.g., a liquid-treatment cartridge) while the packer assembly remains in place and activated thereby preventing fluid flow.

The applicant concurrently identified a need for a multi-purpose casing device (referred to as a "MCD" in the present disclosure, or when components are added, an MCD assembly) and methods for use in cylindrical casings installed in a subsurface environment. The liquid treatment cartridge as described in detail in U.S. Pat. No. 9,937,537 B2 and U.S. Pat. No. 10,556,260 B2 (generally referred to in the present disclosure as a fluid treatment cartridge for a broader scope of the inventive subject matter, or treatment cartridge, cartridge, or Cartridge$R_x$), includes a treatment cartridge (with an outside diameter, for reference purposes only, of about 10-inches) in a filter casing or PileGate (with an inside diameter, for reference purposes only, of about 11.25-inches) wherein an annular space is defined between an exterior of the cartridge casing and an interior of the structural wall of the filter casing (with an annular space, for reference purposes only, of about 0.625 inches, or about ⅝ of an inch, with variations occurring as a result of actual wall thicknesses for materials used). These dimensions are provided for general reference purposes only, and to provide context for the relatively large size of cartridges and casings associated with the prior art as compared to casings typically associated with groundwater monitoring wells (typically about 2 inches in diameter) and drilled groundwater supply wells (typically 4 to 8-inches in diameter).

A fluid treatment cartridge may have an inflatable seal that, when in an inflated condition an annular space (i.e., typically about ⅝-inch diameter), is filled by the inflatable seal such that the treatment cartridge is engaged with the interior of the structural wall of the filter casing. When the inflatable seal is in a deflated condition the treatment cartridge is disengaged from the interior of the structural wall of the filter casing permitting the treatment cartridge to be placed within and removed from the structural wall of the filter casing. Tubing for inflating the pneumatic seal is either outside or inside the casing of the treatment cartridge and extends to the ground surface where the tubing is connected by various fittings and valves for filling the seal (with air, water, or other fluids) and a gage for monitoring pressure within the seal.

An MCD assembly could be used in one example to seal off the flow of fluids that may enter a large diameter filter casing from a known elevation for testing the hydraulic integrity of a barrier wall connected to both sides of the filter casing (e.g., to ensure that groundwater does not appreciably flow through the barrier wall). Once testing is complete, the MCD assembly could remain in place and integrated with an in-situ fluid-treatment cartridge (e.g., for treating contaminated groundwater entering the filter casing). Components connected to the MCD could also be used for measuring physical properties of a fluid at a specific elevation in a filter casing (e.g., measuring the hydrostatic head of groundwater) or sampling a fluid for chemical properties (e.g., obtaining a groundwater sample to assess the water quality from a discrete elevation). In another example, an MCD assembly could be used to surge fluids entering filter casings that have external openings (e.g., well screens, slots, or similar openings) that may periodically need to be cleaned (i.e., similar to processes that are sometimes used in developing water wells or monitoring wells where physical surging removes organic and inorganic material in the filter pack thereby increasing the rate of water movement from the aquifer into the well).

Examples of the use of mechanical packer systems to seal an annular space between an exterior of a fluid treatment cartridge casing and an interior of the structural wall of the filter casing can be found in U.S. Patent Application No. 63/119,285 entitled Mechanical Packer Systems for Controlling Fluid Flow. Examples of fluid treatment cartridges specifically for use with mechanical packer systems can be found in U.S. Patent Application No. 63/119,285, some of which are appropriate for use with MSD assemblies described in the present disclosure.

The MSD assembly described in the present disclosure may, in some circumstances, serve as an alternative to a mechanical packer system used in a filter casing, and/or external seals on a fluid treatment cartridge. The mechanical packer system is anticipated to provide greater control of fluid flow which may be required under higher pressure applications such as those typically encountered at greater subsurface depths or for controlling fluid flow for long periods of time. One goal of the present disclosure is to have multiple devices, apparatus, tools, and methods as appropriate for use with the systems described in U.S. Pat. No. 9,937,537 B2 and U.S. Pat. No. 10,556,260 B2. However, the MSD assembly described in the present disclosure is not limited to large diameter filter casings. Smaller diameter embodiments of the MSD assembly may be used in groundwater monitoring wells, drilled groundwater supply wells, and other casings to serve multiple purposes.

The MCD assembly overcomes some of the shortcomings of conventional techniques and tools for working with casings in the subsurface, such as 1) sealing off the flow of fluids that may enter a casing from an elevation for hydraulic testing or other purposes, such as the integration with a fluid-treatment cartridge, 2) measuring physical or chemical properties of a fluid at a specific elevation in a casing, and/or 3) surging fluids in casings that have external openings that may periodically need to be cleaned.

SUMMARY

This summary is provided to introduce in a simplified form concepts that are further described in the following detailed descriptions. This summary is not intended to identify key features or essential features of the claimed subject matter, nor is it to be construed as limiting the scope of the claimed subject matter.

The purpose of the invention is to provide in situ treatment of contaminated groundwater and flow diversion without the need for an external energy source. The primary means by which contaminated groundwater is treated in situ in a subsurface environment is through the use of the use of the Subflow$R_x$ and related components that work together or independently to control groundwater flow outside the system as well as diverting contaminated groundwater inside the system for extended treatment. The present disclosure provides embodiments, examples, and advantages of how the components work individually and collectively for the common purpose of in situ treatment of contaminated groundwater without the need for an external energy source.

The present disclosure describes devices, tools, and methods for positioning and operating mechanical packer systems in casings for the purpose of controlling fluid flow. The mechanical packer systems described in the present disclosure may be used in vertical, inclined, or horizontal casings, pipes, boreholes, cartridges, or similar conduits (commonly referred to herein as casings). The mechanical packer systems may be applied in casings below the ground surface (e.g., controlling fluid flow in groundwater contamination assessments, groundwater resource investigations, or oil and gas exploration). The mechanical packer systems may be applied in casings above a ground surface (e.g., controlling fluid flow in water or gas lines, drainage pipes, or horizontal borings in tunnels).

In at least one embodiment, a mechanical packer assembly includes: an upper and lower plate with interior channels that form cylindrical bores that radiate from a central hole when the plates are detachably secured to each other.

In at least one example, cylindrical rods operate within some of the bores in the plates, one end of each rod is attached to a disc on the outer circumference of the plates, the other end of each rod is beveled and extends into the center hole of the plates.

In at least one example, springs operate within other bores in the plates on both sides of each rod, one end of each spring is attached to a disc on the outer circumference of the plates and the other ends of each spring are attached to the interior of the plates.

In at least one example, most of the external surfaces of the packer assembly are encased in a formed rubber material.

In at least one embodiment, a mechanical packer assembly is placed in position in a casing by a hollow core cylindrical tool which includes: a hollow core sub with threads to connect with opposing threads in the central hole of one plate of the mechanical packer assembly and one or more hollow core stems that are connected to the sub (the tool is referred to herein as a packer stem assembly).

In at least one example, the packer assembly is positioned by the packer stem assembly to a desired location inside a casing, an annular space is defined between the exterior of the packer assembly and an interior of the structural wall of the casing.

In at least one embodiment, a cylindrical tool for actuating the packer assembly includes a sub that is beveled on one end to interact with the beveled ends of the cylindrical rods exposed in the central hole of the packer assembly and the other end connected to one or more stems (the tool is referred to in the present disclosure as a "Packtivator").

In at least one example, when a Packtivator is inserted into the hollow core of the packer stem assembly and the beveled end of the Packtivator sub contacts the beveled rods exposed in the center hole of the packer assembly, a mechanical wedge force results that extends the rods radially out from the center of the packer assembly.

In at least one example, the rods which are connected to two or more discs that surround the circumference of the packer assembly are also extended radially outward from the packer assembly.

In at least one example, as the Packtivator continues to exert a mechanical wedge force on the rods, the discs which are encased in a formed rubber material fill the annular space between the exterior of the packer assembly and the interior of the structural wall of the casing.

In at least one example, the activated packer assembly applies a uniform compressive force on the interior structural wall of the casing and the formed rubber material seals the annual space preventing fluid flow.

In at least one example, the packer assembly is deactivated when a Packtivator is withdrawn from a casing, the mechanical wedge force is removed, extension springs return the disc assemblies to the plates, placing the packer assembly in an inactive state, and the packer assembly is withdrawn from the casing by the packer stem assembly.

In at least one embodiment, a fluid treatment cartridge integrated with a mechanical packer system includes: a cylindrical cartridge casing that houses media for treatment of fluids, having solid external walls, a perforated internal cylinder to fit over a Packtivator, a top and bottom plate, one plate of which is perforated.

In at least one example, a fluid treatment cartridge is positioned inside a casing over a Packtivator and seated adjacent to an activated packer assembly.

In at least one example, a second packer assembly is positioned near the top of a first Packtivator at the top of the fluid treatment cartridge and is activated by a second Packtivator.

In at least one example, the two activated packer assemblies control and divert fluid to flow into the internal cylinder of the fluid treatment cartridge, through perforated holes in the walls of the internal cylinder, into the media inside the fluid treatment cartridge, and out perforated holes on either the top or bottom cover of the fluid treatment cartridge (depending on the orientation of the fluid treatment cartridge within a casing and the direction of fluid flow), thereby preventing the fluid from bypassing treatment inside the cartridge.

In addition to the broader advantages of a mechanical packer system previously discussed in the background section, there are additional advantages that are apparent when using mechanical packer systems and associated devices, tools, and methods for positioning and operating mechanical packer systems in casings for the purpose of controlling fluid flow, specifically when a fluid treatment cartridge is introduced into the casing. These advantages include, but are not limited to: 1) eliminates the risk of damaging an exposed inflatable seal external to a fluid treatment cartridge during transport or installation; 2) reduces the need for centralizers on the fluid treatment cartridge used to align the cartridge in a casing in order to help protect an exposed inflatable seal external to the cartridge; 3) allows media to be compacted on the interior of a fluid treatment cartridge without risk of damage to tubing, valves, and fittings that may be installed inside the cartridge; 4) removes a potential conduit inside the fluid treatment cartridge that could otherwise serve as a preferential flow path for a fluid to bypass sufficient treatment by contact and increased residence time with the treatment media; 5) enables testing of the hydraulic integrity of a subsurface barrier wall connected to one or more filter casings in advance of installing a fluid treatment cartridge; and 6) reduces time required to isolate and correct potential leaks.

In regard to sixth advantage, the integrity of a mechanical packer to control fluid flow can be tested in a casing in advance of installing a cartridge. Conversely, when a seal directly on the fluid treatment cartridge is not sufficiently controlling fluid flow, the heavy cartridge has to be hoisted out of the filter casing, returned to a laboratory or suitable facility, dismantled, and the treatment media removed (when the tubing, valves, and fittings are on the inside of the cartridge). Once the problem is isolated, the cartridge has to be reassembled, transported, reinstalled in the casing, and rechecked while potentially contaminated fluids have been by-passing treatment in the cartridge during the down time, in this example. Separating the treatment function from sealing function could be advantageous, particularly in environmental applications.

The mechanical packer systems described in the present disclosure are retrievable; however, the systems could also be dedicated to a specific application and considered permanent. Additional advantages of the multi-purpose mechanical packer systems are likely to be recognized beyond those described in the present disclosure and applications for other purposes are expected beyond those stated herein.

The present disclosure describes devices and methods for positioning and operating multipurpose casing devices ("MCDs") in subsurface cylindrical casings for different purposes such as 1) sealing off the flow of fluids that may enter a casing from an elevation for hydraulic testing or other purposes, such as the integration with a fluid-treatment cartridge, 2) measuring physical or chemical properties of a fluid at a specific elevation in a casing, and/or 3) surging fluids in casings that have external openings that may periodically need to be cleaned. MCDs may be applied, for example, in groundwater contamination assessments, groundwater resource investigations, or oil and gas exploration.

In at least one embodiment, an (MCD) includes: a layer of a flexible elastomeric element (referred to in the present disclosure as a rubber material) between two rigid plates that are detachably secured to each other wherein the layer of intervening rubber material has a greater diameter than that of the opposing two plates.

In at least one embodiment, the layer of rubber material has a diameter that is slightly larger than the inside diameter of the casing in which the MCD is to be positioned.

In at least one embodiment, an MCD has rubber material between three or more rigid plates that are detachably secured to each other wherein the intervening layer of rubber material has a greater diameter than that of the opposing three or more plates and slightly greater than the inside diameter of the casing in which the MCD is to be positioned.

In at least one embodiment, an MCD has a hole in the center of each rigid plate; the hole in the center of an upper plate and a lower plate of which is female threaded and is thicker than intervening plates that have no threads in the center hole.

In at least one embodiment, a layer of rubber material is on the outside of the top and the bottom plate and each layer has a diameter equal to that of the plates.

In at least one embodiment, an MCD has a hole in the center of each layer of rubber material matching the diameter of the hole in one or more adjoining plates.

In at least one embodiment, a relatively short segment of a hollow core cylindrical rod is attached by male threads to the female threaded hole in the center of an upper plate or a lower plate.

In at least one embodiment, the relatively short segment of a hollow core cylindrical rod contains a foot valve or similar device for preventing the backflow of fluids inside the rod, referred to in the present disclosure as a foot-valve sub.

In at least one embodiment, hollow core cylindrical rods of variable lengths (referred to in the present disclosure as extensions), have a male and a female threaded connection on each end, and a hole through each threaded connection for inserting quick-connect pins or similar devices to prevent unthreading.

In at least one example, an appropriately sized MCD is selected for a casing wherein the rubber material between adjoining plates is slightly larger than the inside diameter of the casing.

In at least one example, a foot-valve sub is attached to an appropriately sized MCD for the selected casing by removably connecting the male threaded end of the foot-valve sub to the female threads in either the top plate or the bottom plate of the MCD.

In at least one example, one end of an extension is attached to the foot-valve sub by connecting the male threaded end of the extension to the female threads in the top of the foot-valve sub and inserting a quick connect pin in the hole at the connection to prevent unthreading.

In at least one example, another extension is added to the first extension, if needed for reaching the designated elevation in a casing, and once the male threaded end of the second extension is connected to the female threads in the top of the first extension, a quick connect pin is inserted to prevent unthreading at the connection.

In at least one example, the above example is repeated as needed for obtaining an MCD of sufficient length to reach the designated elevation in a casing for the MCD assembly.

In at least one example, the rubber material of the MCD is lubricated with a pure fluid (such as deionized water) prior to installation for ease of compression in the casing.

In at least one example, an MCD assembly (defined herein as an MCD connected to a foot-valve sub, connected to one or more hollow core extensions, and secured by quick-connect pins) is compressed into the casing to the designated elevation and any fluid that may be entering the casing at a lower elevation will rise through the foot-valve sub and into the hollow-core extension(s) until equilibrium is reached with a fluid pressure outside the casing.

In at least one example, fluid within a hollow core extension can be measured (e.g., similar to measuring the hydrostatic head of groundwater in a piezometer) or sampled for chemical properties (e.g., similar to obtaining a groundwater sample from a monitoring well which represents groundwater quality from a discrete elevation).

In at least one example, an MCD is set at a designated elevation in a casing (using the foot-valve sub, hollow core extension [s], and quick-connect pins; these three components are referred to herein as the MCD stem assembly), and once the MCD stem assembly is detachably removed from the MCD by unthreading the MCD from the MCD stem assembly, a fluid-treatment cartridge is inserted in a casing and seated on top of the MCD at least until such time as the cartridge needs to be replaced based on the monitoring results.

In at least one example, a fluid-treatment cartridge is connected to an MSD stem assembly and inserted at a designated elevation in a casing using the MCD stem assembly and once the MCD stem assembly is detachably removed from the cartridge, the MCD stem assembly is reused to seat an MCD on top of the cartridge, at least until such time as the cartridge needs to be replaced based on the monitoring results.

In at least one example, the MCD is used to control fluid flow in a casing, whether the fluid is flowing upward or downward in the casing, directing the fluid to purposely flow within a fluid treatment cartridge and preventing the fluid from flowing through the annular space between the outside of the cartridge and inside walls of the casing.

In at least one example, an MCD assembly is used to surge fluids in a casing that has external openings (e.g., well screens, slots, louvers, or other openings exposed to an outside filter pack or natural formation material) that may periodically need to be cleaned (e.g., to remove fine particles, bacteria, or other materials that may clog or otherwise impede the flow of a fluid through the openings).

In at least one example, an MCD assembly is moved up and down a casing creating a surging action to remove materials in casing openings and thereby causing the materials to move upward with fluids through the foot-valve sub, hollow core extensions, and discharged above the ground surface.

In at least one example, an MCD assembly is withdrawn from a casing, dissembled, and the components are stored for a subsequent use in other casings where potential fluid contamination is not an issue.

In at least one example, an MCD assembly is withdrawn from a casing, the components are disassembled, decontaminated, and the MCD assembly is either dedicated for reuse in the same casing or potentially usable in other casings in the future.

In at least one example, an MCD is used, for example, at a hazardous waste site investigation, the MSD assembly is withdrawn from a casing, the components are disassembled and properly disposed of with other investigative derived waste or materials.

In at least one example, an MCD assembly is suitable for use in relatively large diameter filter casings (e.g., greater than 11 inches in diameter) such as those previously described and referenced in the prior art for: 1) sealing off the flow of fluids that may enter a casing from a known elevation for hydraulic testing or other purposes, such as the integration with a fluid-treatment cartridge, 2) measuring physical or chemical properties of a fluid at a specific elevation in a casing, and/or 3) surging fluids in casings that have external openings that may periodically need to be cleaned.

The MCD assemblies described in the present disclosure could be reusable between casings; however, in situations where the fluid entering the casing is contaminated, the MCD assemblies may be dedicated to individual casings. Because the MSD assembly is a relatively simple tool it will be inexpensive to manufacture and could be disposed of if decontaminating between casings is impractical or if there is a concern due to potential trace-level contamination. Additional advantages of multipurpose casing devices are likely to be recognized beyond those described in the present disclosure and applications for other purposes are expected beyond those stated herein.

The present disclosure also relates to a vertically installed subsurface cylindrical casing which includes an inlet screen and an outlet screen (referred to herein as a "PileGate"), wherein the inlet and outlet screens are on opposite sides of the PileGate from each other, at different elevations from each other, and physically separated from each other by vertical interlocks on the PileGate), an physical subsurface barrier wall connected to the vertical interlocks on the PileGate (i.e., sheet piling), and an in situ groundwater treatment cartridge inside the PileGate (referred to in the present disclosure as a Cartridge$R_x$) or similar in situ groundwater treatment device inside the PileGate. When modular components are added and used to treat contaminated groundwater in situ the subsurface environment, the system is referred to in the present disclosure as the Subflow$R_x$, in reference to the components described in detail in U.S. Pat. Nos. 9,937,537 and 10,556,260.

The Subflow$R_x$ overcomes some of the shortcomings of other commonly available groundwater remediation technologies by minimizing human contact with contaminated materials, providing in situ treatment of a wide range of contaminants found in groundwater by changing the type of solid reactive media inside the Cartridge$R_x$, and replacing the contents in the Cartridge$R_x$ when the media is no longer able to treat contaminant. In addition, the Subflow$R_x$ requires no external energy source to operate relying instead on gravitational forces to transmit contaminated groundwater in an aquifer from an upgradient side of the barrier wall through the system for in situ treatment allowing treated groundwater to discharge from downgradient side of the system. The barrier wall further serves to prevent contaminated groundwater from migrating to unwanted locations (e.g., toward wells that supply groundwater as a source of drinking water or toward sensitive environmental receptors).

The present disclosure further relates to additional components used in conjunction with the MP and/or the MCD in association with the Subflow$R_x$. One component includes dedicated a drive point injection tool to aid in the installation of the Subflow$R_x$ (referred to as the "DPIT" in the present disclosure) to aid in the installation of the Subflow$R_x$. One problem associated with conventional trench based PRBs used in groundwater remediation is the concern for underflow beneath barrier wall where some contaminants may escape treatment. To help overcome this shortcoming of conventional PRBs, the DPIT is detachably secured to a rigid external drive casing and driven to a target elevation in a contaminated subsurface environment prior to the insertion of the PileGate in the rigid external drive casing. When the rigid external drive casing is partially extracted vertically upwards, injection ports are exposed in the dedicated DPIT and are used to inject liquids below the Subflow$R_x$ forming a chemically based barrier wall, using for example in one embodiment, a two-part polymer/coagulant mixture to seal off potential underflow (referred to as the preferred two-part "P/C" mixture in the present disclosure). In other applications the dedicated DPIT can be used to inject liquid treatment amendments below the Subflow$R_x$ at a lower elevation concurrent with in situ groundwater treatment at a higher elevation by solid media in the Cartridge$R_x$. The rigid external drive casing used to install the DPIT is also used to protect the installation of the PileGate, particularly the inlet and outlet screens of the PileGate.

Another component that may be used in conjunction with an MP and/or the MCD in association with the Subflow$R_x$ includes a spiral-shaped treatment device inserted directly inside the PileGate or inside the Cartridge$R_x$. The spiral-shaped treatment device is referred to in the present disclosure as the "SSTD". One issue that the SSTD helps overcome is the need to increase contact time of contaminated groundwater flowing through a cylindrical casing with the treatment media installed inside the casing. The flow of contaminated groundwater is diverted inside the SSTD and reaction time with treatment media contained within the device is thereby increased.

In one embodiment, a mechanical packer (MP) includes but is not limited to, an upper and lower plate with interior channels that form cylindrical bores that radiate outwardly from a central hole when the plates are detachably secured to each other; wherein, cylindrical rods operate within some of the bores in the plates, one end of each rod is attached to a disc on the outer circumference of the plates, the other end of each rod is beveled and extends into the center hole of the plates; wherein springs operate within other bores in the plates on both sides of each rod, one end of each spring is attached to a disc on the outer circumference of the plates and the other end of each spring is attached to the interior of the plates; and most of the external surfaces of the packer assembly are encased in a rubber material).

In one embodiment, an MP placement tool includes a hollow core cylindrical device with a hollow core sub detachably secured to the central hole in the upper plate of the MP with one or more hollow core stems that are detachably secured to the sub.

In one embodiment, a cylindrical tool for actuating the MP includes a sub that is beveled on one end to interact with the beveled ends of the cylindrical rods exposed in the central hole of the MP and the other end of the tool connected to one or more stems. The tool for actuating the MP is referred to as the Packtivator in the present disclosure.

In at least one example, the MP is positioned by the placement tool to a predetermined elevation inside a PileGate, activated by the Packtivator, and used to support a CartridgeR$_x$ seated and sealed on the top of the MP.

In at least one example, the activated MP applies a uniform compressive force on the interior structural wall of the PileGate wherein the rubber material of the MP seals the walls from groundwater flow. Instead, contaminated groundwater is diverted through the central hole in the bottom of the lower plate and further diverted by the Packtivator into the overlying CartridgeR$_x$ for treatment before discharging from the PileGate into a downgradient section of an aquifer. In this example, the CartridgeR$_x$ does not require an external seal in the annular space between the interior wall of the PileGate and exterior wall of the CartridgeR$_x$ which is advantageous in some applications.

Advantages are apparent when using the MP, the placement tool, and the Packtivator in casings for the purpose of controlling or directing liquid flow, specifically when a CartridgeR$_x$ or SSTD is introduced into a PileGate. These advantages include, but are not limited to: 1) eliminates the risk of damaging an exposed inflatable seal external to a CartridgeR$_x$ during transport or installation; 2) reduces the need for centralizers on the CartridgeR$_x$; 3) allows permeable treatment media to be uniformly compacted inside the CartridgeR$_x$ without risk of damage to tubing, valves, and fittings otherwise required; 4) removes a potential conduit inside the CartridgeR$_x$ that could otherwise serve as a preferential flow path for a liquid to bypass sufficient treatment by contact and increased residence time with the permeable treatment media; 5) enables testing of the hydraulic integrity of a subsurface barrier wall (e.g. sheet piling) connected to one or more PileGates in advance of installing a CartridgeR$_x$ or SSTD; and 6) reduces time required to isolate and correct potential leaks that may be associated with pneumatic seals.

Other embodiments, examples, and advantages of the MP, the placement tool, and the Packtivator are provided in U.S. patent application Ser. No. 17/537,696; additional embodiments, examples, and advantages are likely to be recognized beyond those described in the present disclosure and applications for other purposes are expected beyond those stated herein.

In one embodiment, a multipurpose casing device (MCD) includes: one or more layers of a rubber material between two or more rigid plates that are detachably secured to each other wherein the layers of intervening rubber material have a greater diameter than that of the opposing two plates, and the layers of rubber material have a diameter that is slightly larger than the inside diameter of the PileGate in which the MCD is to be positioned.

In at least one embodiment, an MCD has a hole in the center of each rigid plate; the hole in the center of an upper plate which is a tapered female thread and is thicker than intervening plates that have no threads in the center hole, and a layer of rubber material is on the top of the upper plate and bottom of the lower plate and each layer has a diameter equal to that of the plates. The hole in the center of each layer of rubber material matches the diameter of the hole in one or more adjoining plates.

In at least one embodiment, a relatively short segment of a hollow core cylindrical rod is attached by tapered male threads to the tapered female threaded hole in the center of a thicker upper plate; the relatively short segment containing a foot valve or similar device for preventing the backflow of liquids, referred to in the present disclosure as a foot-valve sub.

In at least one embodiment, hollow core cylindrical rods of variable lengths (referred to in the present disclosure as extensions), have a parallel male and a parallel female threaded connection on each end, an O-ring (or equivalent seal or bonded washer) at the base of the male threaded connections, and a hole through each threaded connection for inserting quick-connect pins or similar devices to prevent unthreading and prevent liquid leakage.

In at least one example, an MCD assembly is compressed into a PileGate at a designated elevation and any liquid that may be entering the casing at a lower elevation will rise through the foot-valve sub and into the hollow-core extension(s) until equilibrium is reached with a liquid pressure outside the casing. The liquid within a hollow-core extension can be measured (e.g., similar to measuring the hydrostatic head of groundwater in a piezometer) or sampled for chemical properties (e.g., similar to obtaining a groundwater sample from a monitoring well which represents groundwater quality from a discrete elevation).

In at least one example, an MCD is set at a designated elevation in a casing (using the foot-valve sub, hollow-core extension [s], and sealable quick-connect pins; these three components are referred to herein as the MCD stem assembly), and once the MCD stem assembly is detachably removed from the MCD, a CartridgeR$_x$ or SSTD is inserted in a casing and seated on top of the MCD. Similarly, an MCD may be seated on top of a CartridgeR$_x$ or SSTD, In at least one example, the MCD is used to control liquid flow in a casing, whether the liquid is flowing upward or downward in the casing, directing the liquid to purposely flow within a CartridgeR$_x$ or SSTD and preventing the liquid from flowing through the annular space between the outside of the device and inside walls of the casing.

In at least one example, an MCD assembly is used to surge liquids in a casing that has external openings (e.g., well screens, slots, louvers, or other openings exposed to an outside filter pack, gravel pack, or natural formation material) that may periodically need to be cleaned (e.g., to remove fine particles, bacteria, or other materials that may clog or otherwise impede the flow of a liquid through the openings). The MCD assembly is moved up and down a casing creating a surging action to remove materials in casing openings and thereby causing the materials to move upward with liquids through the foot-valve sub, hollow-core extensions, and discharged above the ground surface.

In one example the MCD can be placed in the bottom of a PileGate and used as a spacer for a CartridgeR$_x$ or SSTD to be seated upon.

Advantages of the MCD assembly include its use to: 1) control liquid flow in a PileGate for the purpose of directing contaminated groundwater to contact treatment media inside a CartridgeR$_x$ or SSTD, 2) conduct hydraulic testing to assess the integrity of a barrier wall attached to a PileGate by sealing off an inlet or an outlet screen of a PileGate and measuring groundwater levels upgradient and downgradient of the wall, 3) measure groundwater levels at a specific elevation in a PileGate and/or obtain groundwater samples for chemical analysis with hollow core tools connected to an MCD, and/or 4) surge liquids through inlet and/or outlet screens of PileGate that may need to be periodically cleaned.

Another advantage of the MCD assembly is that it is a relatively simple tool that will be inexpensive to manufacture. As such, an MCD assembly could be dedicated to each PileGate or similar casing where deployed.

Other embodiments, examples, and advantages of the MCD assembly are provided in U.S. patent application Ser. No. 17/559,138; additional embodiments, examples, and advantages are likely to be recognized beyond those described in the present disclosure and applications for other purposes are expected beyond those stated herein.

The present disclosure further relates to additional components and formulations that may be used in conjunction with the MP and/or the MCD assembly in association with the Subflow$R_x$.

One component includes a drive point injection tool (herein referred to as "DPIT") which has multiple purposes, namely to: 1) aid in the installation of the PileGate by detachable securement to a rigid external drive casing which is driven to a target elevation in a contaminated subsurface environment prior to the insertion of the PileGate inside the rigid external drive casing, 2) serve as an injection point of treatment amendments below the PileGate to supplement treatment inside a Cartridge$R_x$ or SSTD, and/or 3) serve as an injection point of formulated liquids that coagulate and minimize underflow beneath the PileGate.

In one embodiment the dedicated DPIT includes, but is not limited to, a bottom point of a rigid conical structure that is internally supported by reinforcement rods; a circular collar secured to a top plate of the drive point; a plurality of horizontal injection tubes that extend through the collar, the exterior portion of which form injection ports covered with wire cloth or screen, the interior portions secured to elbows, which in turn are secured to vertical injection tubes housed inside a lower circular plate, the circumference of which is secured to an inside wall of the collar; and a lower circular plate has a center hole with internal female threads, the circumference of which is also secured to an inside wall of the collar.

In one embodiment, the DPIT has a foot-valve sub secured to the lower circular plate by exterior male threads on the bottom of the foot-valve sub, an upper circular plate secured to an upper portion of the collar which further secures the top of the foot-valve sub inside an unthreaded circular hole.

In one embodiment, the foot-valve sub of the DPIT is comprised of a ball and an internally tapered cylinder in the top of the foot-valve sub which serves as a ball stop and seal when fluids are flowing upwardly; and a horizontal rod which serves as a ball stop in the bottom of the foot-valve sub when fluids are flowing downwardly, and the foot-valve sub is open.

In one example, the DPIT is seated upright on a ground surface, a rigid external drive casing with an inside diameter larger than the outside diameter of the DPIT collar is detachably secured to the DPIT, and the DPIT is driven into a contaminated subsurface environment to a target elevation.

In one example, a hollow-core injection rod that also serves as a hold-down tool is inserted inside the rigid external drive casing and detachably secured to the DPIT to hold in place while the rigid external drive casing is partially lifted a small amount to expose the plurality of injection ports.

Once the plurality of injection ports of the DPIT are exposed, and while the hollow-core injection rod is still detachably secured to the DPIT, an opportunity exists to inject liquids at a lower elevation in the subsurface environment that augment a site remedial strategy. Such injections are performed before the PileGate—and the interrelated components that are inside the PileGate such as the MP, MCD, Cartridge$R_x$, and/or other components—are installed. Liquid formulations are described below.

In one example, a liquid treatment amendment is injected from the ground surface through the injection rod, through the injection tubes and injection ports, and disperse into a specific elevation in a formation that requires supplemental treatment (e.g., prior to the installation of a PileGate and interrelated components in the same installation at a higher elevation).

In one example, the treatment amendment is a liquid specifically formulated to treat a site-specific contaminant or multiple contaminants in situ as the treatment amendment migrates with the contaminated groundwater and reduces the concentration of contaminants in the aquifer by chemical interactions (e.g., precipitation or adsorption).

In one example, the treatment amendment is a nanoscale zero-valent iron. In another example, the treatment amendment is a liquid activated carbon.

In an entirely different application, the DPIT is used to inject substances that are intended to seal a formation at a specific elevation and create a subsurface barrier to minimize groundwater underflow (prior to the installation of a PileGate in the same installation at a higher elevation). The suitability of injected substances is highly site specific, but could include in one example, simple combinations of water, bentonite, and cement, or in another example, the injected substance could be a more complex chemical grout. However, these substances may not be sufficient to reach extended distances from the point of injection.

In one embodiment, a subsurface barrier to minimize groundwater underflow is composed of a controlled polymer/coagulant liquid injection mixture, referred to in the present disclosure as a two-part P/C mixture.

In one embodiment, the preferred two-part P/C mixture is a polymer emulsion (carboxylated styrene-butadine latex) and a ferric chloride ($FeCl_3$) coagulating agent.

In one embodiment, the ferric chloride coagulating agent is used to destabilize the disperse polymeric particles contained in the polymer emulsion and form a three-dimensional aggregate network.

In one embodiment, the preferred two-part P/C mixture is formulated to consistently reduce the permeability of a porous layer in an aquifer by at least two orders of magnitude due to the highly cohesive characteristics of the formulation that allow adhesion to the aquifer matrix.

In one example the polymer emulsion is injected from the ground surface through the injection rod, through the injection tubes and injection ports of the DPIT, and then disperses into a specific zone of that requires sealing (e.g., prior to the installation of a PileGate and interrelated components in the same installation at a higher elevation).

In one example, the ferric chloride coagulating agent is injected from the ground surface through the injection rod, through the injection tubes and injection ports of the DPIT, and then disperses into same zone as the polymer emulsion resulting in coagulation and permeability reduction.

The advantages of the preferred two-part P/C mixture injected from the DPIT and used as a subsurface barrier to minimize groundwater underflow in the vicinity of an associated Subflow$R_x$ include: 1) the two-part P/C mixture forms a strong barrier by combining with the existing aquifer matrix; 2) high concentrations of high-molecular weight polymeric particles remaining sufficiently fluid to penetrate porous media; 3) the coagulation forms a low permeability material under controlled conditions; 4) in contrast to other downhole grouting techniques that seal a limited area around an injection point, the gelation time of the two-part P/C formulation can be controlled to allow coagulation to occur at extended distances from the point of injection, thereby decreasing the need of closely spaced injection wells; and 5) the emulsion has the ability to flow into and through thin zones of higher permeability even within lower-permeability stratum to coagulate within these zones of greatest fluid transmission. In addition, the preferred two-part P/C mixture is well suited for subsurface injections as it is not reversible, noncorrosive, and nontoxic under a variety of environmental applications. Finally, the two-part preferred P/C mixture has long-term stability, good rheological properties, and is economically feasible.

The rigid external drive casing used to install the dedicated DPIT has an added advantage of serving as a protective casing for the installation of the PileGate once any initial injections are completed and the injection rod is removed. The rigid external drive casing has a larger internal diameter than the external diameter of the PileGate, such that the PileGate can be lowered into the rigid external drive casing and seated upon the top of the DPIT. A gravel pack is incrementally added in the annular space between the exterior walls of the PileGate and the interior walls of the rigid external drive casing as the rigid external drive casing is upwardly withdrawn from the subsurface environment. An expansive sealant or equivalent is used in the female vertical interlock of the PileGate to minimize interference between the gravel pack and installation of the next component of the subsurface barrier wall (e.g., sheet piling).

Once the lower segment of the rigid external drive casing is near the ground surface the upper portion of the casing can be cut off such that the remaining portion of the casing forms a protective physical barrier around the PileGate. The upper portion of the annular space can then be protected following local regulations for well completion (e.g., addition of a bentonite seal, cement to the ground surface, and construction of a lockable top). Interrelated components such as the MP, MCD, Cartridge$R_x$, SSTD, and/or other devices are then installed in the PileGate.

Another component that may be used in conjunction with the MP and/or the MCD assembly in association with the Subflow$R_x$ includes a spiral-shaped treatment device referred to in the present disclosure as the "SSTD".

In one embodiment, the SSTD is a solid core cylinder including a plurality of walls, wherein the plurality of walls of the solid core cylinder include a plurality of flights secured to an exterior, wherein the plurality of flights are configured to spiral upwardly from a bottom to a top of the solid core cylinder.

In one embodiment, the SSTD has a slot on an outer edge of the flights configured to hold a rubber material insert further configured to form a seal when the SSTD is positioned inside a casing (e.g., PileGate or Cartridge$R_x$).

In one embodiment, the SSTD has a coiled porous stocking containing solid permeable reactive media for the treatment of contaminated groundwater that is configured to reside on the external flights of the solid core cylinder.

In one example, the casing in which the SSTD is installed is a Cartridge$R_x$.

In one example, the casing in which the SSTD is installed is a PileGate.

The advantage of the SSTD is that it increases contact time of contaminated groundwater with the treatment media by diverting the groundwater flow over an increased distance along a spiral pathway. Although the SSTD can be installed in the Cartridge$R_x$, it may be more advantageous in some applications to install the SSTD directly in the PileGate where it can be positioned on top of or below the MP or the MCD.

In summary, the present disclosure provides, as one example application, a side elevation perspective of an in situ groundwater treatment and flow diversion system in which the rigid external drive casing system is used to install a dedicated DPIT into a contaminated subsurface environment. A polymer emulsion is injected from the ground surface through the injection rod, through the injection tubes and injection ports of the DPIT, and then disperses into a specific zone that requires sealing. A coagulating agent is then injected from the ground surface through the injection rod, through the injection tubes and injection ports of the DPIT, and then disperses into same zone as the polymer emulsion resulting in coagulation and a significant reduction in permeability.

In this example application, a PileGate is then installed inside the rigid external drive casing system and seated upon the dedicated DPIT. In this example, an MCD is installed at the bottom of the PileGate as a spacer just below the lower elevation screens of the PileGate and an SSTD with a coiled porous stocking configured to contain solid permeable reactive media resides on the flights of the SSTD. An MP is installed on top of the SSTD and a Packtivator activates the MP sealing the interior walls of the PileGate.

In this example application, contaminated groundwater from an upgradient source migrates toward the lower elevation screen of the PileGate. The groundwater is diverted from flowing beneath be PileGate as a result of the significant permeability reduction in a lower elevation stratum due to the coagulation of the preferred two-part P/C mixture of the polymer emulsion (carboxylated styrene-butadine latex) controlled by the ferric chloride ($FeCl_3$) coagulating agent.

In this example application, contaminated groundwater diverted horizontally into the lower elevation screen of the PileGate flows upwardly through the coiled porous stocking containing solid permeable reactive media that resides on the flights of the SSTD. As a result of the increased contact time with the reactive media over the increased distance along the spiral pathway, the groundwater is treated and further diverted vertically upward through the central hole in the bottom of the MCD. The treated groundwater is further diverted through the hollow core Packtivator where it discharges horizontally out the upper elevation screen of the PileGate and into a downgradient section of the aquifer.

In this example application—when it is time to exchange the permeable reactive media inside the coiled porous stocking residing on the SSTD—the interrelated components inside the PileGate are removed with the exception of the MCD installed in the bottom of the PileGate. In addition to serving as a spacer in this example application, the MCD can be used to clean the interior walls of the PileGate and flush particulates from the upper and lower elevation screens by an upward and downward surging action. The interrelated components can then be reinstalled in the PileGate for the common purpose of providing in situ treatment of contaminated groundwater without the need for an external energy source.

BRIEF DESCRIPTION OF THE DRAWINGS

The previous summary and the following detailed descriptions are to be read in view of the drawings, which illustrate particular exemplary embodiments and features as briefly described below. The summary and detailed descriptions, however, are not limited to only those embodiments and features explicitly illustrated.

FIG. 83 is a side elevation view showing the detailed components of the DPIT.

FIG. 84A is a side elevation view of the DPIT.

FIG. 84B is an overhead view of the upper and lower circular plates.

FIG. 85A is a side elevation view of the PileGate.

FIG. 85B is an overhead view of the PileGate.

FIG. 86 is a side elevation view showing the detailed components of the MCD.

FIG. 87A is a side elevation view showing detailed components of the SSTD.

FIG. 87B is a side elevation view showing the detailed components of the SSTD.

FIG. 87C is a side elevation view showing the detailed components of the SSTD.

FIG. 88 is a side elevation view showing the detailed components of the MP.

FIG. 89A is a side elevation view showing the detailed components of the MP.

FIG. 89B is a side elevation view showing the detailed components of the MP.

Figures 89A, 89B, 89C:
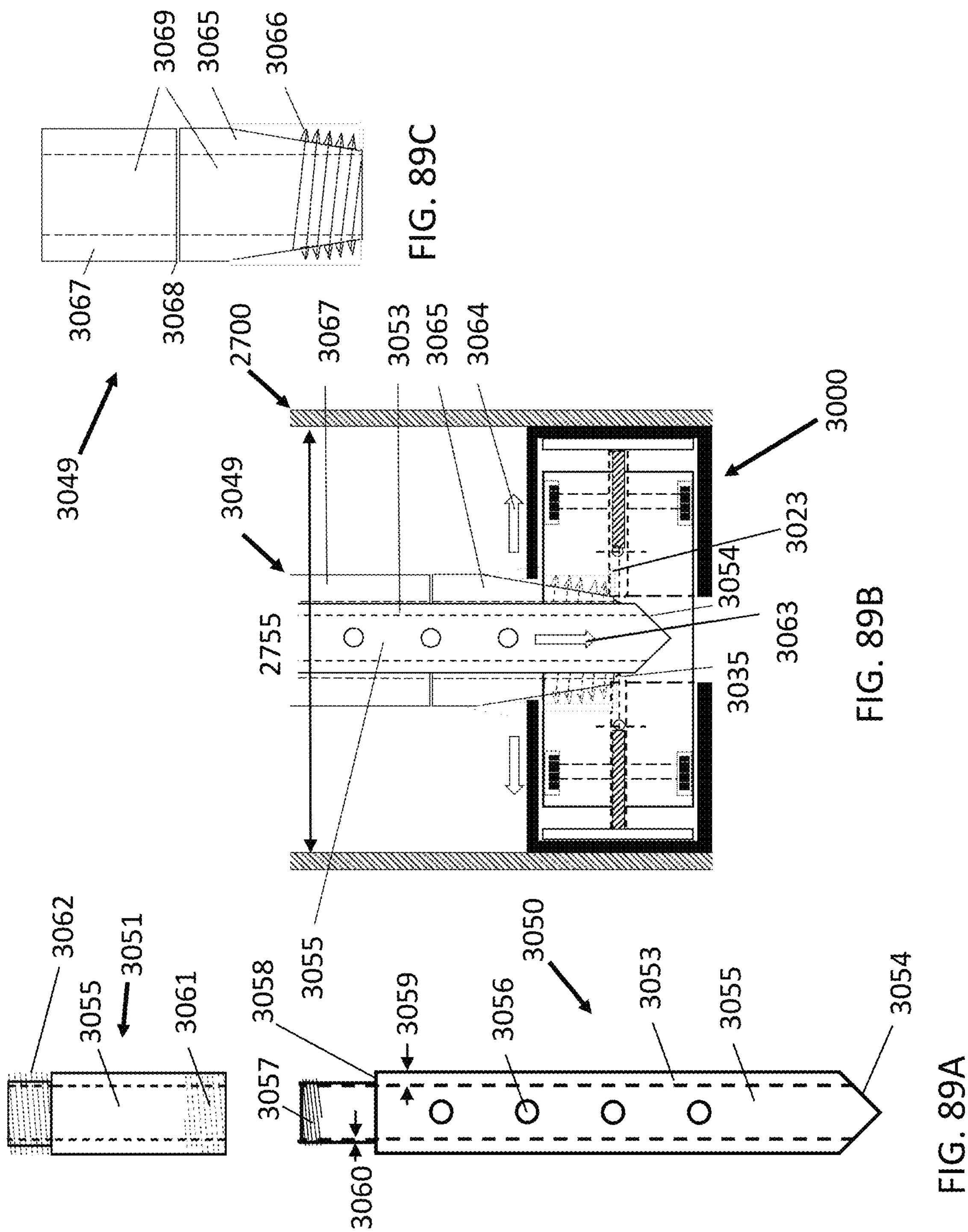

FIG. 89C is a side elevation views showing the detailed components of the MP.

DETAILED DESCRIPTION

These descriptions are presented with sufficient detail to provide an understanding of one or more particular embodiments of broader inventive subject matters. These descriptions expound upon and exemplify particular features of those particular embodiments without limiting the inventive subject matters to the explicitly described embodiments and features. Considerations in view of these descriptions will likely give rise to additional and similar embodiments and features without departing from the scope of the inventive subject matters. Although the term "step" may be expressly used or implied relating to features of processes or methods, no implication is made of any particular order or sequence among such expressed or implied steps unless an order or sequence is explicitly stated.

Any dimensions expressed or implied in the drawings and these descriptions are provided for exemplary purposes. Thus, not all embodiments within the scope of the drawings and these descriptions are made according to such exemplary dimensions. The drawings are not necessarily made to scale. Thus, not all embodiments within the scope of the drawings and these descriptions are made according to the apparent scale of the drawings with regard to relative dimensions in the drawings. However, for each drawing, at least one embodiment is made according to the apparent relative scale of the drawing. Although the drawings largely reference a vertical orientation of a casing, pipe, borehole, cartridge, or similar conduit (i.e., generally referred to the present disclosure as a casing), the inventive subject matters are not limited to a particular orientation of a casing (e.g., the devices in the present disclosure will also work in a horizontal or inclined casing).

Figure 1:
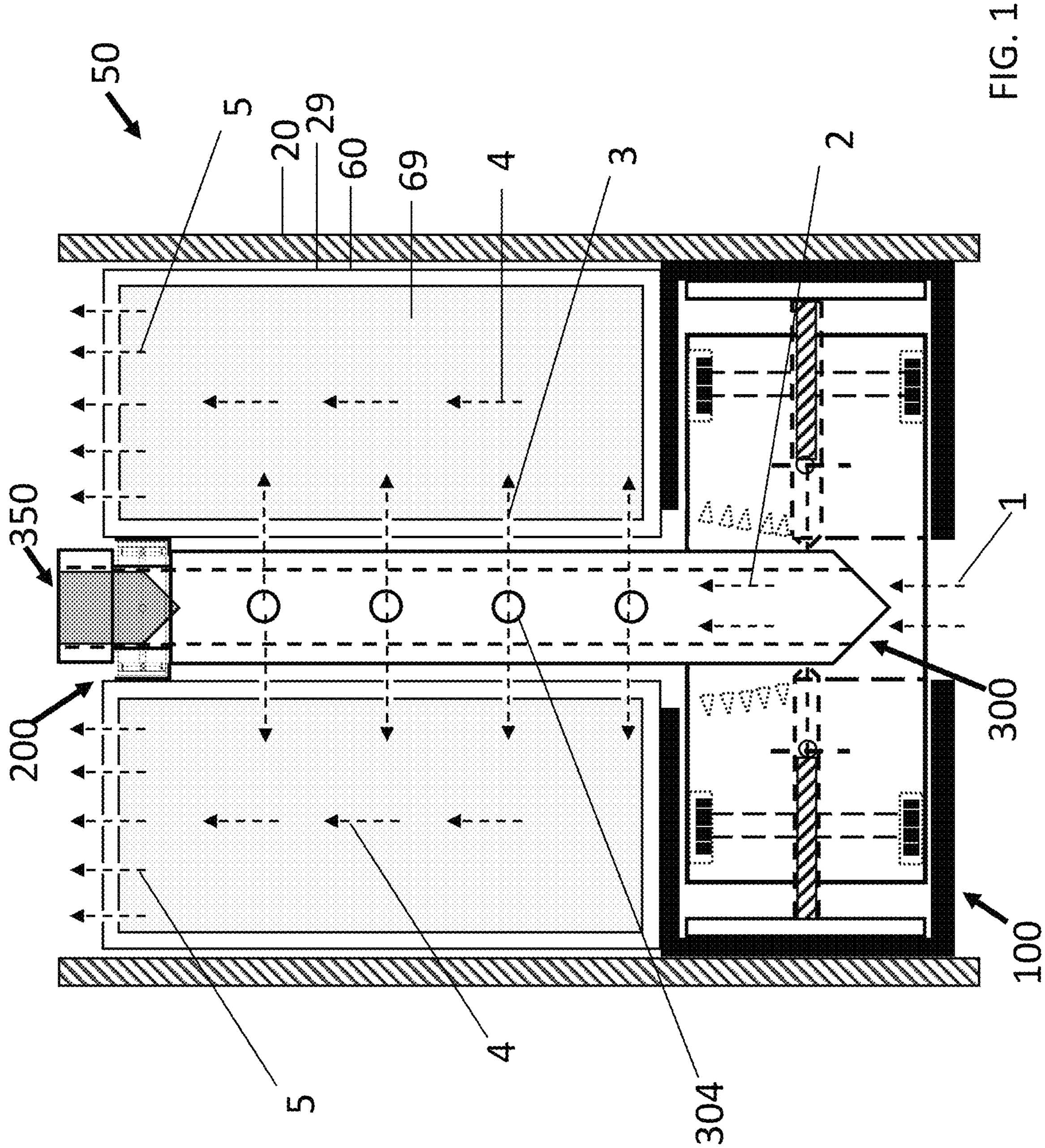
FIG. 1 is a side elevation view of an example application of a large and a small mechanical packer assembly in a casing that have been activated by cylindrically shaped tools to control the flow of a fluid by directing the fluid through a treatment cartridge.

FIG. 1 is a side elevation view of an example application 50 of a mechanical packer system including a large packer assembly 100 in position at a lower elevation inside a section of a vertical cylindrical casing 20 and a small packer assembly 200 in position at an upper elevation. A cylindrically shaped hollow core tool 300 has activated a large mechanical packer assembly 100 and a smaller solid core cylindrically shaped tool 350 has activated a small mechanical packer assembly 200 at an upper elevation. Packer assemblies 100 and 200 in the example application 50 are combined with a fluid treatment cartridge 60 which contains a media 69 on the inside to treat a fluid.

Packer assemblies 100 and 200 shown in FIG. 1 are controlling the flow of a fluid as indicated by dashed arrows 1 through 5 referencing different points along a fluid flow path (i.e., the fluid is generally flowing from points 1 to 5 in this example, which are referred to herein as flow arrows intended to illustrate the general direction of fluid flow). Specifically, in this example 50, a contaminated fluid enters a lower elevation of a casing 20 and flows into the bottom of a large packer assembly 100 shown by parallel flow arrows 1. If the large packer assembly 100 was not present or activated, some of the contaminated fluid would be able to bypass treatment by flowing in the annular space 29 between the fluid treatment cartridge and interior walls of the casing 20. Instead, the fluid flows upward in a hollow core of a cylindrically shaped tool 300 shown by parallel flow arrows 2 and then flows laterally out a plurality of holes 304 in a tool 300 shown by parallel flow arrows 3 into a treatment media 69 inside a fluid treatment cartridge 60. A small solid core cylindrically shaped tool 350 that has activated a small mechanical packer assembly 200 at an upper elevation prevents fluid from bypassing treatment inside the fluid treatment cartridge 60, and instead, the fluid has been laterally dispersed as shown by parallel flow arrows 3 into a cartridge 60 for contact with a treatment media 69 and continues to flow upward as shown by parallel flow arrows 4. In this example application 50, a contaminated fluid that entered a packer assembly 100 at a lower elevation of a casing 20 shown by flow arrows 1 has undergone treatment by contact with the media 69 within a cartridge 60 before flowing out the top of a cartridge 60 shown by flow parallel arrows 5 at a higher elevation.

In the example application 50 shown in FIG. 1, and for general reference only, a larger packer assembly 100 may be on the order of 12-inches in diameter whereas a smaller packer assembly 200 may be only 2-inches in diameter. Other applications are envisioned where different configurations, geometry, and sizes of packer assemblies are used to achieve other objectives still within the scope of the inventive matters. The casing 20 shown in the example application 50 may be represented by steel, plastic, fiberglass, or other material with or without well screens or slots (not shown in FIG. 1). In other applications one or more packer assemblies may be used in an open borehole, for example, drilled vertically, horizontally, or at an inclination in rock, where no casing is required. The devices and mechanisms for construction of a larger packer assembly 100, a small packer assembly 200, a cylindrically shaped hollow core tool 300 for activating a large mechanical packer assembly 100, and a smaller solid core cylindrically shaped tool 350 for activating a small mechanical packer assembly 200, are described in more detail in the present disclosure, along with a description of other embodiments and methods for operation.

Figures 2A, 2B:
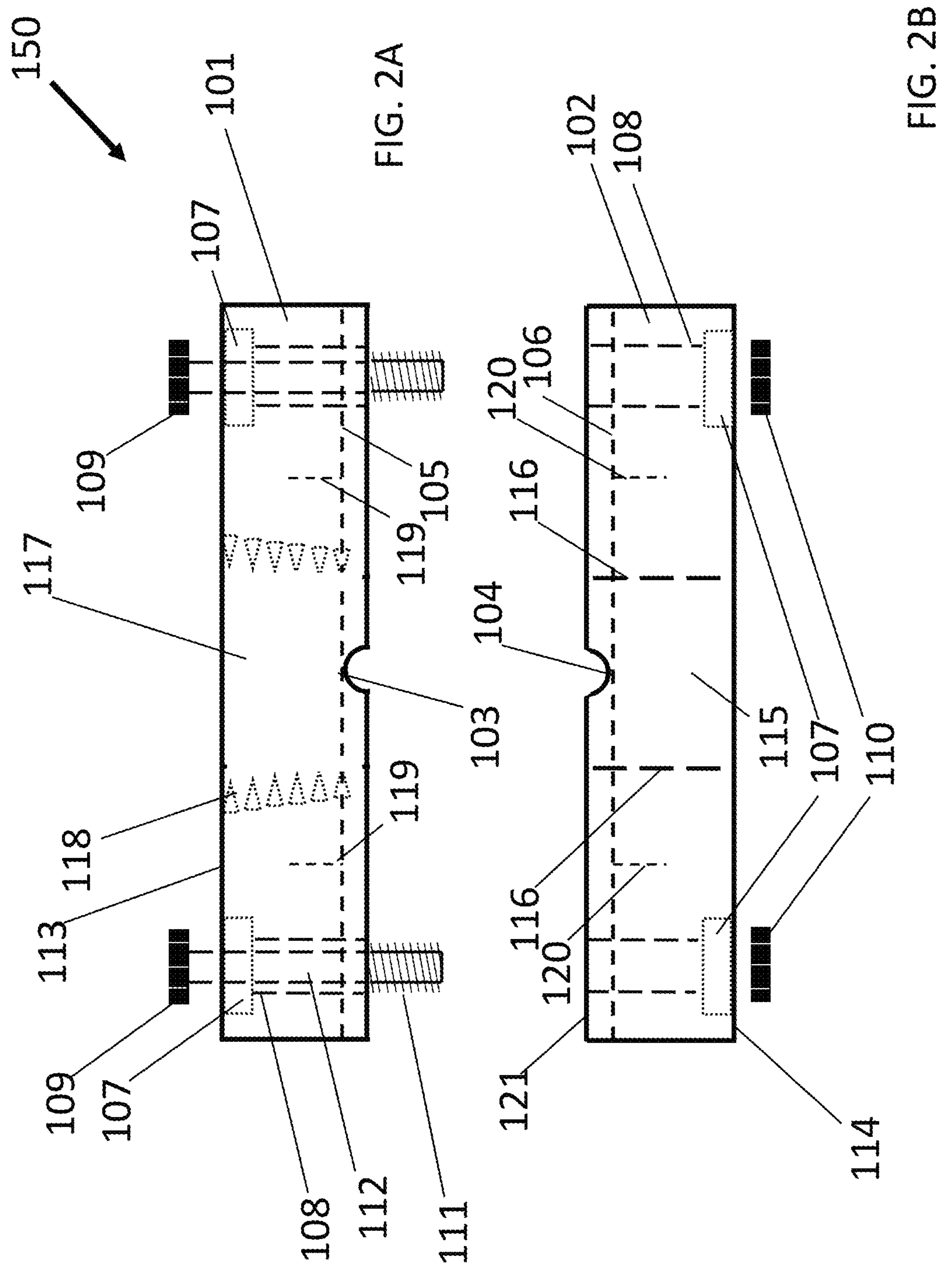
FIG. 2A is a side elevation view through components of a large mechanical packer before assembly.
FIG. 2B is a side elevation view through components of a large mechanical packer before assembly.

FIG. 2A and FIG. 2B are side elevation views through the housing of a large mechanical packer 150 before assembly. In this embodiment the housing components consists of an upper plate 101 and lower plate 102. A half channel 103 in the bottom of the upper plate 101 and a half channel 104 in the top 121 of the lower plate 102 form a hole or cylindrical bore when the two plates are assembled (not shown). Traces of a plurality of other channels are shown by dashed lines 105 in the bottom of the upper plate 101 in FIG. 2A and dashed lines 106 in the top of the lower plate 102 in FIG. 2B. Recessed holes 107 in the top 113 of the upper plate 101 shown in FIG. 2A and in the bottom 114 of the lower plate 102 shown in FIG. 2B connect with bolt holes 108 and accommodate bolt heads 109, bolt shanks 112, and nuts 110, such than when threads 111 on the bolt shank 112 are tightened into the nuts 110, the top surface 113 of the upper plate 101 and bottom surface 114 of the lower plate 102 have no exposed hardware when assembled together (not shown).

A vertical hole 115 in the center of the lower plate 102 is outlined by dashes 116 in FIG. 2B. A tapered vertical hole 117 with threads 118 in the center of the upper plate 101 is shown in FIG. 2A. A plurality of small vertical holes 119 in the upper plate 101 are shown by dashes in FIG. 2A and a plurality of small vertical holes 120 in the lower plate 102 are shown by dashes in FIG. 2B. The small vertical holes 119 and 120 align in the upper and lower plates 101 and 102, respectively.

Figure 3B:
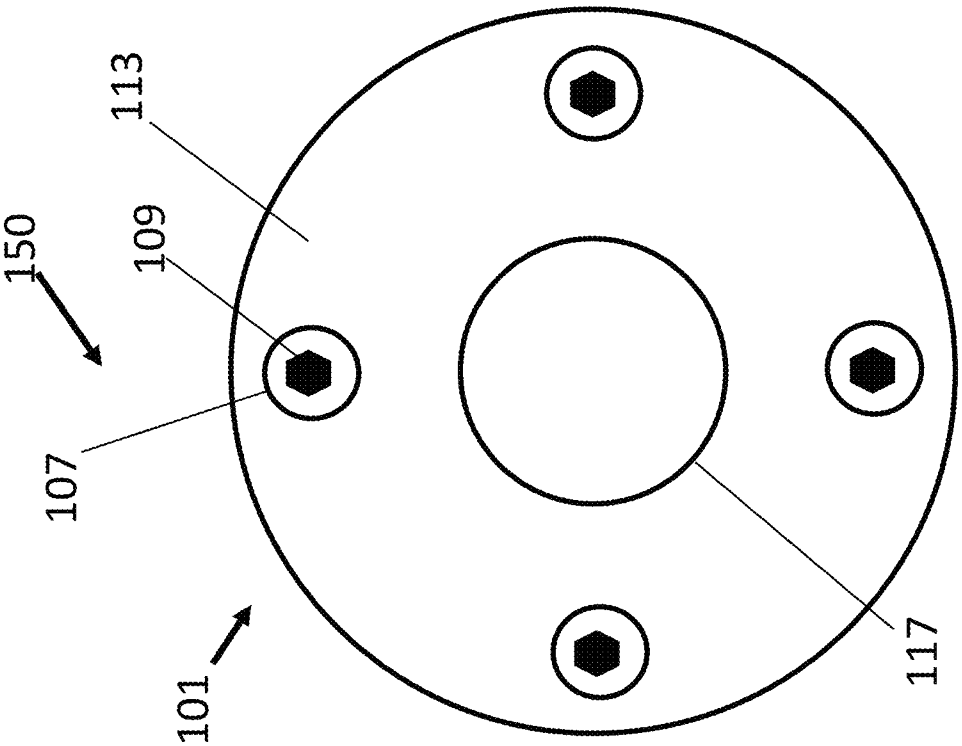
FIG. 3B is an overhead view of components of a mechanical packer before assembly.
Figure 3A:
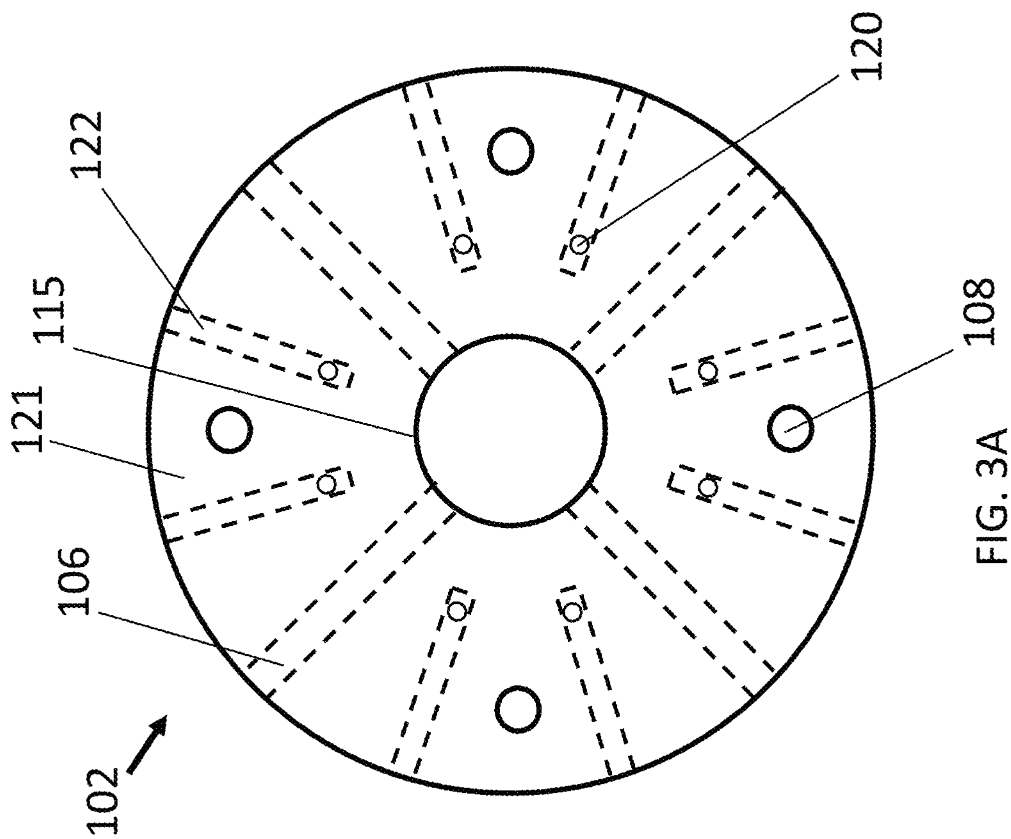
FIG. 3A is an overhead view of components of a mechanical packer before assembly.

FIG. 3A and FIG. 3B are overhead views of the housing of a large mechanical packer 150 before assembly. FIG. 3A is an overhead view of the top 121 of the lower plate 102 showing the plurality of larger-width channels 106 compared with smaller-width channels 122. The larger-width channels 106 extend from the outer circumference of the top 121 of the lower plate 102 into the hole 115 in the center of the lower plate 102. The smaller-width channels 122 extend from the outer circumference on the top 121 of the lower plate 102 radially inward but terminate before the hole 115 in the center of the lower plate 102 and have small-diameter holes 120 near their termination. Larger diameter bolt holes 108 are shown on the top 121 of the lower plate 102. FIG. 3B is an overhead view of the top 113 of the upper plate 101 showing the wider tapered center hole 117 (compared to the center hole 115 in FIG. 3A) and recessed holes 107 and hexagonal bolt heads 109, in this embodiment.

Figure 4B:
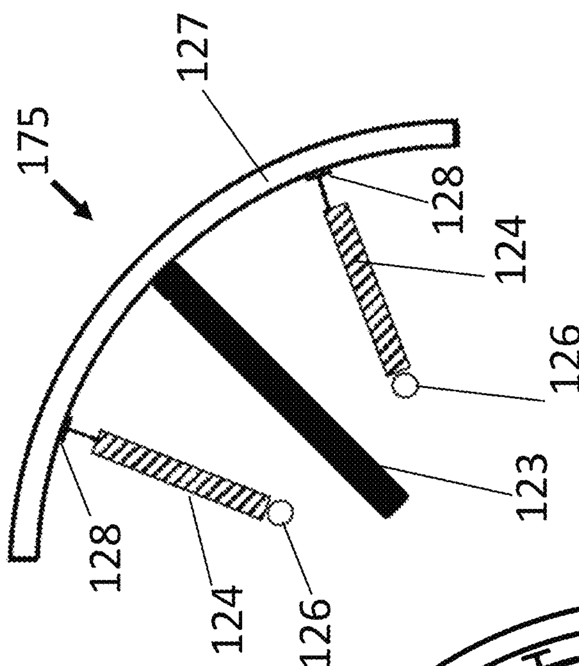
FIG. 4B is an overhead view of a mechanical packer before assembly.
Figure 4A:
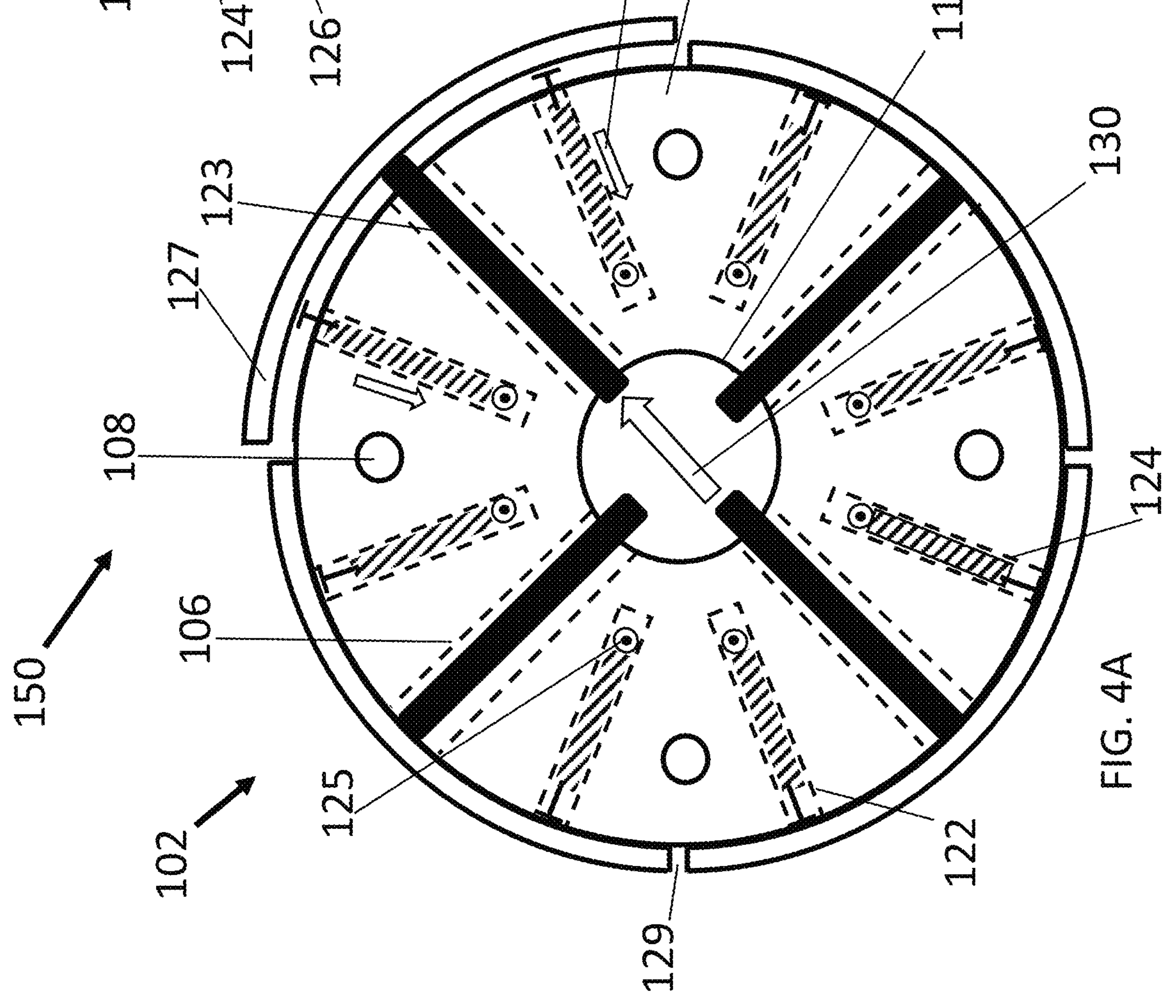
FIG. 4A is an overhead view of components of a mechanical packer before assembly.

FIG. 4A is an overhead view of the housing for a mechanical packer 150 before assembly showing the top 121 of the lower plate 102 with a plurality of cylindrical rods 123 inserted in each of the larger-width channels 106. A plurality of extension springs 124 are shown to be inserted in the smaller-width channels 122. Small-diameter pins 125 inserted in the small-diameter holes 120 (previously shown in FIG. 3A) in the top 121 of the lower plate 102 and secure a circular end 126 of the extension springs 124 (FIG. 4B) to the lower plate 102. A plurality of discs 127 surround the lower plate 102 and are secured to a flat end 128 of the extension springs 124 and a flat end of the cylindrical rods 123 as indicated in FIG. 4B which forms a disc assembly 175. The disc assembly 175 shown in FIG. 4B is removed from the lower plate 102 when small-diameter pins 125 are not engaged with the small-diameter holes 120 (previously shown in FIG. 3A) in the top 121 of the lower plate 102.

In operation, a lateral wedge force represented by arrow 130 from the center hole 115 moves a cylindrical rod 123 in a larger-width channel 106 laterally away from the lower plate 121 as shown in FIG. 4A. Extension springs 124 in smaller-width channels 122 return the disc 127 and cylindrical rod 123 toward the center 115 of the lower plate 121 by lateral forces represented by arrows 131 from a pair of extended springs 124 when a force (represented by arrow 130) is removed. Narrow slots 129 separate the discs when contracted around the lower plate 121 (FIG. 4A).

Figures 5A, 5B, 5C:
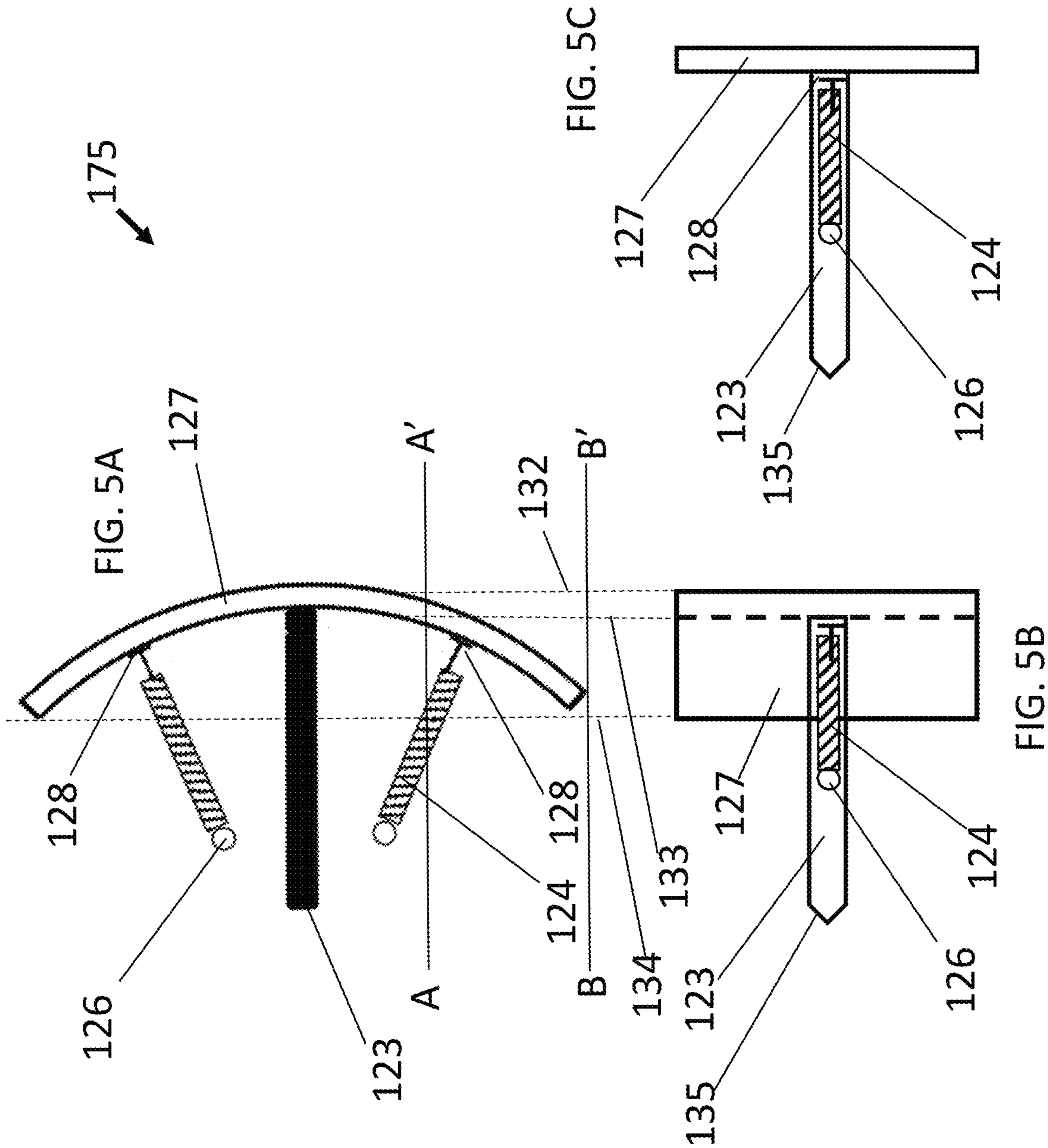
FIG. 5A is an overhead view of a disc assembly.
FIG. 5B is a sectional view of a disc assembly used in a mechanical packer.
FIG. 5C is a sectional view of a disc assembly used in a mechanical packer.

FIG. 5 provides additional perspectives of a disc assembly 175. FIG. 5A is an overhead view of a disc assembly 175 (repeated from FIG. 4B) with the addition of two section lines A-A' and B-B'. FIG. 5B is a sectional view of the disc assembly 175 viewed from section line B-B' whereas FIG. 5C is a sectional view of the disc assembly 175 viewed from section line A-A'. A series of parallel dotted lines (132, 133, and 134) denote the front, back, and extended inside arc of the disc, respectively. The true thickness of the disc is represented by the difference between lines 132 and 133. The apparent thickness of the disc as viewed in the sectional view of FIG. 5B is the difference between vertical lines 132 and 134. The narrower perspective showing the true width of the disc 127 viewed from section line A-A' shown in FIG. 5C (i.e., the difference between lines 132 and 133) is preferred for clarity and will be used in subsequent sectional drawings along with the view of a single spring 124. Sectional views provided in FIG. 5B and FIG. 5C also show a beveled end 135 of the cylindrical rod 123.

Figure 6:
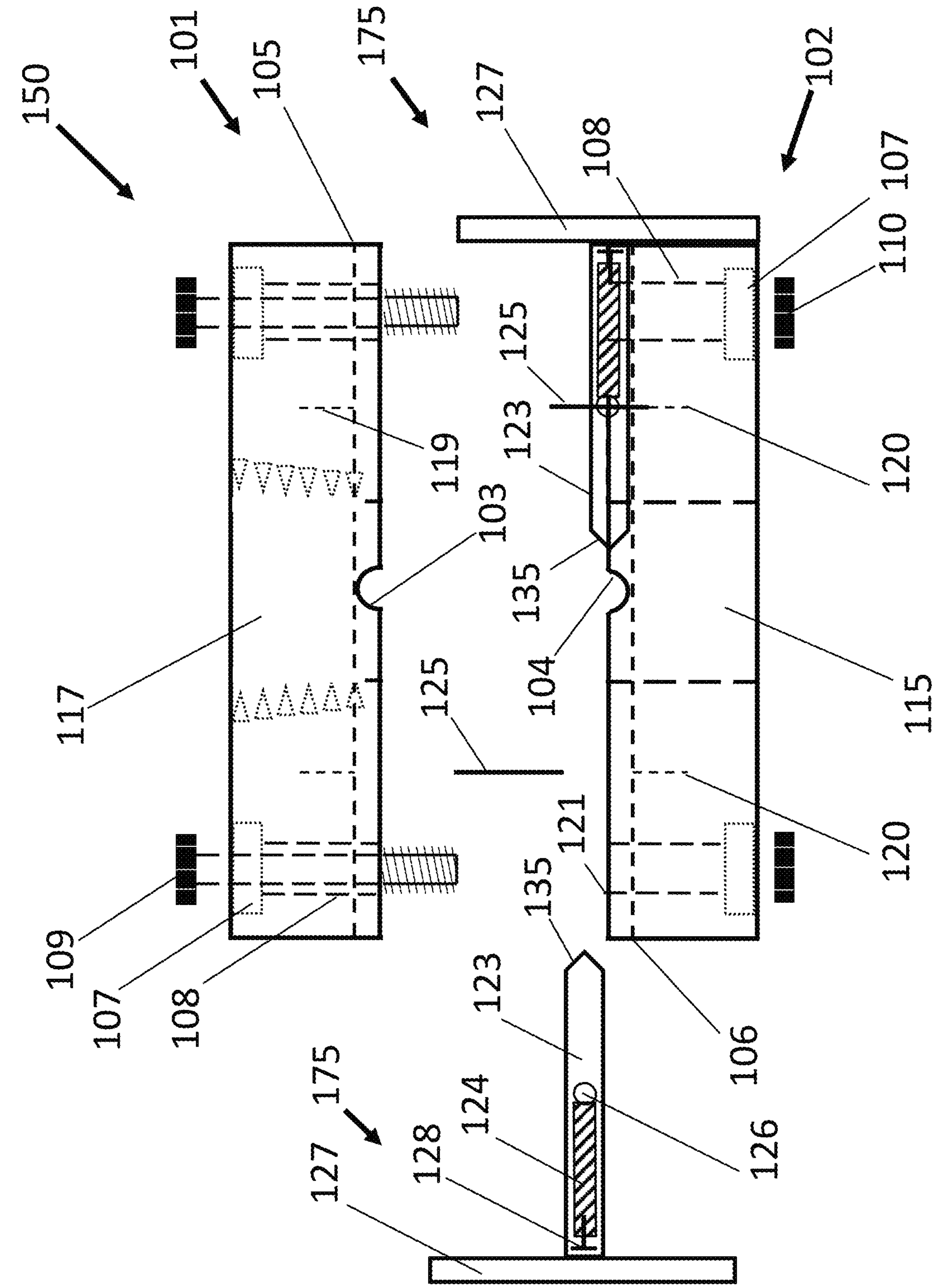
FIG. 6 is a sectional view of components of a mechanical packer before assembly.

FIG. 6 is a sectional view of the housing of a large mechanical packer 150 before assembly showing an upper plate 101 and lower plate 102 with the placement of one-disc assembly 175 in the lower plate on the right and positioning of an opposing disc assembly 175 for installation on the left. A small-diameter pin 125 has been inserted through the small hole 120 on the end of the extension spring 124 and seated into a hole 120 in the top 121 of the lower plate 102 for the installed disc assembly 175 on the right. The beveled end 135 of a cylindrical rod 123 extends into the vertical hole 115 in the center of the lower plate 102 on the right.

Figure 7A:
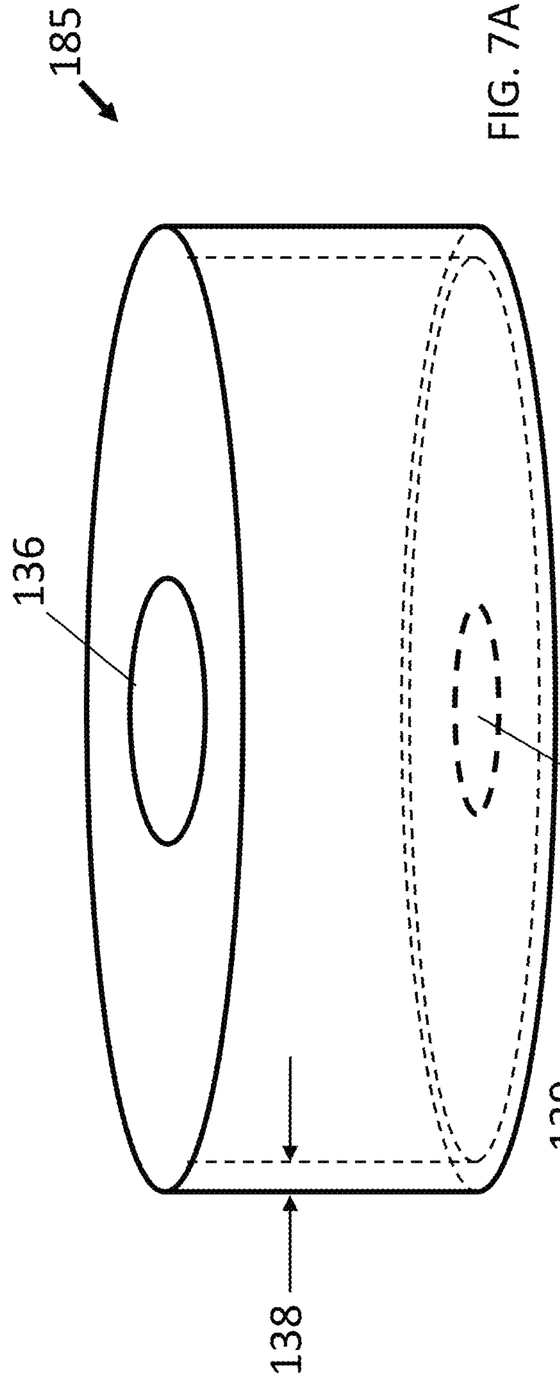
FIG. 7A is an isometric view of a formed rubber material.
Figure 7B:
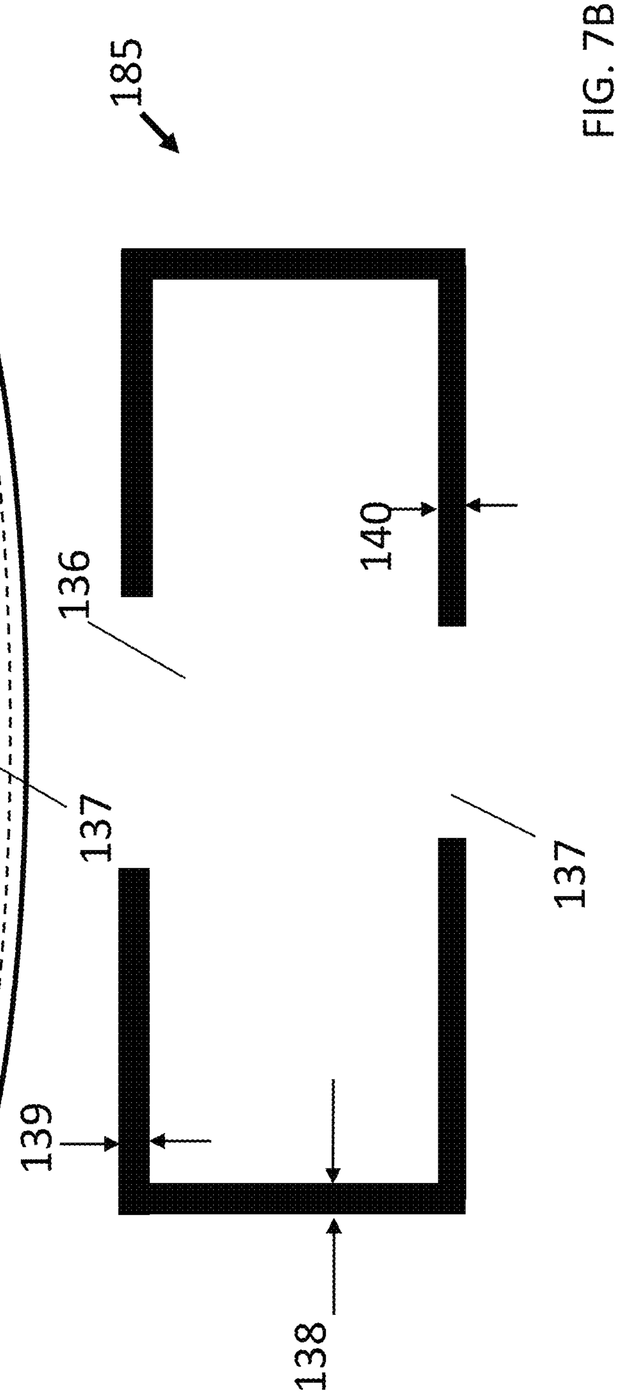
FIG. 7B is a sectional view of a formed rubber material used in a large mechanical packer.
Figure 8:
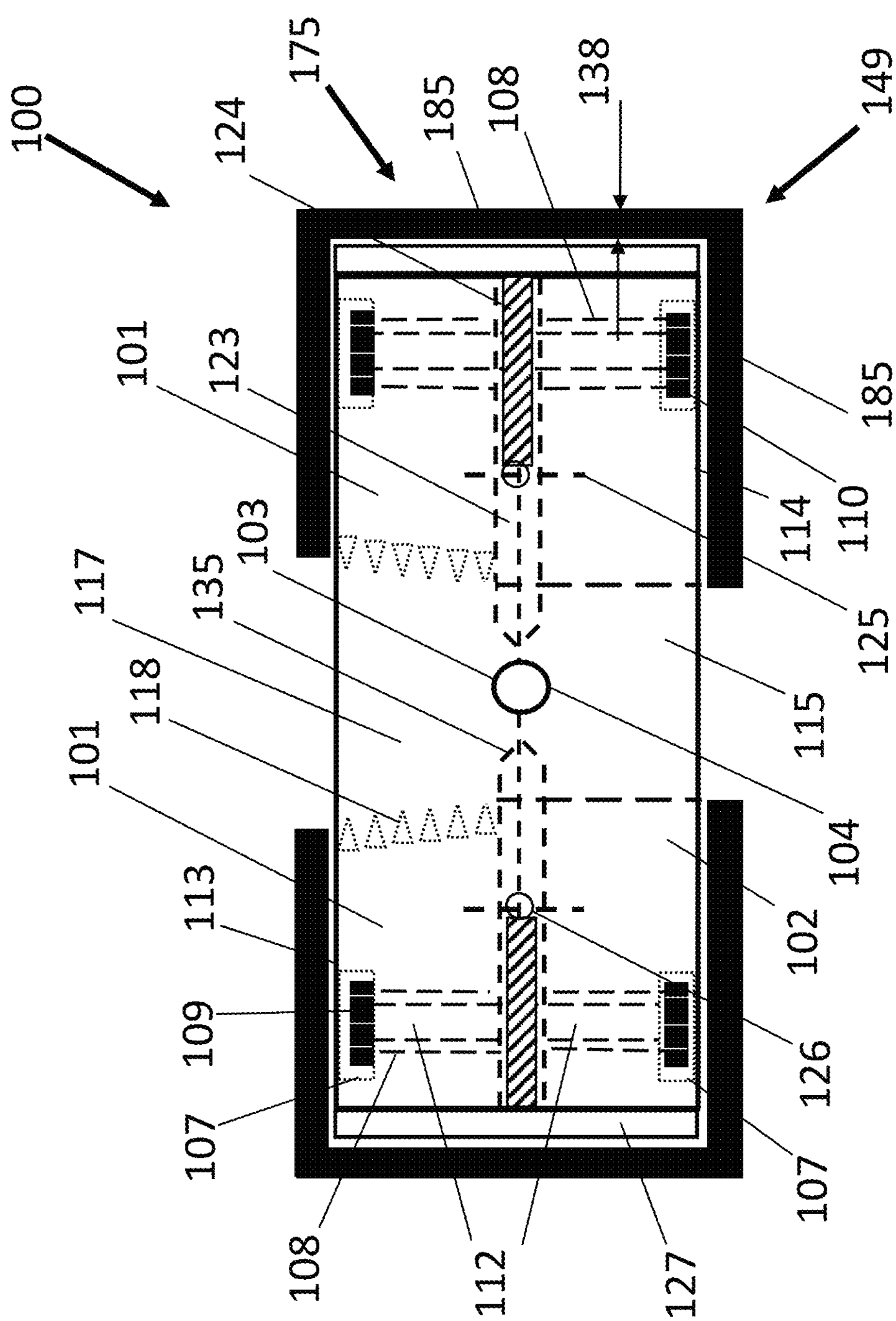
FIG. 8 is a sectional view through the center of a large packer assembly encased within a formed rubber material in a retracted or non-activated state.

FIG. 7A is an isometric view of a formed rubber material 185 (i.e., a flexible elastomeric element such as natural rubber or a wide variety of synthetic rubber such as ethylene propylene diene monomer [EPDM] or styrene-butadiene rubber [SBR]) that has desired mechanical and chemical properties for the specific application for which a large packer assembly 100 is to be deployed). In one embodiment of a large packer assembly 100, a formed rubber material 185 is cylindrically shaped (FIG. 7A) with a slightly wider top opening 136 than bottom opening 137. FIG. 7B is a sectional view of a formed rubber material 185 for the same perspective shown in FIG. 7A. The wall thickness 138 is shown to be the same as the top 139 and bottom 140 thicknesses (FIG. 7B) in this embodiment. FIG. 8 is a sectional view through the center of a large packer assembly 100 encased within a formed rubber material 185. The large packer assembly 100 is in a retracted or non-activated state 149 as noted by position of the cylindrical rods 123 where the beveled ends 135 of the cylindrical rods 123 are near the center of the vertical hole 115 in the center of the lower plate 102 and near the center of the tapered vertical hole 117 with threads 118 in the center of the upper plate 101. The bolt heads 109 have been assembled in the recessed holes 107 in the top 113 of the upper plate 101 and the bolt shank 112 extends through the bolt holes 108 in the upper plate 101 and lower plate 102 where threads 111 (not shown) near the bottom of the bolt shank 112 are secured to nuts 110 in the recessed holes 107 in the bottom 114 of the lower plate 102 such than when threads 111 (not shown) on the bolt shank 112 are tightened into the nuts 110, the upper plate 101 and lower plate 102 are detachably secured to each other holding the plurality of inner works (i.e., cylindrical rods 123, extension springs 124, small-diameter pins 125, and disc assemblies 175) in their respective channels, holes, and positions shown in FIG. 8. The resulting large packer assembly 100 shown in FIG. 8 has no exposed hardware allowing for a smooth surface on which a formed rubber material 185 can operate without interference or damage.

Figure 9:
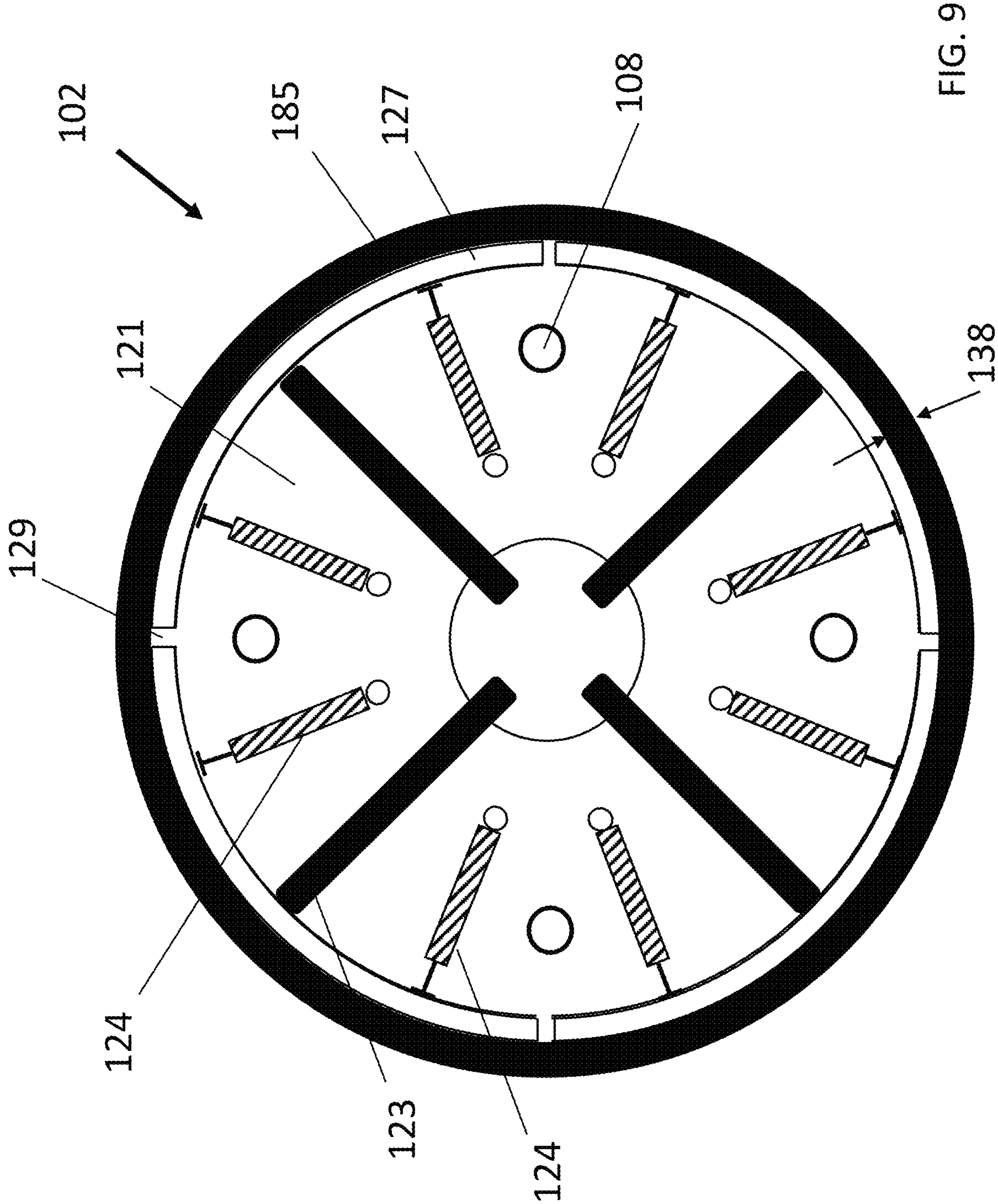
FIG. 9 is an overhead view of the top of a lower plate of a packer assembly.

FIG. 9 is an overhead view of the top 121 of a lower plate 102 showing the width 138 of a rubber material 185 surrounding a plurality of discs 127 separated from each other by narrow 129 slots. The previously described cylindrical rods 123, extension springs 124, and bolt holes 108 are also shown.

Figure 10:
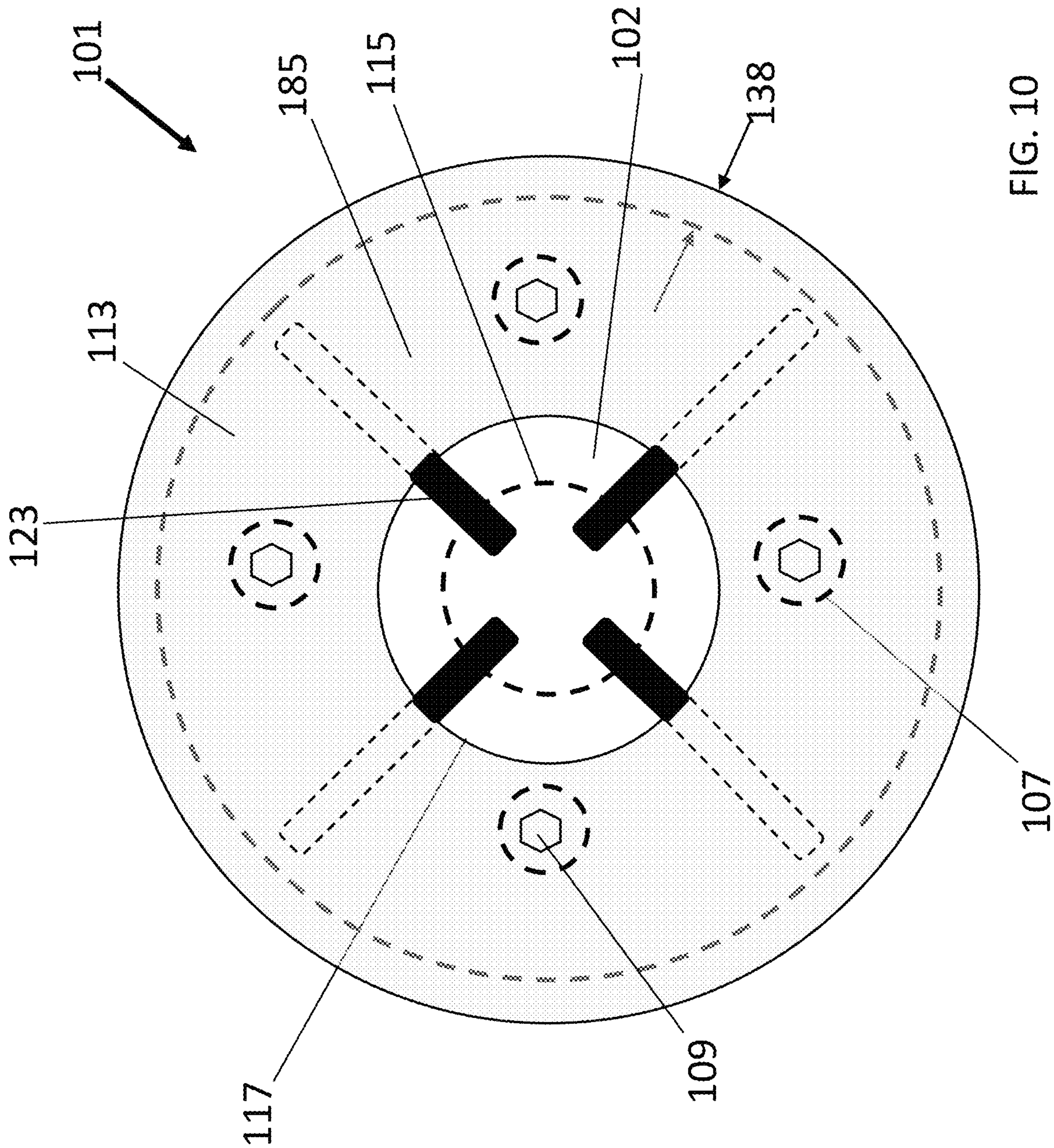
FIG. 10 is an overhead view of the top of an upper plate of a packer assembly.

FIG. 10 is an overhead view of the top 113 of an upper plate 101 showing a rubber material 185 covering all but the tapered vertical hole 117 in the center of the upper plate 101 (with threads 118 not shown) and the vertical hole 115 in the center of the lower plate 102. The wall thickness 138 of a formed rubber material 185 is shown along with the exposed ends of the cylindrical rods 123 visible in the tapered vertical hole 117 in the center of the upper plate 101. Bolt heads 109 set in recessed holes 107 in the top 113 of the upper plate 101 are also shown beneath the covering of a formed rubber material 185.

Figure 11:
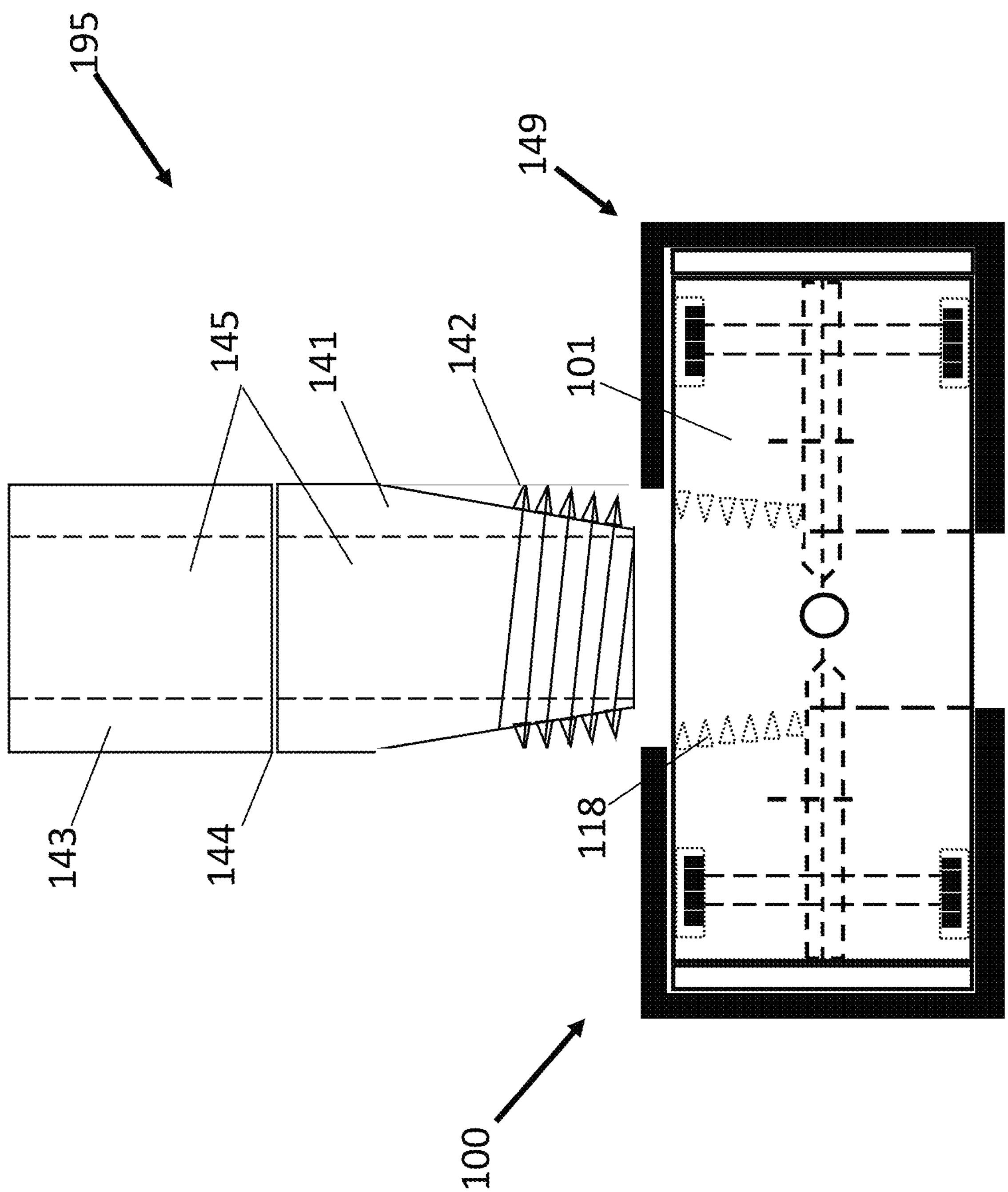
FIG. 11 is a cross sectional view of a completed larger packer assembly in a retracted or non-activated state with a packer stem assembly positioned above it.

FIG. 11 is a cross sectional view of a completed larger packer assembly 100 in a retracted or non-activated state 149. A hollow core sub 141 or equivalent is positioned above the completed packer assembly 100 with tapered threads 142 to match the threads 118 in the center of the upper plate 101. A hollow core stem 143 or equivalent is shown to be connected at a joint 144 with a sub 141 (method of connection not shown). The inside or core of a stem 143 and a sub 141 are both hollow 145 thus referenced as hollow core stems 143 or hollow core subs 141. The total length of a hollow core stem 143 or individual sections of hollow core stems 143 are variable to match site conditions during operation. Sections of hollow core stems 143 that may be of variable length when connected to a hollow core sub 141 for operation are referred to herein as a packer stem assembly 195.

Figure 12:
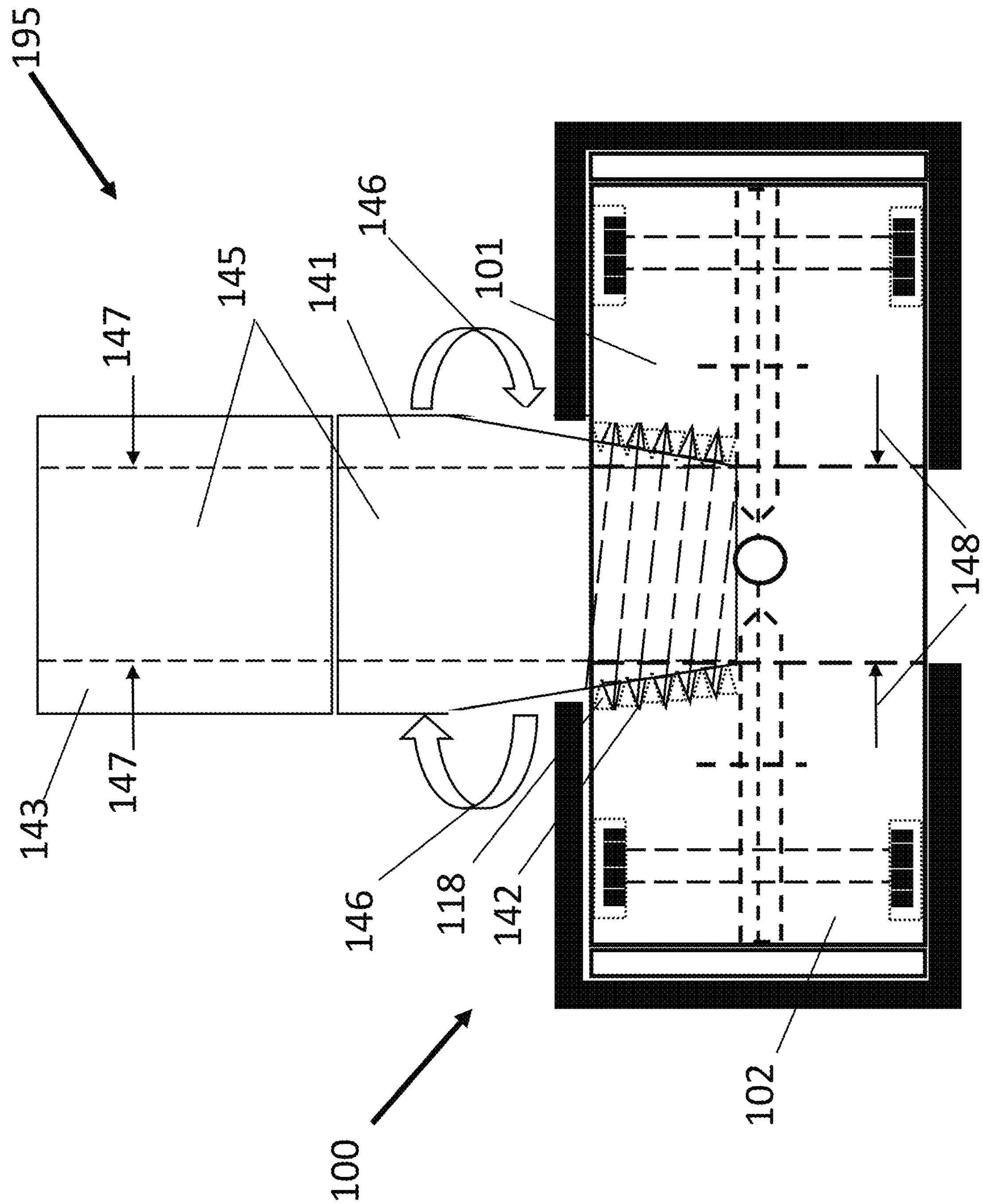
FIG. 12 is a cross sectional view of a completed larger packer assembly in a retracted or non-activated state engaged with a packer stem assembly.

FIG. 12 is a cross sectional view of a completed larger packer assembly 100 in a retracted or non-activated state 149 engaged with a packer stem assembly 195. Clockwise rotation of a packer stem assembly 195 shown by arrows 146 with the completed large packer assembly 100 results in a full engagement of tapered threads 142 on a hollow core sub 141 with threads 118 in the center of the upper plate 101. The inside diameter 147 of a packer stem assembly 195 is the same as the inside diameter 148 in a lower plate 102. In operation, the engagement or disengagement of the hollow core sub 141 with the completed large packer assembly 100 may be below a ground surface or above a ground surface and at any inclination (not shown).

FIG. 13 is a cross sectional view of different embodiments of a cylindrical tool for activating or deactivating packers (the tool is referred to herein as a Packtivator). A Packtivator is used when a completed packer assembly (not shown) is placed in position by a packer stem assembly 195 (not shown) and a mechanical packer needs to be operated (i.e., expanded or in an activated state) to seal a casing or borehole (not shown). A Packtivator consists of subs (three of which are shown in FIG. 13) and stems (two embodiments of which are shown in FIG. 14) that can be interconnected by threading or other means to form a Packtivator assembly. Packtivator subs and stems may have small or large diameters to activate or deactivate small or large diameter packer assemblies, respectively, and may have hollow or solid cores. As described later in the present disclosure, a small packer assembly can reside on a hollow core Packtivator sub and be activated by a smaller diameter solid core Packtivator sub inserted on the inside of a larger hollow core Packtivator sub. Packtivator subs and stems have generally similar geometry and function, but with subtle differences described for the embodiments in the present disclosure.

Figures 13A, 13B, 13C:
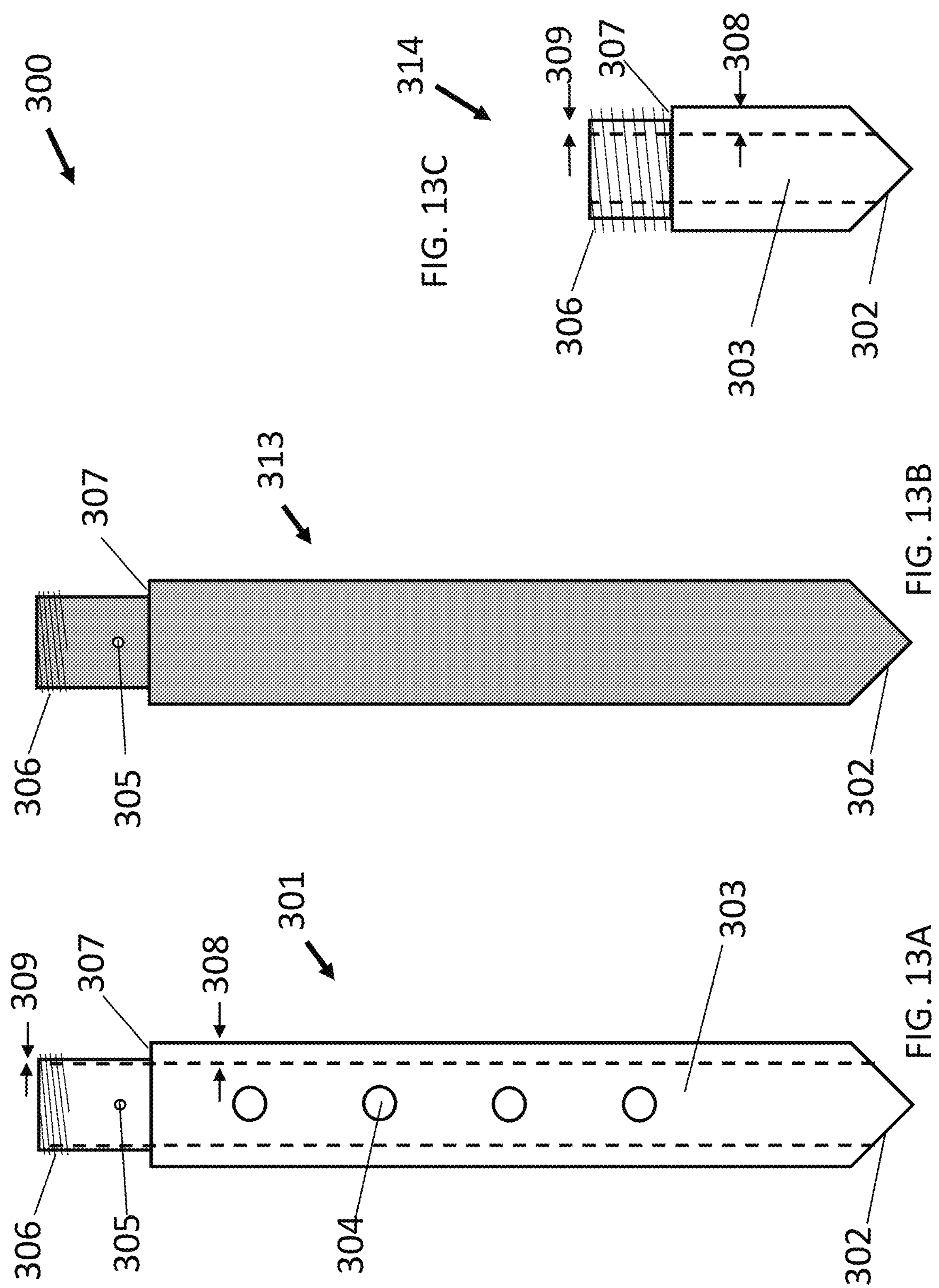
FIG. 13A is a cross sectional of an embodiment of components (subs) of a cylindrical tool for activating or deactivating mechanical packers, referred to herein as a Packtivator.
FIG. 13B is a cross sectional of an embodiment of components (subs) of a cylindrical tool for activating or deactivating mechanical packers, referred to herein as a Packtivator.
FIG. 13C is a cross sectional of an embodiment of components (subs) of a cylindrical tool for activating or deactivating mechanical packers, referred to herein as a Packtivator.

FIG. 13A is a cross sectional view of one embodiment of a hollow core Packtivator sub 301. The hollow core Packtivator sub 301 is shown as a relatively short segment of pipe or equivalent the lower tip 302 of which is beveled to match the beveled ends 135 of the cylindrical rods 123 in a completed packer assembly (previously shown in FIG. 8). In one embodiment a Packtivator sub 301 is hollow 303 throughout its length and a plurality of holes 304 go through the Packtivator sub 301 horizontally to allow fluid flow (not shown). Smaller diameter holes, such as that shown by 305, are below a treaded end 306 at the top of a Packtivator sub 301. A circular seat 307 is shown in FIG. 13A that is formed between the wider wall thickness 308 of a hollow core Packtivator sub 301 compared with the thinner wall thickness 309 in the upper threaded 306 section of a hollow core Packtivator sub 301.

FIG. 13B is a cross sectional view of a second embodiment of Packtivator sub 313 used for activating or deactivating packers which is solid throughout its length and does not permit fluid flow within its core. As with the hollow core Packtivator sub 301 (FIG. 13A), a solid core Packtivator sub 313 is a short segment of pipe or equivalent the lower tip 302 of which is beveled to match the beveled ends 135 of the cylindrical rods 123 in a completed packer assembly (previously shown in FIG. 8). Smaller diameter holes, such as that shown by 305, are below a treaded end 306 at the top of a Packtivator sub 313 and a circular seat 307 is in the upper threaded 306 section as shown in FIG. 13B.

FIG. 13C is a cross sectional view of a third embodiment of Packtivator sub 314 used for activating or deactivating packers which is hollow throughout its length to permit fluid flow within its core. The hollow core Packtivator sub 314 is shown to be substantially shorter in length compared with Packtivator subs 301 and 313 for different purposes described later in the present disclosure. As with the other Packtivator subs 301 and 313, a Packtivator sub 314 is an even shorter segment of pipe or equivalent the lower tip 302 of which is beveled to match the beveled ends 135 of the cylindrical rods 123 in a completed packer assembly (previously shown in FIG. 8). A threaded end 306 at the top of a hollow core Packtivator sub 314 extends to a circular seat 307 as shown in FIG. 13C. In a fourth embodiment a Packtivator sub may be similar to 314 except having a solid core to prevent fluid flow within its core (not shown but a solid core Packtivator sub is described later in the present disclosure).

Figure 14B:
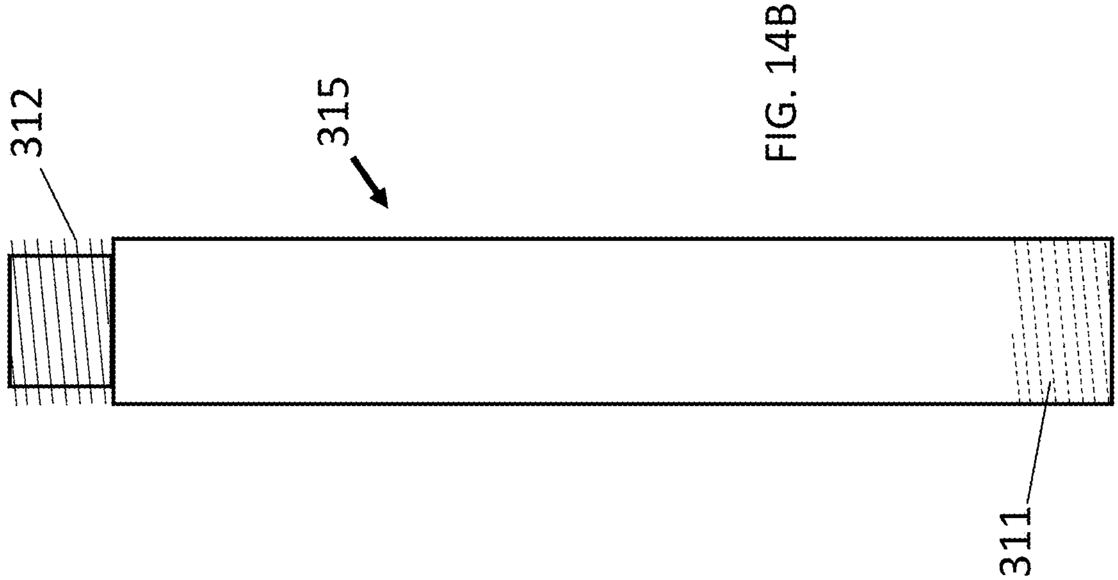
FIG. 14B is a cross sectional view of an embodiment of a Packtivator stem.
Figure 14A:
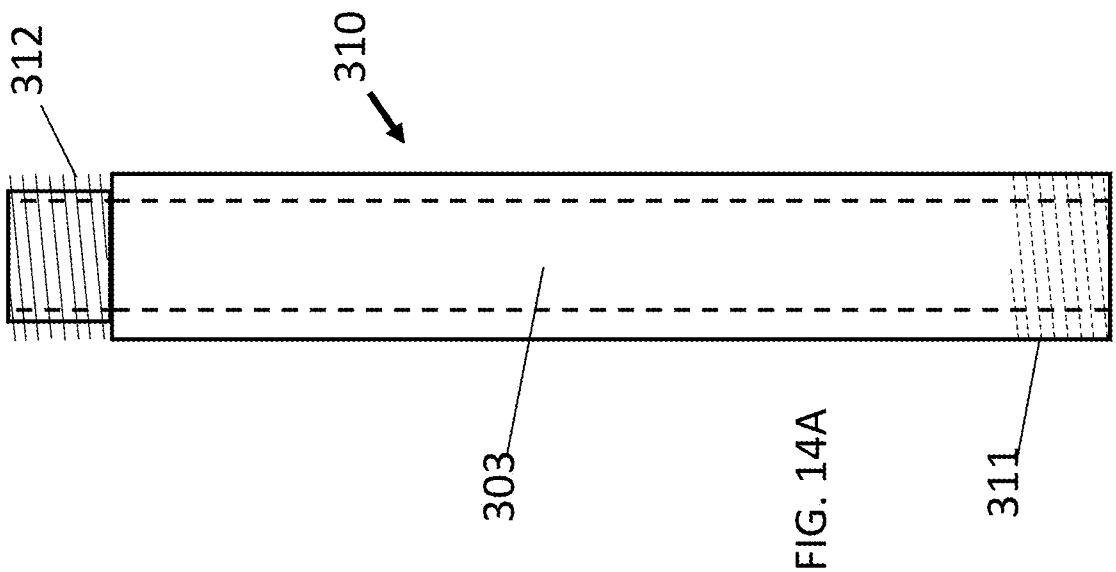
FIG. 14A is a cross sectional view of an embodiment of a Packtivator stem.

FIG. 14 is a cross sectional view of two embodiments of Packtivator stems. In FIG. 14A a Packtivator stem 310 is hollow 303 throughout its length and has threads 311 in its lower section. The upper section of a hollow core Packtivator stem 310 is fully threaded 312 (i.e., no seat 307 as in Packtivator subs 301, 313, or 314). A Packtivator stem 315 shown in FIG. 14B is similar to Packtivator stem 310 except that it is solid throughout its length (i.e., a solid core Packtivator stem 315).

Packtivator stems can be connected with each other to achieve a desired length to match site conditions during operation (i.e., connecting threads 311 in the lower section of one stem to threads 312 in the upper section of another stem). In most operations, a hollow core Packtivator stem 310 would connect by lower threads 311 to upper threads 306 of a hollow core Packtivator sub (301 or 314) and a solid core Packtivator stem 315 would connect by lower threads 311 to upper threads 306 of a solid core Packtivator sub 313. However, the Packtivator subs and stems are interchangeable, and for example, a hollow core Packtivator stem 310 could be connected to a solid core Packtivator sub 313 (e.g., to reduce the weight of an entire Packtivator assembly).

Figure 15:
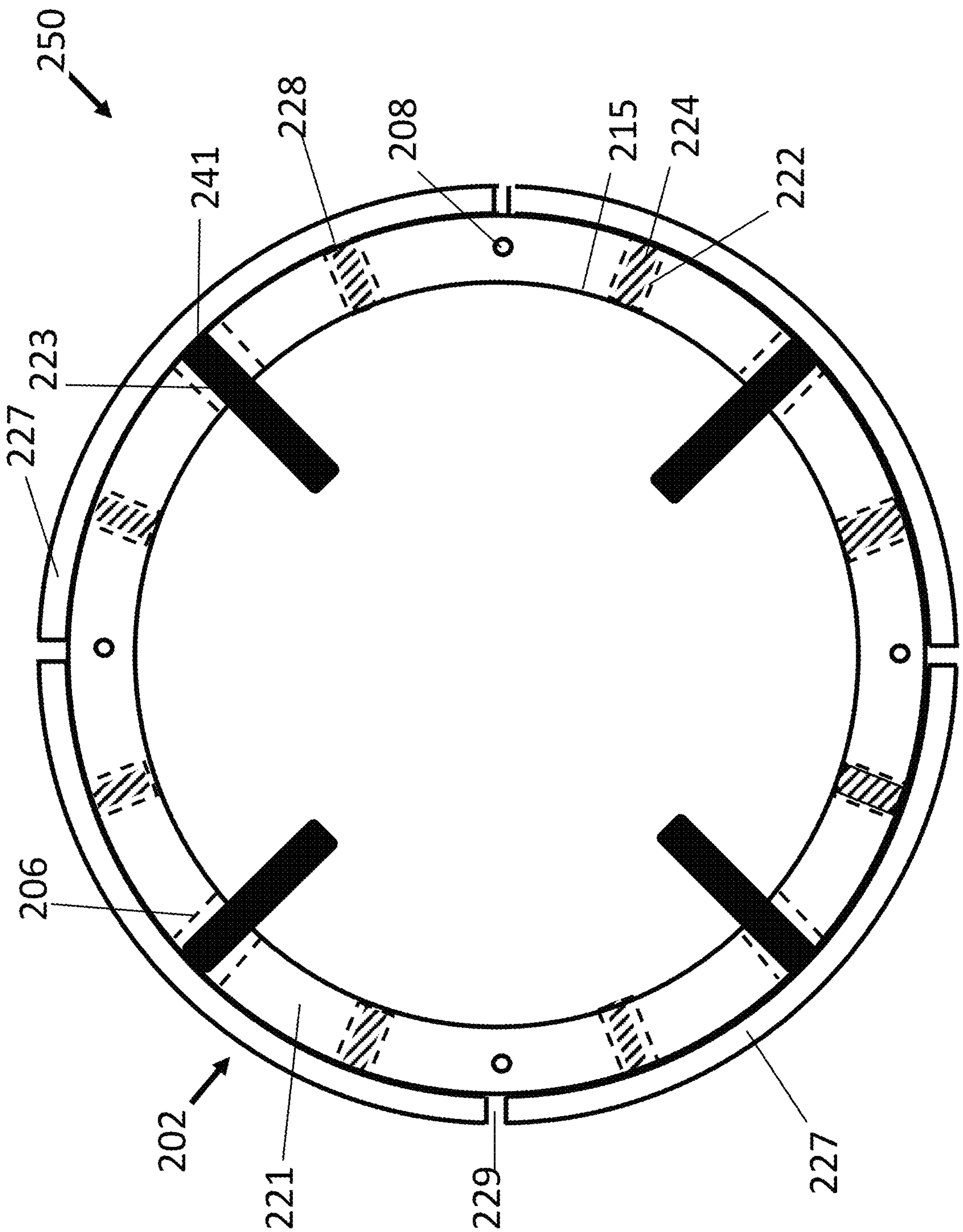
FIG. 15 is an enlarged overhead view of the some of the components of a small mechanical packer before assembly.

FIG. 15 is an enlarged overhead view of the some of the housing and key components of a small mechanical packer before assembly 250. As previously described in the present disclosure, a small packer assembly 200 may be on the order of 2-inches in diameter relative to a large packer assembly 100 which may be on the order of 12-inches in diameter (FIG. 1). The components of the smaller packer assembly 200 and larger packer assembly 100 are similar in shape and function with a few exceptions as described below and in the following figures. Other shapes, sizes, and embodiments can be envisioned beyond those referenced in the present disclosure.

FIG. 15 shows the top 221 of a lower plate 202 with a plurality of cylindrical rods 223 inserted in larger-width channels 206. A plurality of intervening extension springs 224 are inserted in smaller-width channels 222. A plurality of discs 227 surround a lower plate 202 separated by small slots 229 and are secured to flat ends 228 of extension springs 224 and flat ends 241 of cylindrical rods 223. A plurality of bolt holes 208 are shown in a top 221 of a lower plate 202.

Figure 16:
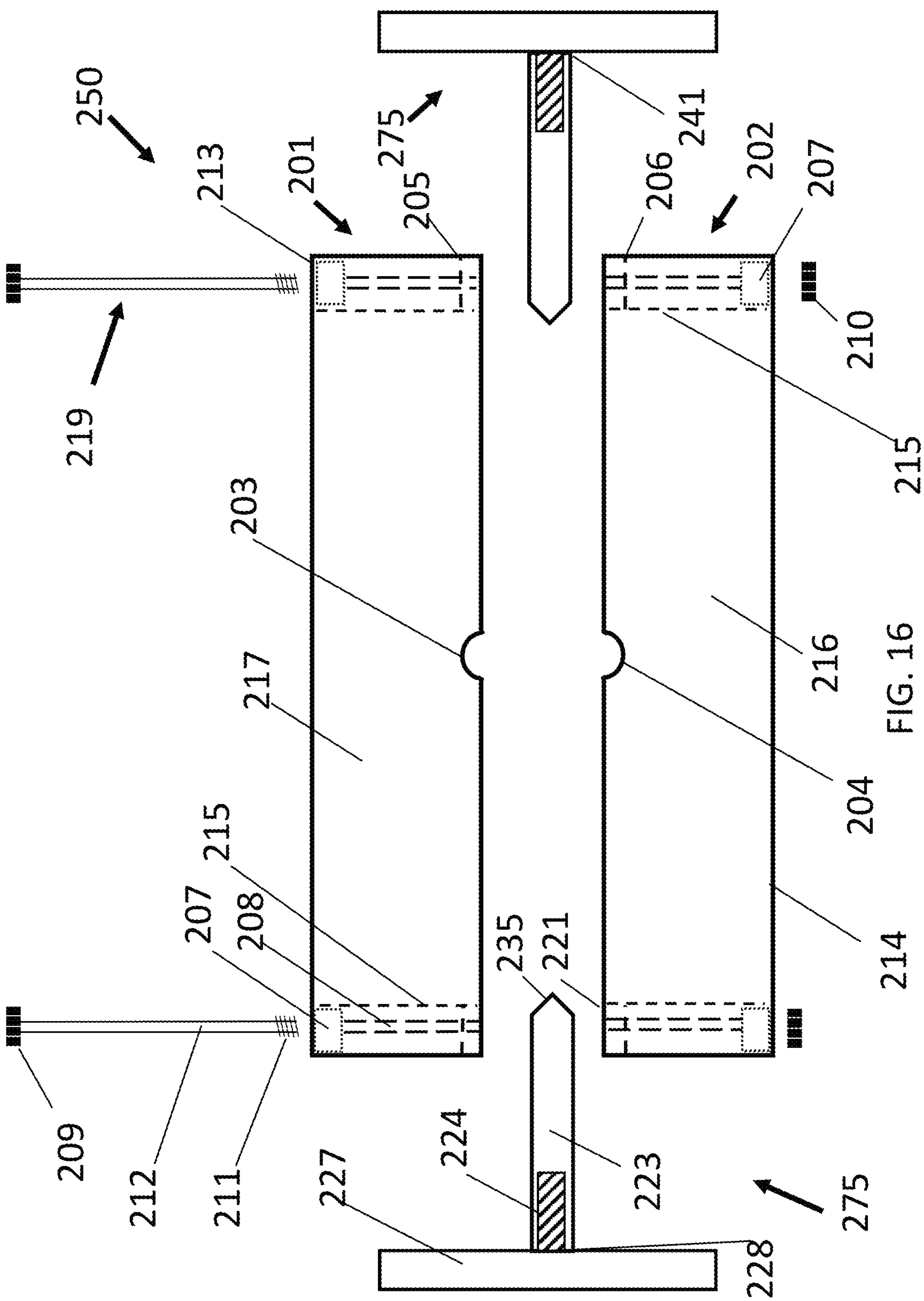
FIG. 16 is a sectional view of most of the components of a small mechanical packer before assembly.

FIG. 16 is a sectional view of the housing and most of the components of a small mechanical packer before assembly 250. In this embodiment the components consists of an upper plate 201 and lower plate 202. A channel 203 in the bottom of the upper plate 201 and a channel 204 in the top 221 of the lower plate 202 form a hole or bore when the two plates are assembled (not shown). Traces of a plurality of other channels are shown by dashed lines 205 in the bottom of the upper plate 201 and dashed lines 206 in the top of the lower plate 202. Recessed holes 207 in the top 213 of the upper plate 201 and in the bottom 214 of the lower plate 102 connect with bolt holes 208 and accommodate bolt heads 209, bolt shanks 212, and nuts 210, such than when a bolt 219 is tightened into a nut 210, the top surface 213 of the upper plate 201 and bottom surface 214 of the lower plate 202 have no exposed hardware when assembled (not shown).

A vertical hole 216 in the center of the lower plate 202 is outlined by dashes 215 in FIG. 16. Unlike the large packer (which has a tapered vertical hole 117 with threads 118 in the center of the upper plate 101 as previously shown in FIG. 2A), the vertical hole 217 in the upper plate 201 outlined by dashes 215 of the small packer is the same diameter as in the lower plate 202 and without threads (FIG. 16). A disc assembly 275 for a small packer is defined by a disc 227, at least two extension springs 224, and a cylindrical rod 223. The discs 227 are secured to flat ends 228 of extension springs 224 and flat ends 241 of cylindrical rods 223 (FIG. 16).

Figure 17A:
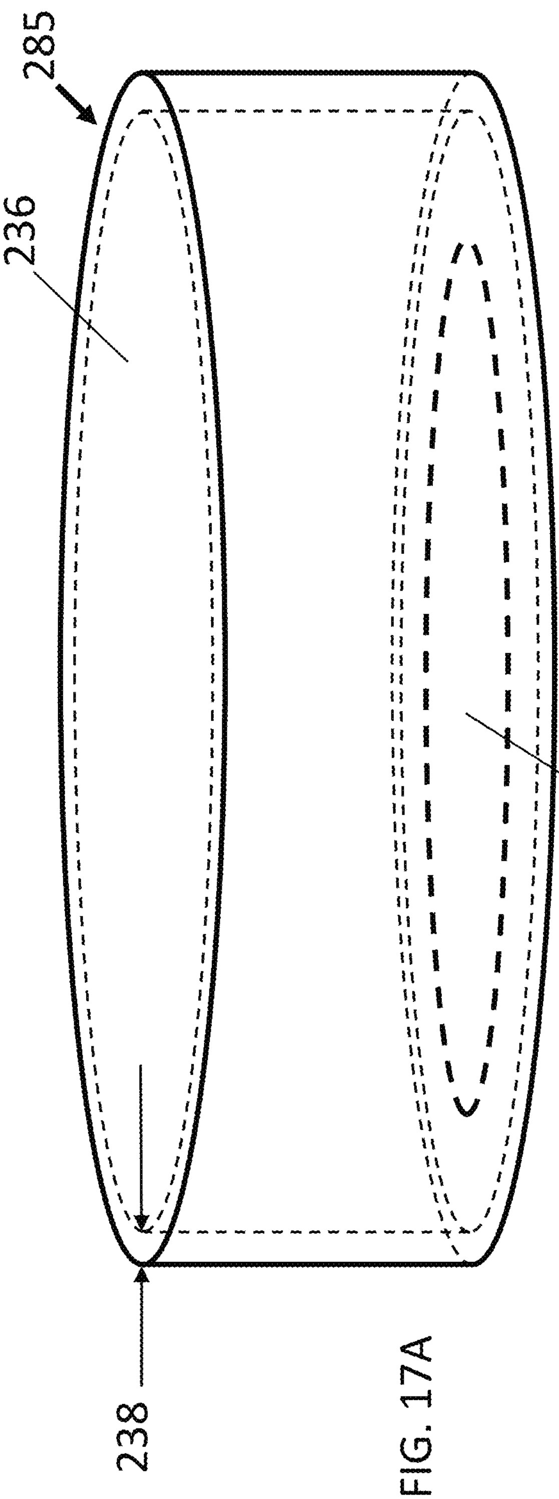
FIG. 17A is an isometric view of a formed rubber material.
Figure 17B:
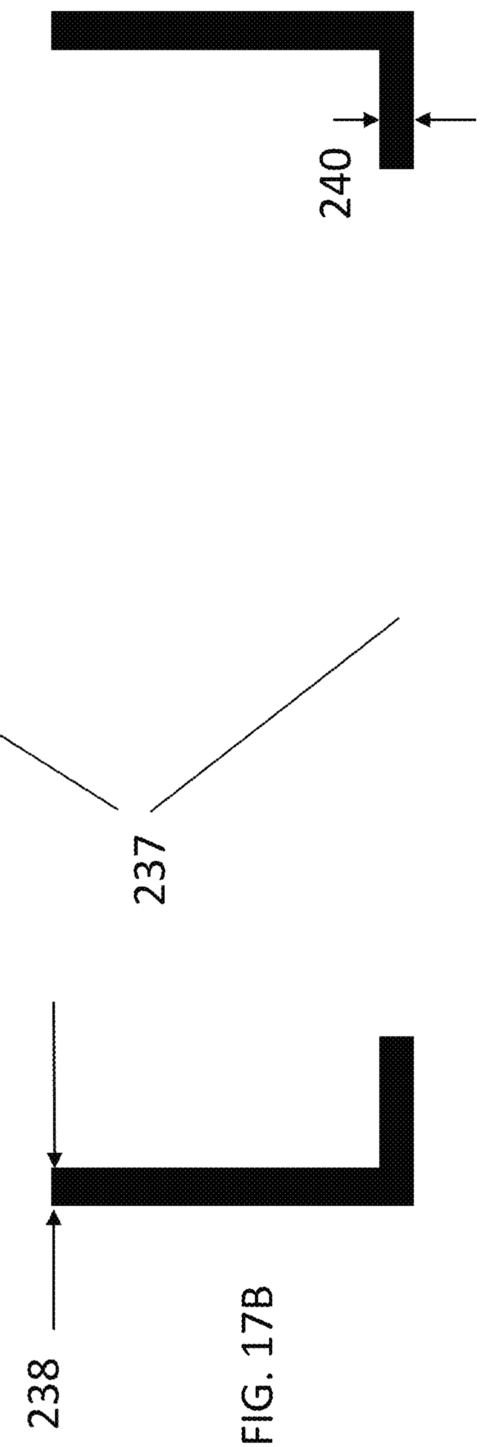
FIG. 17B is a sectional view of a formed rubber material for a small mechanical packer.

FIG. 17A is an isometric view of a formed rubber material 285 (i.e., a flexible elastomeric element such as natural rubber or a wide variety of synthetic rubber such as ethylene propylene diene monomer [EPDM] or styrene-butadiene rubber [SBR]) that has desired mechanical and chemical properties for the specific application) for which a small packer assembly 200 is to be deployed. In one embodiment of a packer assembly 200, a formed rubber material 285 is cylindrically shaped (FIG. 17A) with a wide top opening 236 relative to the bottom opening 237. FIG. 17B is a sectional view of a formed rubber material 285 for the same perspective shown in FIG. 17A. The wall thickness 238 is shown to be the same as the bottom thickness 240 (FIG. 17B) in this embodiment.

Figure 18:
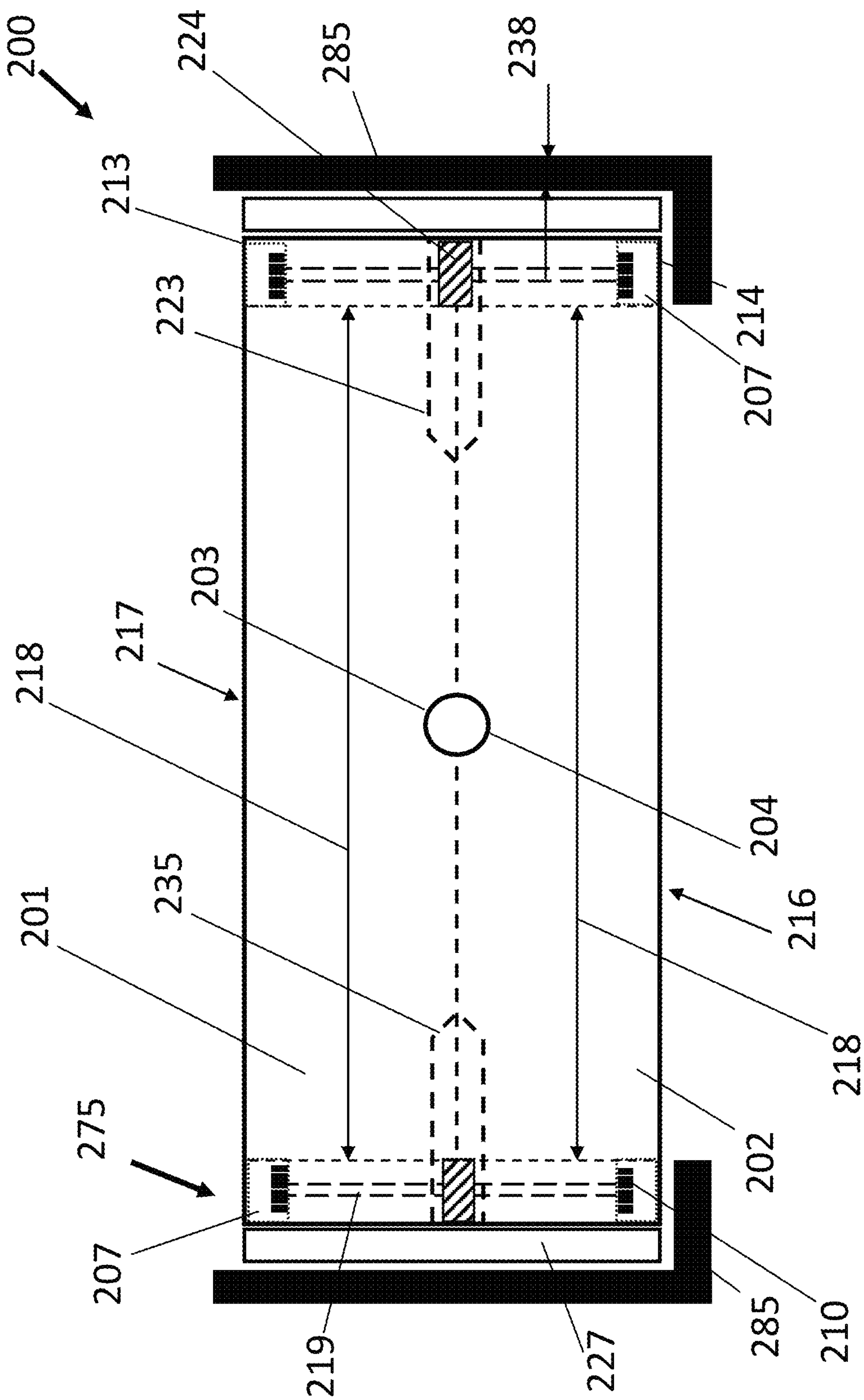
FIG. 18 is a sectional view through the center of a small packer assembly encased within a formed rubber material in a retracted or non-activated state.

FIG. 18 is a sectional view through the center of a small packer assembly 200 encased within a formed rubber material 285. The small packer assembly 200 is in a retracted or non-activated state 275 as noted by position of the discs 227 in contact with the upper 201 and lower 202 plates. As previously discussed, the vertical holes 216 and 217 in the center of the lower and upper plates 202 and 201, respectively, are the same inside diameter 218 (i.e., there is no tapering or threading as in the embodiment of the large packer 100 previously described).

The bolts 219 shown in FIG. 18 have been assembled in the recessed holes 207 in the top 213 of the upper plate 201 and are screwed into nuts 210 in the recessed holes 207 in the bottom 214 of the lower plate 202 such than when a bolt 219 is tightened into a nut 210, an upper plate 201 and a lower plate 202 are detachably secured to each other holding the inner works (i.e., cylindrical rods 223, extension springs 224, and disc assembly 275) in their respective channels and positions shown in FIG. 18. The resulting small packer assembly 200 shown in FIG. 18 has no exposed hardware allowing for a smooth surface on which a formed rubber material 285 can operate without interference.

Figures 19A, 19B, 19C, 19D, 19E:
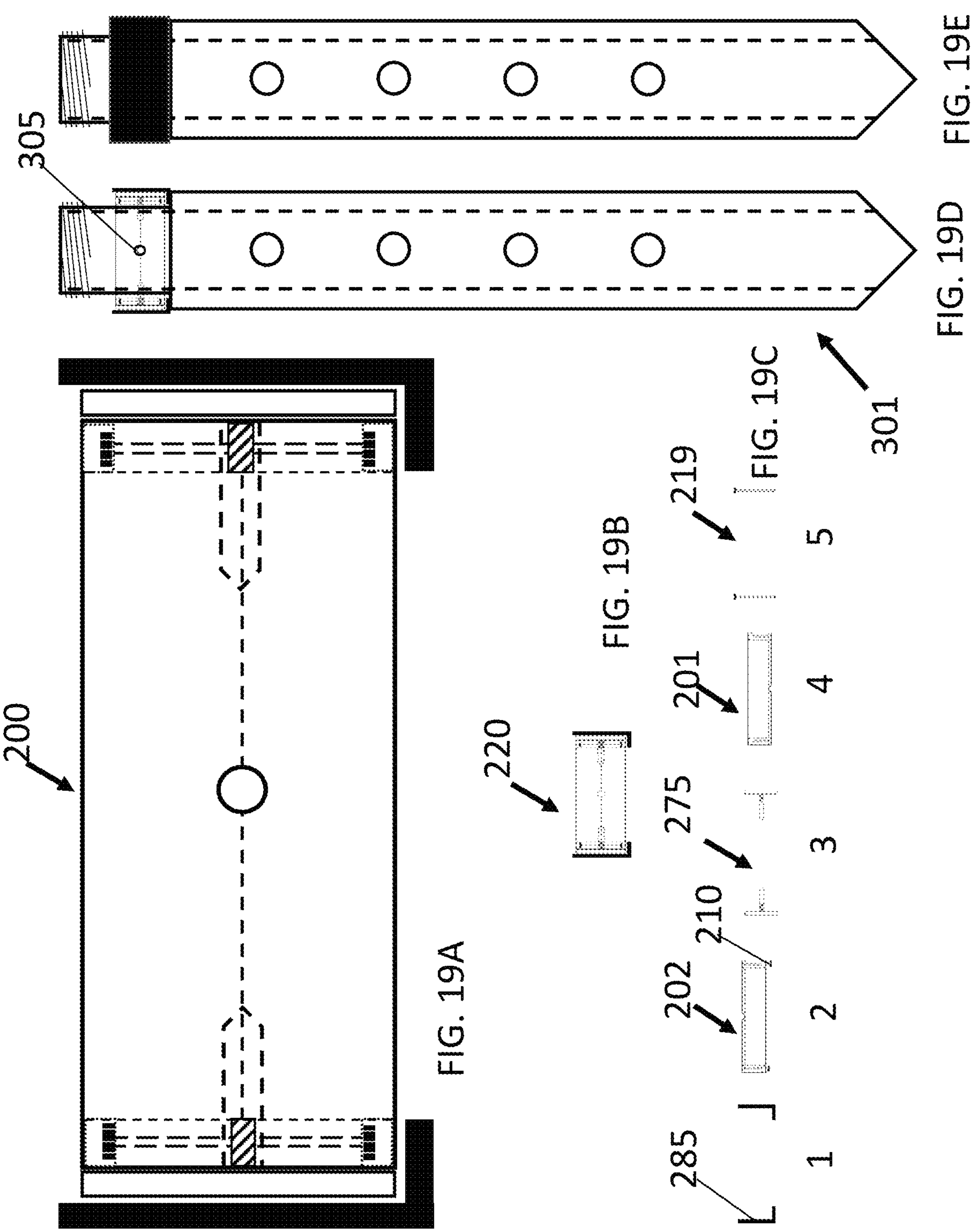
FIG. 19A is a sectional view through the center of a small packer assembly at an expanded scale.
FIG. 19B is a reduced sectional view of the same small packer assembly shown in a sectional view in FIG. 19A.
FIG. 19C is a sectional view of the key components of a small packer showing a sequence of steps that may be used to install a small packer on a Packtivator sub.
FIG. 19D is a sectional view of a Packtivator sub with small packer assemblies installed.
FIG. 19E is a sectional view of a Packtivator sub with small packer assemblies installed.

FIG. 19A is a sectional view through the center of a small packer assembly 200 drawn at the same expanded scale previously illustrated in FIG. 18 and contrasted to a same small packer assembly drawn at a reduced scale 220 in FIG. 19B. The key components of a small packer are shown in FIG. 19C in a sequence of five steps that may be used to install a small packer near the top of a hollow core Packtivator sub 301 as shown assembled in a central sectional view in FIG. 19D. Step 1 of FIG. 19C involves placing a formed rubber material 285 on a circular seat 307 (previously shown in FIG. 13A) on the hollow core Packtivator sub 301. Step 2 involves placing a lower plate 202 with pre-set nuts 210 on a formed rubber material 285 on the formed rubber material 285 on the circular seat 307 of the hollow core Packtivator sub 301. Step 3 involves inserting cylindrical rod assemblies 275 into holes 305 below a threaded end at the top of a hollow core Packtivator sub 301 (temporarily folding down the sides of a formed rubber material 285 as needed for cylindrical rod assemblies 275 to fit into holes 305 near the top of the Packtivator subs and also resting in the wide channels 206 previously shown in FIG. 15). Step 4 involves placing an upper plate 201 on top of a lower plate 202 such that the wide channels and narrow channels (shown in FIG. 15) align creating bores for the operation of the cylindrical rods 223 and extension springs 224. Step 5 involves inserting and tightening bolts 219 to complete a small packer assembly 200 in place on a seat below a treaded end near the top of a hollow core Packtivator sub 301 (FIG. 19D). FIG. 19E shows an off-centered sectional view of the hollow core Packtivator sub 301 with a small packer assembly 200 in place where only the sides of a formed rubber material 285 are visible (covering the inner workings of the small packer assembly shown in FIG. 19D).

Figure 20:
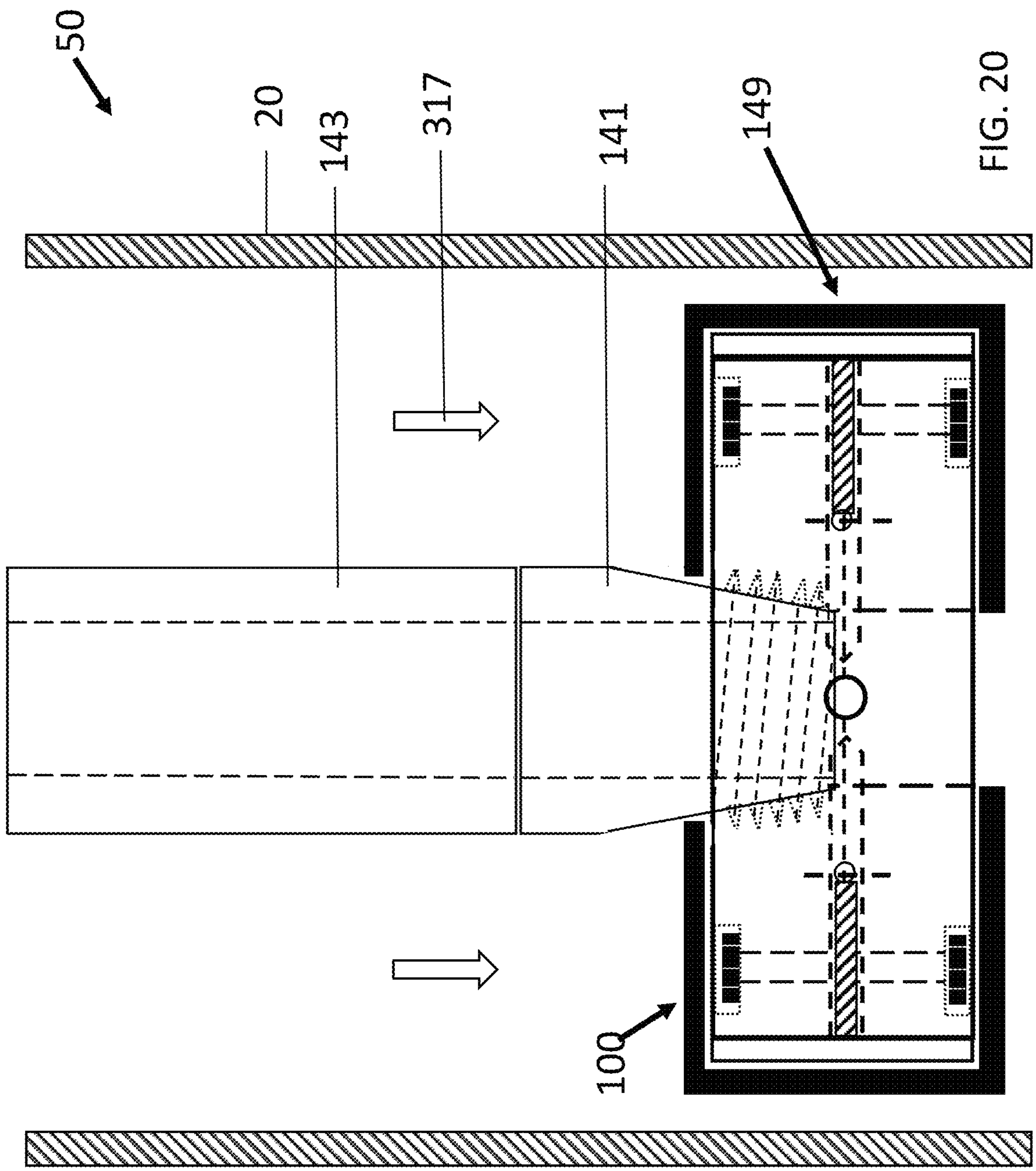
FIG. 20 is a sectional view of an example application of a large packer assembly in an inactivated state being lowered inside a casing by a packer stem assembly.

FIG. 20 shows a sectional view of an example application 50 of a large packer assembly 100 being lowered 317 inside a cylindrical casing 20 by a hollow core packer sub 141 connected to a hollow core packer stem 143. A large packer assembly 100 is in a retracted or non-activated state 149 as required until in position at a desired elevation (not shown).

Figure 21:
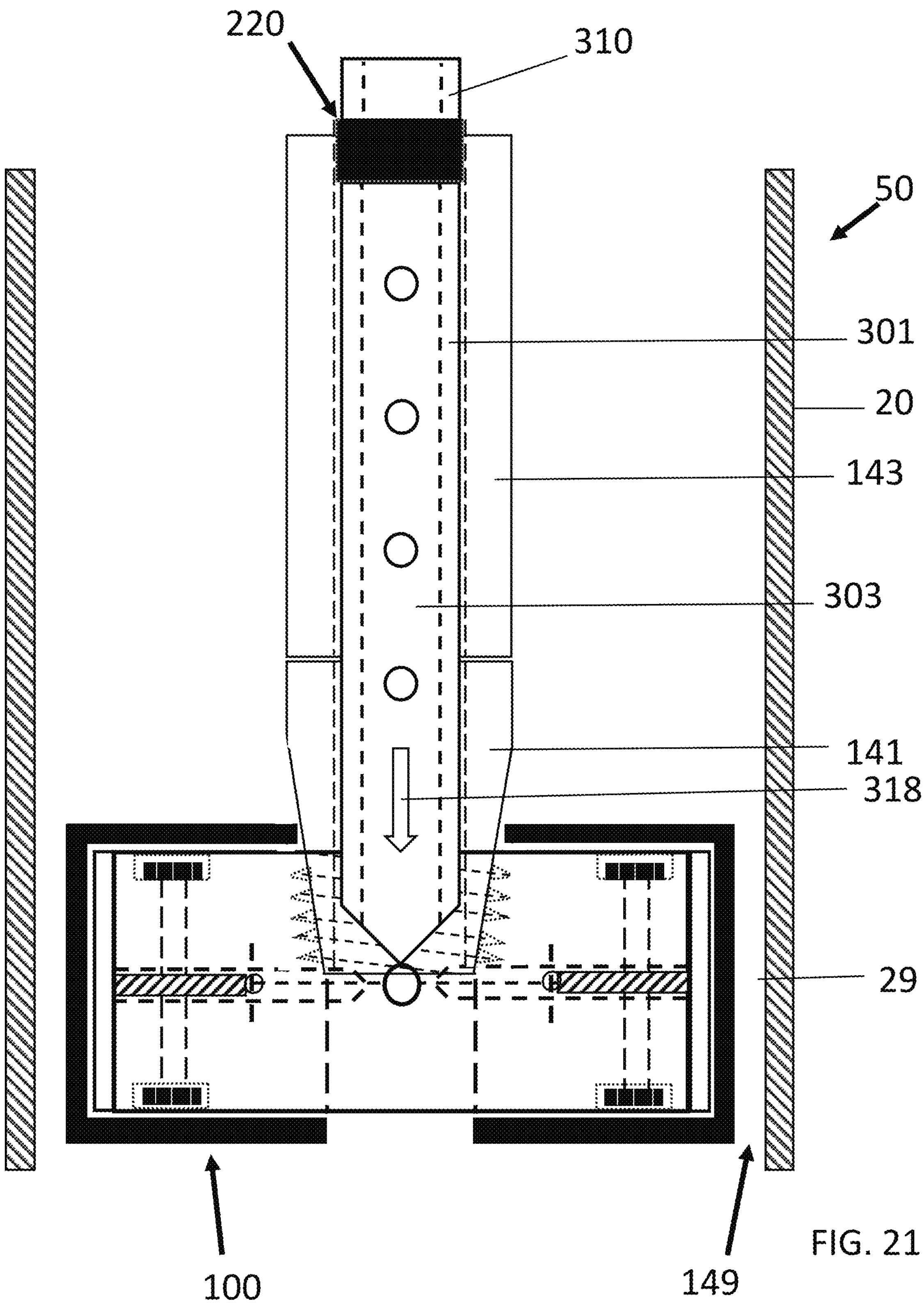
FIG. 21 is a sectional view of an example application of a large packer assembly in an inactivated state at a desired elevation inside a casing. A Packtivator and small packer assembly are being lowered through a packer stem assembly.

FIG. 21 shows a sectional view of an example application 50 of a large packer assembly 100 in a retracted or non-activated state 149 at a desired elevation inside a cylindrical casing 20. A hollow core Packtivator sub 301 is being lowered 318 inside a hollow core packer stem 143 and hollow core packer sub 141. A small packer assembly 220 is shown at the top of a hollow core Packtivator sub 301 in FIG. 21. An annular space 29 is shown between large packer assembly 100 and the inside walls of the casing 20 during a retracted or non-activated state 149 of the large packer assembly 100.

Figure 22:
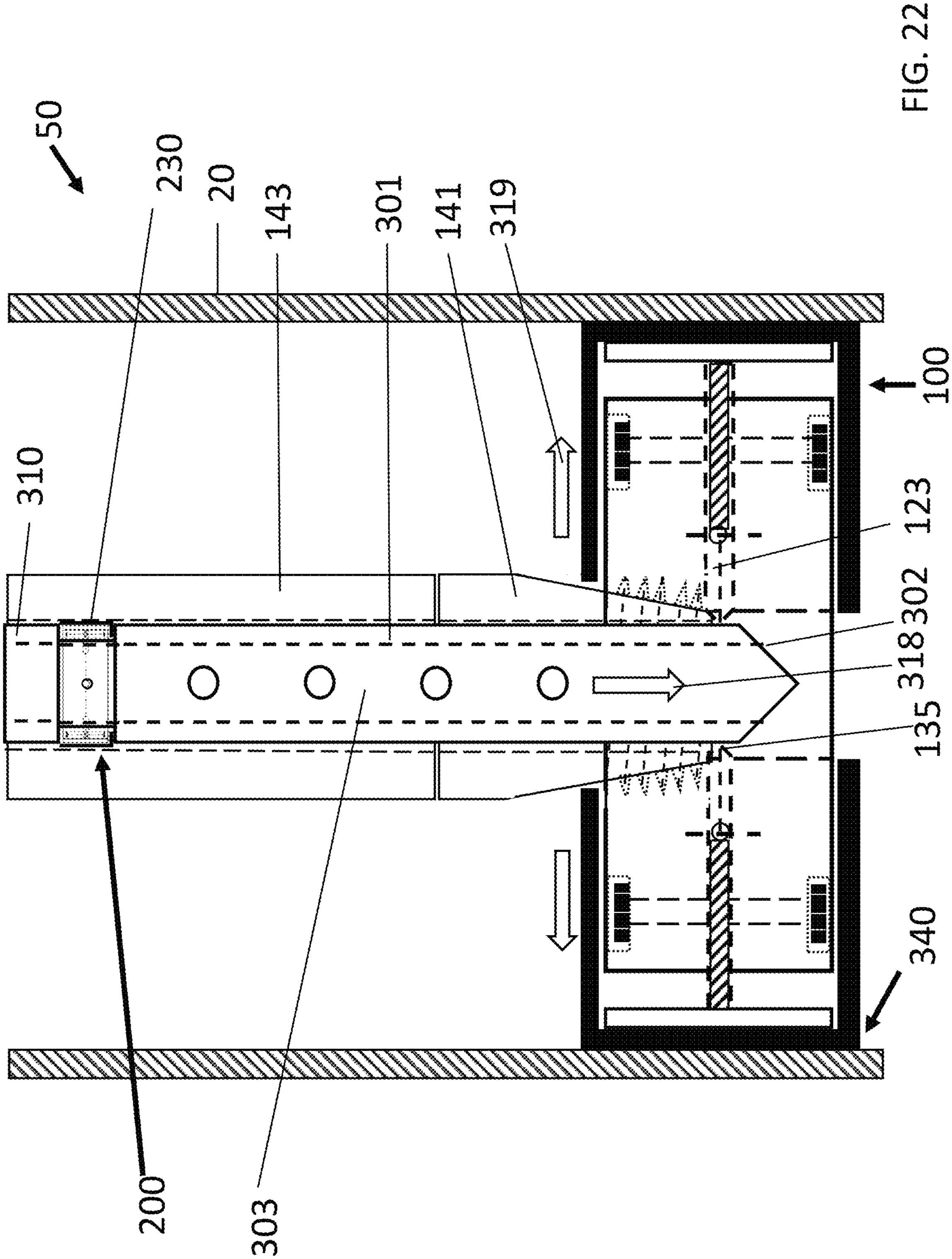
FIG. 22 is a sectional view of an example application of a large packer assembly in an activated state inside a casing while a small packer assembly remains in an inactivated state.

FIG. 22 shows a sectional view of an example application 50 of a large packer assembly 100 in an activated state 340 as noted by lateral extension 319 of the key packer components previously described as a hollow core Packtivator sub 301 is pressed downward 318 engaging a beveled end of a hollow core Packtivator sub 302 with the beveled ends 135 of a plurality of cylindrical rods 123 at a desired elevation inside a cylindrical casing 20. In an activated state 340, a plurality of disc assemblies 175 (previously described in association with FIG. 8) are fully extended by mechanical engagement of a hollow core Packtivator sub 302 such that the formed rubber material 185 that encases a large packer assembly 100 is firmly pressed against an interior wall of a casing 20 such that an annular space 29 previously shown in FIG. 21 is filled to prevent flow of a fluid (not shown). A small packer assembly 200 in a retracted or non-activated state 230 is shown at the top of a hollow core Packtivator sub 301 beneath a hollow core Packtivator stem in FIG. 22.

Figure 23:
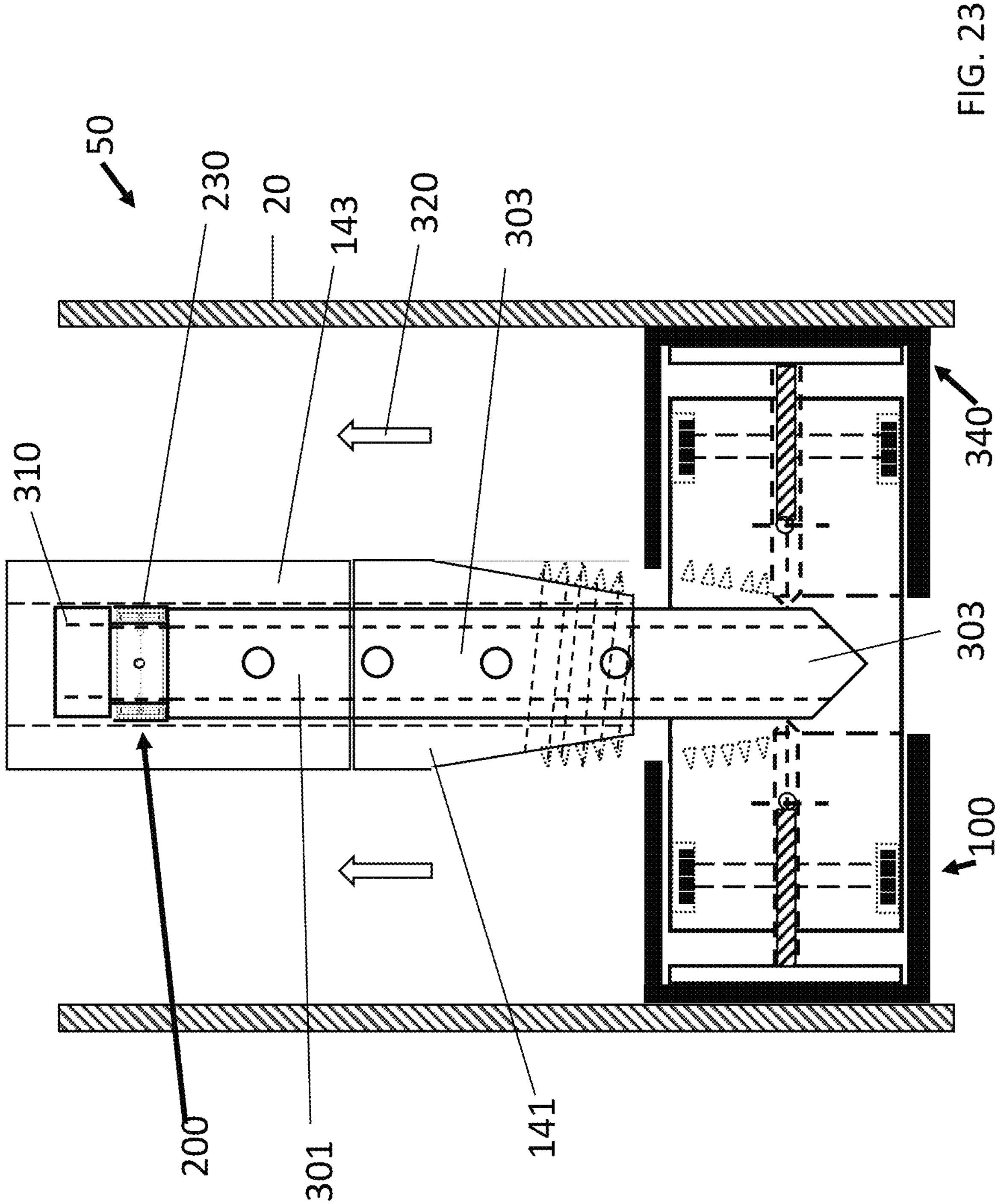
FIG. 23 is a sectional view of an example application of a large packer assembly in an activated state inside a casing and removal of a packer stem assembly while a small packer assembly remains in an inactivated state.

FIG. 23 shows a sectional view of an example application 50 of a large packer assembly 100 in an activated state 340 inside a cylindrical casing 20. In an activated state 340, a plurality of disc assemblies 175 (previously described in association with FIG. 8) are fully extended by mechanical engagement of a hollow core Packtivator sub 302 such that the formed rubber material 185 that encases a large packer assembly 100 is firmly pressed against an interior wall of a casing 20 such that an annular space 29 previously shown in FIG. 21 is filled to prevent flow of a fluid (not shown). A hollow core Packtivator sub 301 remains in place at a desired elevation as a hollow core packer stem 143 and hollow core packer sub 141 are removed from the cylindrical casing 20 shown by arrows 320. A small packer assembly 200 in a retracted or non-activated state 230 is shown at the top of a hollow core Packtivator sub 301 and beneath a hollow core Packtivator stem 310 in FIG. 23.

Figures 24A, 24B, 24C, 24D:
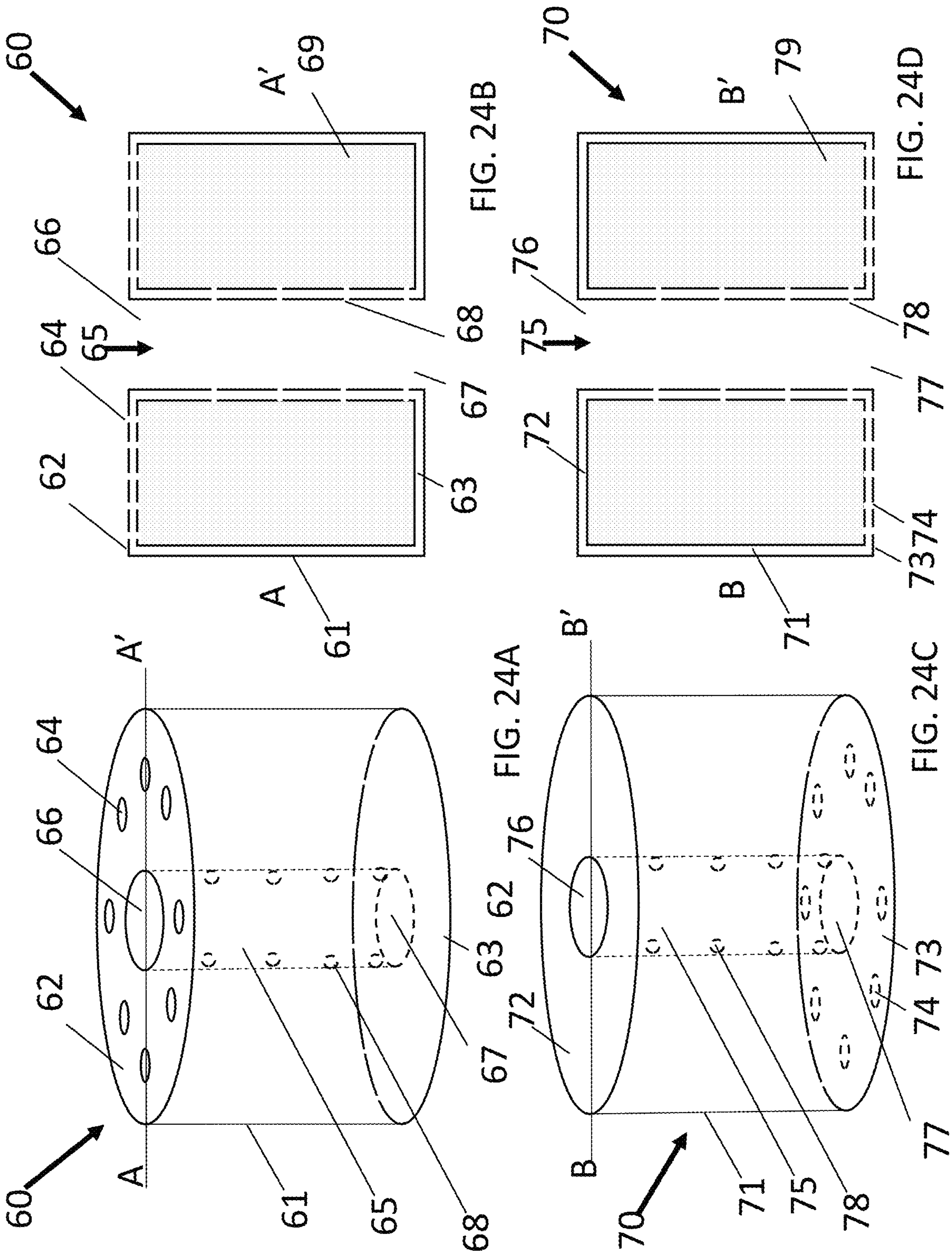
FIG. 24A is an isometric view of one embodiment of a fluid treatment cartridge.
FIG. 24B is a sectional view of the first embodiment showing a treatment media inside.
FIG. 24C is an isometric view of a second embodiment of a fluid treatment cartridge.
FIG. 24D is a sectional view of the second embodiment showing a treatment media inside.

FIG. 24A is an isometric view of a cylindrically shaped fluid treatment cartridge 60 that in one embodiment consists of sidewalls 61, a top 62, and a bottom 63. A plurality of holes 64 are shown in a top 62 and an open cylindrical tube 65 is on the inside of a cartridge 60 exposing a hole 66 in a top 62 and a hole 67 in a bottom 63 of a cartridge 60. A plurality of perforations 68 are shown on walls of a cylindrical tube 65. A section line A-A' is labeled in FIG. 24A and the corresponding cross-sectional view along the center of cylindrically shaped fluid treatment cartridge 60 is shown in FIG. 24B.

A permeable and reactive treatment media 69 is shown inside a fluid treatment cartridge 60 in FIG. 24B (the media is not specified within the present disclosure as the selection of appropriate media and its particle size would be site specific depending on the contaminants in a fluid requiring treatment, but could include, as one example, activated carbon). External sidewalls 61, a top 62, and a bottom 63 are shown. The plurality of holes 64 are shown in a top 62 and a hole 66 of an open cylindrical tube 65 is on the inside of a cartridge 60 exposing a hole 66 in a top 62 and a hole 67 in a bottom 63 of a cartridge 60. A plurality of perforations 68 are shown on walls of a cylindrical tube 60 in FIG. 24B.

FIG. 24C is an isometric view of a cylindrically shaped fluid treatment cartridge 70 that in one embodiment consists of sidewalls 71, a top 72, and a bottom 73 that is perforated with a plurality of holes 74. An open cylindrical tube 75 is on the inside of a cartridge 70 exposing a hole 76 in a top 72 and a hole 77 in a bottom 73 of a cartridge 70. A plurality of perforations 78 are shown on walls of a cylindrical tube 75. A section line B-B' is labeled in FIG. 24C and the corresponding cross-sectional view along the center of cylindrically shaped fluid treatment cartridge 70 is shown in FIG. 24D.

A permeable and reactive treatment media 79 is shown inside a cartridge 70 in FIG. 24D (the media is not specified within the present disclosure as the selection of appropriate media and its particle size would be site specific depending on the contaminants in a fluid requiring treatment, but could include, as one example, activated carbon). External sidewalls 71, a top 72, and a bottom 73 with a plurality of holes 74 are shown. An open cylindrical tube 75 on the inside of a cartridge 60 exposes a hole 76 in a top 72 and a hole 77 in a bottom 73 of a cartridge 70. A plurality of perforations 78 are shown on walls of a cylindrical tube 70 in FIG. 24B.

Figure 25A:
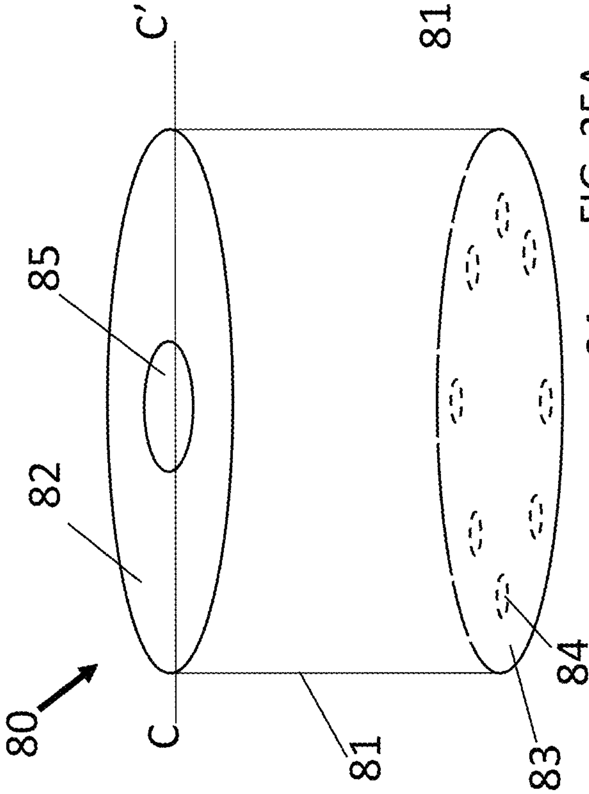
FIG. 25A is an isometric view of a third embodiment of a fluid treatment cartridge.

FIG. 25A is an isometric view of a cylindrically shaped fluid treatment cartridge 80 that in one embodiment consists of sidewalls 81, a top 82, and a bottom 83 that is perforated with a plurality of holes 84. A hole 85 is shown in the top 82. A section line C-C' is labeled in FIG. 25A and the corresponding cross-sectional view along the center of cylindrically shaped fluid treatment cartridge 80 is shown in FIG. 25B.

Figure 25B:
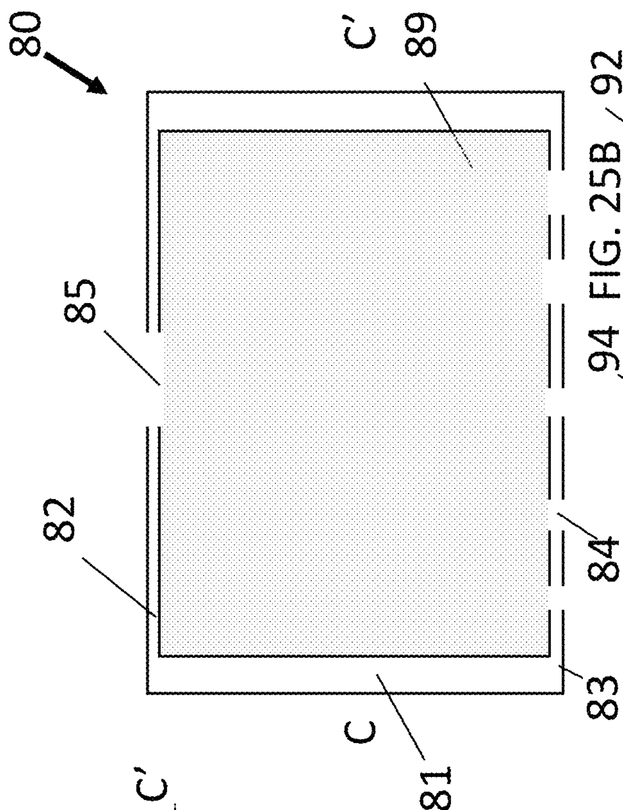
FIG. 25B is a sectional view of the third embodiment showing a treatment media inside.

A permeable and reactive treatment media 89 is shown inside a cartridge 80 in FIG. 25B (the media is not specified within the present disclosure as the selection of appropriate media and its particle size would be site specific depending on the contaminants in a fluid requiring treatment, but could include, as one example, activated carbon). External sidewalls 81, a top 82, and a bottom 83 with a plurality of holes 84 are shown. A hole 85 is shown in a top 82 in FIG. 25B.

Figure 25C:
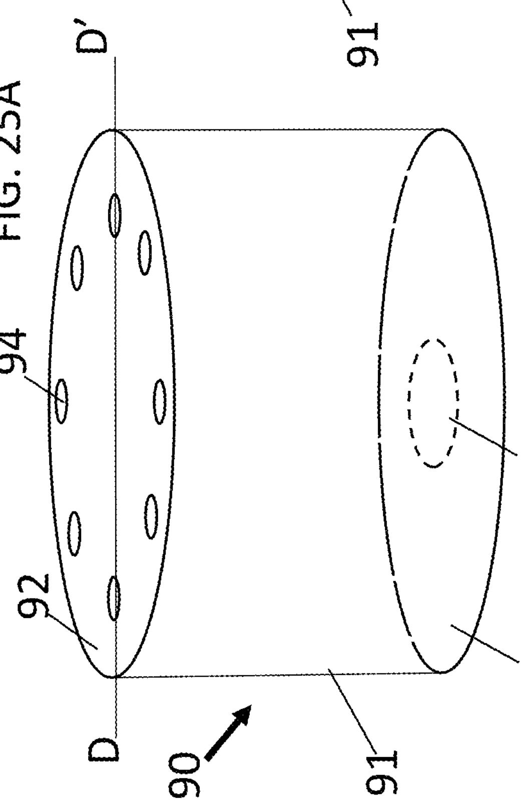
FIG. 25C is an isometric view of a fourth embodiment of a fluid treatment cartridge.

FIG. 25C is an isometric view of a cylindrically shaped fluid treatment cartridge 90 that in one embodiment consists of sidewalls 91, a top 92, and a bottom 93. A plurality of holes 94 are in a top 92 and a hole 95 is shown in a bottom 93. A section line D-D' is labeled in FIG. 25C and the corresponding cross-sectional view along the center of cylindrically shaped fluid treatment cartridge 90 is shown in FIG. 25D.

Figure 25D:
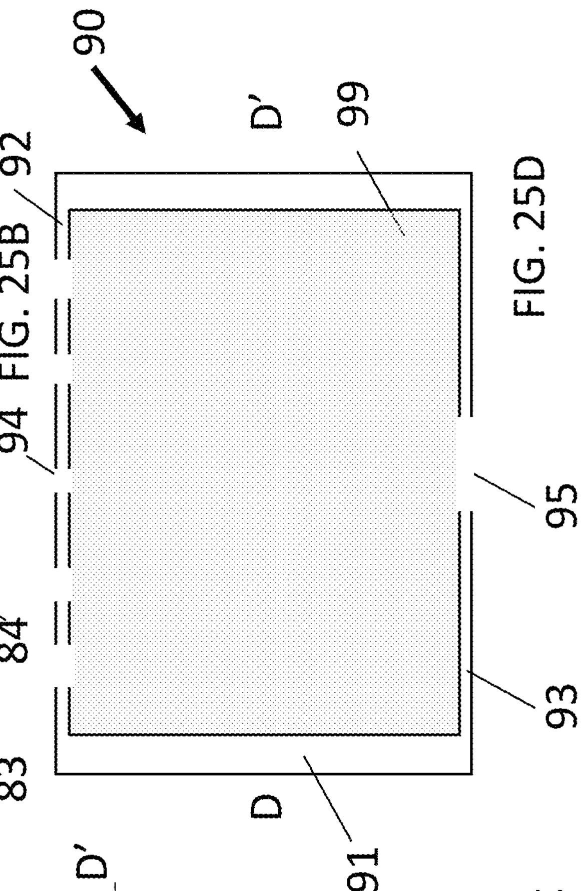
FIG. 25D is a sectional view of the fourth embodiment showing a treatment media inside.

A permeable and reactive treatment media 99 is shown inside a cartridge 90 in FIG. 25D (the media is not specified within the present disclosure as the selection of appropriate media and its particle size would be site specific depending on the contaminants in a fluid requiring treatment, but could include, as one example, activated carbon). External sidewalls 91, a top 92 with a plurality of holes 94, and a bottom 93 with a hole 95 are shown in FIG. 25D.

Figure 26:
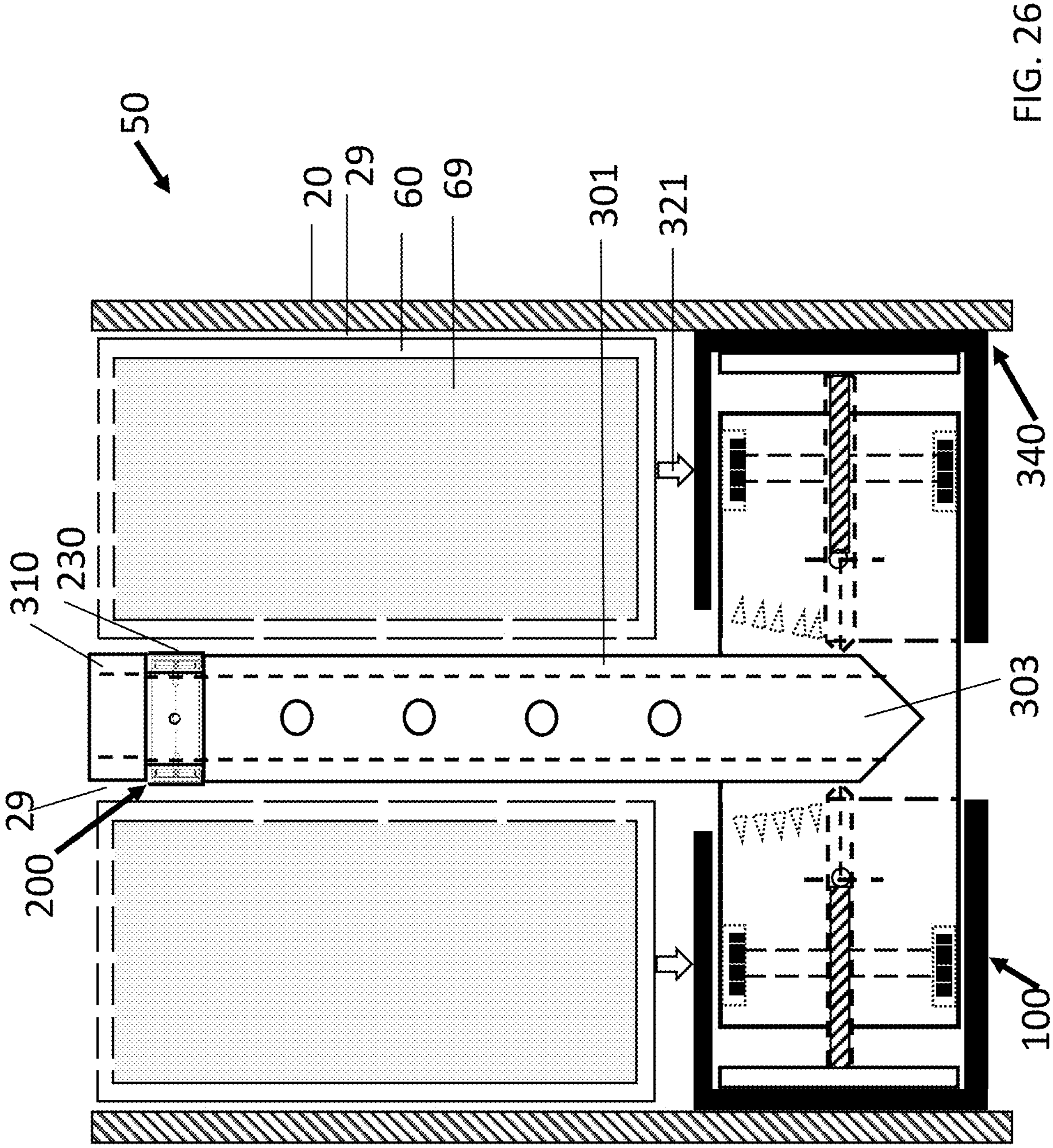
FIG. 26 is a sectional view of an example application of a large packer assembly in an activated state inside a casing and lowering of a fluid treatment cartridge over a Packtivator while a small packer assembly remains in an inactivated state.

FIG. 26 shows a sectional view of an example application 50 of a large packer assembly 100 in an activated state 340 inside a cylindrical casing 20 In an activated state 340, previously described disc assemblies 175 are fully extended radially by mechanically wedged engagement of a hollow core 303 Packtivator sub 301 and a formed rubber material 185 encasing a large packer assembly 100 is firmly pressed against an interior wall of a casing 20 such that an annular space 29 previously shown in FIG. 21 is filled to prevent flow of a fluid (not shown). A hollow core Packtivator sub 301 with a hollow core Packtivator stem 310 remain in place at a desired elevation as a fluid treatment cartridge 60 with a media 69 inside is lowered as shown by arrows 321 to be seated on top of a large packer assembly 100. An underlying spacer may be providing support to the large packer assembly in casing 20 but is not shown.

A small packer assembly 200 in a retracted or non-activated state 230 is shown at the top of the hollow core Packtivator sub 301 in FIG. 26. An annular space 29 is shown between the interior wall of a casing 20 and exterior wall of a cartridge 60. Another annular space 29 is shown above a small packer assembly 200 between a hollow core Packtivator stem 310 and a perforated 68 cylindrical tube 65 (previously detailed in FIG. 24A and FIG. 24B) inside a fluid treatment cartridge 60.

Figure 27:
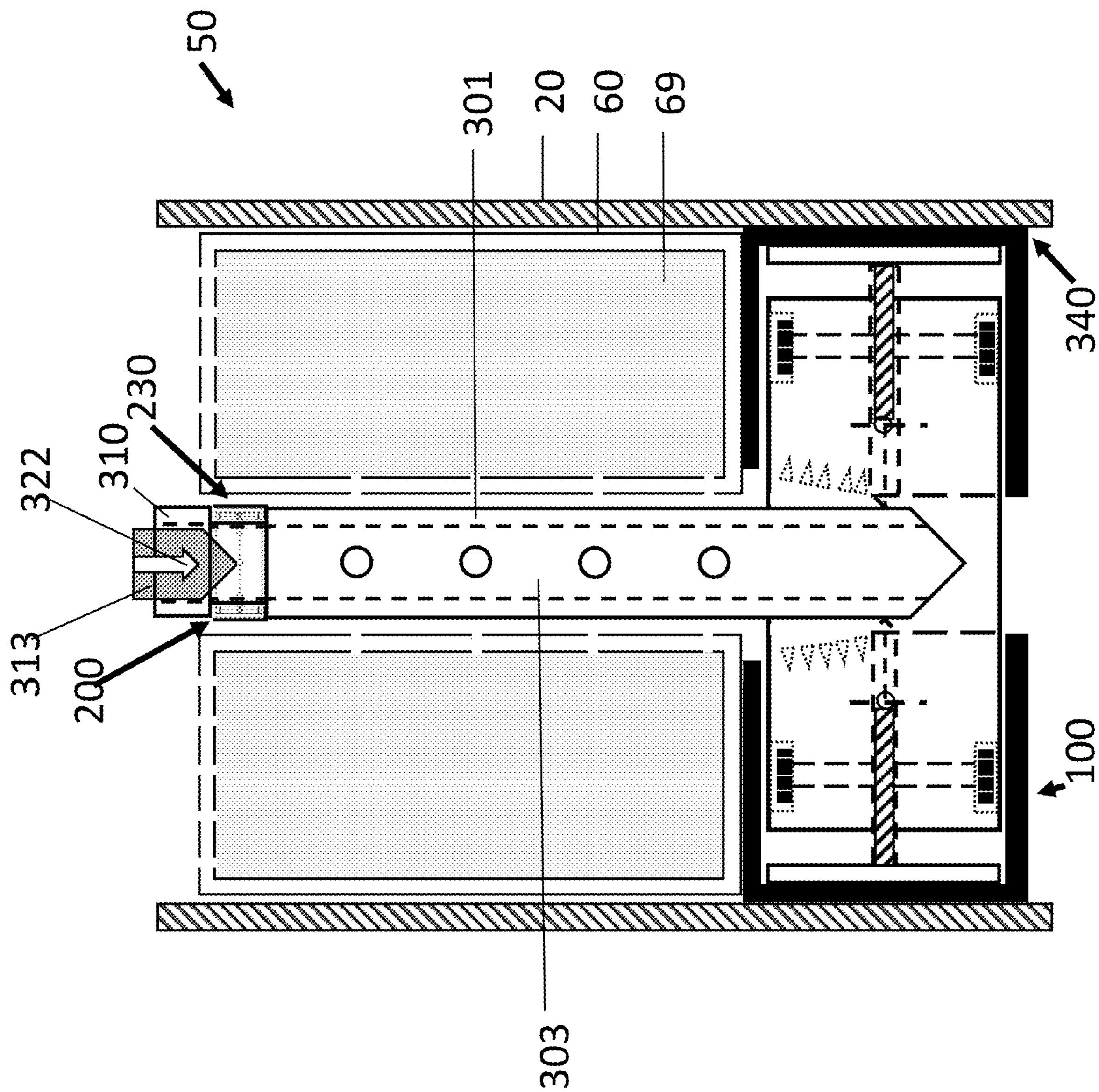
FIG. 27 is a sectional view of an example application of a large packer assembly in an activated state inside a casing with a fluid treatment cartridge seated on top. A small Packtivator is being lowered into a larger diameter Packtivator while a small packer assembly remains in an inactivated state.

FIG. 27 shows a sectional view of an example application 50 of a large packer assembly 100 in an activated state 340 inside a cylindrical casing 20 at a desired elevation. A fluid treatment cartridge 60 is seated on top of a large packer assembly 100 in an activated state 314. A media 69 is shown inside a cartridge 60. A solid core Packtivator sub 313 with a small diameter is shown being lowered by a downward vertical arrow 322 into a hollow portion 303 of a larger diameter hollow core Packtivator sub 301 near a small packer assembly 200 in a retracted or non-activated state 230 at the top of FIG. 27.

Figure 28:
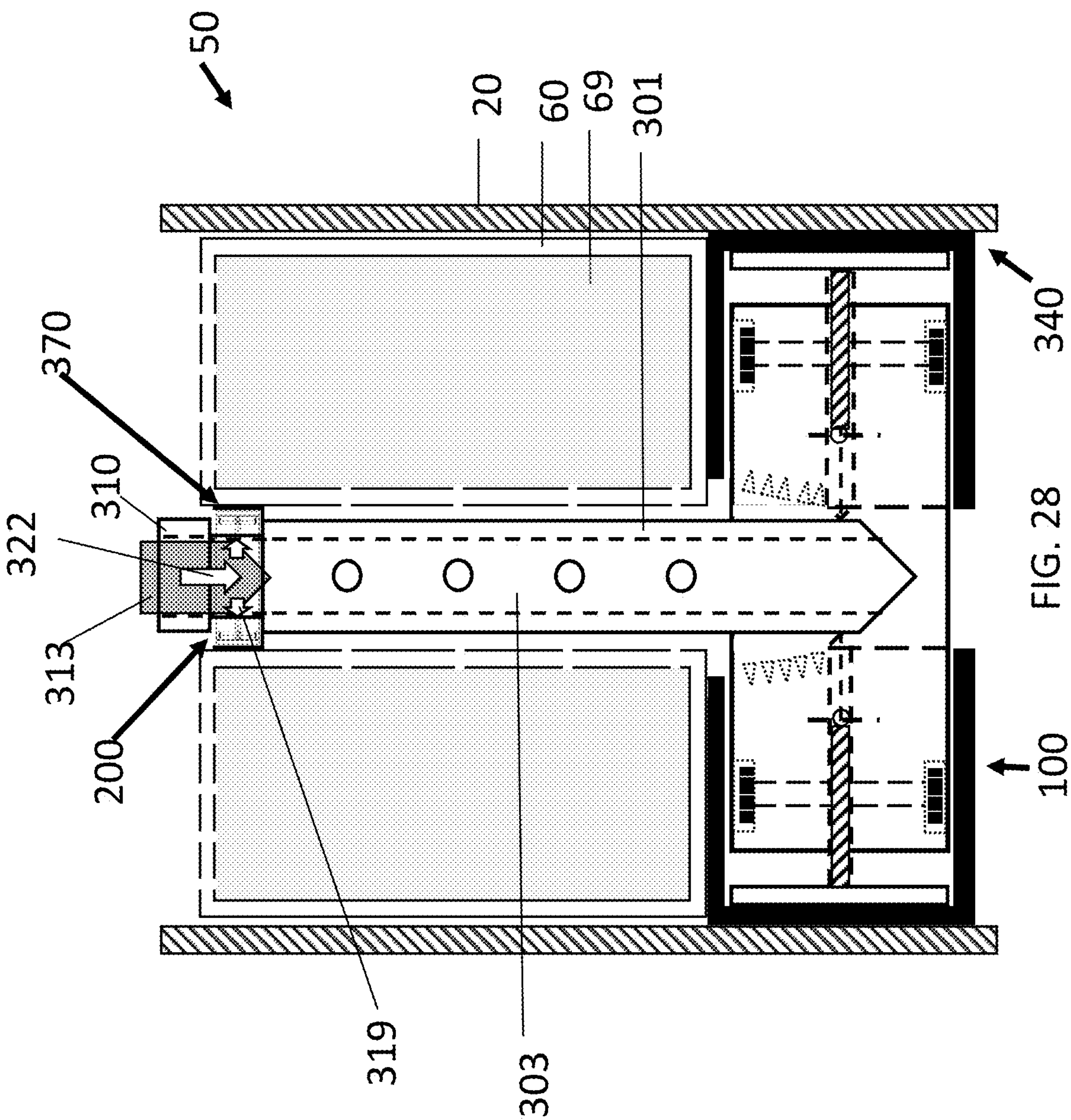
FIG. 28 is a sectional view of an example application of a large packer assembly in an activated state inside a casing with a fluid treatment cartridge seated on top. A small packer assembly has been activated by a small solid core Packtivator.

FIG. 28 shows a sectional view of an example application 50 of a large packer assembly 100 in an activated state 340 inside a cylindrical casing 20 at a desired elevation. A fluid treatment cartridge 60 with a media 69 on the inside is seated on top of a large packer assembly 100 in an activated state 340. A solid core Packtivator sub 313 with a small diameter is shown by a downward vertical arrow 322 exerting a lateral force shown by arrows 319 that activate 370 a small packer assembly 200 at the top of a larger diameter hollow core Packtivator sub 301. The small packer assembly 200 is in contact with the interior walls of a cylinder 65 (previously shown in FIG. 24A) inside of a fluid treatment cartridge 60 thereby sealing an upper annular space 29 previously shown in FIG. 26.

Figure 29:
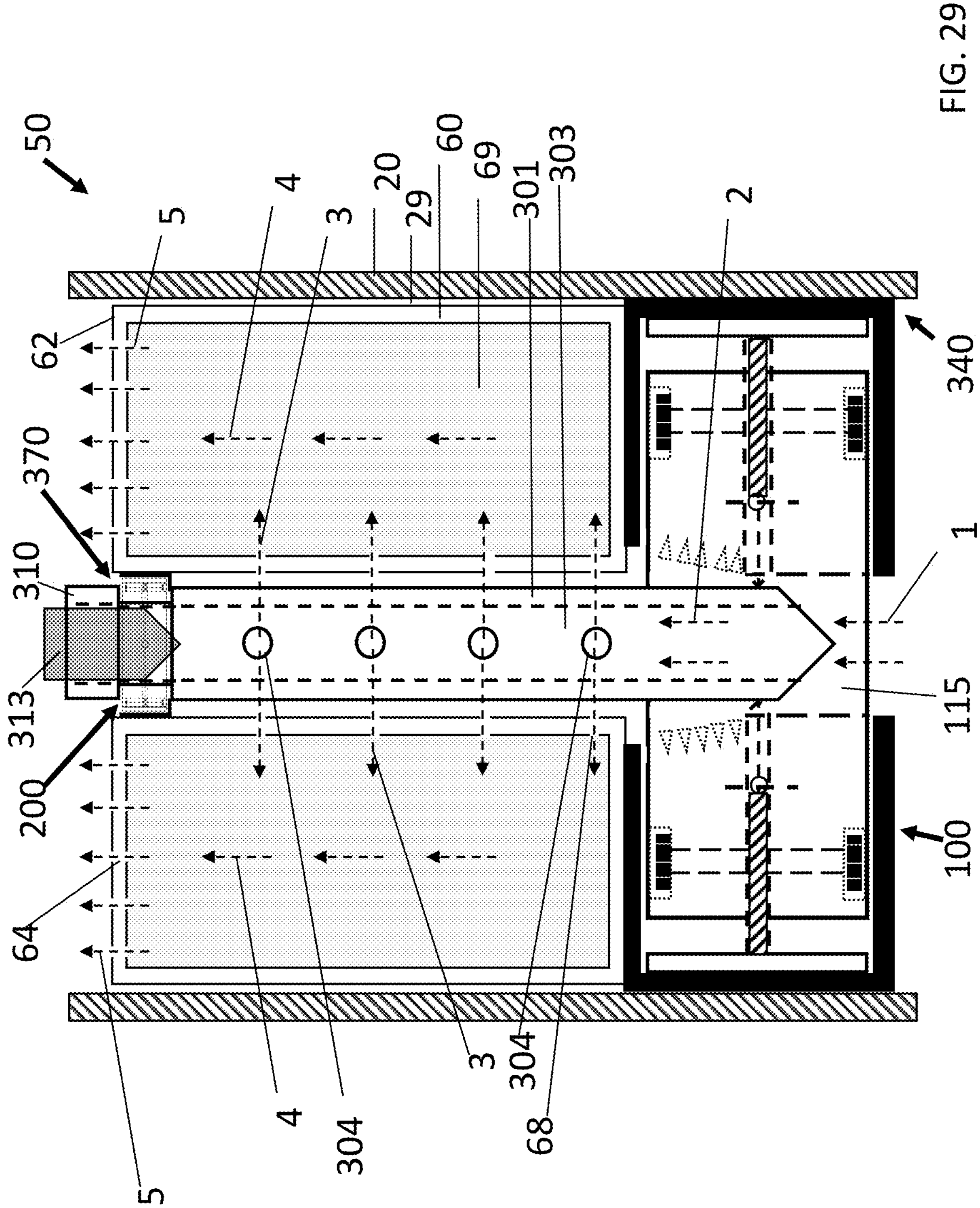
FIG. 29 is a side elevation view of an example application of a large and a small mechanical packer assembly in a casing that have been activated by hollow core and solid core Packtivators, respectively, to control the flow of a fluid and direct the fluid through an in-situ treatment cartridge.

FIG. 29 shows a sectional view of an example application 50 of a large packer assembly 100 in an activated state 340 inside a cylindrical casing 20 at a desired elevation. A fluid treatment cartridge 60 with a media 69 on the inside is seated on top of a large packer assembly 100 in an activated state 340. A solid core Packtivator sub 313 with a small diameter remains at a set elevation to activate 370 a small packer assembly 200 at the top of a larger diameter hollow core 303 Packtivator sub 301. The small packer assembly 200 is in contact with the interior walls of a cylinder 65 (previously shown in FIG. 24A) inside of a fluid treatment cartridge 60 thereby sealing an upper annular space 29 previously shown in FIG. 26.

Packer assemblies 100 and 200 shown in FIG. 29 are activated 340 and 370, respectively, thereby controlling the flow direction of a fluid as indicated by dashed arrows 1 through 5. The dashed arrows reference different points along an upward fluid flow path (i.e., a fluid is generally flowing from points 1 to 5 in this example, which are referred to herein as flow arrows intended to illustrate a general direction of fluid flow).

Specifically, in the example 50 shown in FIG. 29, a fluid enters a lower elevation of a casing 20 and flows upward into a hole 115 in the bottom of a large packer assembly 100 shown by parallel flow arrows 1. A fluid flows upward in a hollow core 303 of a Packtivator sub 301 shown by parallel flow arrows 2 and then flows laterally out a plurality of holes 304 of a hollow core Packtivator sub 301 shown by parallel flow arrows 3 into a treatment media 69 inside a fluid treatment cartridge 60. A fluid flows upward through a treatment media 69 inside a fluid treatment cartridge 60 as shown by parallel flow arrows 4. A fluid exits a cartridge 60 as shown by parallel flow arrows 5 through a plurality of holes 64 shown in a top 62 of a cartridge 60.

In the example 50 shown in FIG. 29, the upward flow of a fluid is controlled by two packer assemblies (100 and 200) both in activated states 340 and 370, respectively. Previously described disc assemblies 175 and 275 for packer assemblies 100 and 200, respectively, are fully extended by mechanical means. Packtivators 301 and 313 mechanically engage with the large packer assembly 100 and the small packer assembly 200, respectively. Formed rubber materials 185 and 285 encasing the packer assemblies 100 and 200, respectively, are firmly pressed against interior walls of casings from the mechanical operation of the packers such that previously described annular spaces 29 are sealed thereby controlling fluid flow and directing it instead along a desired flow path. Specifically, in the example 50 shown in FIG. 29, the fluid entering a lower elevation of casing 20 is considered to be contaminated and is purposely directed through a cartridge for increased contact and residence time with a media 69 for treatment before discharging (not shown) from a casing 20.

FIG. 30 is a side elevation view of an example application of a mechanical packer system 400 showing a sequence of installation steps that could be followed in operation.

Figures 30A, 30B, 30C:
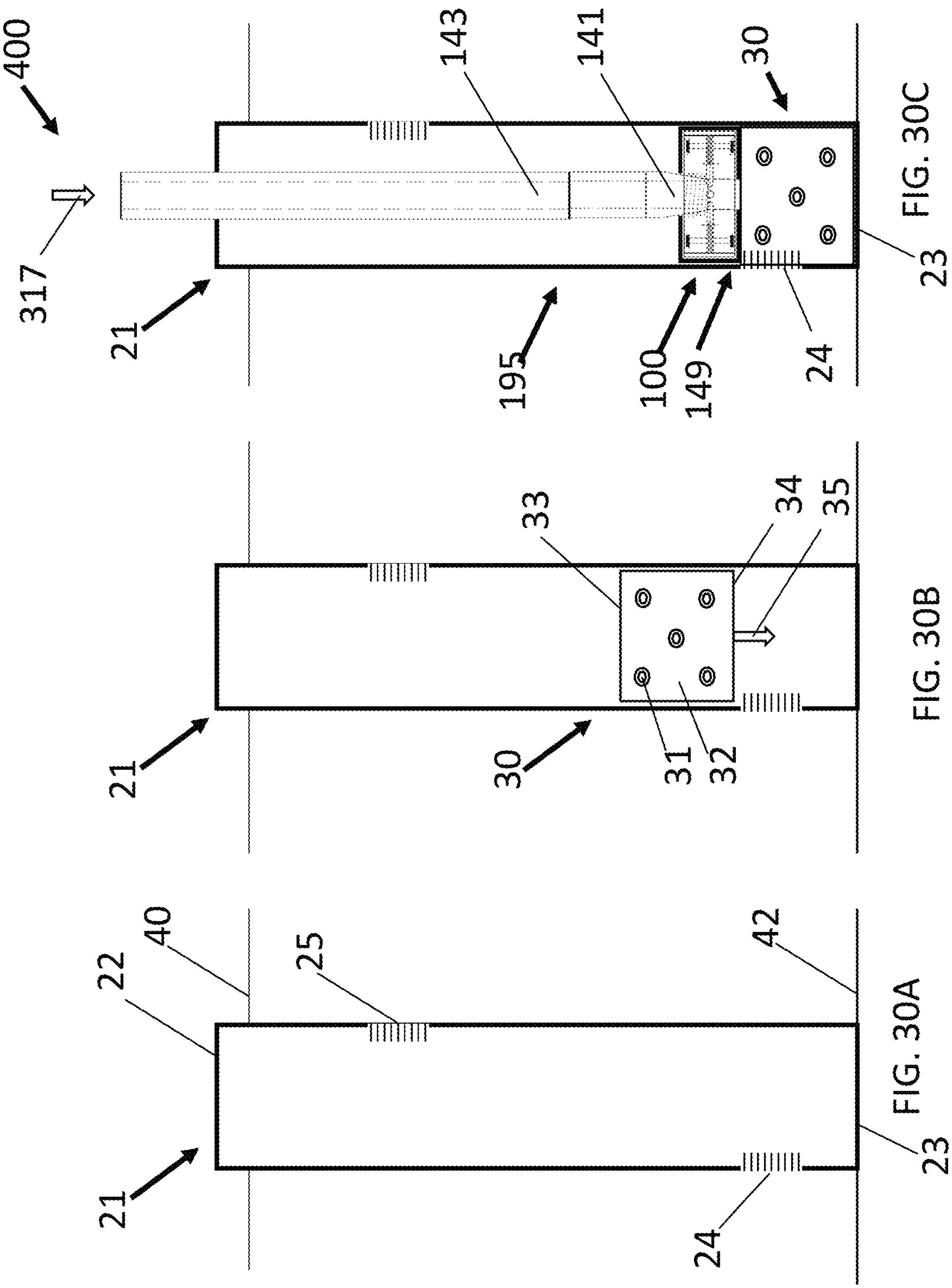
FIG. 30A shows a casing of a mechanical packer system installed below a ground surface.
FIG. 30B shows the addition of a permeable spacer to the mechanical packer system.
FIG. 30C shows the installation of a large packer assembly.

FIG. 30A shows a cylindrical casing 21 with a top 22, bottom 23, a lower elevation well screen 24 on one side of a casing 21, and an upper elevation screen 25 on an opposing side of a casing 21. A casing 21 is installed below a ground surface 40 where an open bottom 23 is seated into a layer 42 at a lower elevation than a ground surface 40. In other applications (not shown), a casing bottom may be closed or have a drive shoe.

FIG. 30B shows a removable permeable spacer 30 being lowered into a casing 21 previously described in FIG. 30A as shown by a downward arrow 35. In one embodiment a spacer has perforations 31 in cylindrical walls 32. Perforations (not shown) are also in a top 33 and a bottom 34 in this embodiment of a removable permeable spacer 30. In other applications (not shown), a spacer may be as simple as a permeable aggregate added to the bottom of a casing.

FIG. 30C shows a removable permeable spacer 30 in position at a desired elevation in the bottom 23 of a casing 21 aligning with a lower elevation well screen 24. A large packer assembly 100 in a retracted or non-activated state 149 is set on top of a removable permeable spacer 30 by a hollow core packer sub 141 connected to a hollow core packer stem 143 constituting a hollow core packer stem assembly 195 being lowered into a casing 21 as shown by a downward arrow 317.

FIG. 31 is a side elevation view of an example application of a mechanical packer system 400 showing a sequence of installation steps that could be followed in operation and represents a continuation of the installation steps shown in FIG. 30A through FIG. 30C.

Figures 31A, 31B, 31C:
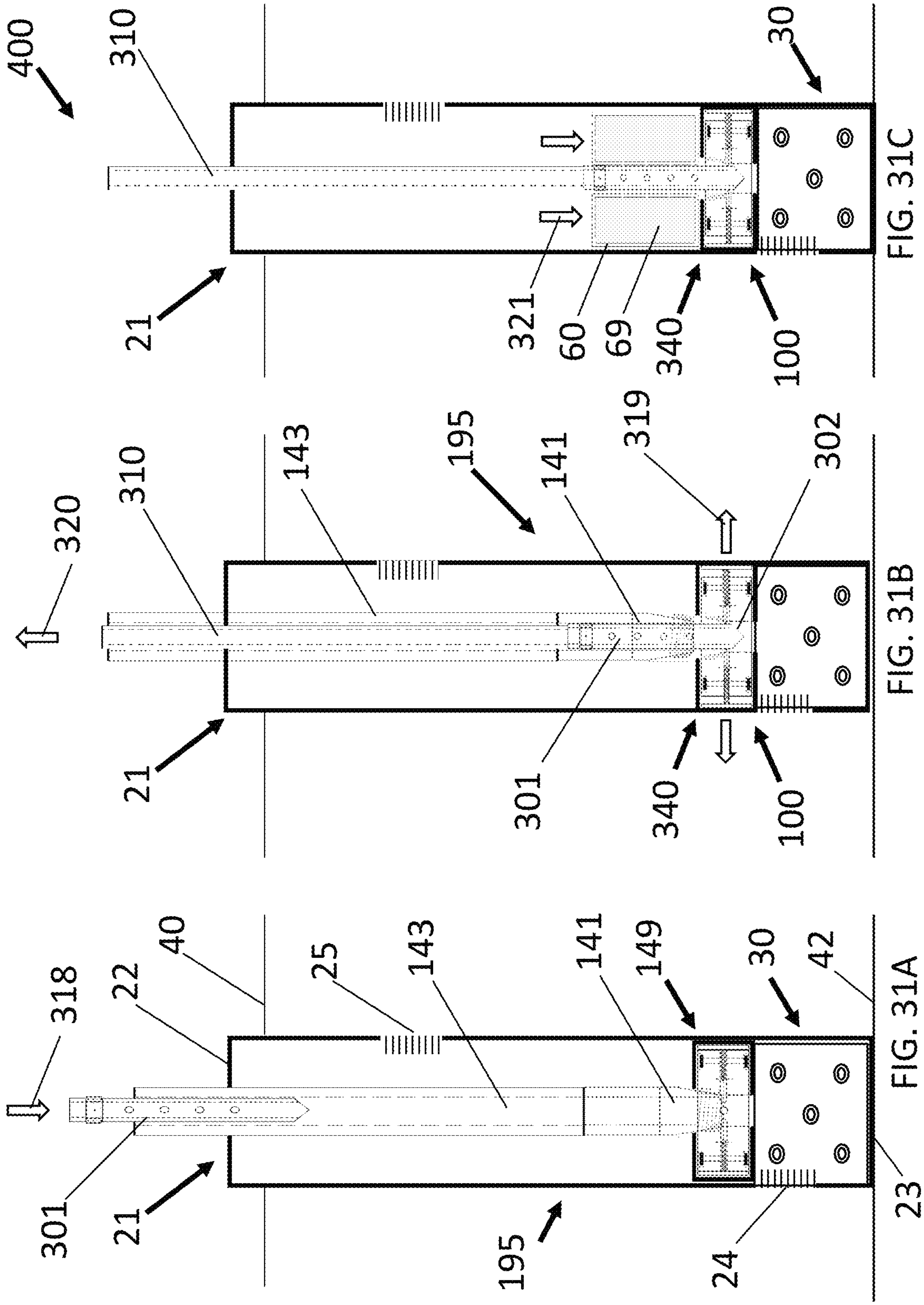
FIG. 31A shows a stem assembly connected to a large packer assembly and a Packtivator partially inserted into a hollow core packer stem.
FIG. 31B shows activation of a large packer assembly and removal of a hollow core packer stem assembly.
FIG. 31C shows the seating of a fluid treatment cartridge on an activated large packer assembly resting upon a permeable spacer at the bottom of a casing.

FIG. 31A shows a hollow core packer stem assembly 195 remaining connected to a large packer assembly 100 which is in a retracted or non-activated state 149 and seated on top of a removable permeable spacer 30 in a casing 21 installed below a ground surface 40. A hollow core Packtivator sub 301 is partially inserted into a hollow core packer stem 143 as shown by a downward arrow 318.

FIG. 31B shows a hollow core Packtivator sub 301 that has been further inserted into a hollow core packer sub 141 such that the beveled end 302 of the Packtivator sub 301 has engaged with the beveled ends 135 of the cylindrical rods 123 (previously detailed in FIG. 22) inside a large packer assembly 100. A large packer assembly 100 is placed in an activated state 340 as shown by horizontal arrows 319 indicating a lateral force. A hollow core Packtivator sub 301 and hollow core Packtivator stem 310 remain in place while a hollow core stem assembly 195 is in the process of being removed from a casing 21 (by unscrewing threads 142 on the hollow sub 141 from threads 118 in an upper plate 101 of a large packer assembly 100 as previously shown in FIG. 12). A hollow core stem assembly 195 is shown to be removed from a casing 21 by an upward arrow 320.

FIG. 31C shows a fluid treatment cartridge 60 filled with a treatment media 69 lowered into a casing 21 as indicated by downward arrows 321. A cartridge 60 is seated upon a previously described large packer assembly 100 which is in an activated state 340 and is supported by an underlying permeable spacer 30. As previously discussed, and shown in FIG. 24A and FIG. 24B, an open cylinder 65 inside a fluid treatment cartridge 60 allows it to be installed over a hollow core Packtivator stem 310 and hollow core Packtivator sub 301 without interference.

FIG. 32 is a side elevation view of an example application of a mechanical packer system 400 showing a sequence of installation steps that could be followed in operation and represents a continuation of the installation steps shown in FIG. 31A through FIG. 31C.

Figures 32A, 32B:
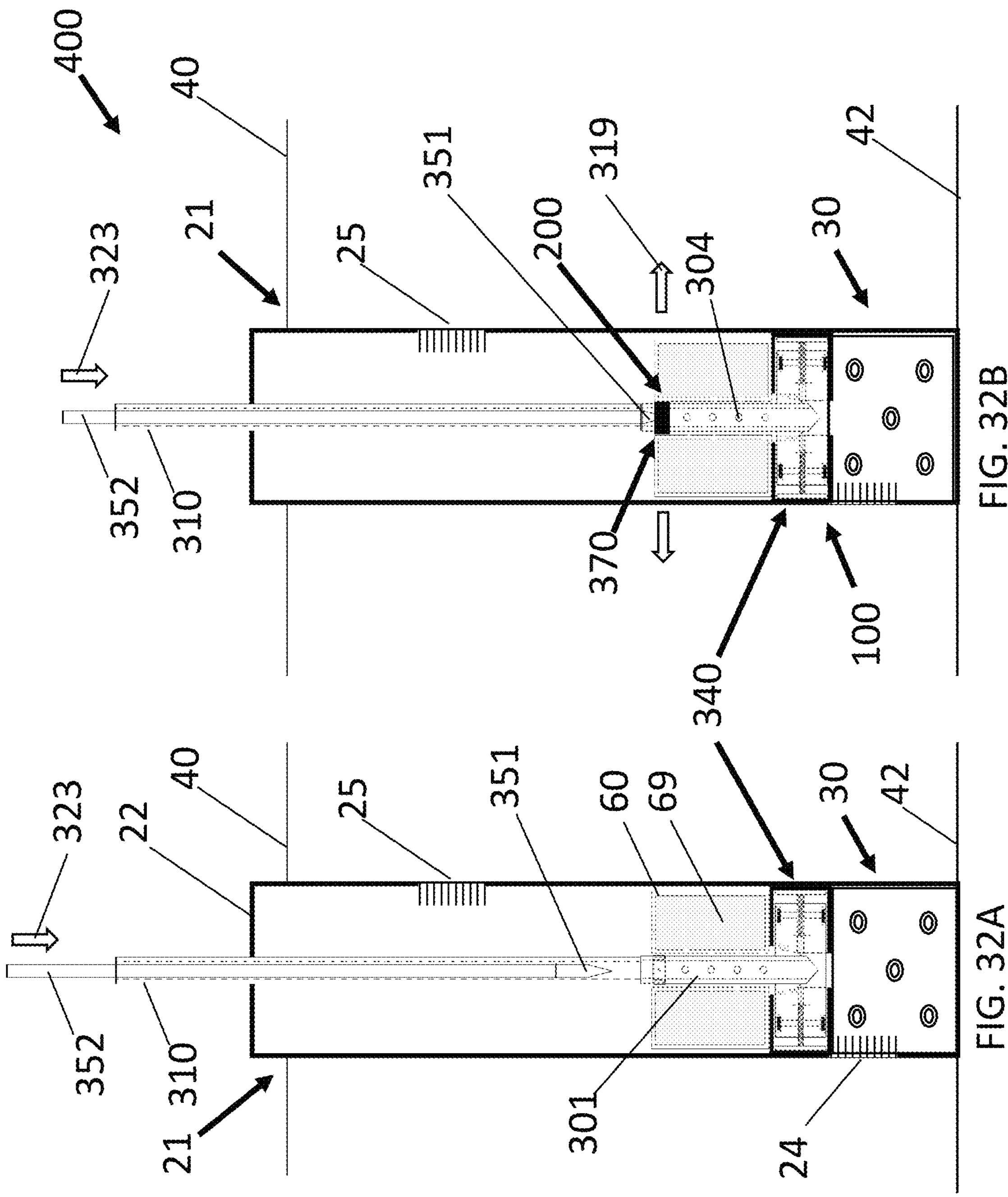
FIG. 32A shows a small diameter hollow core Packtivator sub and stem partially lowered inside a large diameter hollow core Packtivator stem.
FIG. 32B shows activation of a small packer assembly in the top of a fluid treatment cartridge on an activated large packer assembly resting upon a permeable spacer at the bottom of a casing.

FIG. 32A shows a small diameter hollow core Packtivator sub 351 with an attached small diameter hollow core Packtivator stem 352 partially lowered inside a large diameter hollow core Packtivator stem 310 as indicated by a downward arrow 323.

FIG. 32B shows further lowering of a small diameter hollow core Packtivator stem 352 shown by a downward arrow 323 such that a beveled end 302 of a hollow core Packtivator sub 351 has engaged with beveled ends 135 of cylindrical rods 123 (previously detailed in FIG. 22) inside a small packer assembly 200 placing the small packer assembly 200 in an expanded or activated state 370 shown by horizontal arrows 319 indicating that a lateral force was applied by the hollow core Packtivator sub 351.

Figure 33:
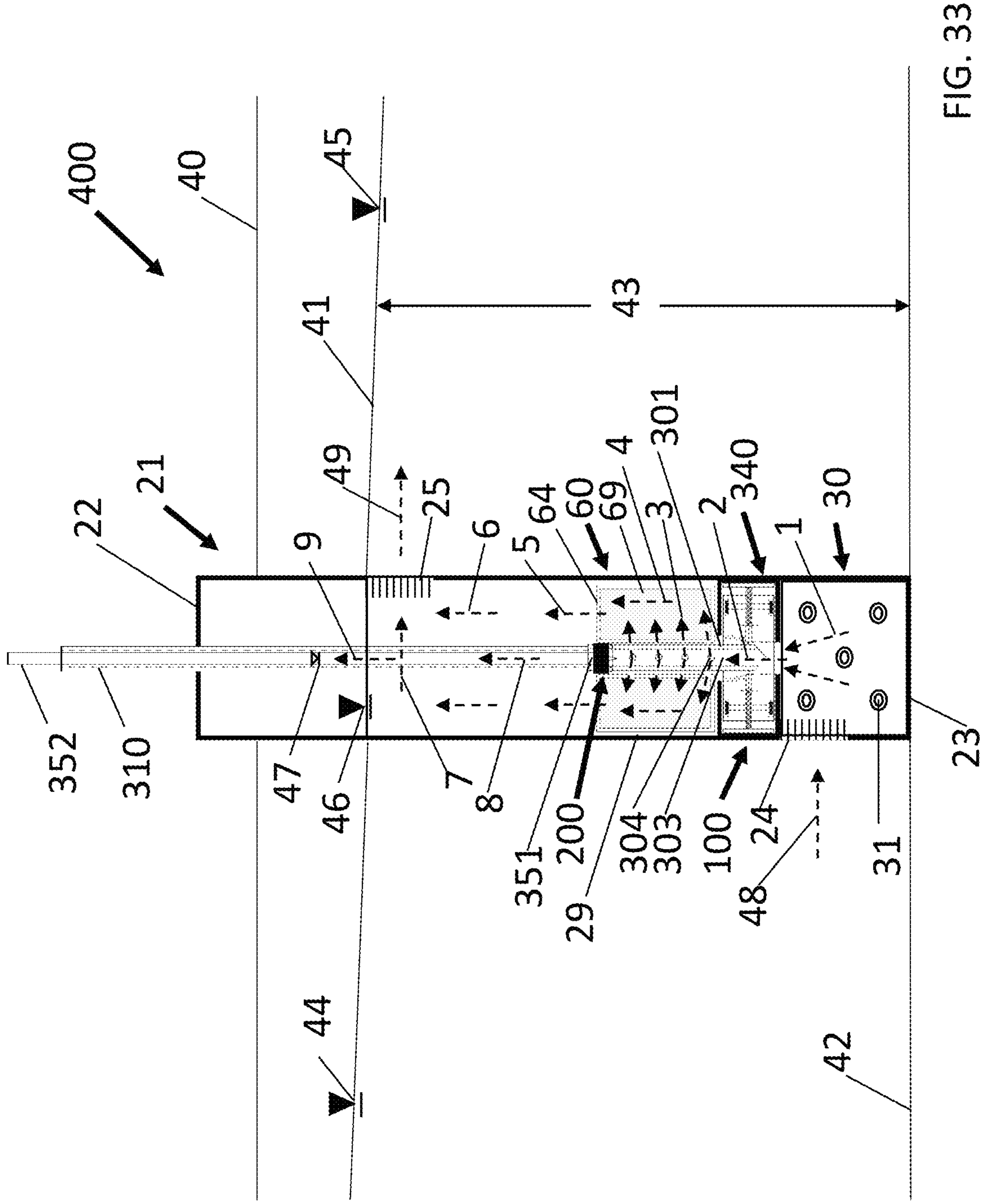
FIG. 33 is a side elevation view of an example application two activated mechanical packer systems that incorporates the eight installation steps previously detailed in FIG. 30A through FIG. 32B detailing the packer's control of upward fluid flow inside a casing in an example groundwater setting.

FIG. 33 is a side elevation view of an example application 400 of a mechanical packer system that incorporates the installation steps previously detailed in FIG. 30A through FIG. 32B showing two mechanical packer systems 100 and 200 both in activated states 340 and 370, respectively, detailing the control of example packer systems on a fluid in an example application 400. The fluid in application 400 could be groundwater, for example, although other fluids such as oil or gas could be envisioned. A cylindrical casing 21 with a top 22, bottom 23, a lower elevation well screen 24 on one side of a casing 21, and an upper elevation screen 25 on an opposing side of a casing 21 is shown installed below a ground surface 40 where an open bottom 23 is seated into a layer 42 at a lower elevation than a ground surface 40 which could represent a lower-permeability layer 42 beneath an aquifer 43 defined as a zone of saturation between a water table 41 and a lower-permeability layer (or aquitard) 42 wherein water at a higher elevation 44 than at a lower elevation 45 creates a flow regime from left to right in FIG. 33.

In the example application 400 shown in FIG. 33, a casing 21 serves the same purpose as a filter casing or filter channel described in detail in U.S. Pat. No. 9,937,537 B2 and U.S. Pat. No. 10,556,260 B2, in which a sectioned barrier wall with multiple interlocking wall sections are placed in a ground area in a partially or entirely subsurface condition with reference to a ground surface and a filter casing is interlocked along vertical connections with two wall sections, wherein the wall sections and vertical connections among them are essentially water impermeable. Groundwater migrates across the wall via the filter casing, moving vertically within the interior of the filter casing in either an upward or downward flow direction according to its installation and site-specific arrangement.

An impervious barrier wall, although not shown in FIG. 33, is detachably secured to both sides of a casing 21 (perpendicular to the illustration) with a purpose of diverting groundwater to flow preferentially toward a casing 21. In the example application 400 shown in FIG. 33, groundwater, as an example, flows laterally 48 into a lower elevation inlet screen 24 and moves generally upward through a casing 21 before discharging laterally 49 through a higher elevation outlet screen 25 (due to differences in hydraulic head resulting from the connection of a casing 21 to a barrier wall, not shown).

Specifically, in the example 400 shown in FIG. 33, contaminated groundwater, as an example, laterally enters a casing 21 through a lower elevation inlet screen 24 and flows upward in a permeable spacer 30 to the center of a large packer assembly 100 shown by converging flow arrows 1. Groundwater flows upward in a hollow core 303 of a hollow core Packtivator sub 301 shown by flow arrow 2 and then flows laterally out a plurality of holes 304 of a hollow core Packtivator sub 301 shown by parallel flow arrows 3 into a treatment media 69 inside a fluid treatment cartridge 60. Groundwater flows upward through a treatment media 69 inside a fluid treatment cartridge 60 as shown by parallel flow arrows 4 before exiting a plurality of holes 64 in a top of a cartridge 60. Groundwater continues to flow upward in a casing 21 shown by parallel flow arrows 6 before flowing horizontally as shown by flow arrow 7 before discharging 49 through a higher elevation outlet screen 25.

Since a small diameter Packtivator sub 351 in this example 400 is hollow, fluids will also flow upward into a hollow core Packtivator sub 351 and into a small diameter hollow core Packtivator stem 352 as shown by flow arrows 8 and 9 in FIG. 33. Groundwater in a small diameter hollow core Packtivator stem 352 is shown to be at a higher elevation 47 than a groundwater elevation inside a larger diameter casing 21 in FIG. 33. Groundwater inside a small diameter hollow core Packtivator stem 352 represents untreated groundwater that has entered at a lower elevation of a casing 21 under a higher hydraulic head than treated groundwater that has discharged from the in-situ treatment cartridge 60 shown by parallel flow arrows 5 and is a lower hydraulic head 46 in a casing 21. In this example 400, a small diameter hollow core Packtivator stem 352 could be used as a piezometer specifically to measure hydraulic head and/or a pre-treatment groundwater quality monitoring well inside a casing 21.

A small diameter hollow core Packtivator sub 351 that has activated a small mechanical packer assembly 200 at an upper elevation of casing 21 prevents fluid from bypassing treatment inside a fluid treatment cartridge 60, and instead, groundwater has been laterally dispersed as shown by parallel flow arrows 3 into a cartridge 60 for increased residence time and contact with a treatment media 69 as well as with an upward component as shown by parallel flow arrows 4. In this example application 400, contaminated groundwater that entered a packer assembly 100 at a lower elevation of a casing 21 shown by flow arrows 1 has undergone treatment with media 69 within a cartridge 60 before flowing out the top of a cartridge 60 shown by flow parallel arrows 5 at a higher elevation.

Figure 34:
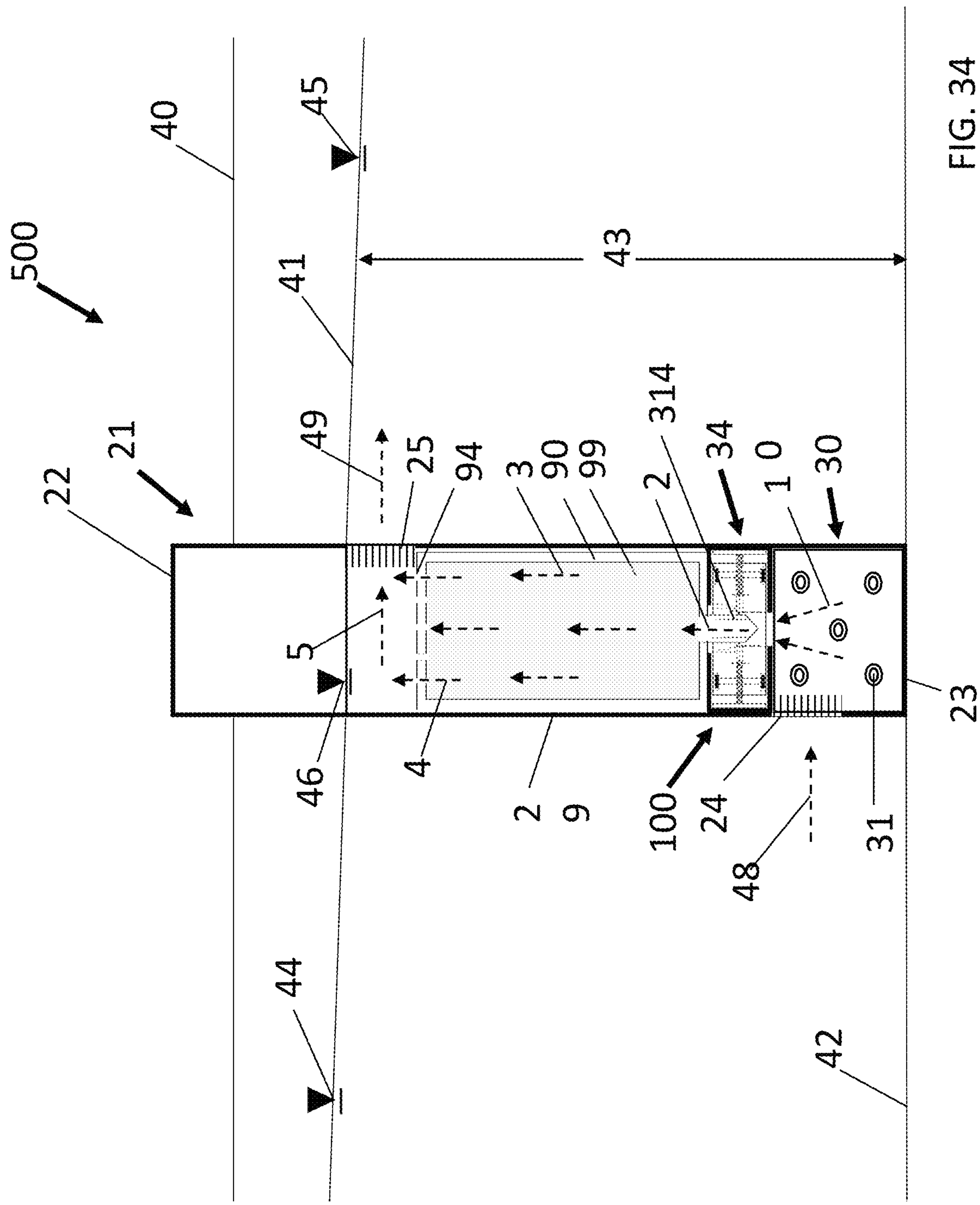
FIG. 34 is a side elevation view of an example application of a single activated mechanical packer system detailing the packer's control of upward fluid flow inside a casing in an example groundwater setting.

FIG. 34 is a side elevation view of an example application 500 of a mechanical packer system showing a single large mechanical packer system 100 in an activated state 340 detailing the control of example packer system on a fluid. The fluid in application 500 could be groundwater, for example, although other fluids such as oil or gas could be envisioned. A cylindrical casing 21 with a top 22, bottom 23, a lower elevation well screen 24 on one side of a casing 21, and an upper elevation screen 25 on an opposing side of a casing 21 is shown installed below a ground surface 40 where an open bottom 23 is seated into a layer 42 at a lower elevation than a ground surface 40 which could represent a lower-permeability layer 42 beneath an aquifer 43 defined as a zone of saturation between a water table 41 and a lower-permeability layer (or aquitard) 42 wherein water at a higher elevation 44 than at a lower elevation 45 creates a flow regime from left to right in FIG. 34.

In the example application 500 shown in FIG. 34, a casing 21 serves the same purpose as a filter casing or filter channel described in detail in U.S. Pat. No. 9,937,537 B2 and U.S. Pat. No. 10,556,260 B2, in which a sectioned barrier wall with multiple interlocking wall sections are placed in a ground area in a partially or entirely subsurface condition with reference to a ground surface and a filter casing is interlocked along vertical connections with two wall sections, wherein the wall sections and vertical connections among them are essentially water impermeable. Groundwater migrates across the wall via the filter casing, moving vertically within the interior of the filter casing in either an upward or downward flow direction according to its installation and site-specific arrangement.

An impervious barrier wall, although not shown in FIG. 34, is detachably secured to both sides of a casing 21 (perpendicular to the illustration) with a purpose of diverting groundwater to flow preferentially toward a casing 21. In the example application 500 shown in FIG. 34, groundwater, as an example, flows laterally 48 into a lower elevation inlet screen 24 and moves generally upward through a casing 21 before discharging laterally 49 through a higher elevation outlet screen 25 (due to differences in hydraulic head resulting from the connection of a casing 21 to a barrier wall, not shown).

Specifically, in the example 500 shown in FIG. 34, contaminated groundwater, as an example, laterally enters 48 a casing 21 through a lower elevation inlet screen 24 and flows upward in a permeable spacer 30 to the center of a large packer assembly 100 shown by converging flow arrows 1. Groundwater flows upward in a hollow core 303 of a Packtivator sub 314 shown by flow arrow 2 directly into a bottom hole in a fluid treatment cartridge 90 (previously detailed in FIG. 25C and FIG. 25D). Groundwater flows upward through a treatment media 99 inside a fluid treatment cartridge 90 as shown by parallel flow arrows 3 before exiting a plurality of holes 94 in a top of a cartridge 90 shown by parallel flow arrows 4. Groundwater flows horizontally as shown by flow arrow 5 before laterally discharging 49 through the higher elevation outlet screen 25.

In the example application 500 shown in FIG. 34 contaminated groundwater that laterally entered 48 a lower elevation of a casing 21 has undergone treatment by increased residence time and contact with a treatment media 99 and laterally discharges 49 from a higher elevation outlet screen 25 as treated groundwater.

Figure 35:
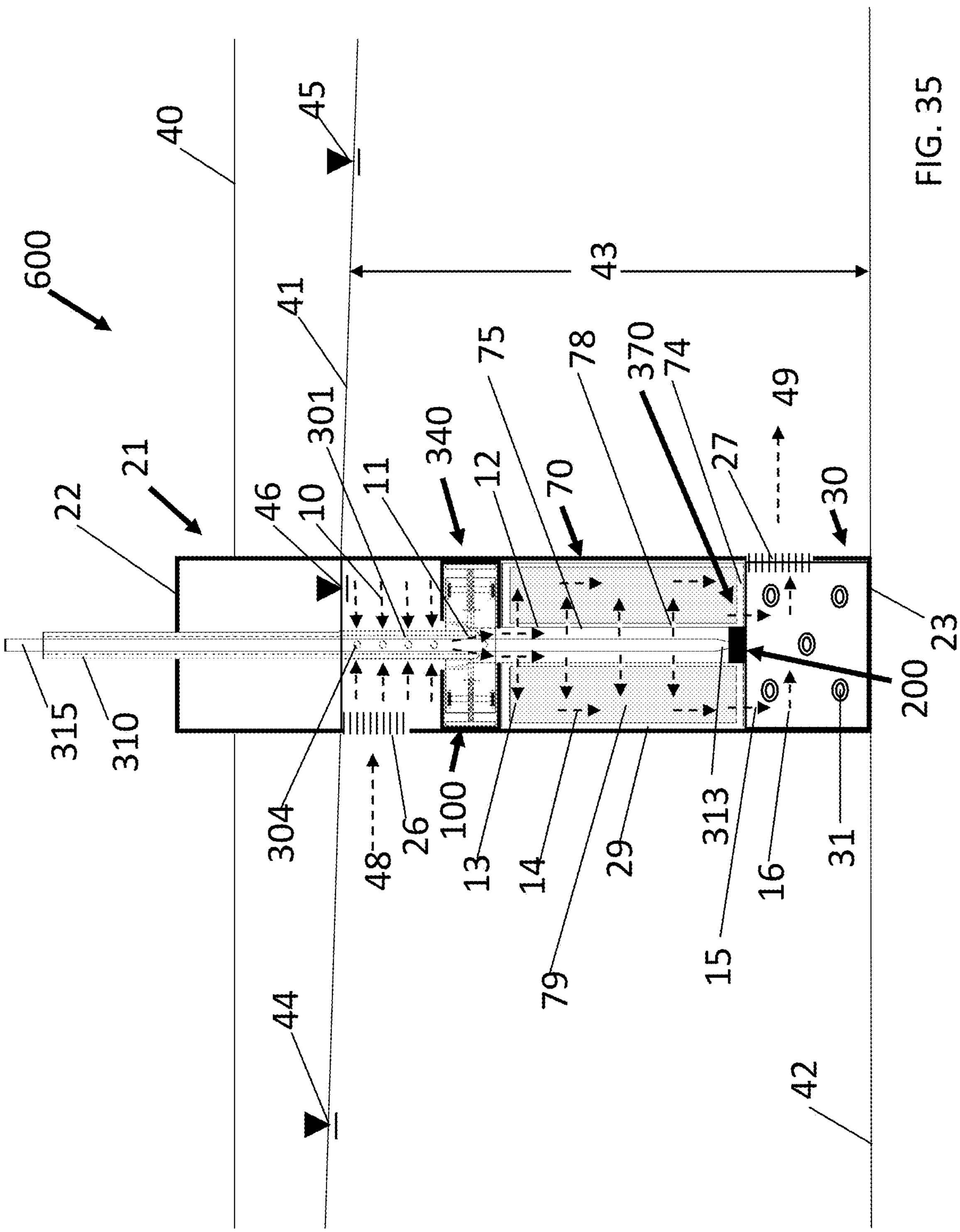
FIG. 35 is a side elevation view of an example application of a two activated mechanical packer system detailing the packer's control of downward fluid flow inside a casing in an example groundwater setting.

FIG. 35 is a side elevation view of an example application 600 of a mechanical packer system showing two mechanical packer systems 100 and 200 both in activated states 340 and 370, respectively, detailing the control of example packer systems on a fluid in an example application 600. The fluid in application 600 could be groundwater, for example, although other fluids such as oil or gas could be envisioned. A cylindrical casing 21 with a top 22, bottom 23, a higher elevation well screen 26 on one side of a casing 21, and an lower elevation screen 27 on an opposing side of a casing 21 is shown installed below a ground surface 40 where an open bottom 23 is seated into a layer 42 at a lower elevation than a ground surface 40 which could represent a lower-permeability layer 42 beneath an aquifer 43 defined as a zone of saturation between a water table 41 and a lower-permeability layer (or aquitard) 42 wherein water at a higher elevation 44 than at a lower elevation 45 creates a flow regime from left to right in FIG. 35.

In the example application 600 shown in FIG. 35, a casing 21 serves the same purpose as a filter casing or filter channel described in detail in U.S. Pat. No. 9,937,537 B2 and U.S. Pat. No. 10,556,260 B2, in which a sectioned barrier wall with multiple interlocking wall sections are placed in a ground area in a partially or entirely subsurface condition with reference to a ground surface and a filter casing is interlocked along vertical connections with two wall sections, wherein the wall sections and vertical connections among them are essentially water impermeable. Groundwater migrates across the wall via the filter casing, moving vertically within the interior of the filter casing in either upward or downward flow direction according to its installation and site-specific arrangement.

An impervious barrier wall, although not shown in FIG. 35, is detachably secured to both sides of a casing 21 (perpendicular to the illustration) with a purpose of diverting groundwater to flow preferentially toward a casing 21. In the example application 600 shown in FIG. 35, groundwater flows laterally 48 into a higher elevation inlet screen 26 and moves generally downward through a casing 21 before laterally discharging 49 through a lower elevation outlet screen 27 (due to differences in hydraulic head resulting from the connection of a casing 21 to a barrier wall, not shown).

Specifically, in the example 600 shown in FIG. 35, groundwater laterally enters 48 a casing 21 through a higher elevation inlet screen 26 and flows laterally shown by parallel flow arrows 10 into a plurality of holes 304 of a hollow core Packtivator sub 301 used to activate 340 a large packer assembly 100 near an upper elevation in a casing 21. A smaller diameter solid core Packtivator stem 362 and a solid core Packtivator sub 361 are shown inside a hollow core Packtivator sub 301 and hollow core Packtivator stem 310 used to activate 370 a small mechanical packer system 200 near a lower elevation in a casing 21 and prevent fluids from bypassing treatment inside a cartridge 70 and instead increasing residence time and contact with a treatment media 79. Groundwater flows downward through the hollow core Packtivator sub 301 as shown by diverging flow arrows 11.

A fluid treatment cartridge 70 and treatment media 79 (previously detailed in FIG. 24C and FIG. 24D) are shown below a large packer assembly 100 in FIG. 35. Groundwater flows downward through an internal cylinder 75 in a fluid treatment cartridge 70 as shown by flow arrows 12 and laterally out through a plurality of holes 78 in an internal cylinder 75 into treatment media 79 as shown by flow arrows 13. Groundwater flows vertically downward through the treatment media 79 as shown by parallel flow arrows 14 and continues to flow vertically downward exiting a plurality of holes 74 in a bottom of a cartridge 70 shown by parallel flow arrows 15 and laterally within a permeable spacer 30 shown by flow arrows 16 before discharging laterally 49 through a lower elevation outlet screen 27.

Figure 36:
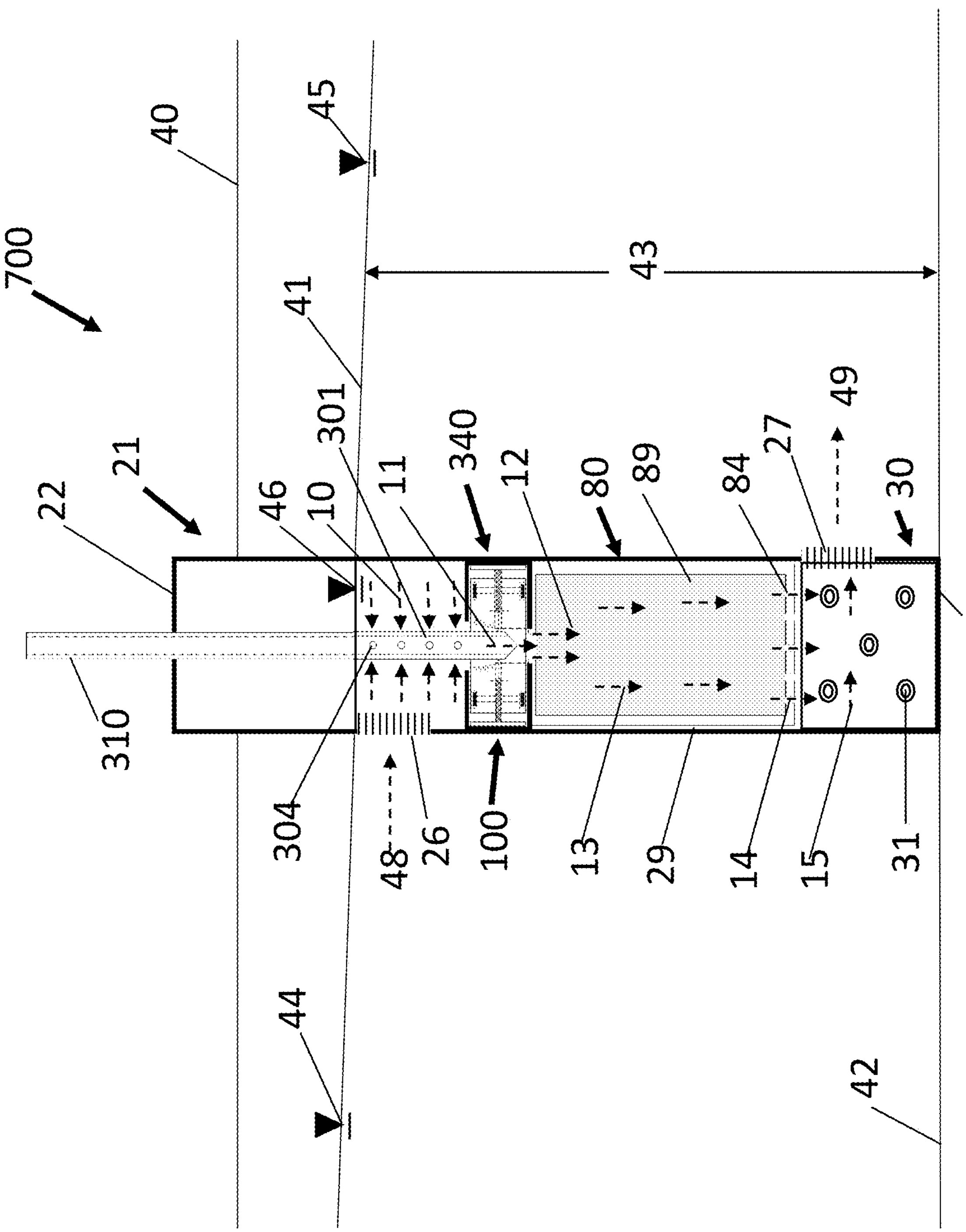
FIG. 36 is a side elevation view of an example application of a single activated mechanical packer system detailing the packer's control of downward fluid flow inside a casing in an example groundwater setting.

FIG. 36 is a side elevation view of an example application 700 of a mechanical packer system 100 in an activated state 340 detailing the control of example packer system on a fluid in an example application 700. The fluid in application 700 could be groundwater, for example, although other fluids such as oil or gas could be envisioned. A cylindrical casing 21 with a top 22, bottom 23, a higher elevation well screen 26 on one side of a casing 21, and an lower elevation screen 27 on an opposing side of a casing 21 is shown installed below a ground surface 40 where an open bottom 23 is seated into a layer 42 at a lower elevation than a ground surface 40 which could represent a lower-permeability layer 42 beneath an aquifer 43 defined as a zone of saturation between a water table 41 and a lower-permeability layer (or aquitard) 42 wherein water at a higher elevation 44 than at a lower elevation 45 creates a flow regime from left to right in FIG. 36.

In the example application 700 shown in FIG. 36, a casing 21 serves the same purpose as a filter casing or filter channel described in detail in U.S. Pat. No. 9,937,537 B2 and U.S. Pat. No. 10,556,260 B2, in which a sectioned barrier wall with multiple interlocking wall sections are placed in a ground area in a partially or entirely subsurface condition with reference to a ground surface and a filter casing is interlocked along vertical connections with two wall sections, wherein the wall sections and vertical connections among them are essentially water impermeable. Groundwater migrates across the wall via the filter casing, moving vertically within the interior of the filter casing in either upward or downward flow direction according to its installation and site-specific arrangement.

An impervious barrier wall, although not shown in FIG. 36, is detachably secured to both sides of a casing 21 (perpendicular to the illustration) with a purpose of diverting groundwater to flow preferentially toward a casing 21. In the example application 700 shown in FIG. 36, groundwater flows laterally 48 into a higher elevation inlet screen 26 and moves generally downward through a casing 21 before discharging laterally 49 through a lower elevation outlet screen 27 (due to differences in hydraulic head resulting from the connection of a casing 21 to a barrier wall, not shown).

Specifically, in the example 700 shown in FIG. 36, groundwater laterally enters 48 a casing 21 through a higher elevation inlet screen 26 and flows laterally shown by parallel flow arrows 10 into a plurality of holes 304 of a hollow core Packtivator sub 301 used to activate 340 a large packer assembly 100 near an upper elevation in a casing 21. Groundwater flows downward through the hollow core Packtivator sub 301 as shown by parallel flow arrows 11.

A fluid treatment cartridge 80 and treatment media 89 (previously detailed in FIG. 25A and FIG. 25B) are shown below a large packer assembly 100 in FIG. 36. Groundwater flows downward and directly into a fluid treatment cartridge 80 as shown by parallel flow arrows 12 and continues downward into a treatment media 89 as shown by parallel flow arrows 13 for increased residence time and contact with a treatment media 89. Groundwater flows vertically downward exiting a plurality of holes 84 in a bottom of a cartridge 80 shown by parallel flow arrows 14 and laterally within a permeable spacer 30 shown by flow arrows 15 before discharging laterally 49 through a lower elevation outlet screen 27.

Figure 37:
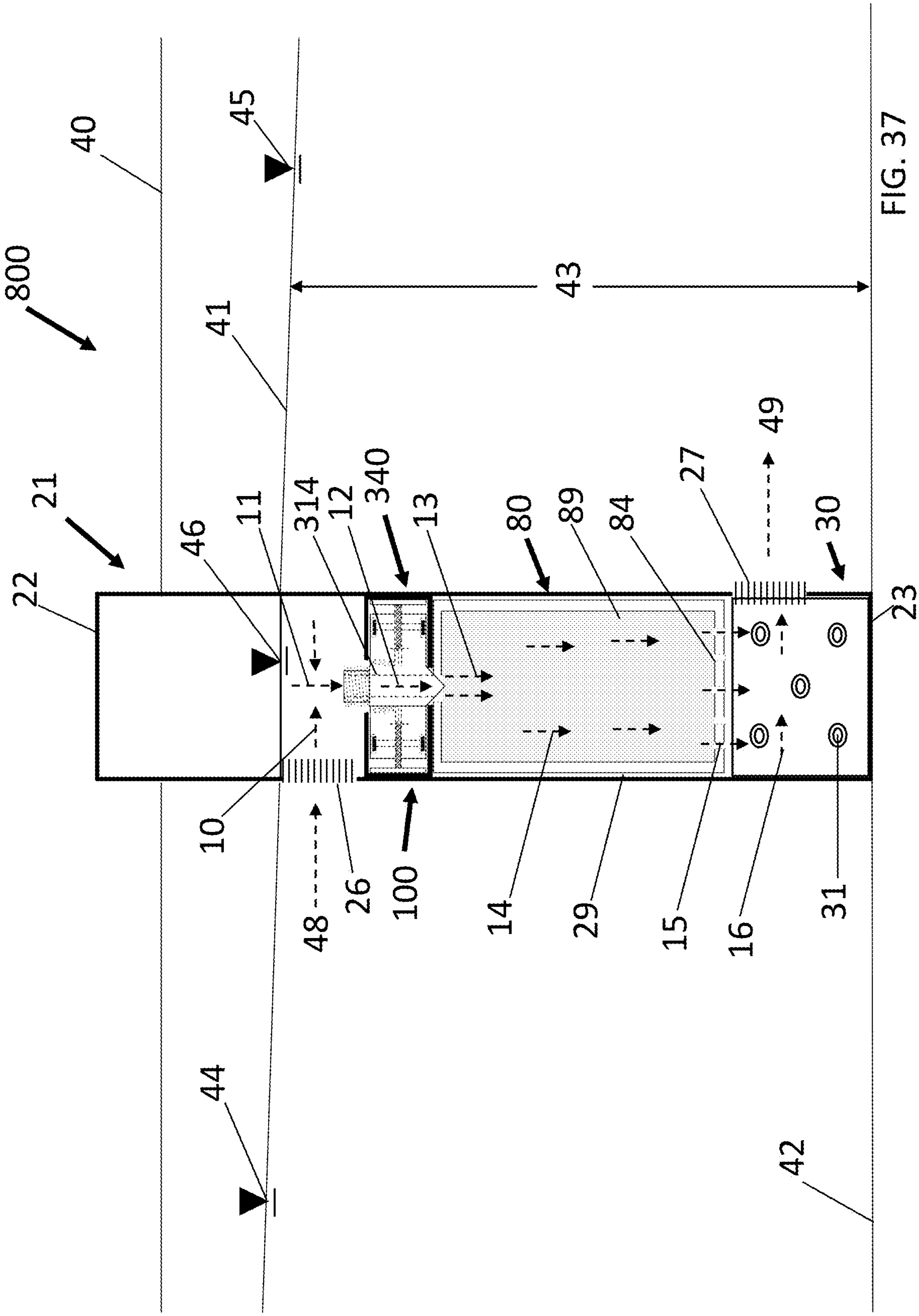
FIG. 37 is a side elevation view of an example application of a single activated mechanical packer system detailing the packer's control of downward fluid flow inside a casing in an example groundwater setting.

FIG. 37 is a side elevation view of an example application 800 of a mechanical packer system 100 in an activated state 340 detailing the control of an example packer system on a fluid in an example application 800. The fluid in application 800 could be groundwater, for example, although other fluids such as oil or gas could be envisioned. A cylindrical casing 21 with a top 22, bottom 23, a higher elevation well screen 26 on one side of a casing 21, and an lower elevation screen 27 on an opposing side of a casing 21 is shown installed below a ground surface 40 where an open bottom 23 is seated into a layer 42 at a lower elevation than a ground surface 40 which could represent a lower-permeability layer 42 beneath an aquifer 43 defined as a zone of saturation between a water table 41 and a lower-permeability layer (or aquitard) 42 wherein water at a higher elevation 44 than at a lower elevation 45 creates a flow regime from left to right in FIG. 37.

In the example application 800 shown in FIG. 37, a casing 21 serves the same purpose as a filter casing or filter channel described in detail in U.S. Pat. No. 9,937,537 B2 and U.S. Pat. No. 10,556,260 B2, in which a sectioned barrier wall with multiple interlocking wall sections are placed in a ground area in a partially or entirely subsurface condition with reference to a ground surface and a filter casing is interlocked along vertical connections with two wall sections, wherein the wall sections and vertical connections among them are essentially water impermeable. Groundwater migrates across the wall via the filter casing, moving vertically within the interior of the filter casing in either upward or downward flow direction according to its installation and site-specific arrangement.

An impervious barrier wall, although not shown in FIG. 37, is detachably secured to both sides of a casing 21 (perpendicular to the illustration) with a purpose of diverting groundwater to flow preferentially toward a casing 21. In the example application 800 shown in FIG. 37, groundwater flows 48 into a higher elevation inlet screen 26 and moves downward through a casing 21 before discharging 49 through a lower elevation outlet screen 27 (due to differences in hydraulic head resulting from the connection of a casing 21 to a barrier wall, not shown).

Specifically, in the example 800 shown in FIG. 37, groundwater laterally enters 48 a casing 21 through a higher elevation inlet screen 26 and flows laterally shown by flow arrows 10 and vertically downward shown by flow arrow 11 into a hollow core Packtivator sub 314 used to activate 340 a large packer assembly 100 near an upper elevation in a casing 21. Groundwater flows vertically downward through the hollow core Packtivator sub 314 as shown by flow arrow 12.

A fluid treatment cartridge 80 and treatment media 89 (previously detailed in FIG. 25A and FIG. 25B) are shown below a large packer assembly 100 in FIG. 37. Groundwater flows downward and directly into a fluid treatment cartridge 80 as shown by parallel flow arrows 13 and continues downward into treatment media 89 as shown by parallel flow arrows 14 for increased residence time and contact with a treatment media 89. Groundwater flows vertically downward exiting a plurality of holes 84 in a bottom of a cartridge 80 shown by parallel flow arrows 15 and laterally within an underlying permeable spacer 30 shown by flow arrows 16 before discharging laterally 49 through a lower elevation outlet screen 27.

Figure 38:
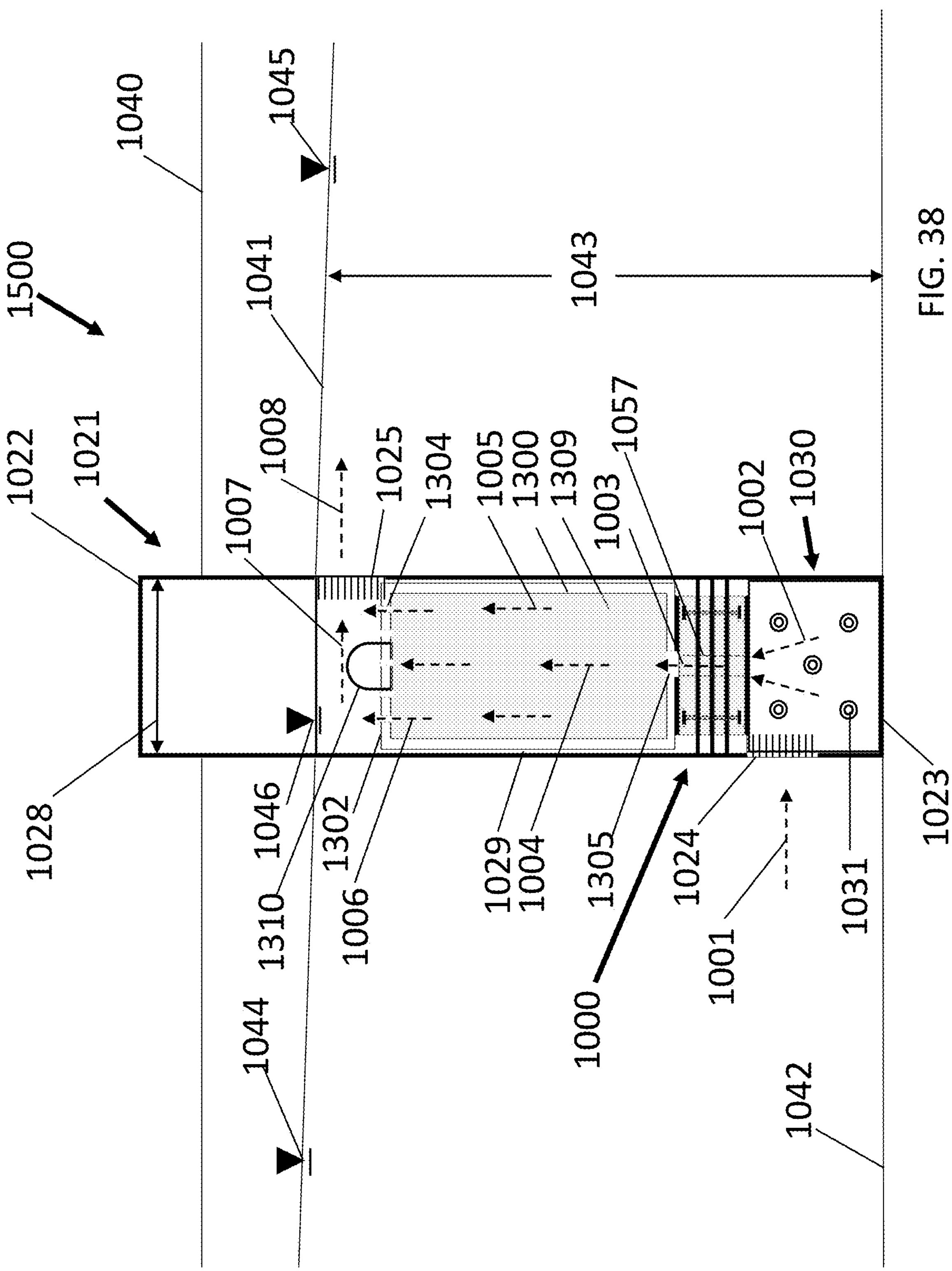
FIG. 38 is a side elevation view of an example subsurface application in which an MSD has been positioned at a lower elevation in a large diameter filter casing and used to control the upward flow of a fluid through a treatment cartridge seated on the MCD preventing the fluid from flowing through the annular space between the casing and cartridge.

FIG. 38 is a side elevation view of a subsurface application 1500 in which a multipurpose casing device (MCD) 1000 has been positioned in a casing 1021 specifically to control fluid flow which in this example represents groundwater in an aquifer. A cylindrical casing 1021 with a top 1022, bottom 1023, a lower elevation well screen 1024 on one side of a casing 1021, and an upper elevation screen 1025 on an opposing side of a casing 1021 is shown installed below a ground surface 1040 where an open bottom 1023 is seated into a layer 1042 at a lower elevation than a ground surface 1040 which could represent a lower-permeability layer 1042 beneath an aquifer 1043 defined as a zone of saturation between a water table 1041 and a lower-permeability layer (or aquitard) 1042 wherein water at a higher elevation 1044 than at a lower elevation 1045 creates a groundwater flow regime from left to right in FIG. 38.

In the example application 1500 shown in FIG. 38, a casing 1021 serves the same purpose as a filter casing or filter channel described in detail in U.S. Pat. No. 9,937,537 B2 and U.S. Pat. No. 10,556,260 B2, in which a sectioned barrier wall with multiple interlocking wall sections are placed in a ground area in a partially or entirely subsurface condition with reference to a ground surface and a filter casing is interlocked along vertical connections with two wall sections, wherein the wall sections and vertical connections among them are essentially water impermeable. Groundwater migrates across the wall via the filter casing, moving vertically within the interior of the filter casing in either an upward or downward flow direction according to its installation and site-specific arrangement.

An impervious barrier wall, although not shown in FIG. 38, is detachably secured to both sides of a casing 1021 (perpendicular to the illustration) with a purpose of diverting groundwater to flow preferentially toward a casing 1021. In the example application 1500 shown in FIG. 38, groundwater, as an example, flows into a lower elevation inlet screen 1024 and moves generally upward through a casing 1021 before discharging through a higher elevation outlet screen 1025 (due to differences in hydraulic head resulting from the connection of a casing 1021 to a barrier wall, not shown). An MCD has been placed in a lower elevation of the casing 1021 to control the flow of flow of groundwater as indicated by dashed arrows 1001 through 1008 referencing different points along a groundwater flow path. Groundwater is generally flowing from points 1001 to 1008 in this example, which are referred to herein as flow arrows intended to illustrate the general direction of fluid flow.

Specifically, in the example 1500 shown in FIG. 38, contaminated groundwater, as an example, laterally enters a casing 1021 shown by flow arrow 1001 through a lower elevation inlet screen 1024 and flows into a permeable spacer 1030 with holes 1031 to the center of an MCD 1000 shown by converging upward flow arrows 1002. Groundwater flows upward in a center hole of the MCD 1000 shown by flow arrow 1003 into a central hole 1305 in the bottom of a fluid treatment cartridge 1300 and then flows upward shown by flow arrows 1004 and 1005 inside the cartridge 1300 where contaminated groundwater contacts treatment media 1309 inside the cartridge 1300. Treated groundwater exits a plurality of holes 1304 in a top 1302 of a cartridge 1300 shown by parallel flow arrows 1006. Groundwater then flows horizontally as shown by flow arrow 1007 before discharging 1008 through a higher elevation outlet screen 1025 on the downgradient side 1045 of the filter casing 1021. The details of devices and methods associated with the MCD 1000 are described in the following figures and specifications.

Figure 39:
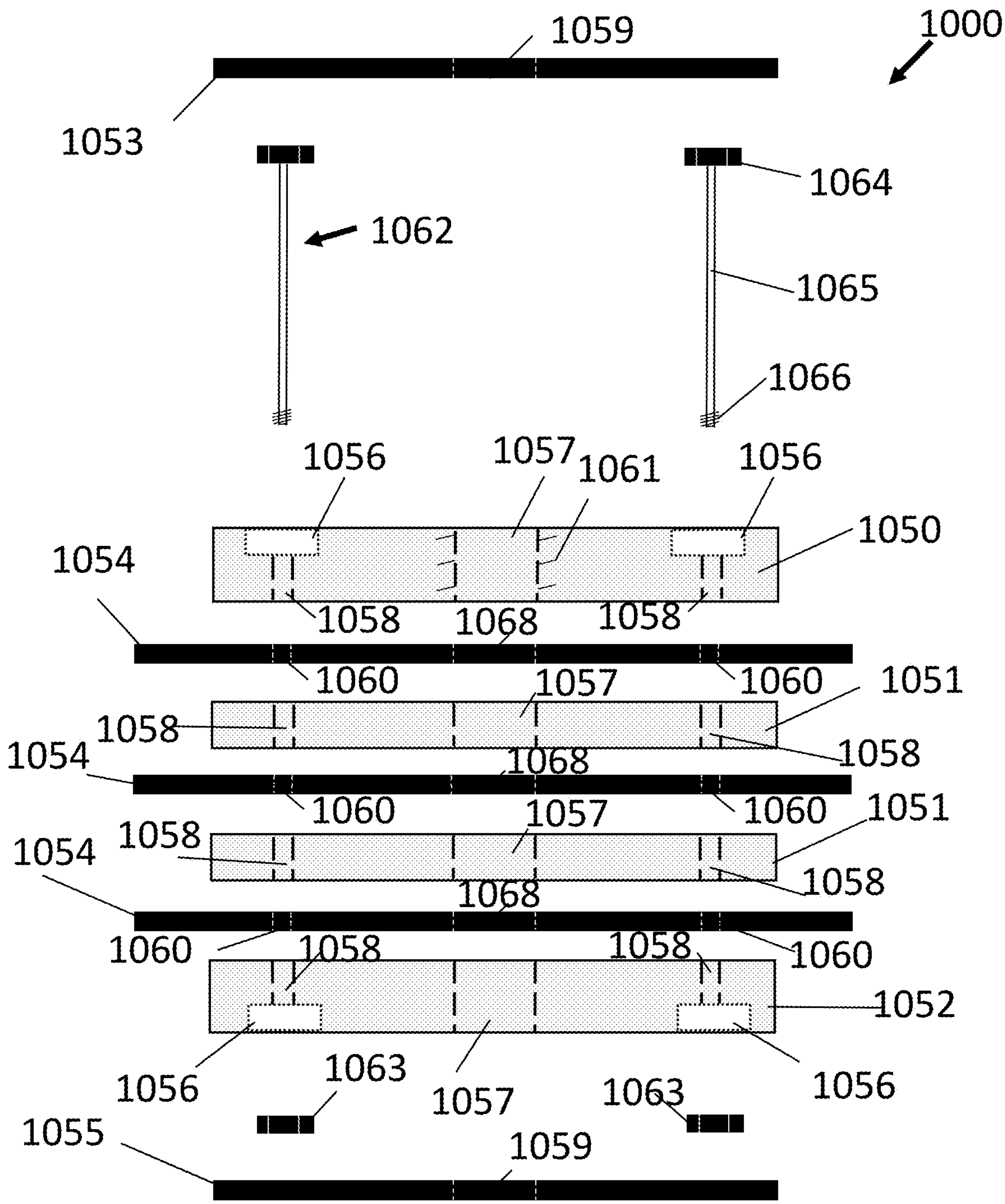
FIG. 39 is a side elevation view through one embodiment of an MCD showing components before assembly.

FIG. 39 is a side elevation view through one embodiment of an MCD showing components before assembly. In this preferred embodiment, an MCD consists of an upper plate 1050, two intervening plates 1051, and a lower plate 1052 wherein the plates are rigid relative to three intervening layers 1054 of a flexible rubber material. A flexible rubber material 1053 is also shown above the upper plate 1050 and below 1055 the lower plate 1052 with the same diameter as the respective plates. The three intervening layers 1054 of a flexible rubber material are shown to extend beyond the edges of the adjoining rigid plates 1050, 1051, and 1052 and have diameters that are slightly larger than the inside diameter of a casing (not shown) in which the MCD assembly is to be tightly placed for sealing purposes.

The upper plate 1050 and lower plate 1052 shown in FIG. 39 have recessed holes 1056 to house bolt heads 1064 and nuts 1063, respectively. Holes 1058 to accommodate bolt 1062 shanks 1065 and threads 1066 extend through the plates 1058 and rubber material 1060. A central hole 1057 in the upper plate 1050 is tapered (i.e., National Pipe Thread or NPT) female threaded 1061. Central holes 1057 in the two intervening plates 1051 are not threaded but have the same diameter as the central holes in the upper 1050 and lower 1052 plates. Central holes 1059 are also shown in the rubber material 1053 above the upper plate 1050 and below 1055 the lower plate 1052.

Figure 40:
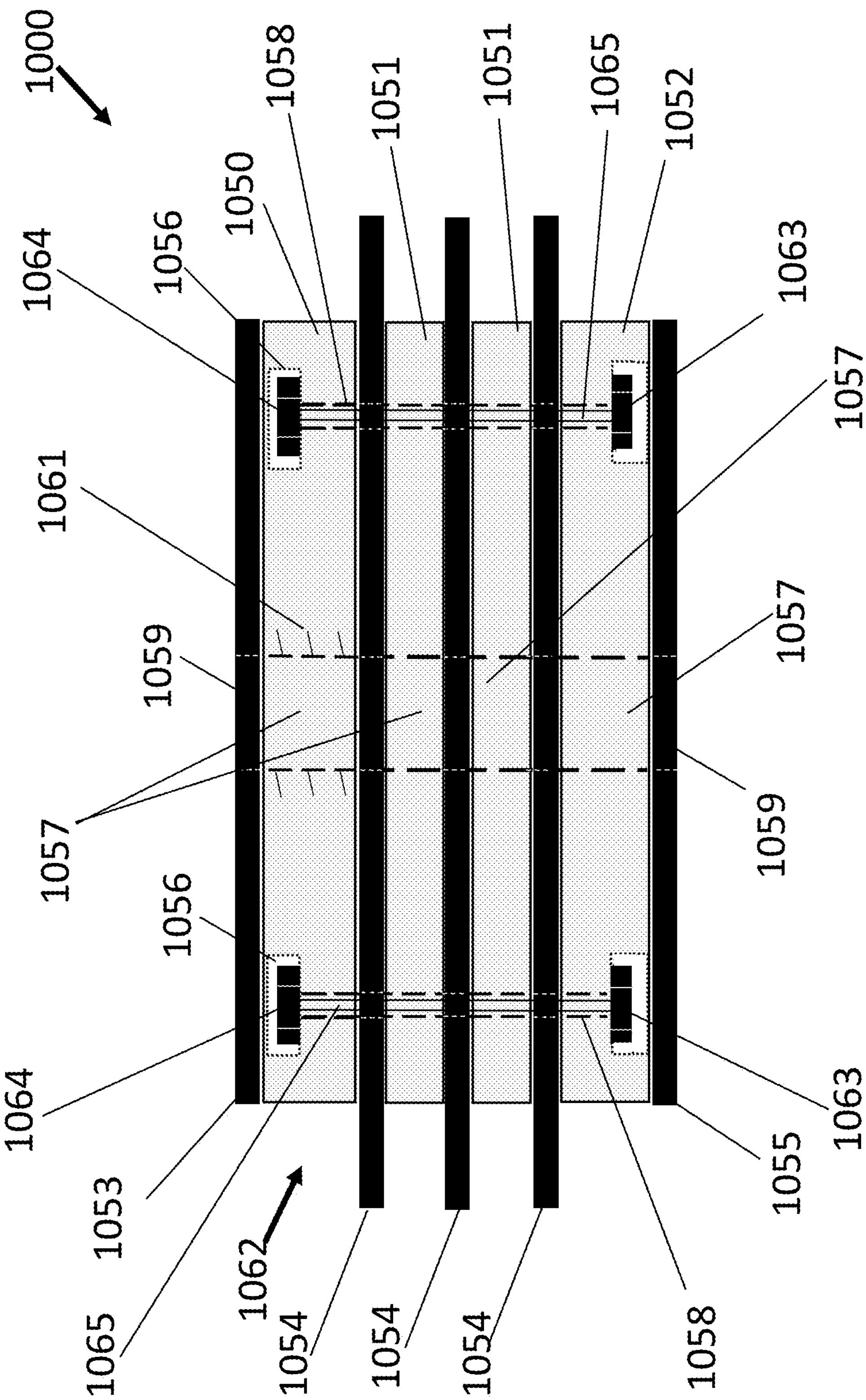
FIG. 40 is a side elevation view through an assembled MCD, in one embodiment.

FIG. 40 is a side elevation view through an assembled MCD 1000, in one embodiment. Bolts 1062 and nuts 1063 detachably secure the upper plate 1050, two intervening plates 1051, and lower plate 1052 and compress the intervening layers 1054 of rubber material. Central holes 1057 are shown through all the rigid plates the upper plate 1050 of which is female threaded 1061. Central holes 1059 are also shown in the rubber material 1053 above the upper plate 1050 and below 1055 the lower plate 1052, and as previously shown in FIG. 39, central holes 1068 are also in the three intervening layers of rubber material 1054.

Figure 41:
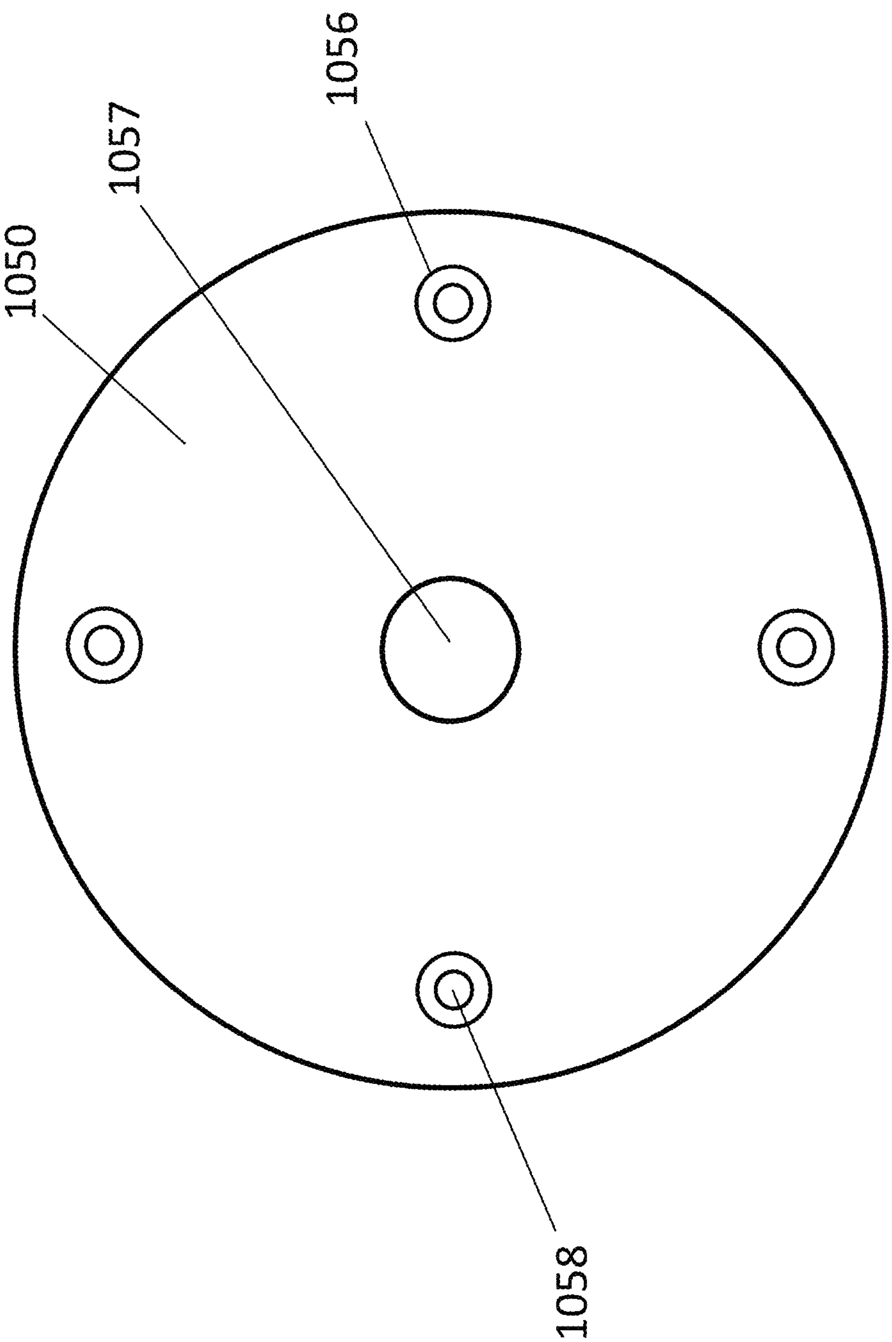
FIG. 41 is an overhead view of a top plate of an MCD before assembly, at the same relative scale shown in FIG. 40.

FIG. 41 is an overhead view of a top plate 1050 of an MCD before assembly, at the same relative scale shown in FIG. 40. A central hole 1057 in the upper plate 1050 is shown (female threading 1061 was previously shown in FIG. 40). Recessed holes 1056 to house bolt heads 1064 (previously shown in FIG. 40) and holes 1058 to accommodate bolts 1062 (previously shown in FIG. 39) are shown in FIG. 41.

Figure 42:
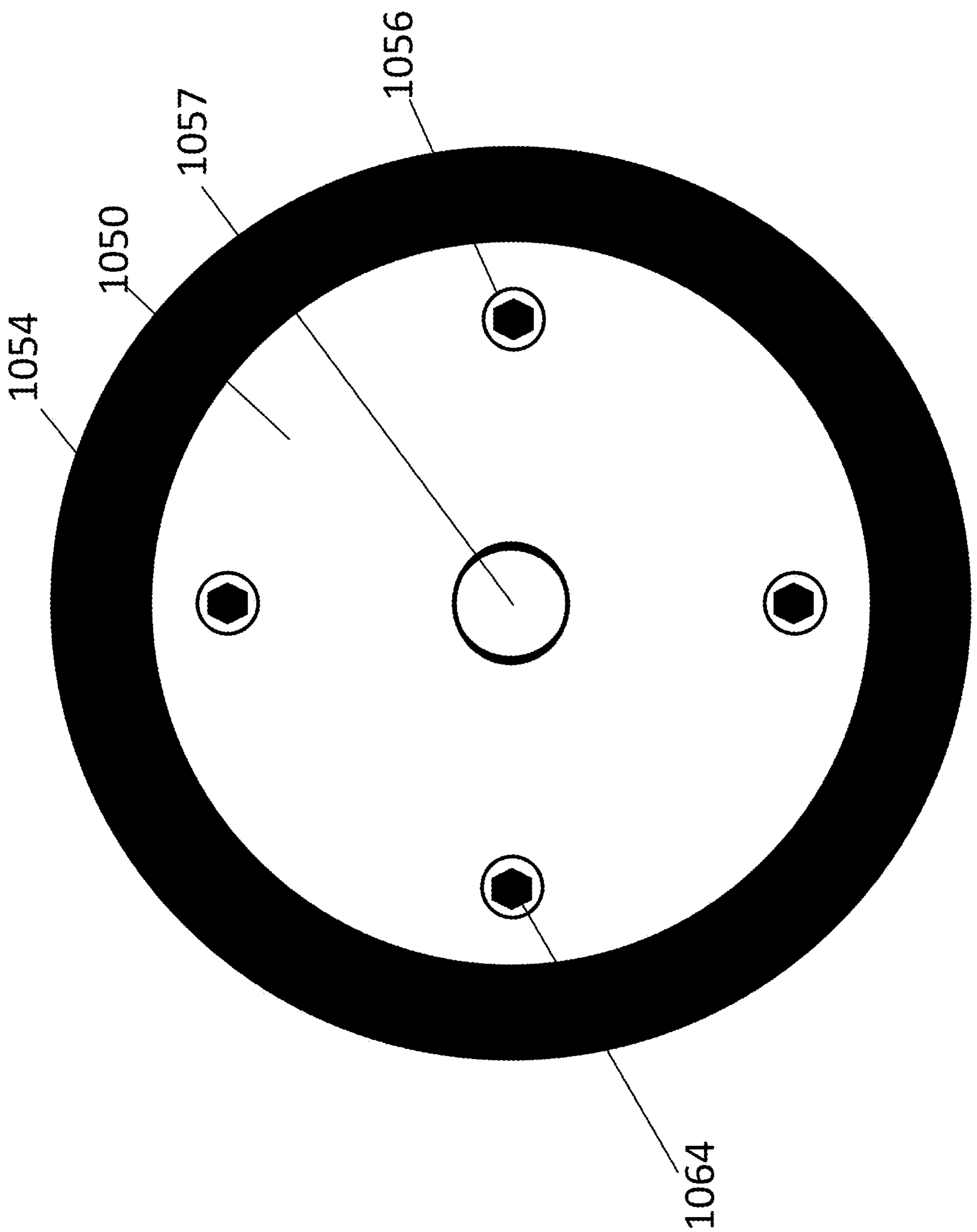
FIG. 42 is an overhead view of a top plate showing an extended rubber material beyond the plate diameter, at the same relative scale shown in FIG. 40 and FIG. 41.

FIG. 42 is an overhead view of a top plate 1050 showing an extended rubber material 1054 beyond the plate diameter, at the same relative scale shown in FIG. 40 and FIG. 41. A central hole 1057 in the upper plate 1050 is shown (female threading 1061 was previously shown in FIG. 39). Recessed holes 1056 to house bolt heads 1064 are shown.

Figures 43A, 43B, 43C, 43D:
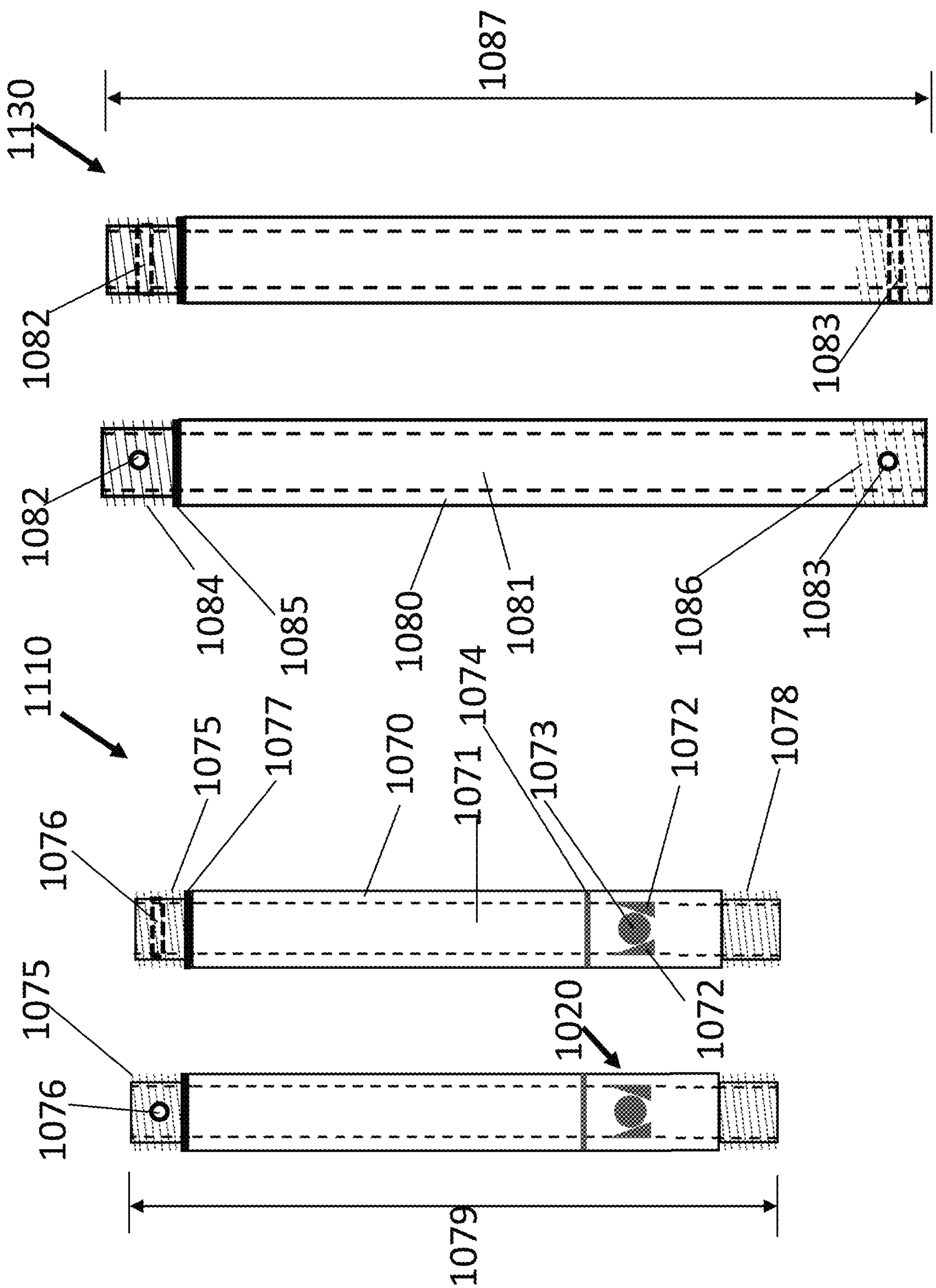
FIG. 43A is a section view through a foot-valve sub and extensions according to one embodiment of the present invention.
FIG. 43B is a section view through a foot-valve sub and extensions according to one embodiment of the present invention.
FIG. 43C is a section view through a foot-valve sub and extensions according to one embodiment of the present invention.
FIG. 43D is a section view through a foot-valve sub and extensions according to one embodiment of the present invention.

FIGS. 43A-43D illustrate a sectional view through foot-valve subs 1110 and extensions 1130, in one embodiment, shown from different perspectives. Foot-valve subs 1110 are relatively short 1079 segments of pipe or casing with foot valves 1120 (FIG. 43A) or equivalent inside to prevent fluid from flowing out of the sub 1110. FIG. 43B shows the casing 1070 which has a hollow core 1071 with male threading 1075 at the top and male threading 1078 at the bottom. An O-ring seal 1077 made of a rubber material or similar flexible material is shown seated beneath the male threads at the top of the foot-valve sub 1110. A hole 1076 is shown male threading 1075 connection in the top of the foot-valve sub 110 in FIG. 43A and in FIG. 43B at a 90-degree rotation for a different perspective. The details of the foot-valve shown in FIG. 43B include a wedge-shaped valve 1072 and a ball 1073 that seats inside the wedge-shaped valve, in one embodiment.

FIG. 43C and FIG. 43D show extensions 1130, in one embodiment, shown from different perspectives. Extensions 1130 may be of variable length but longer 1087 than the length 1079 of a foot-valve sub 1110, as shown in comparison of FIG. 43D and FIG. 43A, respectively. FIG. 43C shows the casing 1080 which has a hollow core 1081 with male threading 1084 at the top and female threading 1086 at the bottom. A hole 1082 is shown in the top of the extension 1130 in FIG. 43C and in FIG. 43D at a 90-degree rotation for a different perspective. An O-ring seal 1085 made of a rubber material or similar flexible material is shown seated beneath the male threads at the top of the extension 1130. A hole 1083 is also shown in the female threading 1086 connection in the bottom of the extension in FIG. 43C and FIG. 43D.

Figures 44A, 44B:
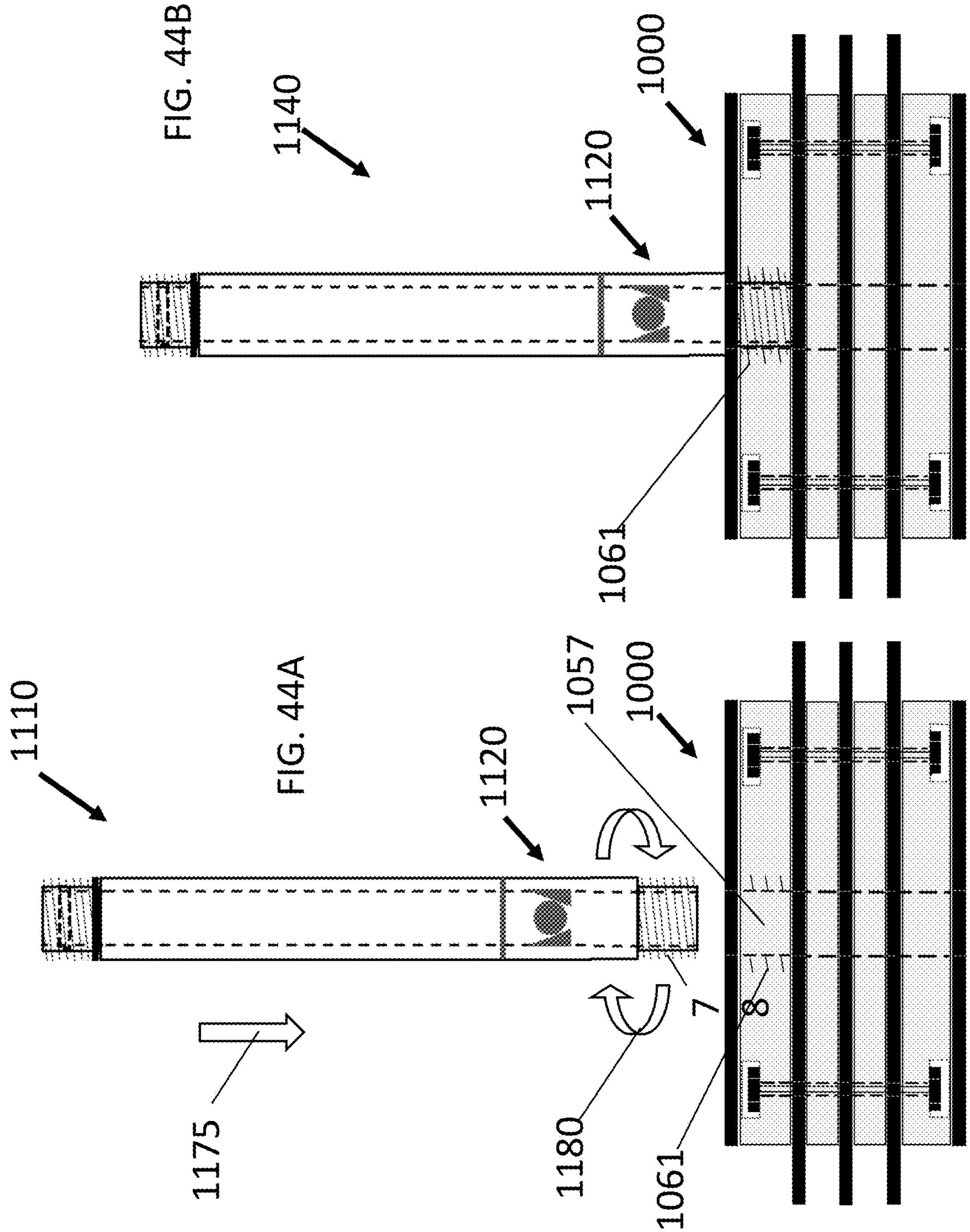
FIG. 44A is a sectional view of a foot-valve sub before integration with an MCD
FIG. 44B is a sectional view of a foot-valve sub after integration with an MCD.

FIGS. 44A-B illustrates a sectional view of foot-valve subs 1110 before (FIG. 44A) and after (FIG. 44B) integration with a fully assembled MCD 1000. In FIG. 44A the foot-valve sub 1110 is shown being lowered 1175 and turned 1180 clockwise to tighten male threads 1078 at the bottom of the foot-valve sub 1110 into the female threads 1061 in the upper hole 1057 of the MCD 1000. The resulting assembly 1140 in FIG. 44B shows the foot-valve sub 1110 removably detached to a fully assembled MCD 1000.

Figures 45A, 45B, 45C, 45D, 45E, 45F:
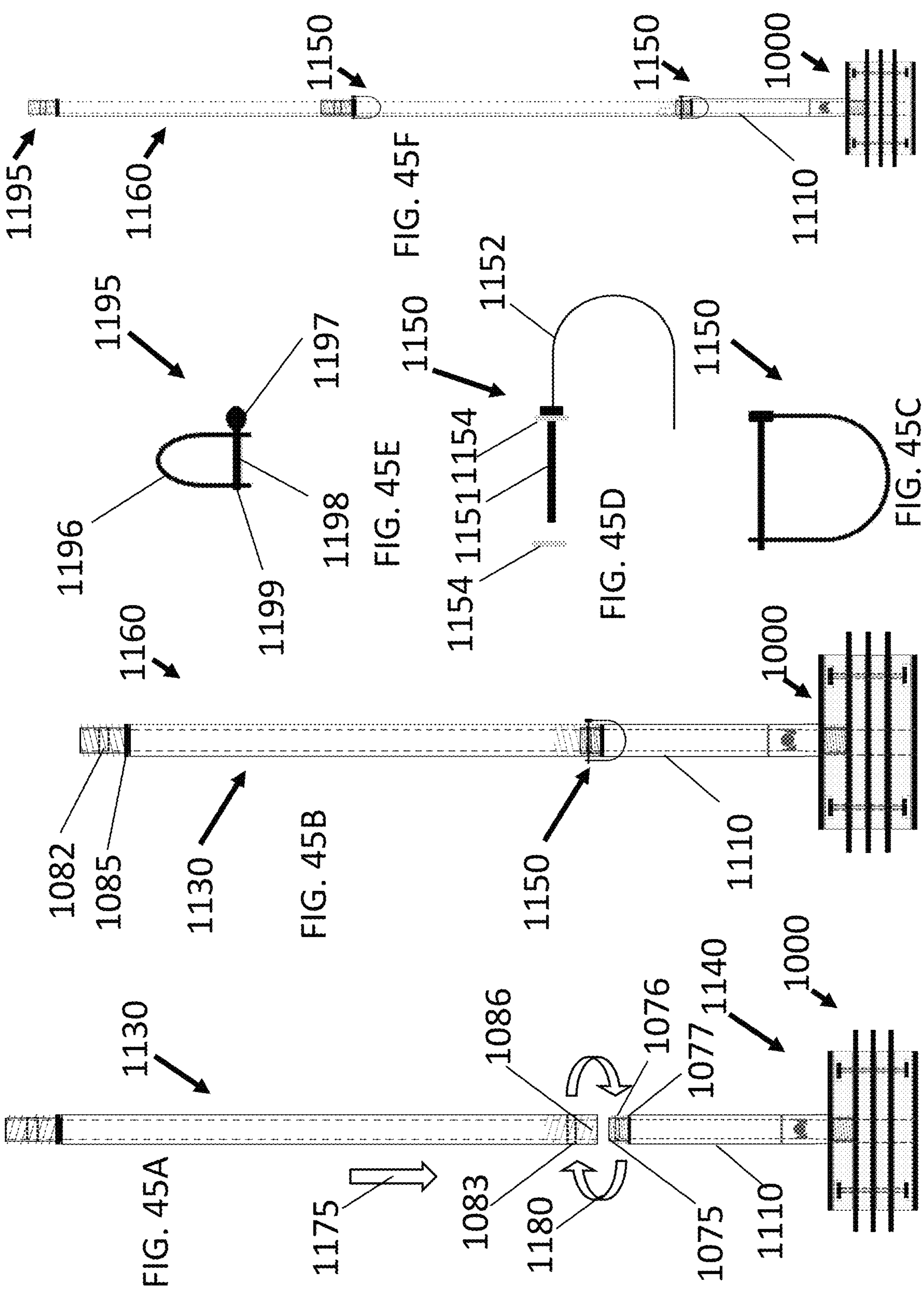
FIG. 45A is a sectional view of an extension added to a foot-valve sub.
FIG. 45B is a sectional view of an extension added to a foot-valve sub.
FIG. 45C is a sectional view of a quick-connect pin inserted to prevent unthreading of the extensions and a shackle for lifting the MCD Assembly.
FIG. 45D is a sectional view of a quick-connect pin inserted to prevent unthreading of the extensions and a shackle for lifting the MCD Assembly.
FIG. 45E is a sectional view of an extension added to a foot-valve sub.
FIG. 45F is a sectional view of an extension added to a foot-valve sub.

FIGS. 45A-45F illustrate sectional view of extensions 1130 added to foot-valve subs 1110 connected to MCDs 1000 with sealable quick-connect pins 1150 inserted in holes in threaded connections to prevent unthreading of the extensions, and a shackle 1195 in an uppermost extension for lifting the entire MCD assembly 1160. In FIG. 45A the extension 1130 is being lowered 1175 and turned in a clockwise direction 1180 to tighten female threads 1086 in the bottom of the extension 1130 with the male threads 1075 in the top of the foot-valve sub 1110 thereby tightening the O-ring seal 1077 (or equivalent seal or bonded washer) at the top of the foot-valve sub 1110 and aligning hole 1083 in the bottom threaded connection of the extension 1130 with hole 1077 in the top threaded connection of the foot-valve sub 1110 for insertion of a quick-connect pin 1150 as shown connected in FIG. 45B. A quick-connect pin 1150 shown in FIG. 45C consists of a pin, locking loop 1152, and rubber seals 1154 such that when operated, as represented by FIG. 45D, and in place, shown in FIGS. 45B and 45F, the connections to extensions will not come unthreaded until locking loop 1152 is unlatched. An entire MCD assembly 1160 is shown in FIG. 45B and FIG. 45C when one or more extensions, respectively, are connected to a foot-valve sub, connections are held by a quick-connect pins, and the MCD is detachably secured to the foot-valve sub.

A shackle 1195 or equivalent can be used as one alternative to lift and lower an entire MCD assembly 1160 as shown in FIG. 45F, particularly if the MCD assembly 1160 is of considerable length. In the example shown in FIG. 45E, the shackle 1195 consists of a looped shackle 1196 and a removable pin 1198 with male threads on one end 1199 and a thumb-screw head 1195 on the other end of the pin 1198. The pin 1198 of the shackle 1195 can be removed entirely and when the looped shackle 1196 is in position over a male threaded connection of an extension 1130, the pin 1198 can be inserted through the unthreaded ear of the shackle (not shown), through the hole 1082 in the male threaded connection of an extension 1130 and tightened in the female threads in the opposing ear of the shackle (not shown).

Figure 46B:
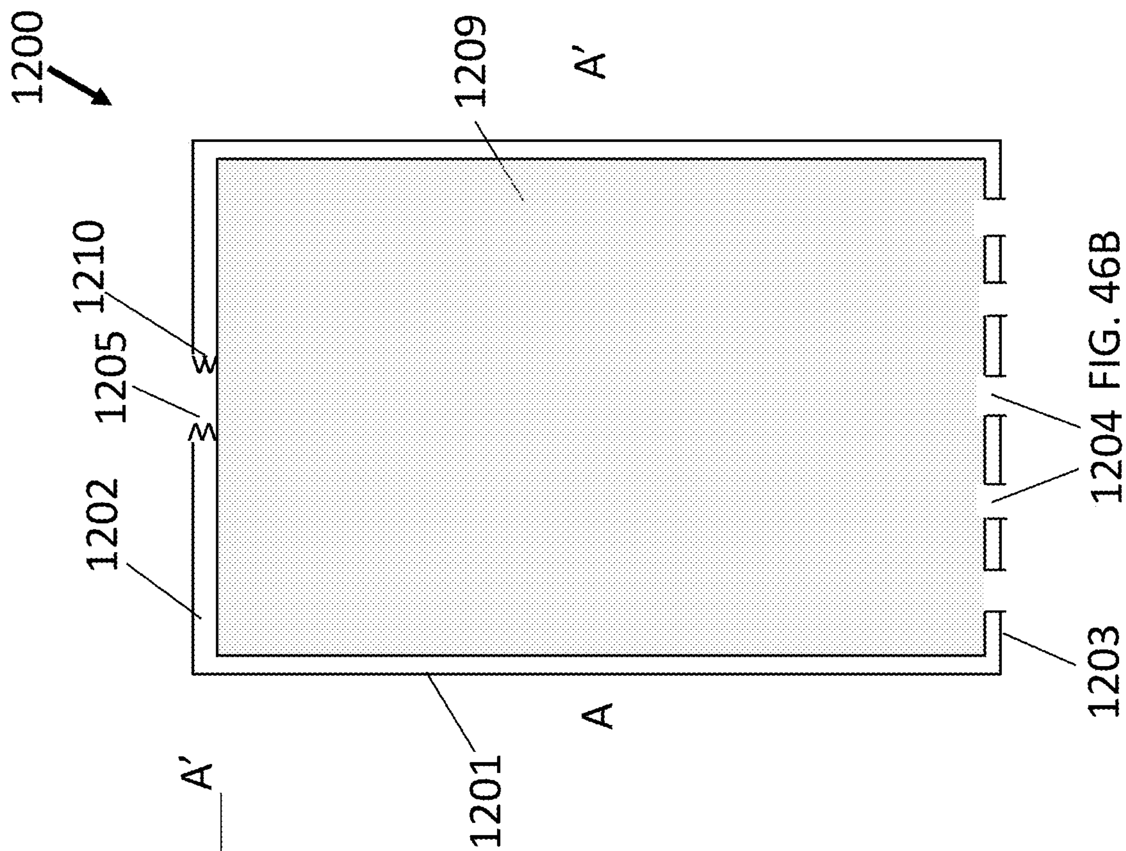
FIG. 46B is a sectional view of one embodiment of a fluid treatment cartridge for integration with an MCD in a filter casing.
Figure 46A:
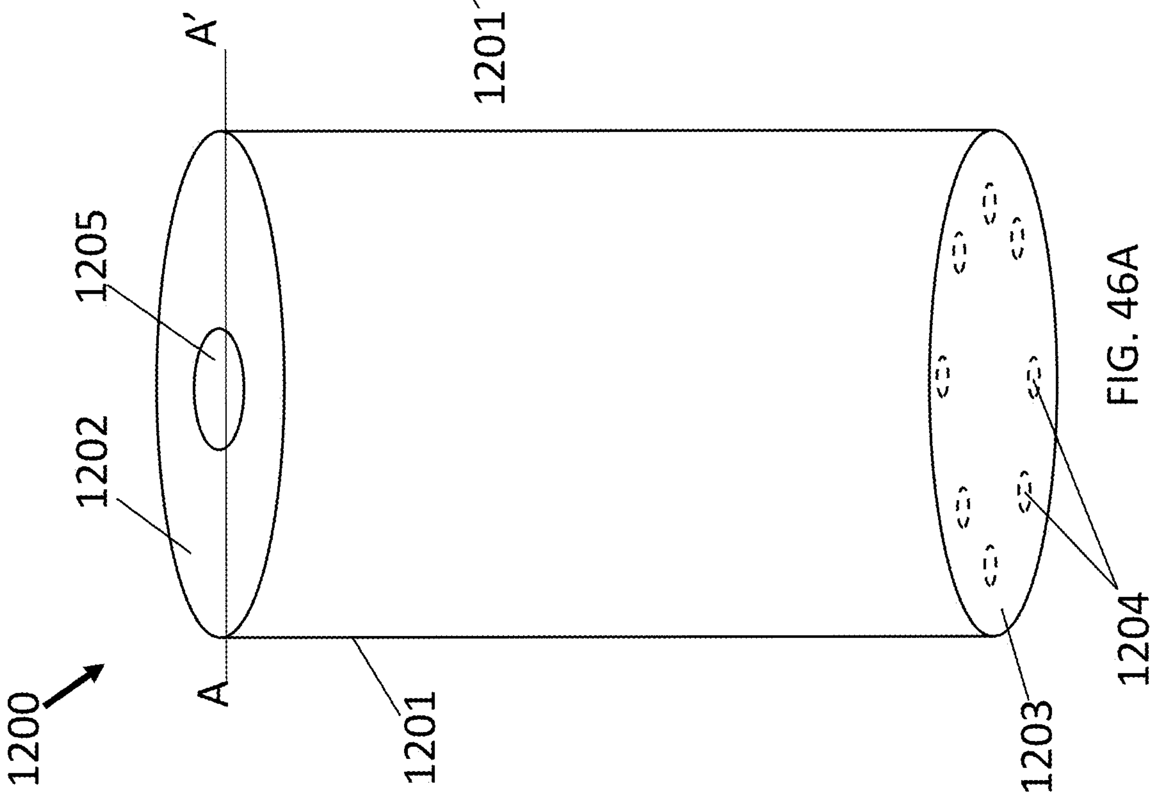
FIG. 46A is an isometric view of one embodiment of a fluid treatment cartridge for integration with an MCD in a filter casing.

FIG. 46A is an isometric view and FIG. 46B is a sectional view of one embodiment of a fluid treatment cartridge 1200 for integration with an MCD in a filter casing (shown in subsequent figures). FIG. 46A is an isometric view of a cylindrically shaped fluid treatment cartridge 1200 for use with an MCD in a filter casing which in one embodiment consists of sidewalls 1201, a top 1202, and a bottom 1203 that is perforated with a plurality of holes 1204. A hole 1205 is shown in a top 1182. A section line A-A' is labeled in FIG. 46A and the corresponding cross-sectional view along the center of cylindrically shaped fluid treatment cartridge 1200 is shown in FIG. 46B.

A treatment media 1209 is shown inside a cartridge 1200 in FIG. 46B (the media is not specified within the present disclosure). External sidewalls 1201, a top 1202, and a bottom 1203 with a plurality of holes 1204 are shown. Female threads 1210 are shown in the hole 1205 in the top 1202 of the cartridge 1200 in FIG. 46B.

Figure 47A:
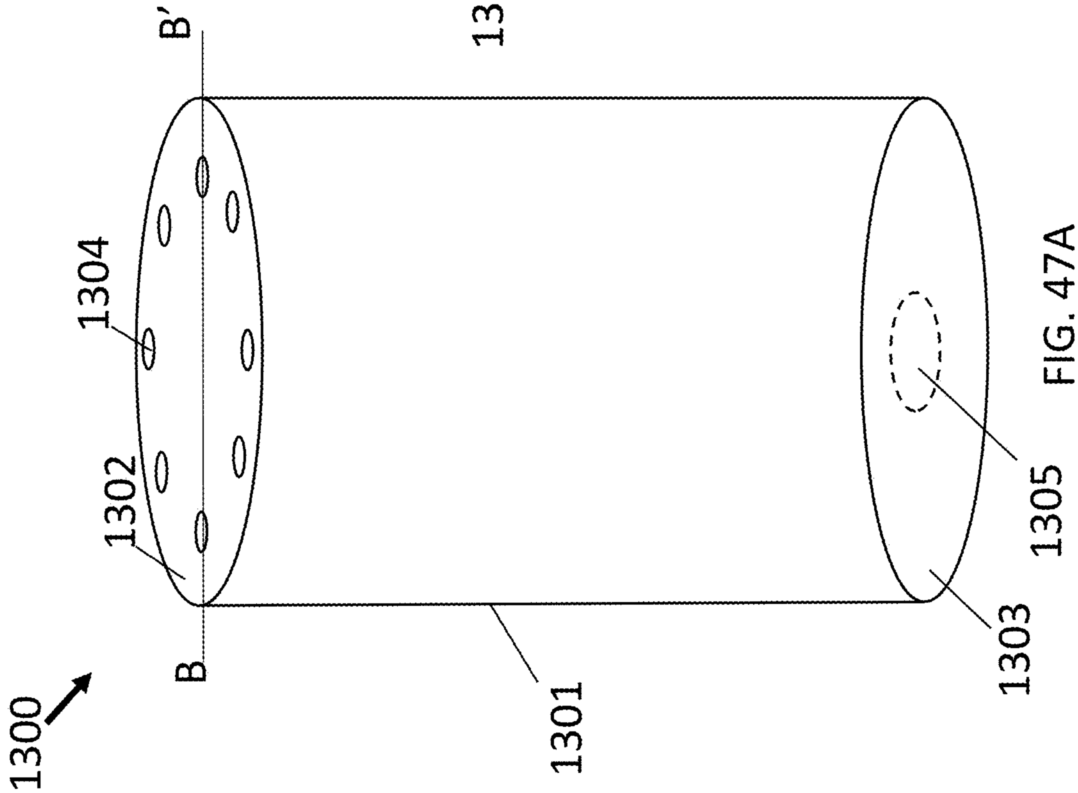
FIG. 47A is an isometric view of a second embodiment of a fluid treatment cartridge for integration with an MCD in a filter casing.
Figure 47B:
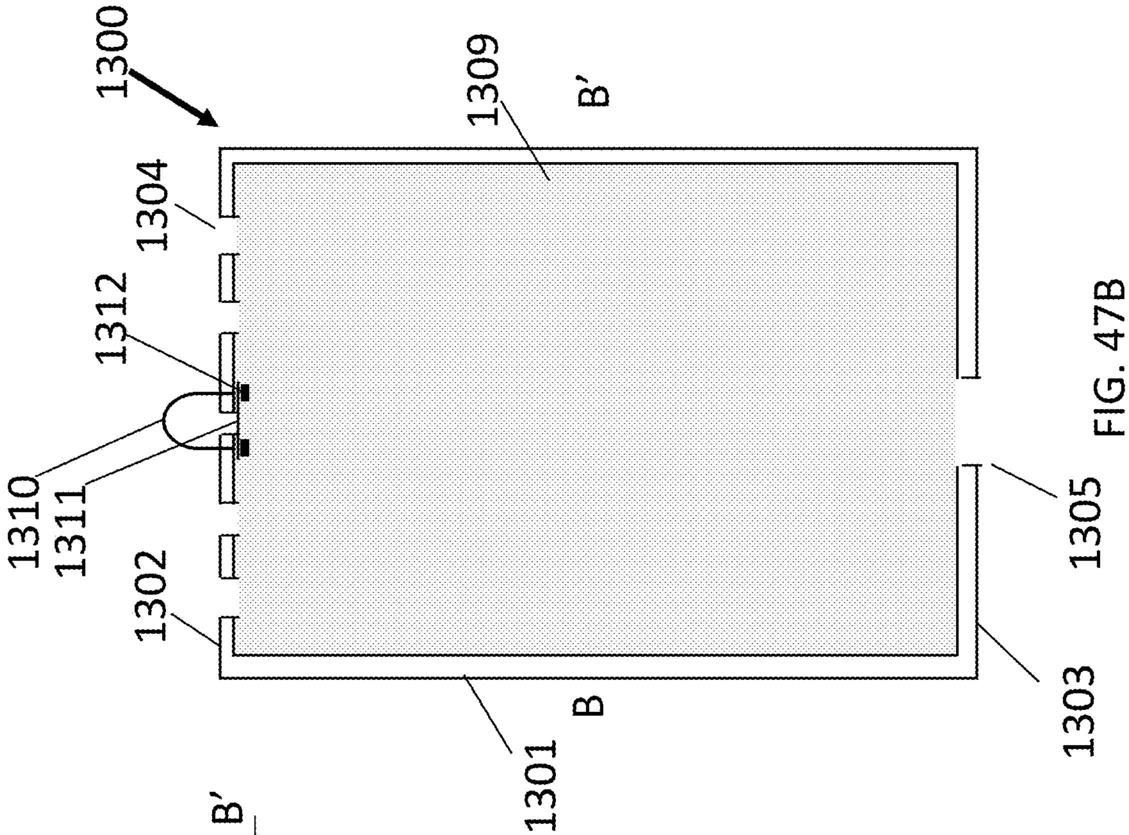
FIG. 47B is a sectional view of a second embodiment of a fluid treatment cartridge for integration with an MCD in a filter casing.

FIG. 47A is an isometric view and FIG. 47B is a sectional view of a second embodiment of a fluid treatment cartridge 1300 for integration with an MCD in a filter casing (shown in subsequent figures). FIG. 47A is an isometric view of a cylindrically shaped fluid treatment cartridge 1300 for use with an MCD in a filter casing which in one embodiment consists of sidewalls 1301, a top 1302 that is perforated with a plurality of holes 1304, and a bottom 1303. A hole 1305 is shown in a bottom 1303. A section line B-B' is labeled in FIG. 47A and the corresponding cross-sectional view along the center of cylindrically shaped fluid treatment cartridge 1300 is shown in FIG. 47B.

A treatment media 1309 is shown inside a cartridge 1300 in FIG. 47B (the media is not specified within the present disclosure). External sidewalls 1301, a top 1302 with a plurality of holes 1304, and a bottom 1303 are shown.

Figures 48A, 48B, 48C:
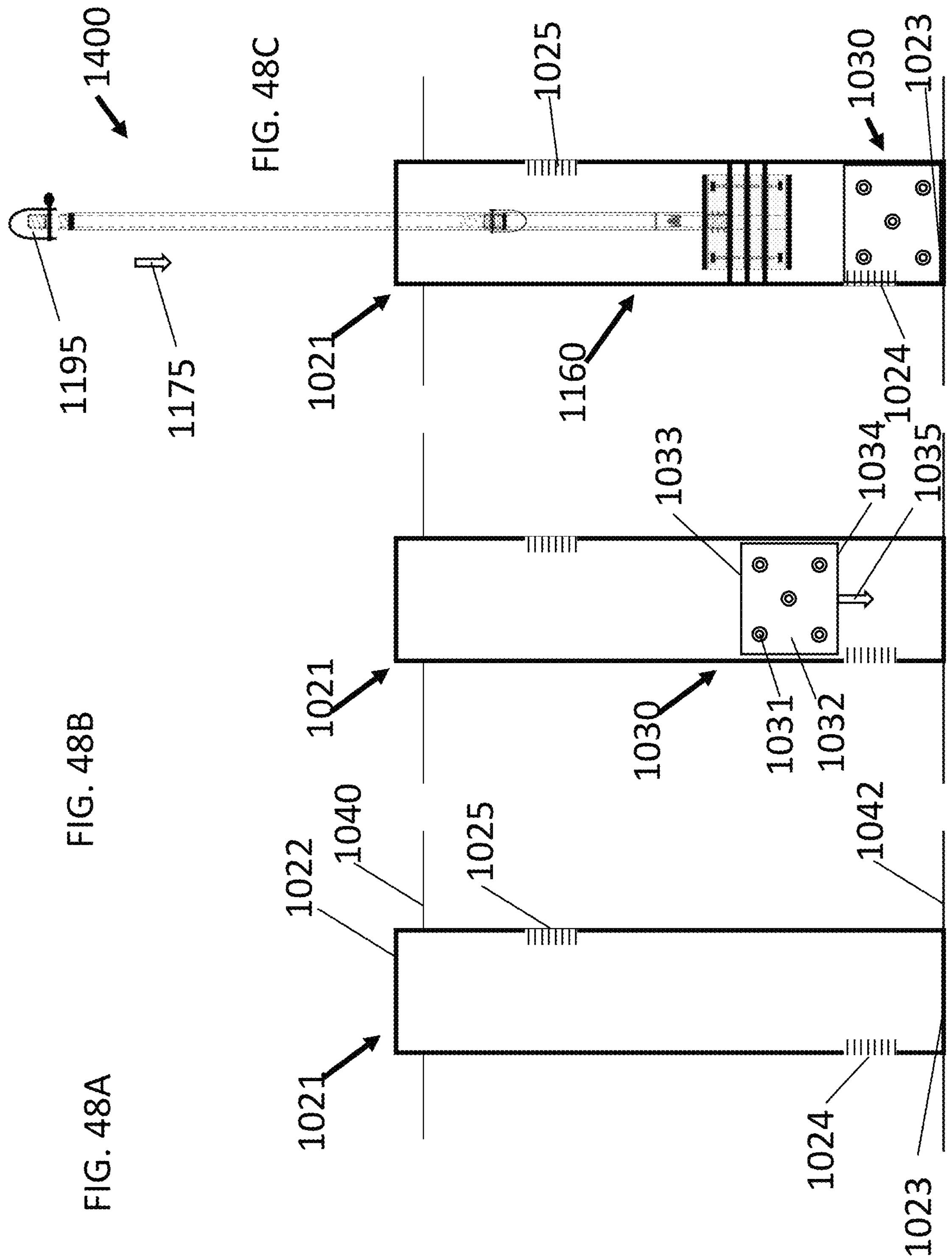
FIGS. 48A through 48C are sectional views of an application showing three example sequential steps that could be followed for installation of an MCD in a filter casing.

FIGS. 48A-C are sectional views of an application 1400 showing three example sequential steps that could be followed for installation of an MCD in a filter casing 1021. FIG. 48A shows a cylindrical casing 1021 with a top 1022, bottom 1023, a lower elevation well screen 1024 on one side of a casing 1021, and an upper elevation screen 1025 on an opposing side of a casing 1021. A casing 1021 is installed below a ground surface 1040 where an open bottom 1023 is seated into a layer 1042 at a lower elevation than a ground surface 1040. In other applications (not shown), a casing bottom may be closed or have a drive shoe.

FIG. 48B shows a removable permeable spacer 1030 being lowered into a casing 1021 previously described in FIG. 48A as shown by a downward arrow 1035. In one embodiment a spacer has perforations 1031 in cylindrical walls 1032. Perforations (not shown) are also in a top 1033 and a bottom 1034 in this embodiment of a removable permeable spacer 1030. In other applications (not shown), a spacer may be as simple as a permeable aggregate added to the bottom of a casing.

FIG. 48C shows a removable permeable spacer 1030 in position at a desired elevation in the bottom 1023 of a casing 1021 aligning with a lower elevation well screen 1024. An MCD assembly 1160 is being lowered into a casing 1021 as shown by a downward arrow 1175 by a shackle 1195.

Figures 49A, 49B, 49C:
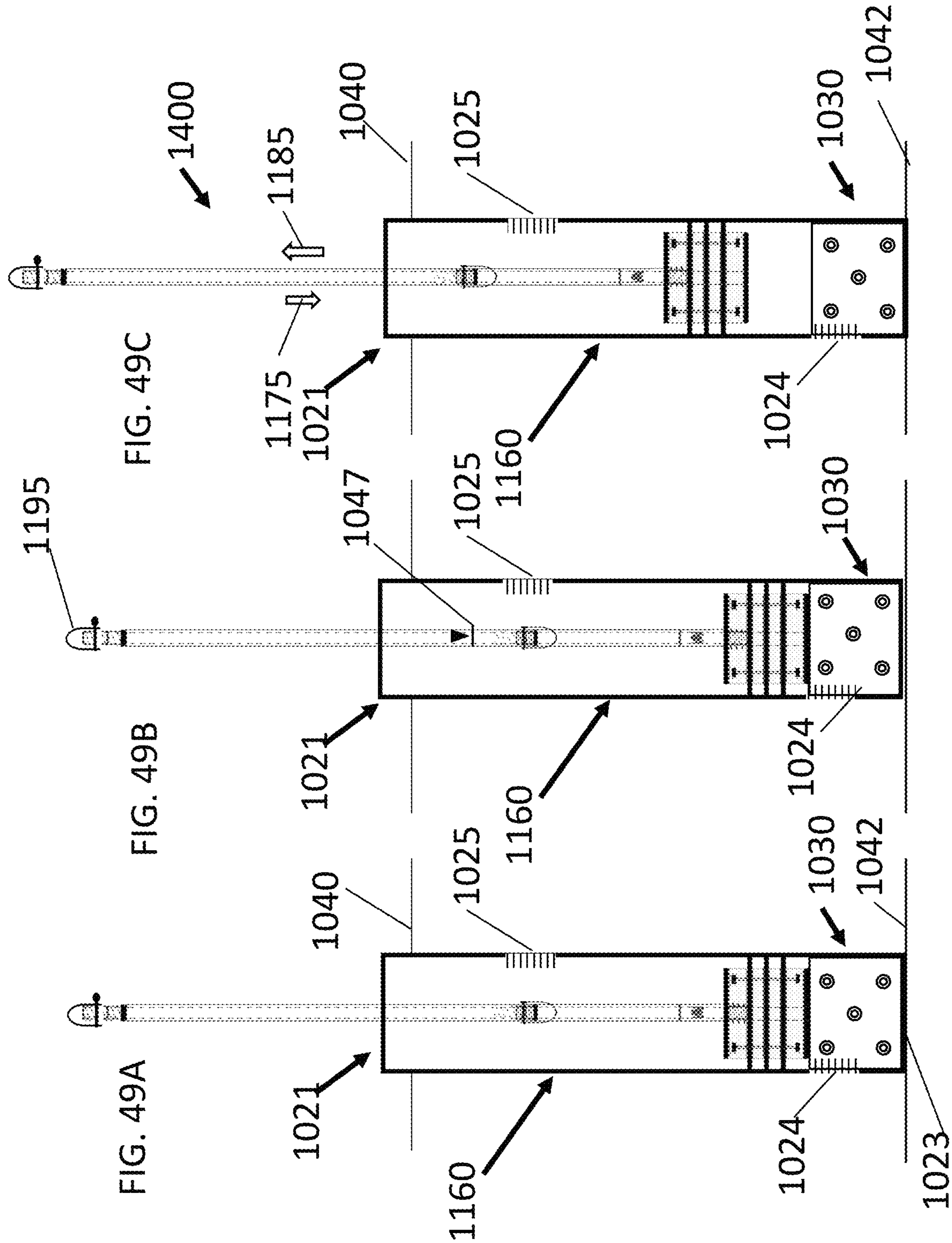
FIGS. 49A through 49C are sectional views of an application showing three additional example sequential steps that could be followed for installation and operation of an MCD in a filter casing.

FIGS. 49A-49C are sectional views of an application showing three additional example sequential steps from FIG. 48 that could be followed for installation and operation of an MCD assembly 1060 in a filter casing 1021. FIG. 49A shows an MCD assembly 1160 seated on the top of a removable permeable spacer 1030. FIG. 49B represents a hydraulic test where a groundwater level 1047 is being measured inside an extension of a MCD assembly 1060. FIG. 49 represents development of the filter casing 1021 where the MCD assembly 1160 is being raised 1185 and lowered 1175 in the casing to surge fluids and other materials from screens 1024 or screens 1025.

Figures 50A, 50B:
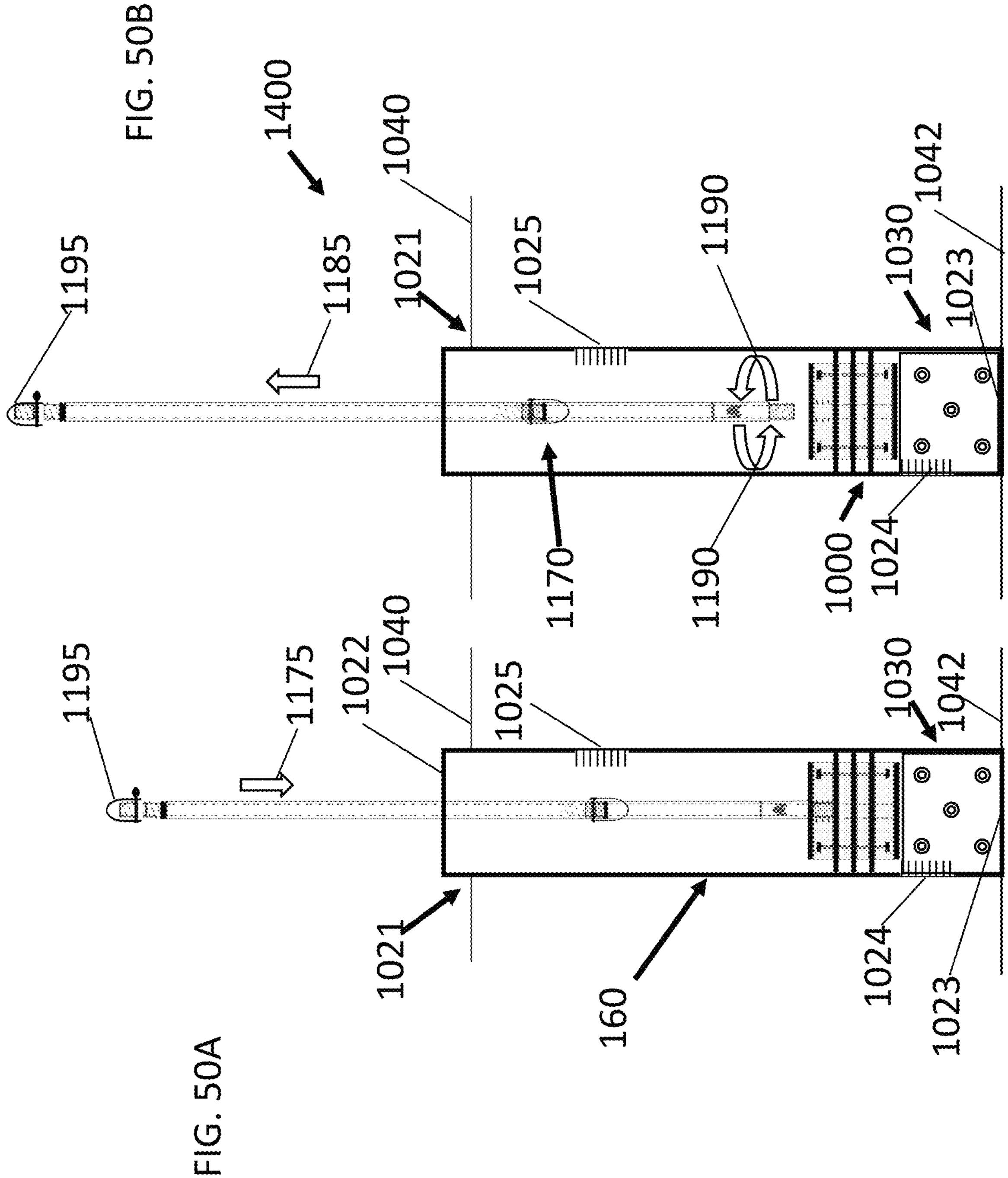
FIGS. 50A and 50B are sectional views of an application showing two additional example sequential steps that could be followed for installation of an MCD in a filter casing.

FIGS. 50A-50B are a sectional view of an application showing two additional example sequential steps from FIG. 49 that could be followed for installation of an MCD assembly 1160 in a filter casing 1021. FIG. 50A shows repositioning of the MCD assembly 1160 on the removable permeable spacer 1030 following development of the casing 1021 from FIG. 49C. FIG. 50B shows removal of an MCD stem assembly 1170 by counterclockwise rotation 1190 of the MCD stem assembly 1170 detachably removing the MCD stem assembly 1170 from the MCD 1000 which remains seated on top of the removable permeable spacer 1030.

Figure 51:
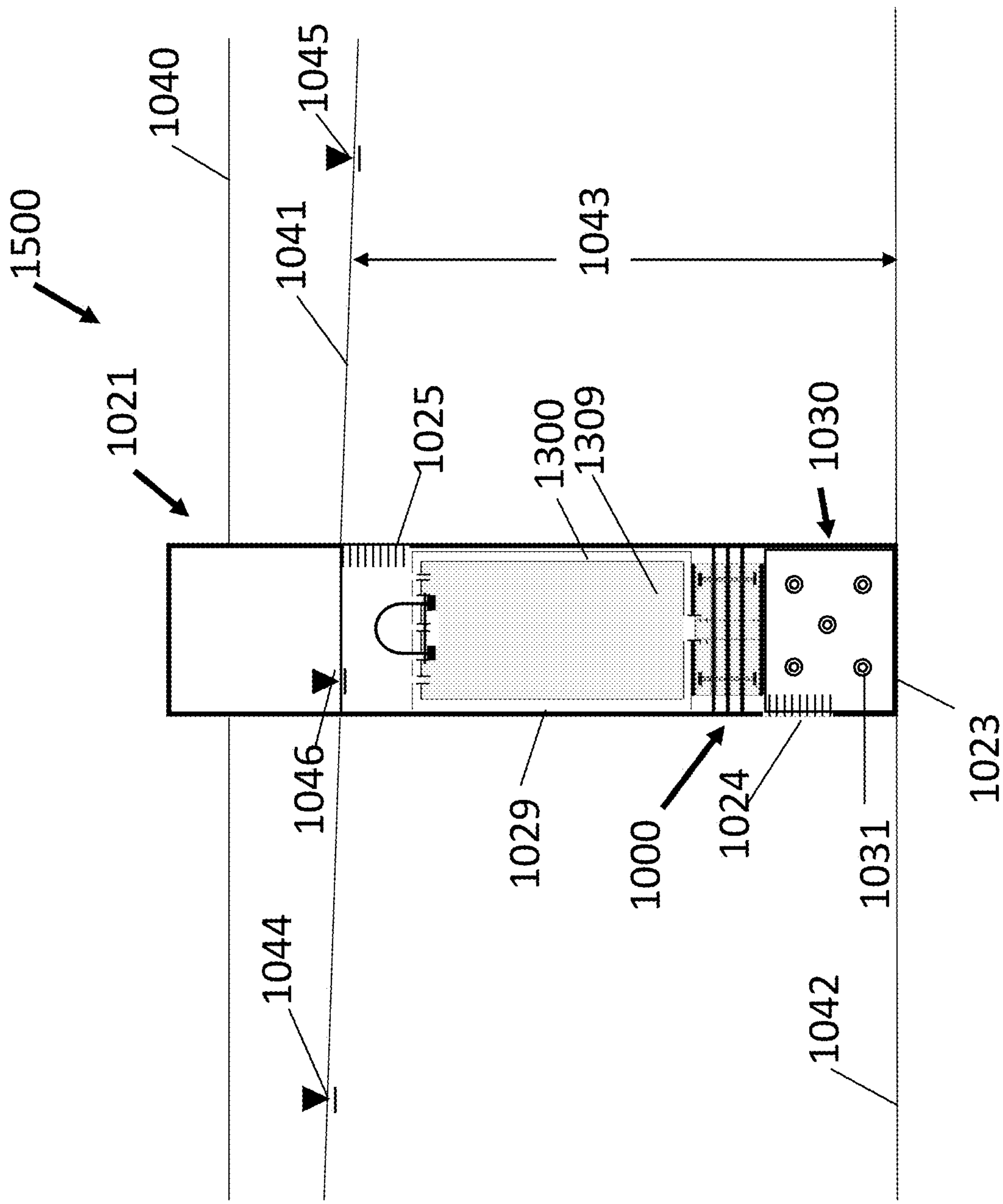
FIG. 51 is a sectional view of an application in an example hydrogeological setting building upon the prior sequential steps shown in FIG. 48A through FIG. 50B, where a fluid treatment cartridge is added to a filter casing and seated on top of a previously installed MCD.

FIG. 51 is a sectional view of an application 1500 in an example hydrogeological setting building upon the prior sequential steps shown in FIG. 48 through FIG. 50, where a fluid treatment cartridge 1300 with a permeable treatment media 1309 (not specified is added to a filter casing 1021 and seated on top of a previously installed MCD 1000 seated on a removable permeable spacer 1030. A cylindrical casing 1021 with a top 1022, bottom 1023, a lower elevation well screen 1024 on one side of a casing 1021, and an upper elevation screen 1025 on an opposing side of a casing 1021 is shown installed below a ground surface 1040 where an open bottom 1023 is seated into a layer 1042 at a lower elevation than a ground surface 1040 which could represent a lower-permeability layer 1042 beneath an aquifer 1043 defined as a zone of saturation between a water table 1041 and a lower-permeability layer (or aquitard) 1042 wherein water at a higher elevation 1044 than at a lower elevation 1045 creates a groundwater flow regime from left to right in FIG. 51.

In the example application 1500 shown in FIG. 51, a casing 1021 serves the same purpose as a filter casing or filter channel described in detail in U.S. Pat. No. 9,937,537 B2 and U.S. Pat. No. 10,556,260 B2, in which a sectioned barrier wall with multiple interlocking wall sections are placed in a ground area in a partially or entirely subsurface condition with reference to a ground surface and a filter casing is interlocked along vertical connections with two wall sections, wherein the wall sections and vertical connections among them are essentially water impermeable. Groundwater migrates across the wall via the filter casing, moving vertically within the interior of the filter casing in either an upward or downward flow direction according to its installation and site-specific arrangement.

An impervious barrier wall, although not shown in FIG. 51, is detachably secured to both sides of a casing 1021 (perpendicular to the illustration) with a purpose of diverting groundwater to flow preferentially toward a casing 1021. In the example application 1500 shown in FIG. 51, groundwater, as an example, flows into a lower elevation inlet screen 1024 and moves generally upward through a casing 1021 before discharging through a higher elevation outlet screen 1025 (due to differences in hydraulic head resulting from the connection of a casing 1021 to a barrier wall, not shown). An MCD has been placed in a lower elevation of the casing 1021 to control the flow of flow of groundwater as indicated by dashed arrows shown in subsequent figures referencing different points along a groundwater flow path.

Figure 52:
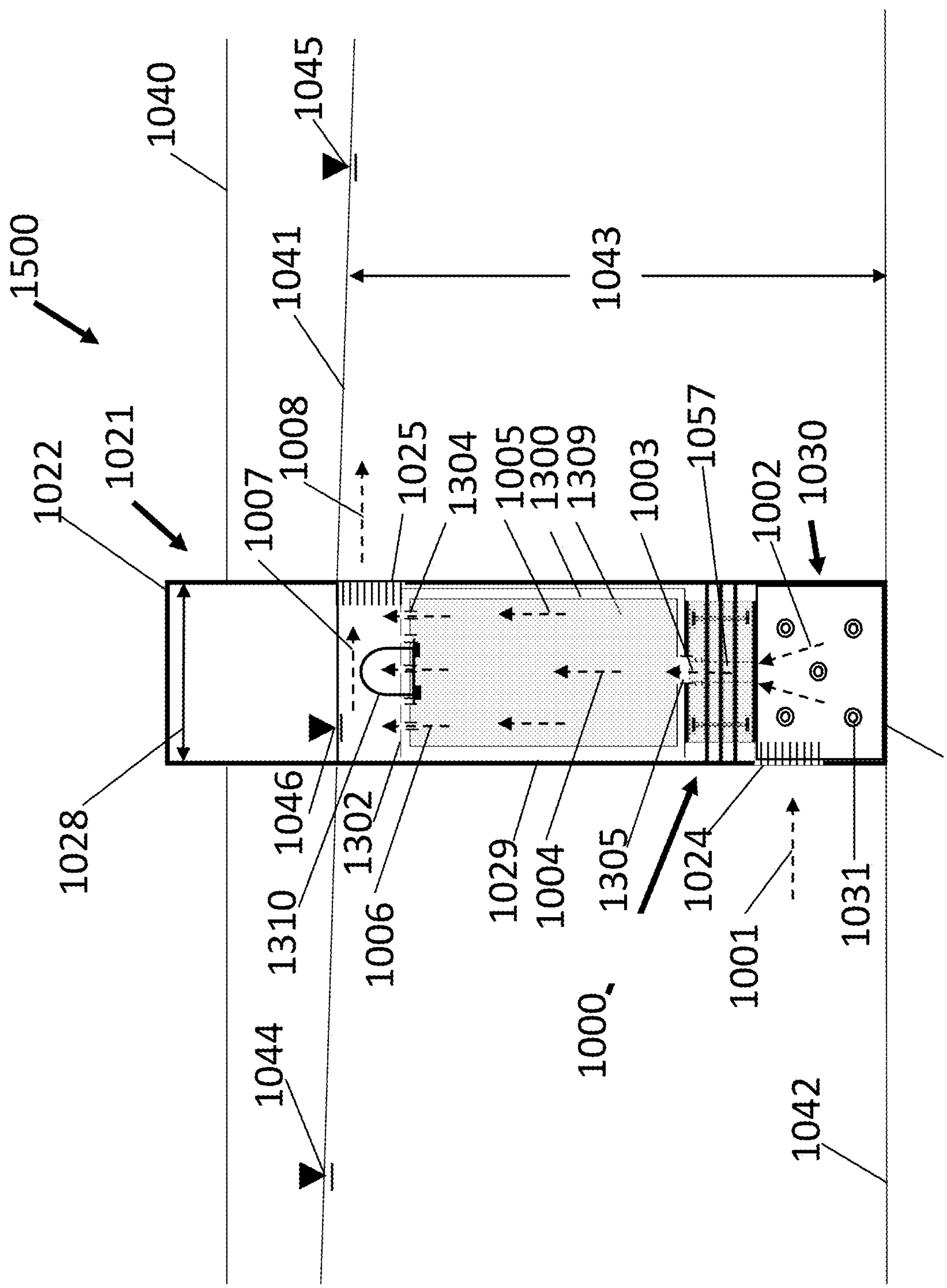
FIG. 52 is a side elevation view of an example subsurface application in which an MSD has been positioned at a lower elevation in a large diameter filter casing and used to control the upward flow of a fluid through a treatment cartridge seated on the MCD preventing the fluid from flowing through the annular space between the casing and cartridge as shown by fluid flow arrows.

FIG. 52 is a side elevation view of an example subsurface application 1500 which is a continuation of FIG. 51 and in which an MSD 1000 has been seated on a removable permeable spacer 1030 at a lower elevation in a large diameter 1028 filter casing 1021 and used to control the upward flow of a fluid through a treatment cartridge seated on the MCD preventing the fluid from flowing through the annular space between the casing and cartridge as indicated by dashed arrows referencing different points along a groundwater flow path (dashed arrows numbered 1001 through 1008).

Specifically, in the example 1500 shown in FIG. 52, contaminated groundwater, as an example, laterally enters a casing 1021 shown by flow arrow 1001 through a lower elevation inlet screen 1024 and flows into a permeable spacer 1030 with holes 1031 to the center of an MCD 1000 shown by converging upward flow arrows 1002. Groundwater flows upward in a center hole 1057 of the MCD 1000 shown by flow arrow 1003 into a central hole 1305 in the bottom of a fluid treatment cartridge 1300 and then flows upward shown by flow arrows 1004 and 1005 inside the cartridge 1300 where contaminated groundwater contacts unspecified treatment media 1309 inside the cartridge 1300. Treated groundwater exits a plurality of holes 1304 in a top 1302 of a cartridge 1300 shown by parallel flow arrows 1006. Groundwater then flows horizontally as shown by flow arrow 1007 before discharging 1008 through a higher elevation outlet screen 1025 on the downgradient side 1045 of the filter casing 1021.

Figure 53:
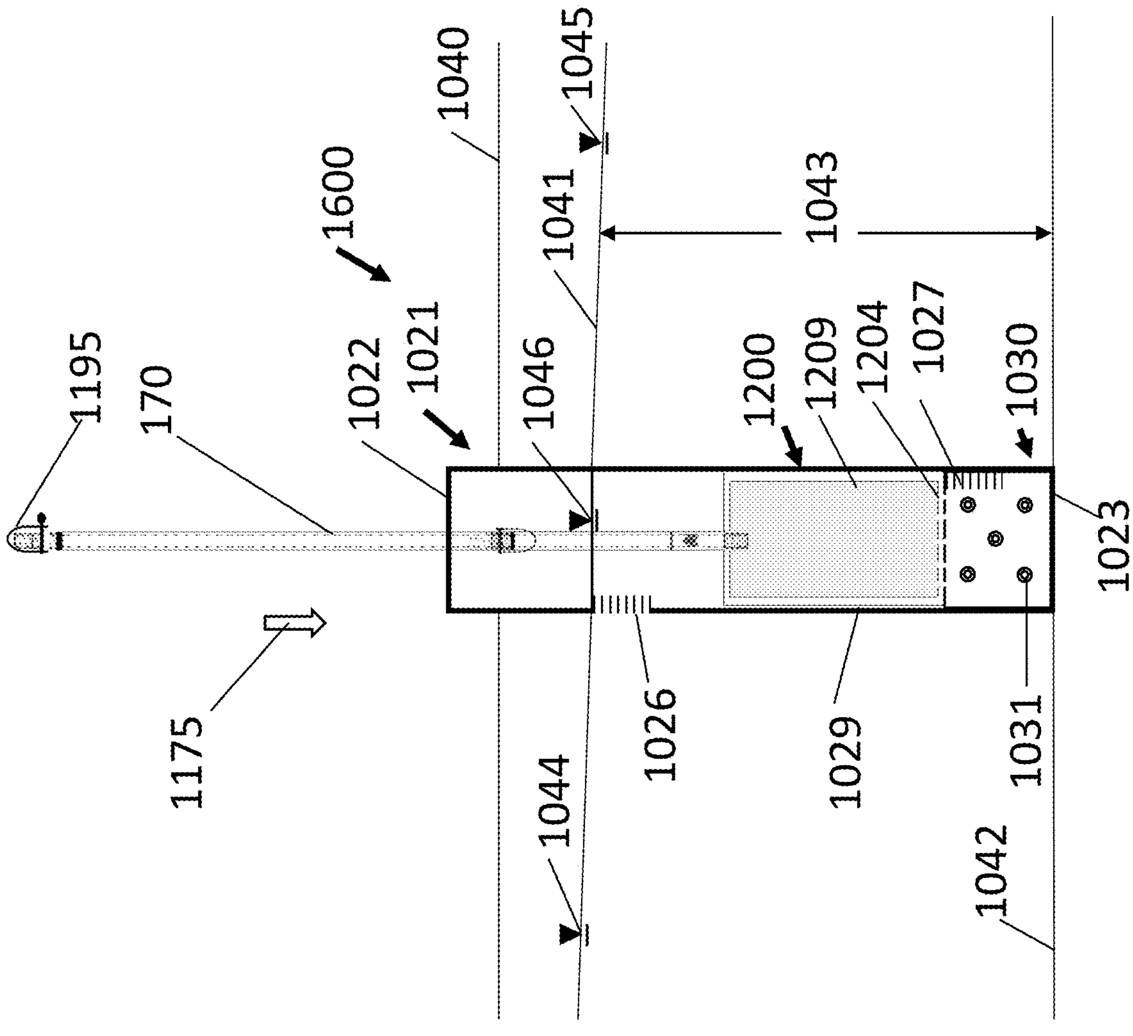
FIG. 53 is a sectional view of a filter casing installed in a different orientation (i.e., intake screens are positioned near the water table and outlet screens are positioned near the base of the aquifer), but in the same hydrogeologic setting shown in FIG. 51 through FIG. 52, where a fluid treatment cartridge is added at a designated elevation in a casing using an MCD stem assembly.

FIG. 53 is a sectional view of a filter casing 1021 installed in a different orientation 1600 (i.e., intake screens 1026 are positioned near the water table 1041 and outlet screens 1027 are positioned near the base of the aquifer 1042), but in the same hydrogeologic setting shown in FIG. 51 through FIG. 52. A fluid treatment cartridge 1200 is added at a designated elevation in a casing 1021 using an MCD stem assembly 1170 removably attached to the fluid treatment cartridge 1200 which has an unspecified permeable treatment media 1209.

Figure 54:
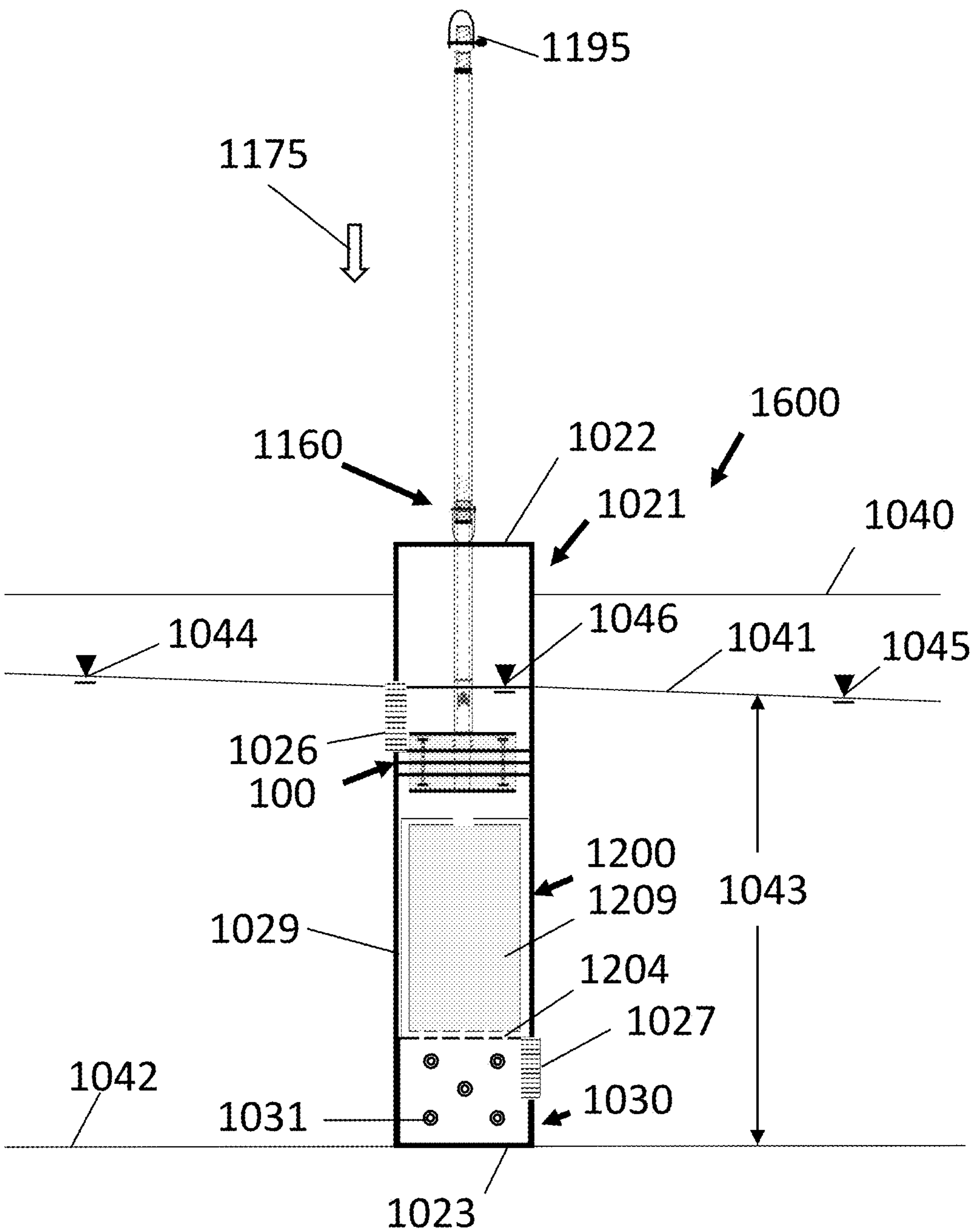
FIG. 54 is a sectional view of a filter casing installed in a different orientation (i.e., intake screens are positioned near the water table and outlet screens are positioned near the base of the aquifer), but in the same hydrogeologic setting shown in FIG. 51 through FIG. 53, where an MCD is seated on top of a fluid treatment cartridge at a designated elevation in a casing using the MCD stem assembly.

FIG. 54 is a sectional view of a filter casing 1021 installed in a different orientation 1600 (i.e., intake screens 1026 are positioned near the water table 1041 and outlet screens 1027 are positioned near the base of the aquifer 1042), but in the same hydrogeologic setting shown in FIG. 51 through FIG. 53, where an MCD assembly 1160 is in the process of being lowered 1175 into the casing 1021 and the MCD 1000 is to be seated on the top of a fluid treatment cartridge 1200 at a designated elevation in a casing 1021. A fluid treatment cartridge 1200 is shown to have an unspecified permeable treatment media 1209 in FIG. 54.

Figure 55:
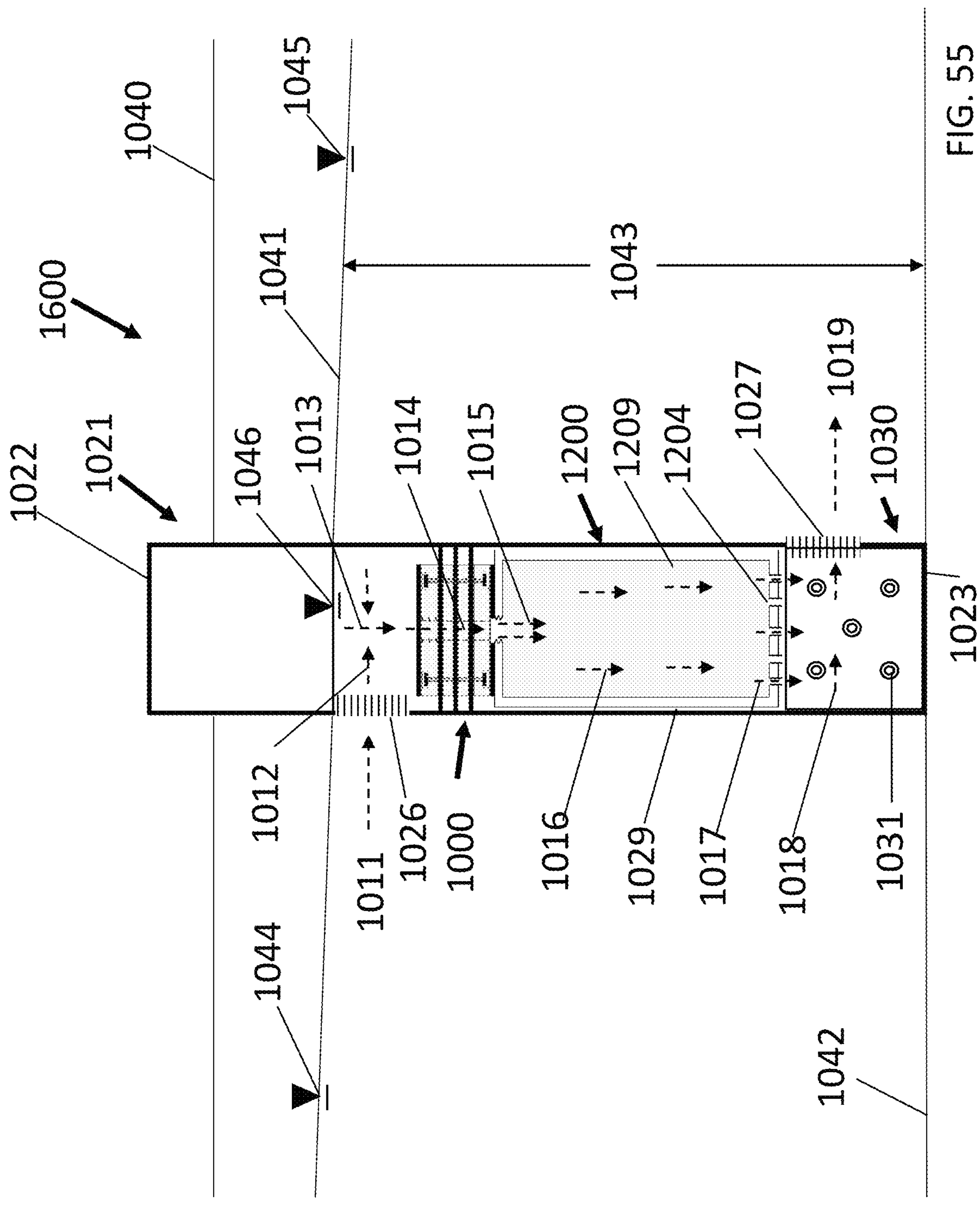
FIG. 55 is a sectional view of a filter casing installed in a different orientation (i.e., intake screens are positioned near the water table and outlet screens are positioned near the base of the aquifer), but in the same hydrogeologic setting shown in FIG. 51 through FIG. 54, where an MCD is seated on top of a fluid treatment cartridge at a designated elevation in a casing using the MCD stem assembly and used to control the downward flow of a fluid through an MCD preventing the fluid from flowing through the annular space between the casing and cartridge.

FIG. 55 is a sectional view of a filter casing 1021 installed in a different orientation 1600 (i.e., intake screens 1026 are positioned near the water table 1041 and outlet screens 1027 are positioned near the base of the aquifer 1042), but in the same hydrogeologic setting shown in FIG. 51 through FIG. 54, where an MCD 1000 is seated on top of a fluid treatment cartridge at a designated elevation in a casing 1021 and used to control the downward flow of a fluid through an MCD 1000 preventing the fluid from flowing through the annular space 1029 between the casing 1021 and the cartridge 1200.

Specifically, in the example 1600 shown in FIG. 55, groundwater laterally enters a casing 1021 as shown by flow arrow 1011 through a higher elevation inlet screen 1026 and flows laterally shown by flow arrows 1012 before flowing vertically 1013 downward into the hole throughout the center of the MCD 1000 as shown by flow arrow 1014. Groundwater continues to flow downward 1015 through the fluid treatment cartridge 1200 shown by parallel flow arrows 1016 before discharging through the holes 1204 in the bottom of the treatment cartridge 1200 shown by flow arrows 1017 into a permeable spacer 1030 with holes 1031 before discharging laterally 1019 through a lower elevation outlet screen 1027.

Figure 56:
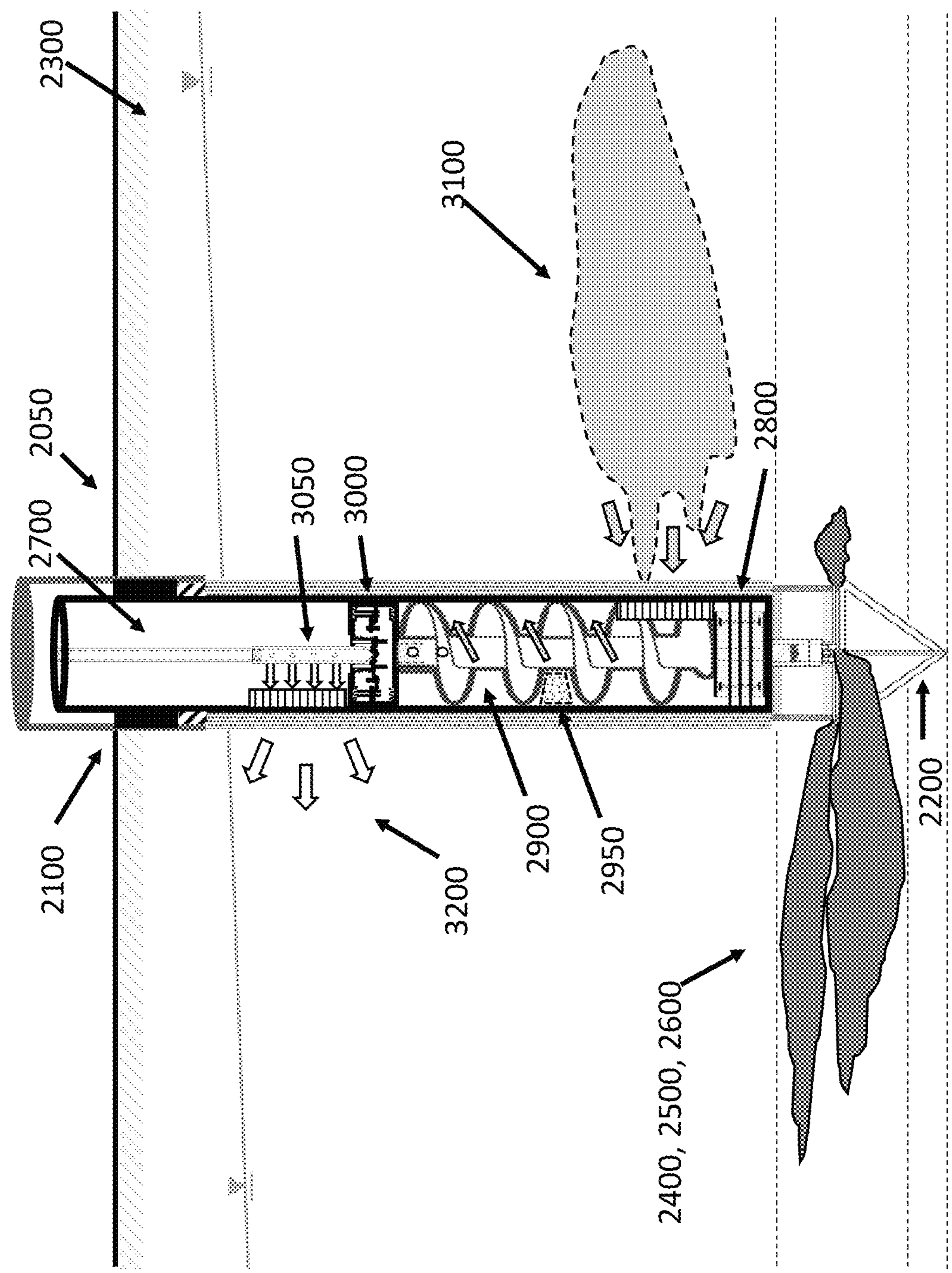
FIG. 56 is a side elevation view of a subsurface environment showing the installation of a groundwater treatment and flow diversion system.

FIG. 56 is a side elevation view of an in situ groundwater treatment and flow diversion system 2050. A rigid external casing drive system 2100 (e.g., steel or fiberglass) is used to install a dedicated drive point and injection tool (referred to in the present disclosure as a DPIT) 2200 into the subsurface environment 2300. A first chemical 2400, a second chemical 2500, injected horizontally from the dedicated DPIT reacting together form a coagulated barrier system 2600 to minimize groundwater flow in a lower elevation formation in the subsurface environment 2300. A PileGate 2700 installed inside the rigid external drive casing system 2100 includes a multipurpose casing device (MCD) 2800, a spiral-shaped treatment device (referred to in the present disclosure as a SSTD) 2900 with a solid permeable treatment media inside a coiled porous stocking 2950, and a mechanical packer (MP) 3000 activated by an actuation tool 3050 (referred to in the present disclosure as a Packtivator). A plume of contaminated groundwater 3100 is diverted into the groundwater treatment and flow diversion system 2050. Treated groundwater 3200 discharges horizontally from 2050 at a higher elevation in the subsurface environment 2300.

Figure 57:
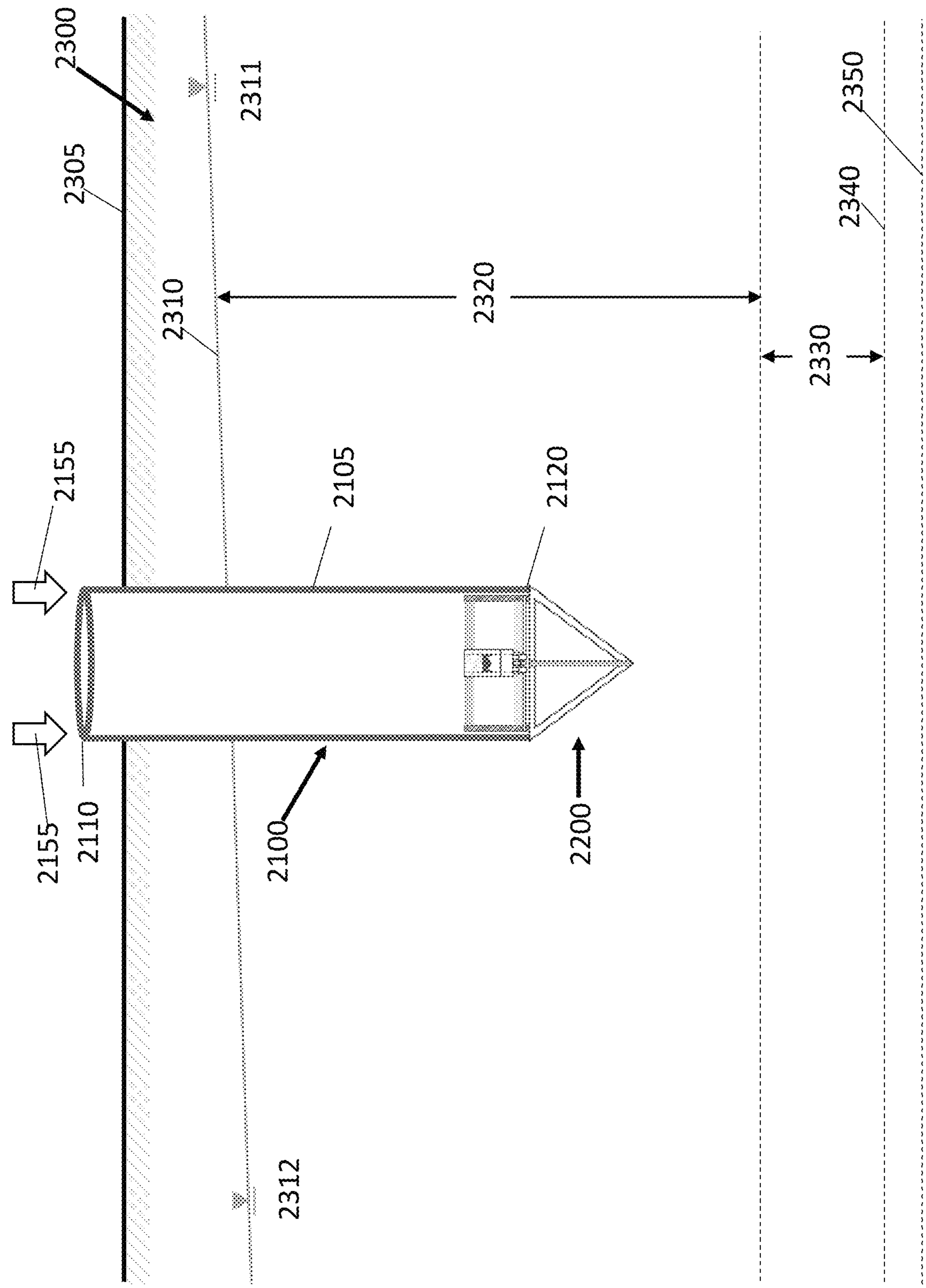
FIG. 57 is a side elevation view of a subsurface environment showing the partial installation of a DPIT using a rigid external drive casing system.

FIG. 57 is a side elevation view of a subsurface environment 2300 showing the partial installation of a DPIT 2200 detachably secured to the bottom 2120 of a rigid external drive casing 2105. A downward driving force 2155 on the top of the rigid external drive casing 2110 drives the DPIT beneath the ground surface 2305, into the saturated zone beneath the water table 2310, and into a more permeable section 2320 of an aquifer. A less permeable section 2330 of the aquifer underlies the more permeable section of the aquifer. The base of the aquifer 2340 is underlain by an aquitard (e.g., a very low permeability clay layer). The target depth of the of the system installation is a predetermined elevation 2350 below the ground surface 2305 where the bottom point of the DPIT 2200 is to terminate. Groundwater flows horizontally from a higher water table elevation 2311 representing the upgradient section of the aquifer to a lower water table elevation 2312 representing the downgradient section of the aquifer.

Figure 58:
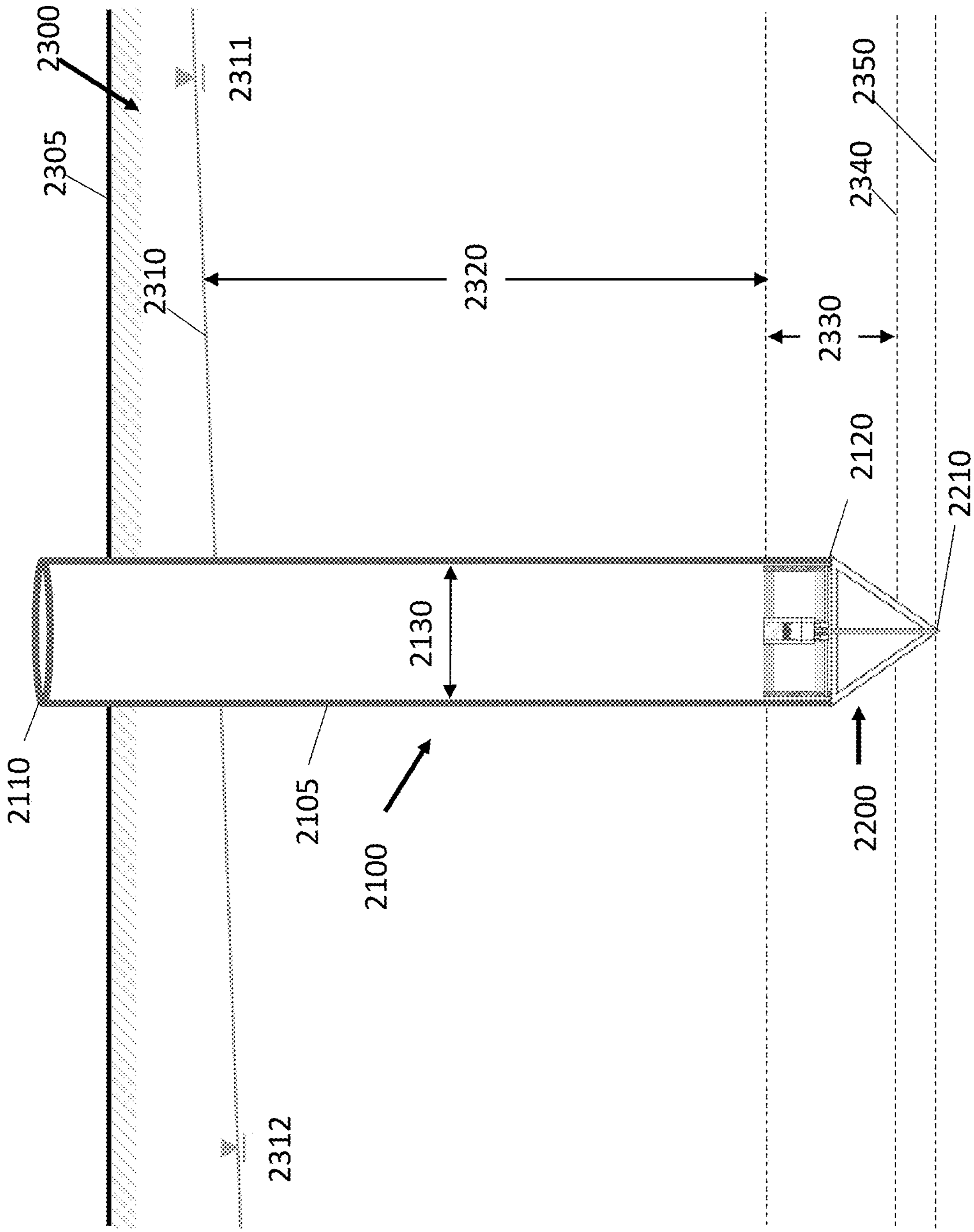
FIG. 58 is a side elevation view of a subsurface environment showing the completed installation of a DPIT with the rigid external drive casing system.

FIG. 58 is a side elevation view of a subsurface environment 2300 showing the completed installation of the DPIT 2200 detachably secured to the bottom 2120 of a rigid external drive casing 2105. The bottom drive point 2210 of the DPIT 2200 is at the predetermined elevation 2350. The inside diameter 2130 of the rigid external drive casing 2105 is greater than the outside diameter of the upper section of the DPIT 2200 for subsequent detachment of the DPIT 200 from the rigid external drive casing 2105 by an upward force on the rigid external drive casing 105 (shown in subsequent drawings).

Figure 59:
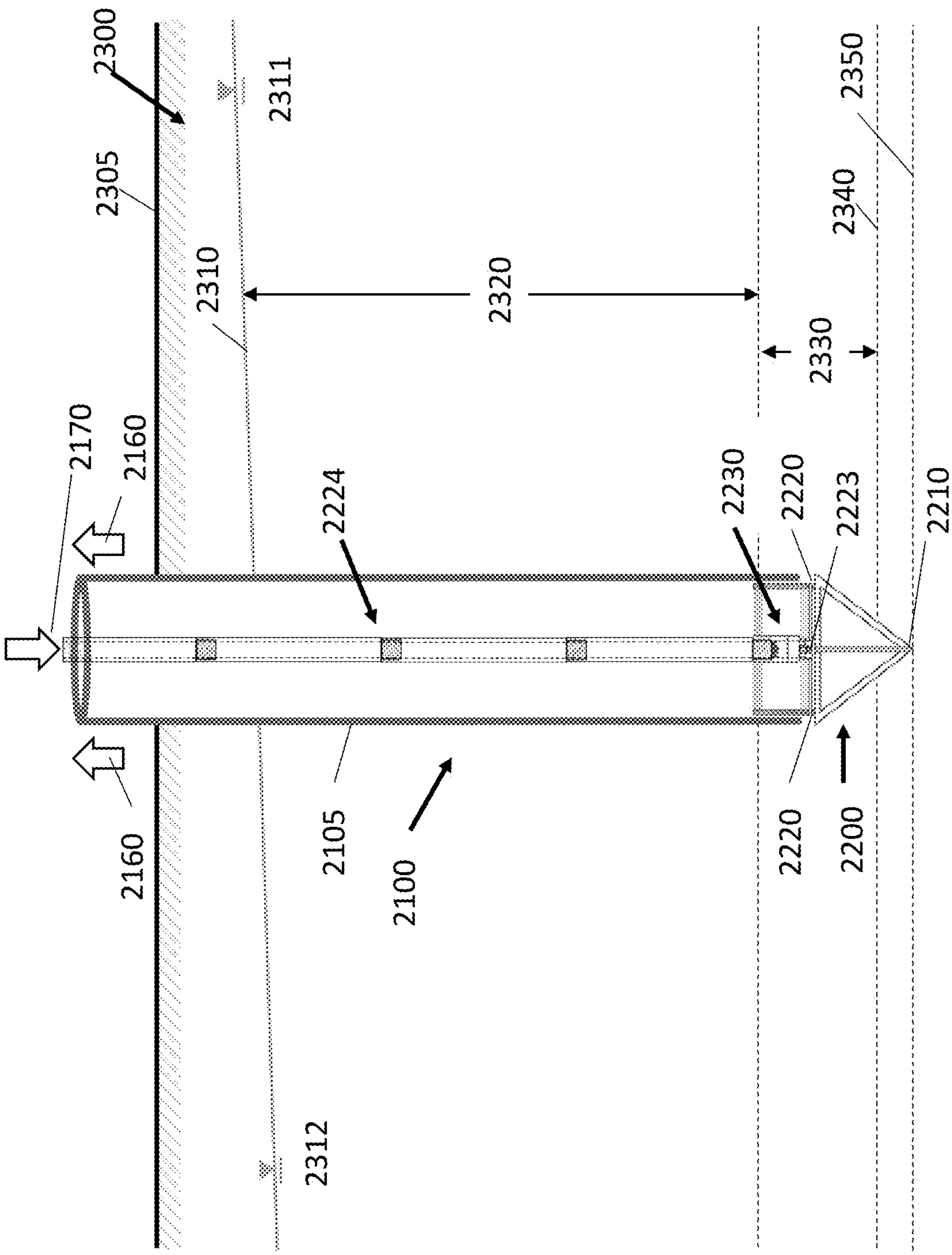
FIG. 59 is a side elevation view of a subsurface environment showing partial upward extraction of the rigid external drive casing and use of a tool to hold the DPIT in place.

FIG. 59 is a side elevation view of a subsurface environment 2300 showing partial upward extraction 2160 of the rigid external drive casing 2105. A downward force 2170 on an assembly of extensions 2224 detachably secured to a foot-valve sub 2230 holds the bottom drive point 2210 of the DPIT 2200 at the predetermined elevation 2350. The partial upward extraction 2160 exposes a plurality of horizontal injection tubes 2220 each having an injection port 2223 that is covered with a wire cloth or screen to prevent formation materials from the less permeable section 2330 of the aquifer from entering the injection tubes 2220 or ports 2223. A predetermined target injection depth aligns with the mid-section of the less permeable section 2330 of the aquifer.

Figure 60:
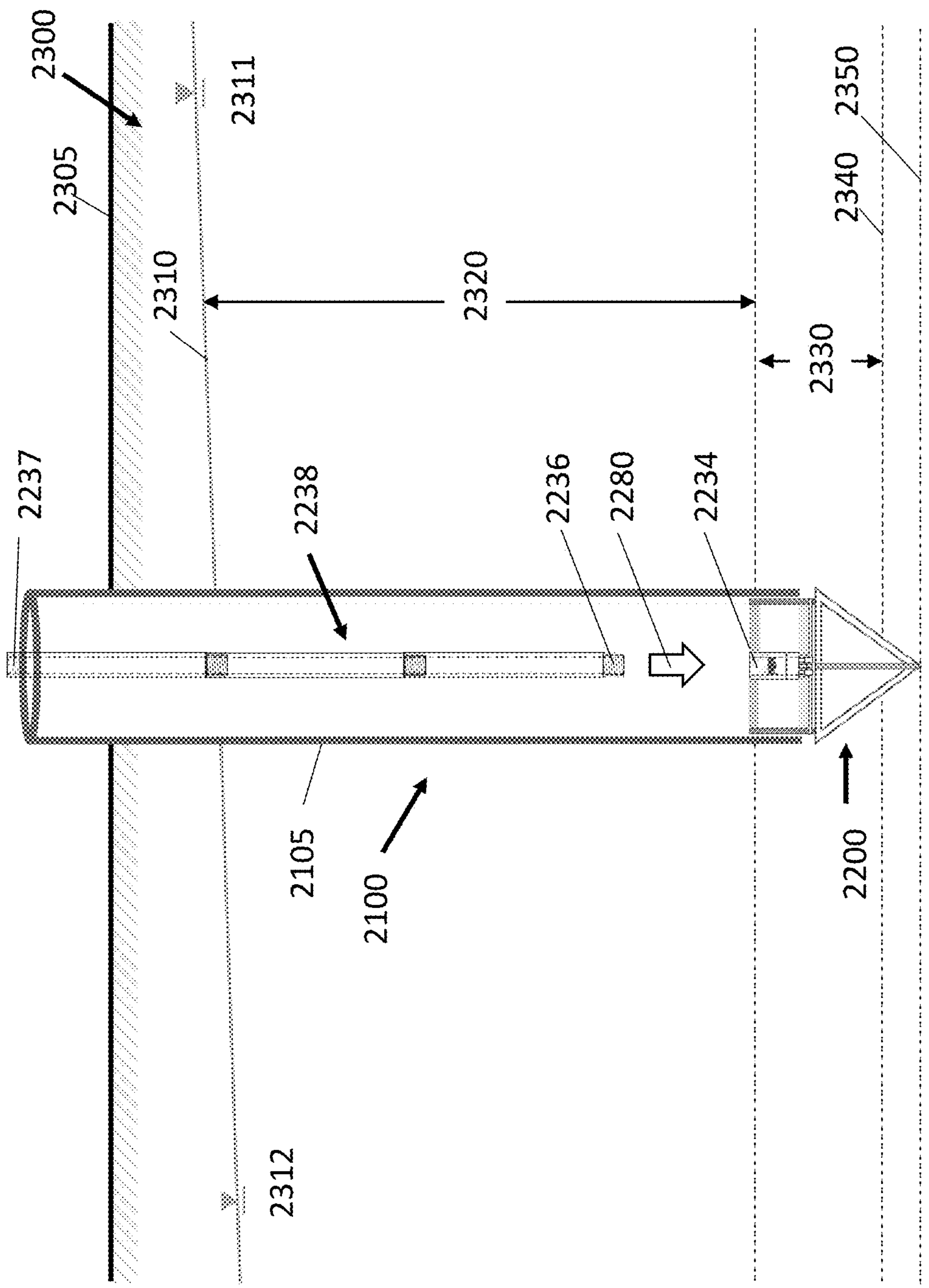
FIG. 60 is a side elevation view of a subsurface environment showing partial installation of a tool for injection of chemicals.

FIG. 60 is a side elevation view of a subsurface environment 2300 showing partial downward 2280 installation of a tool 2238 for injection of chemicals. Exterior male threads 2236 on a bottom of a hollow core extension are intended for detachable securement to interior female threads 2234 on the top of the foot-valve sub in the upper section of the DPIT 2200.

Figure 61:
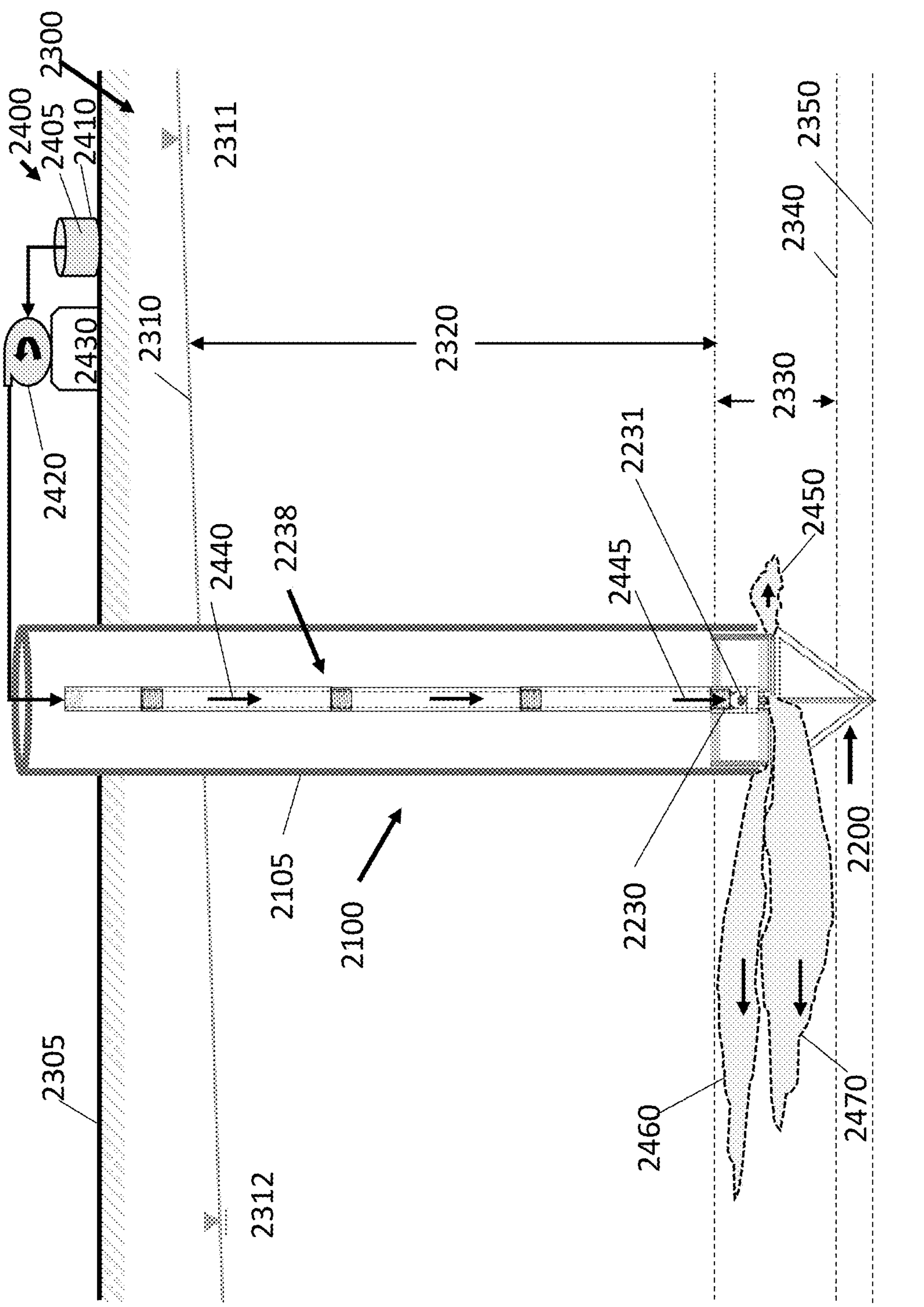
FIG. 61 is a side elevation view of a subsurface environment showing connection of the injection tool with the DPIT, injection of a first chemical through the injection tool and into the DPIT, and the horizontal discharge of the first chemical into a lower elevation formation.

FIG. 61 is a side elevation view of a subsurface environment 2300 showing an assembly of hollow-core extensions with O-ring seals (2238) forming an injection tool when connected to the foot-valve sub 2230 inside the upper section of the DPIS 2200. In one embodiment, a polymer emulsion system 2400 is setup above the ground surface 2305 by filling a tank 2410 with a polymer emulsion 2405. A stand 2430 supports a pump 2420 which is used to pump the polymer emulsion 2405 downwardly 2440 into an upper section of the assembly of hollow-core extensions with O-ring seals (2238) and further downwardly 2445 in a lower section of the assembly of hollow-core extensions with O-ring seals (2238) connected to the foot-valve sub 2230, forcing the ball 2231 inside to move in a downward position. The polymer emulsion 2405 flows from the foot-valve sub 2230 into a plurality of horizontal injection tubes 2220 and ports 2223 previously described in reference to FIG. 59 and shown in more detail in FIG. 83 and FIG. 84.

The polymer emulsion 2405 flows from the injection ports 2223 (not shown in FIG. 61) into the less permeable section of the aquifer 2330 under gravity causing a plume 2450 to flow a short distance upgradient 2311. The polymer emulsion 2405 flows downgradient 2312 in both an upper section 2460 and lower section 2470 of the less permeable section of the aquifer 2330. The polymer emulsion 2405 extends further downgradient 2312 within the less permeable section of the aquifer 2330 due to hydraulic head differentials between the upgradient 2311 and downgradient 2312 sections of the aquifer and because of the physical barrier created by the rigid external drive casing system 2100 as installed in the subsurface environment 2300 where the DPIT 2200 has terminated within the base of the aquifer 2340.

Figure 62:
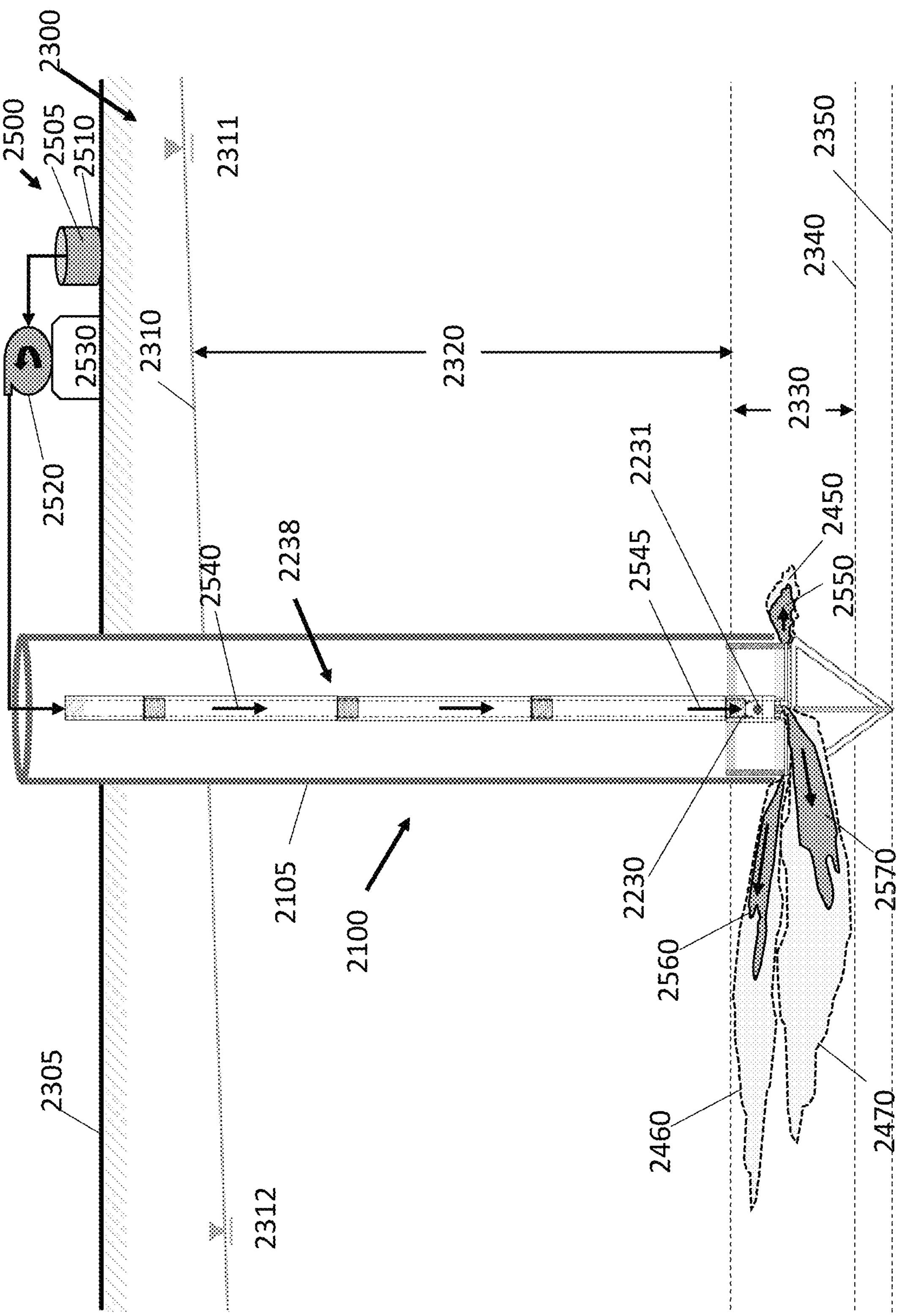
FIG. 62 is a side elevation view of a subsurface environment showing injection of a second chemical through the injection tool and into the DPIT, and the horizontal discharge of the second chemical into the lower elevation formation where it reacts with the first chemical.

FIG. 62 is a side elevation view of a subsurface environment 2300 showing an assembly of hollow-core extensions with O-ring seals (2238) forming an injection tool when connected to the foot-valve sub 2230 inside the upper section of the DPIS 2200. In one embodiment, a coagulating agent system 2500 is setup above the ground surface 2305 by filling a tank 2510 with a coagulating agent 2505. A stand 2530 supports a pump 2520 which is used to pump the liquid coagulating agent 2505 downwardly 2540 into an upper section of the assembly of hollow-core extensions with O-ring seals (2238) and further downwardly 2545 in a lower section of the assembly of hollow-core extensions with O-ring seals (2238) connected to the foot-valve sub 2230, forcing the ball 2231 inside to move in a downward position. The coagulating agent 2505 flows from the foot-valve sub 2230 into a plurality of horizontal injection tubes 2220 and ports 2223 previously described in reference to FIG. 59 and shown in more detail in FIG. 83 and FIG. 84.

The coagulating agent 2505 flows from the injection ports 2223 (not shown in FIG. 62) into the less permeable section of the aquifer 2330 under gravity causing a plume 2450 to flow a short distance upgradient 2311. The coagulating agent 2505 flows downgradient 2312 in both an upper section 2560 and lower section 2570 of the less permeable section of the aquifer 2330. The coagulating agent 2550, 2560, and 2570 follows the same horizontal distribution path as the polymer emulsion 2450, 2460, and 2470.

Figure 63:
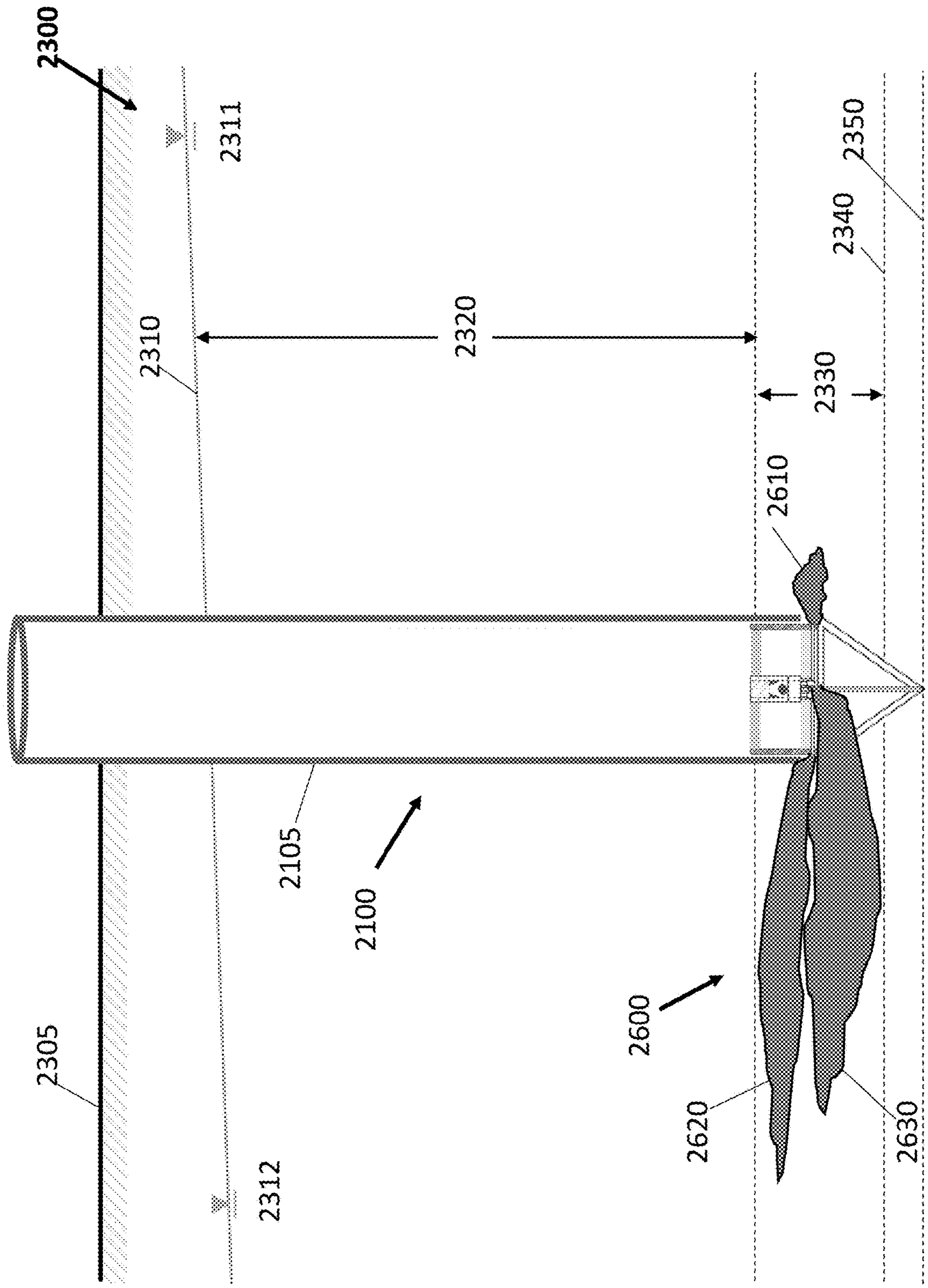
FIG. 63 is a side elevation view of a subsurface environment showing a coagulated barrier system created by the reaction of the two chemicals in the lower elevation formation.

FIG. 63 is a side elevation view of a subsurface environment 2300 showing a coagulated barrier system 2600 created by the reaction of the coagulating agent 2505 with the polymer emulsion 2405 after sequential injection of both chemicals in the less permeable section of the aquifer 2330. The coagulated barriers 2610, 2620, and 2630 are formed in the same horizontal distribution paths as the polymer emulsion 2405 and the coagulating agent 2505.

Figure 64:
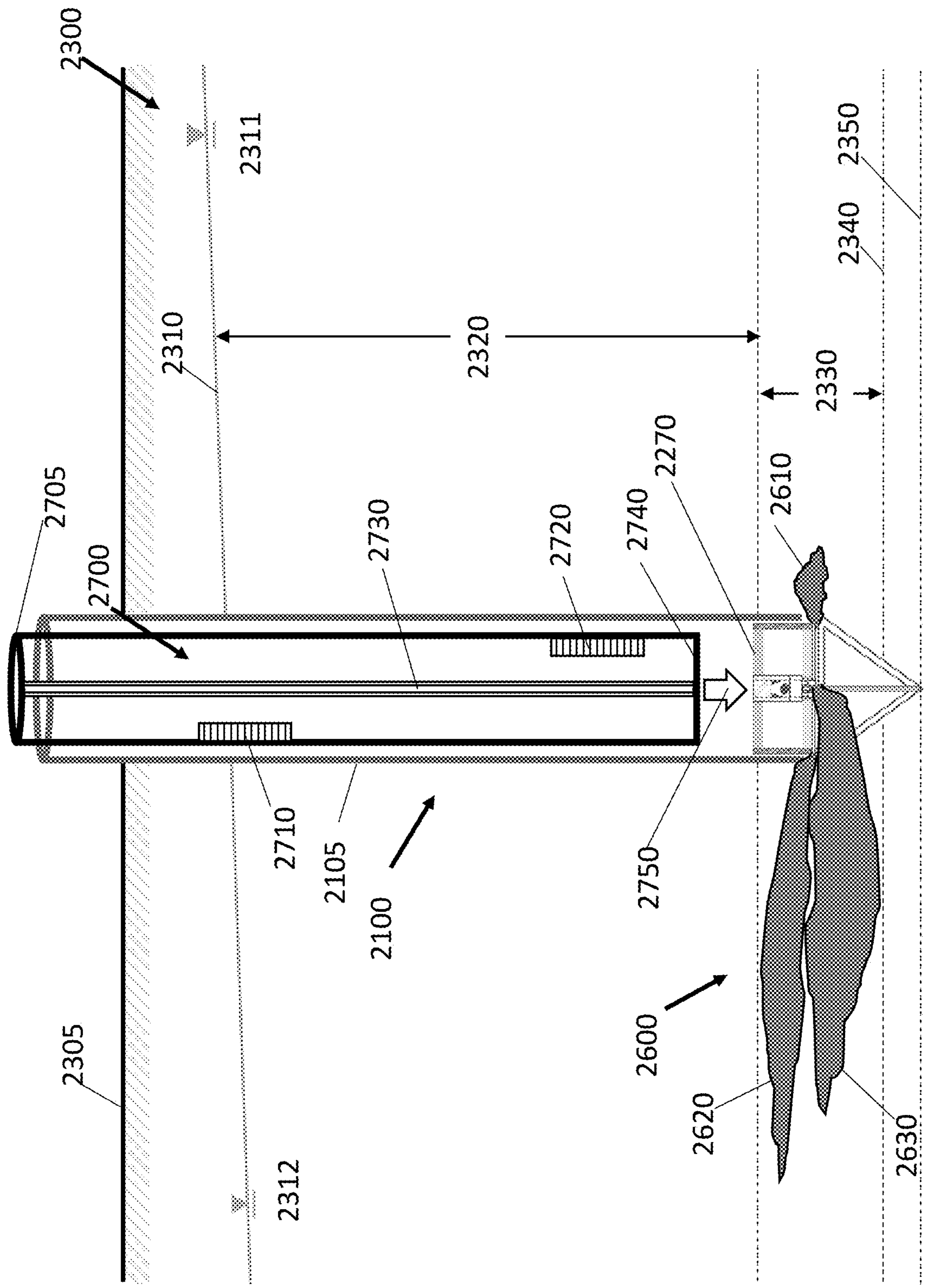
FIG. 64 is a side elevation view of a subsurface environment showing partial downward lowering of a PileGate into the rigid external drive casing system.

FIG. 64 is a side elevation view of a subsurface environment 2300 showing partial downward lowering 2750 of a cylindrical PileGate 2700 into the rigid external drive casing system 2100. The PileGate 2700 has an upper elevation screen 2710 oriented downgradient 2312 and a lower elevation screen 2720 oriented upgradient 2311 in this example installation. A vertical interlock with a female connection 2730 extends from the top 2705 to the bottom 2740 of the PileGate centered between the upper elevation screen 2710 and the lower elevations screens 2720. A vertical interlock with a male connection 2735 is not shown in FIG. 64 but is shown in an overhead view FIG. 85B on an opposing side of the PileGate 700.

Figure 65:
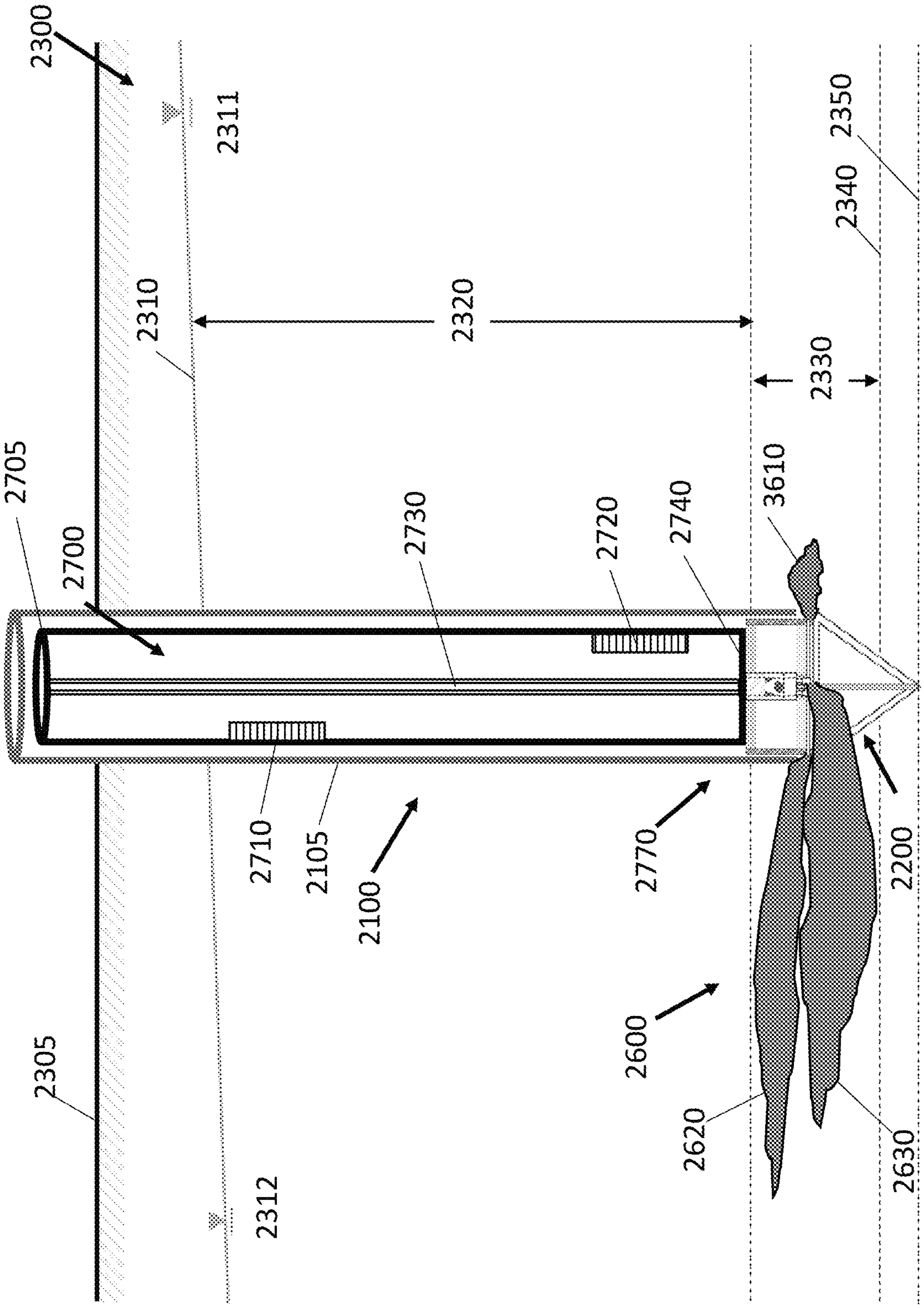
FIG. 65 is a side elevation view of a subsurface environment showing completed installation of the PileGate seated on the DPIT in the rigid external drive casing system.

FIG. 65 is a side elevation view of a subsurface environment 2300 showing completed installation of the PileGate 2700 positioned 2770 on the DPIT 2200 in the rigid external drive casing system 2100. A second vertical interlock with a male connection 2735 (not shown in FIG. 65) is on the opposing side of the PileGate 2700 and shown in detail in an overhead view FIG. 85B. The two vertical interlocks are used to either connect the PileGate 2700 to another PileGate 2700 or to sheet piling (not shown) to form a vertical barrier wall as detailed in patents U.S. Pat. No. 9,937,537 B2 and U.S. Pat. No. 10,556,260 B2. In the example installation shown in FIG. 65, the lower elevation screen 2720 is oriented upgradient to serve as an inlet screen and the upper elevation screen 2710 is oriented downgradient to serve as an outlet screen of the PileGate 2700. Different screen orientations can be envisioned for other example installations depending on the remedial objectives.

Figure 66:
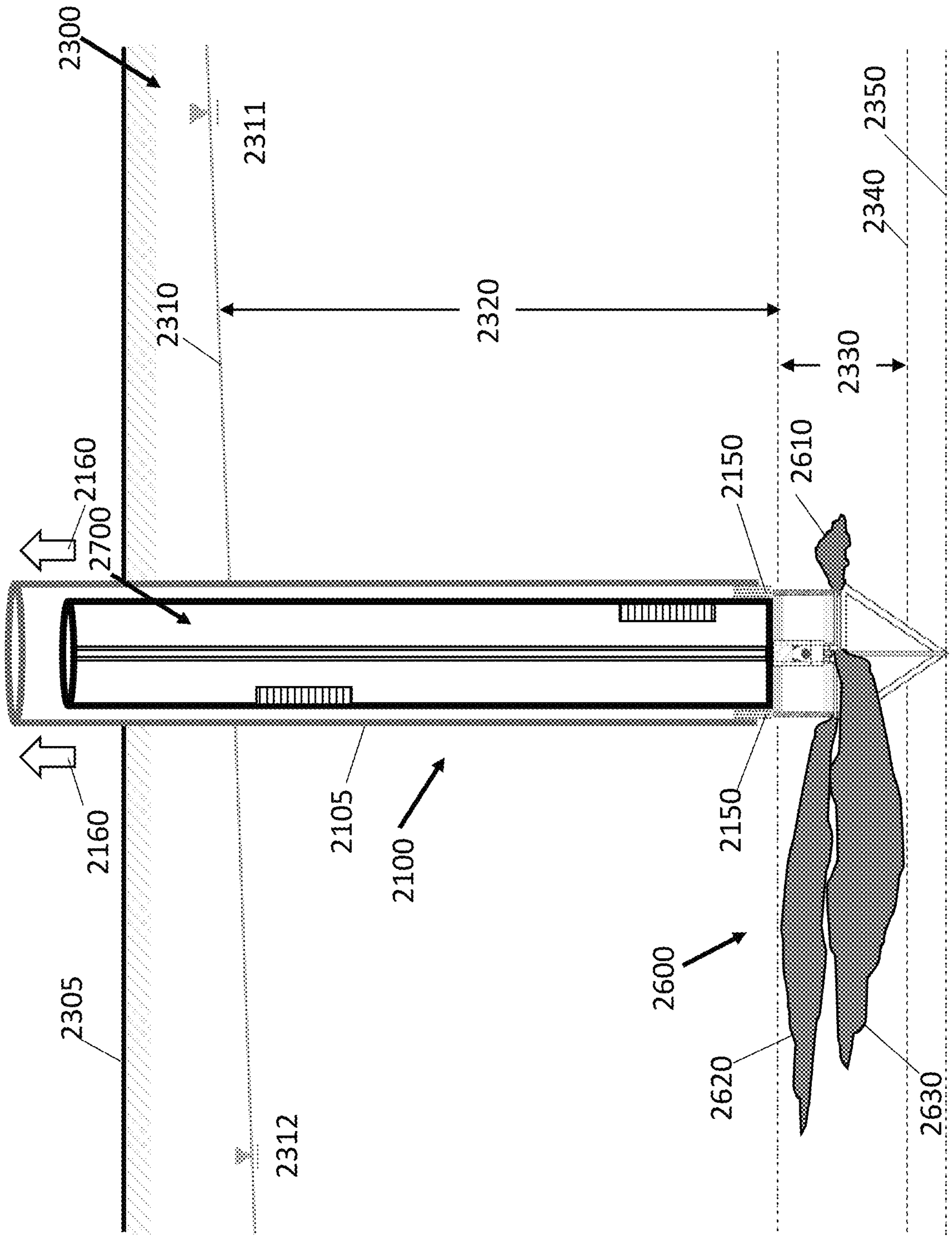
FIG. 66 is a side elevation view of a subsurface environment showing partial upward extraction of the rigid external drive casing system and the concurrent emplacement of a gravel pack at a lower elevation in the annular space surrounding the PileGate.

FIG. 66 is a side elevation view of a subsurface environment 2300 showing a partial upward extraction force 2160 of the rigid external drive casing system 2100 and the concurrent emplacement of a gravel pack 2150 at a lower elevation in the annular space surrounding the PileGate 2700.

Figure 67:
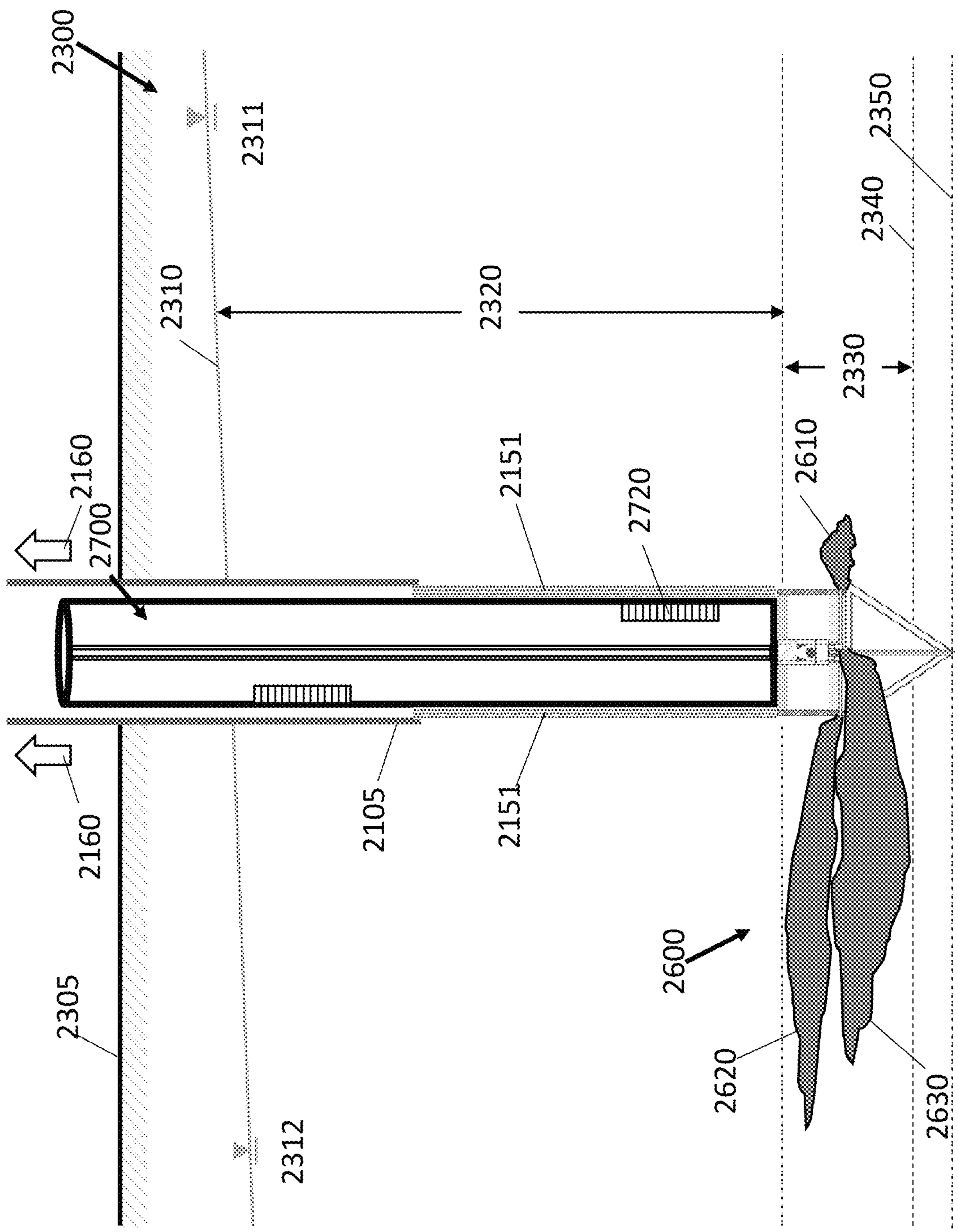
FIG. 67 is a side elevation view of a subsurface environment showing continued partial upward extraction of the rigid external drive casing system and the concurrent emplacement of a gravel pack at a middle elevation in the annular space surrounding the PileGate.

FIG. 67 is a side elevation view of a subsurface environment 2300 showing continued partial upward extraction force 2160 of the rigid external drive casing system 2100 and the concurrent emplacement of a gravel pack 2151 at a middle elevation in the annular space surrounding the PileGate 2700.

Figure 68:
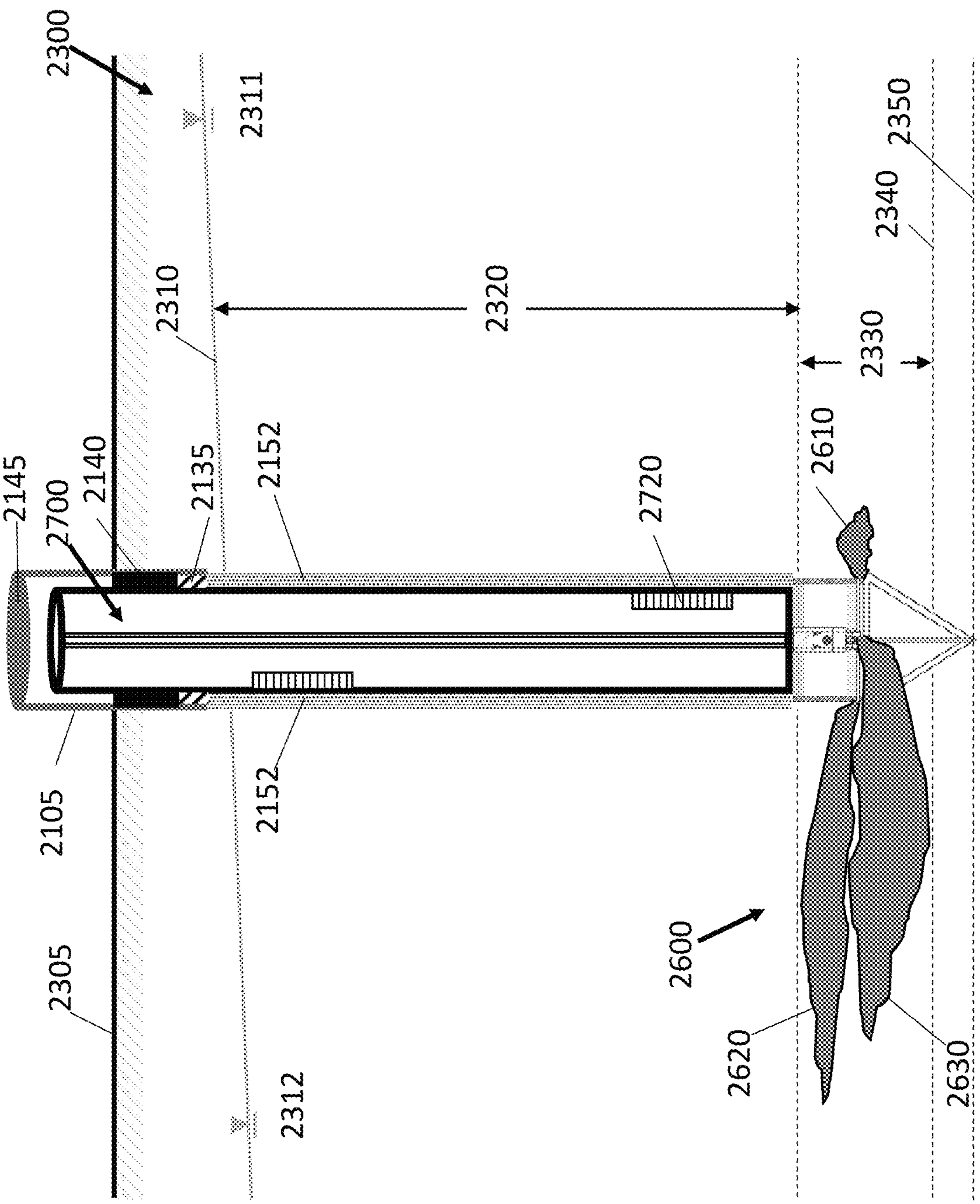
FIG. 68 is a side elevation view of a subsurface environment showing completed upward extraction of the rigid external drive casing system and the concurrent emplacement of a gravel pack at an upper elevation in the annular space surrounding the PileGate along with seals emplaced in the annular space between the rigid external drive casing and the PileGate near the ground surface.

FIG. 68 is a side elevation view of a subsurface environment 2300 showing a completed upward extraction of the rigid external drive casing system 2100 above the water table 2310 but below the ground surface 2305 and the concurrent emplacement of a gravel pack at an upper elevation 2152 in the annular space surrounding the PileGate 2700. A bentonite or similar expansive clay seal 2135 is placed in the annular space at the top of the gravel pack at the upper elevation 2152. A grout or similar cement seal 2140 is placed in the annular space between the rigid external drive casing 2105 and the PileGate 2700 above the bentonite seal 2135 and secures the rigid external drive casing 2105 and the PileGate 2700 at the ground surface 2305. A removable top 2145 for access is placed on the rigid external drive casing 2105.

Figure 69:
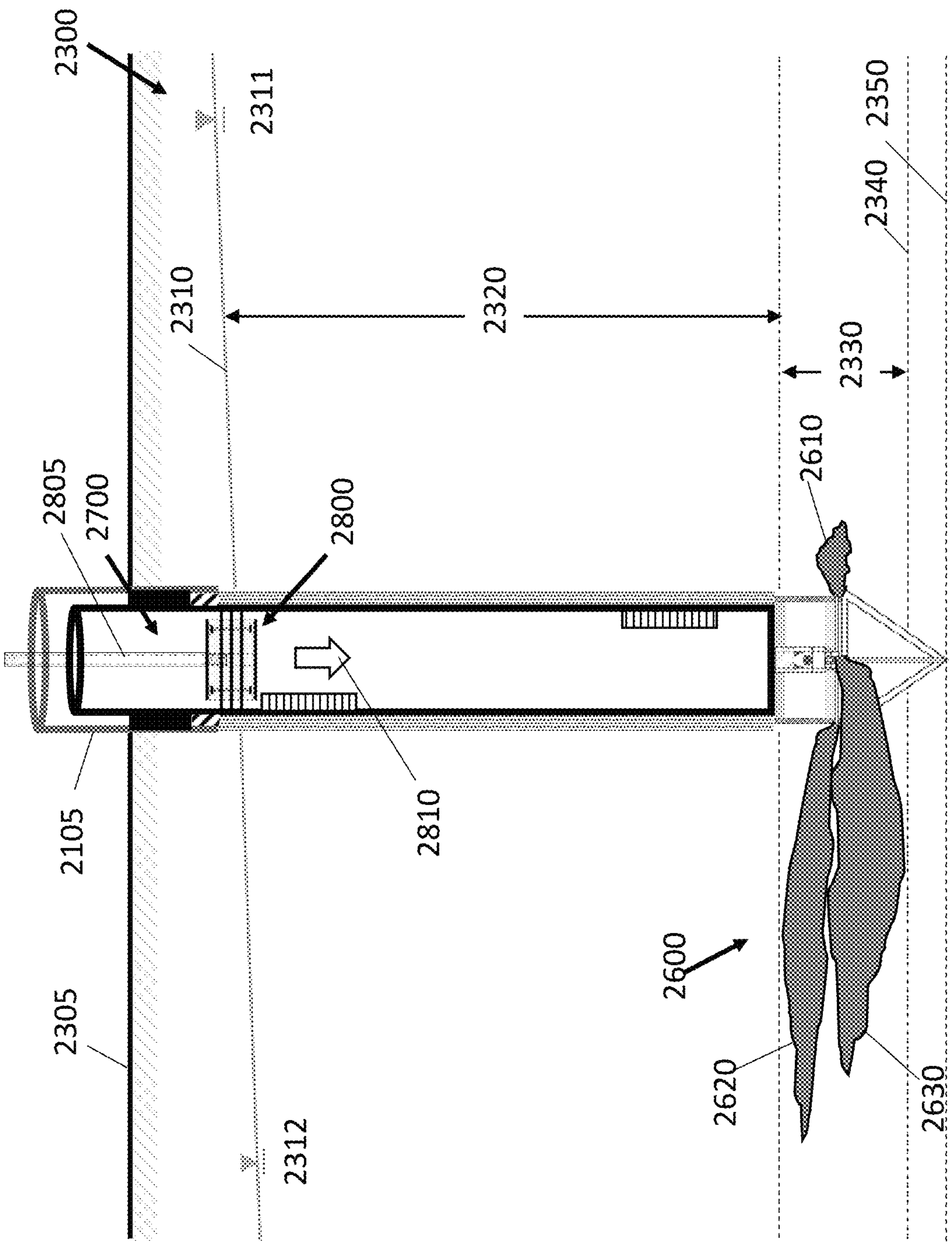
FIG. 69 is a side elevation view of a subsurface environment showing initial downward installation of an MCD inside the PileGate.

FIG. 69 is a side elevation view of a subsurface environment 2300 showing initial downward installation 2810 of an MCD 2800 inside the PileGate 2700. Additional details of the MCD 800 are provided in U.S. patent application Ser. No. 17/559,138, which is herein incorporated by reference in its entirety. An extension 2805 is detachably secured to the MCD 2800. Details of the MCD 2800 are provided in FIG. 86.

Figure 70:
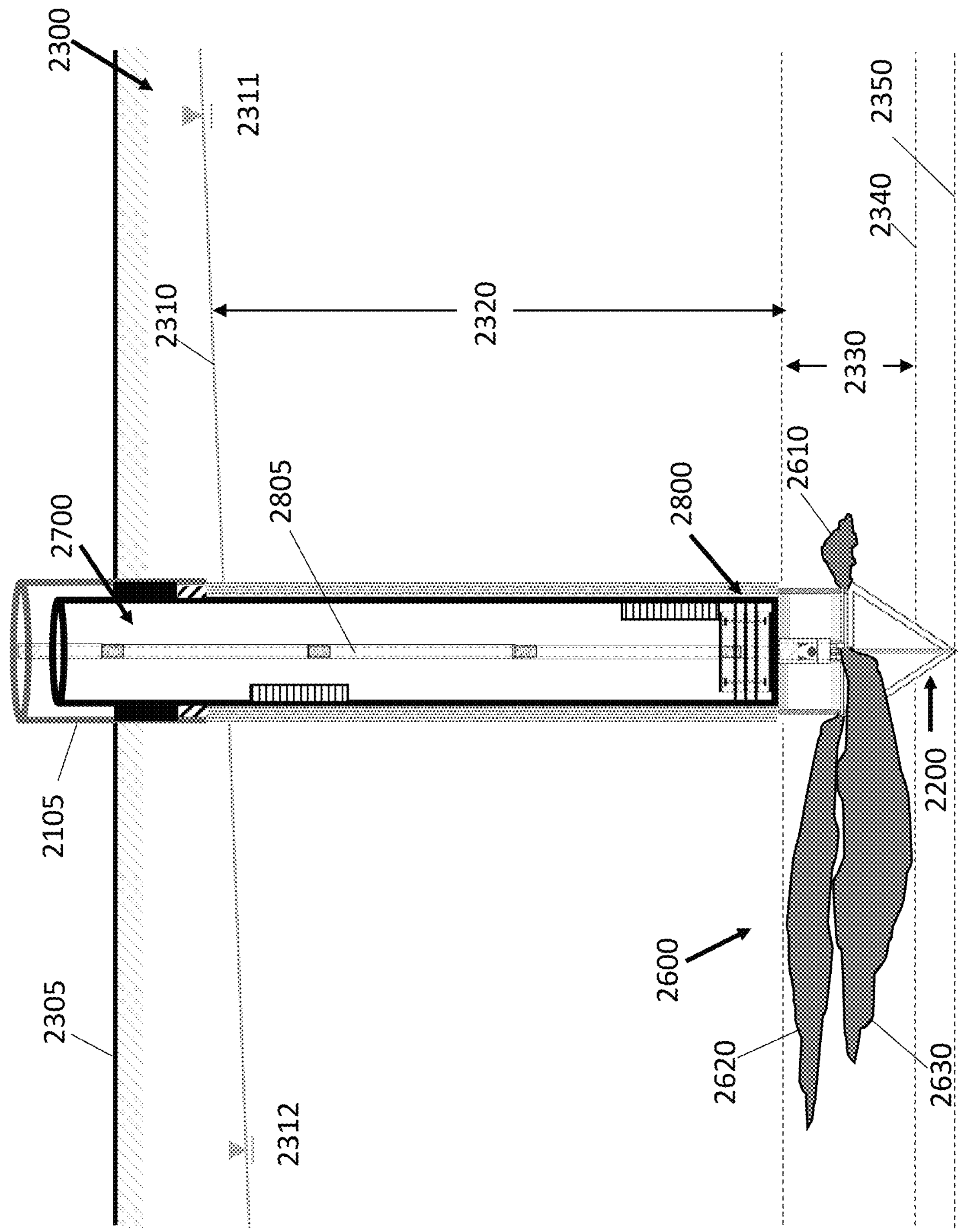
FIG. 70 is a side elevation view of a subsurface environment showing completed installation of an MCD seated on the DPIT inside the PileGate.

FIG. 70 is a side elevation view of a subsurface environment 2300 showing completed installation of an MCD 2800 seated on the DPIT 2200 inside the PileGate 2700.

Figure 71:
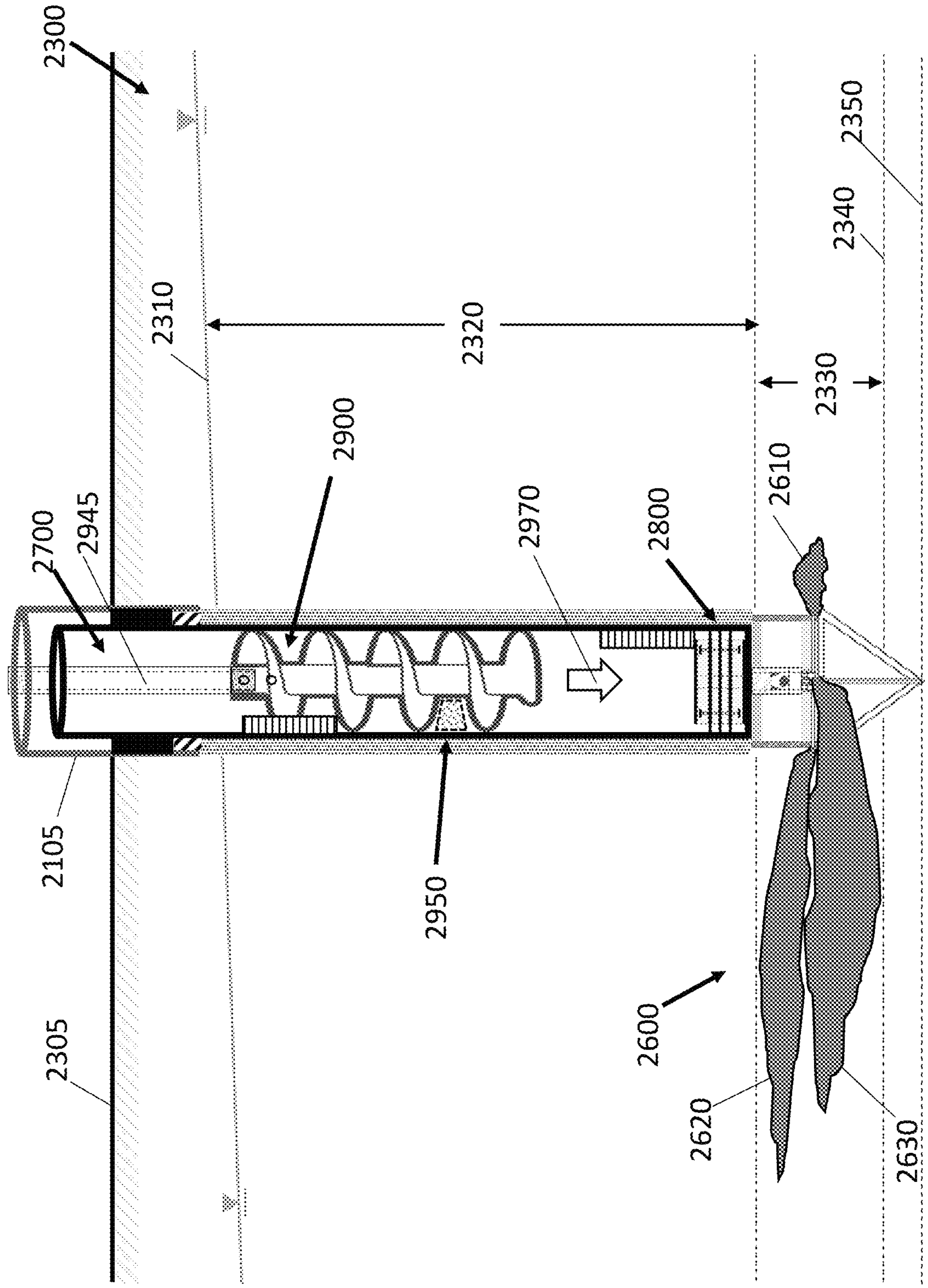
FIG. 71 is a side elevation view of a subsurface environment showing initial downward installation of an SSTD inside the PileGate.

FIG. 71 is a side elevation view of a subsurface environment 2300 showing initial downward installation 2970 of an SSTD 2900 inside the PileGate 2700. An extension 2945 is detachably secured to the SSTD 2900. A porous stocking filled with solid permeable media 2950 is coiled around the SSTD 2900 (only a small section of 2950 is shown in FIG. 71 but the stocking coils around the entire length of the SSTD 2900). Details of the SSTD 2900 are provided in FIG. 87.

Figure 72:
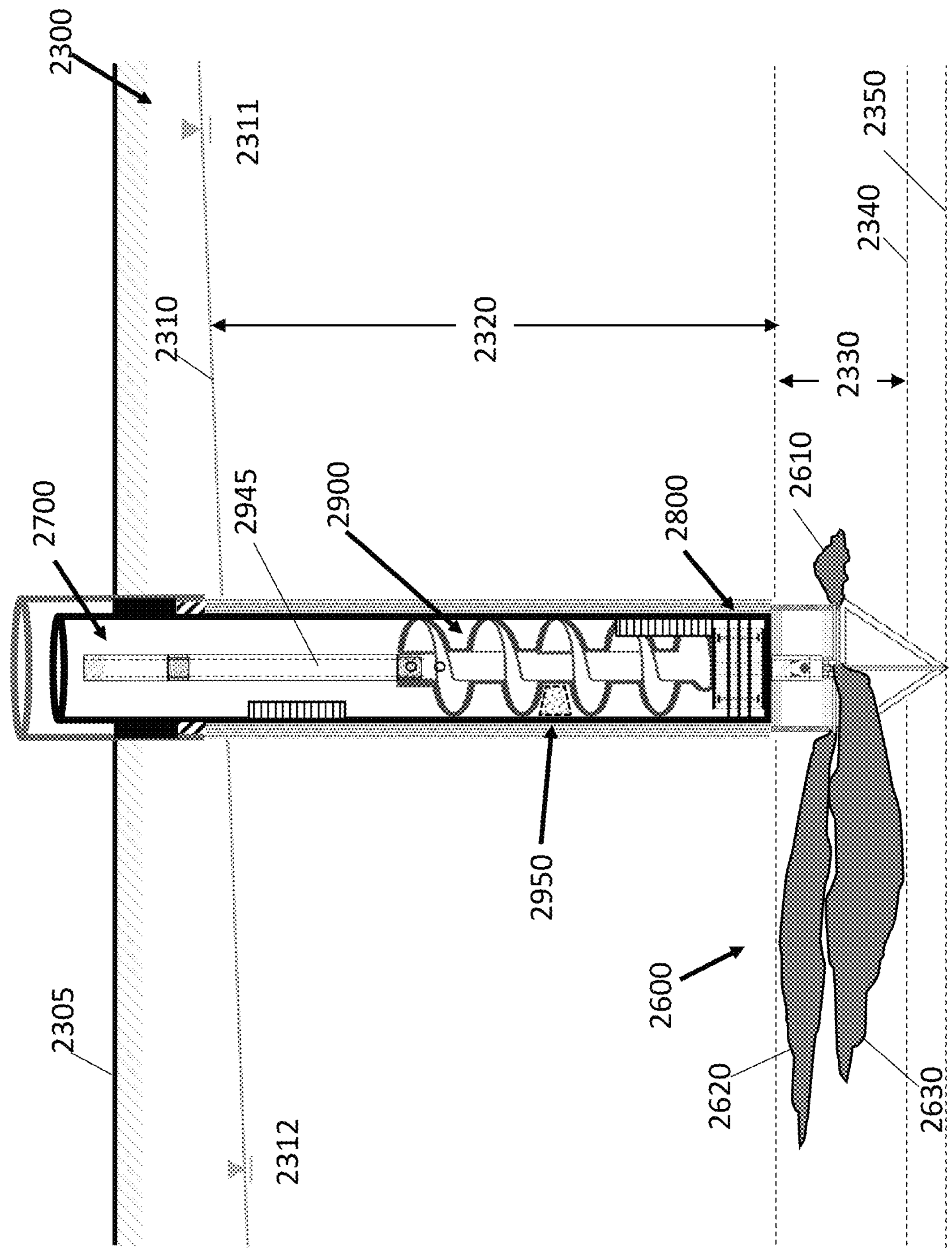
FIG. 72 is a side elevation view of a subsurface environment showing completed installation of an SSTD seated on the MCD inside the PileGate.

FIG. 72 is a side elevation view of a subsurface environment 2300 showing completed installation of the SSTD 2900 seated on the MCD 2800 inside the PileGate 700.

Figure 73:
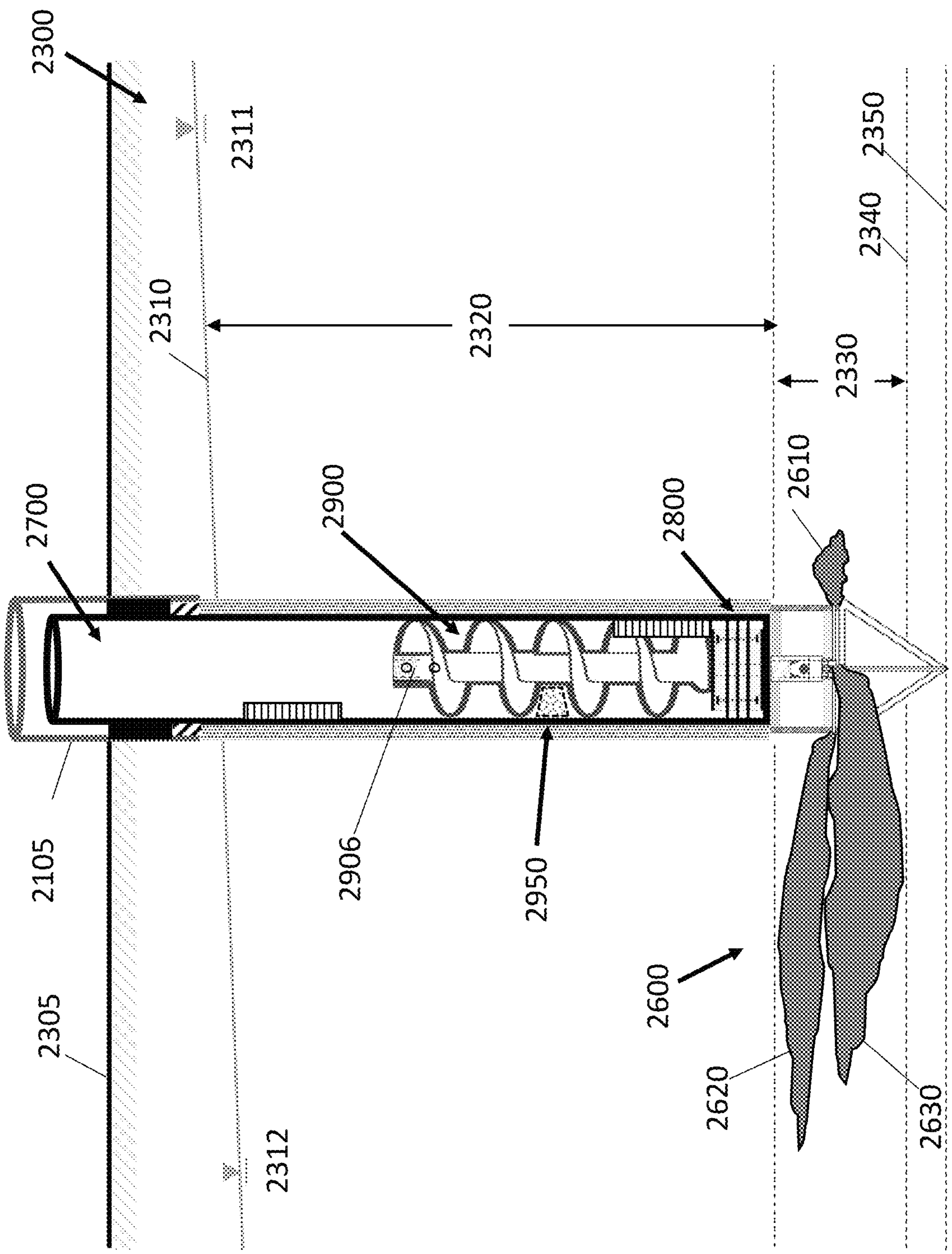
FIG. 73 is a side elevation view of a subsurface environment showing removal of the SSTD installation tool from the PileGate.

FIG. 73 is a side elevation view of a subsurface environment 2300 showing the extension 2945 that was used to install the SSTD 2900 removed from the PileGate 2700. A plurality of 2906 in the top of the SSTD 2900 are exposed upon removal of extension 2945.

Figure 74:
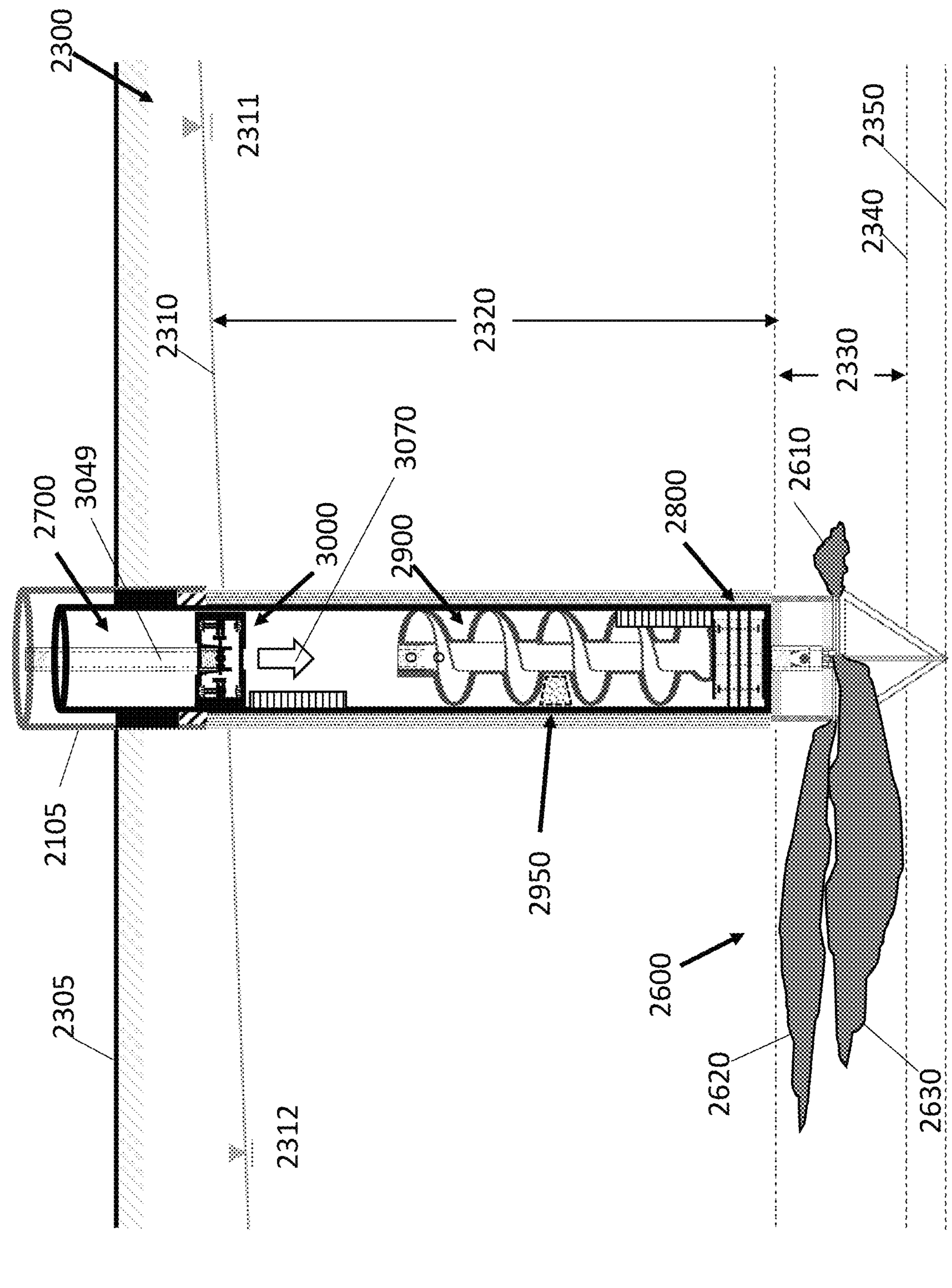
FIG. 74 is a side elevation view of a subsurface environment showing initial installation of an MP inside the PileGate.

FIG. 74 is a side elevation view of a subsurface environment 2300 showing initial downward positioning 3070 of an MP 3000 inside the PileGate 2700 by use of a hollow-core extension 3049. Details of the MP 3000 and associated tools are provided in FIGS. 88 and 89.

Figure 75:
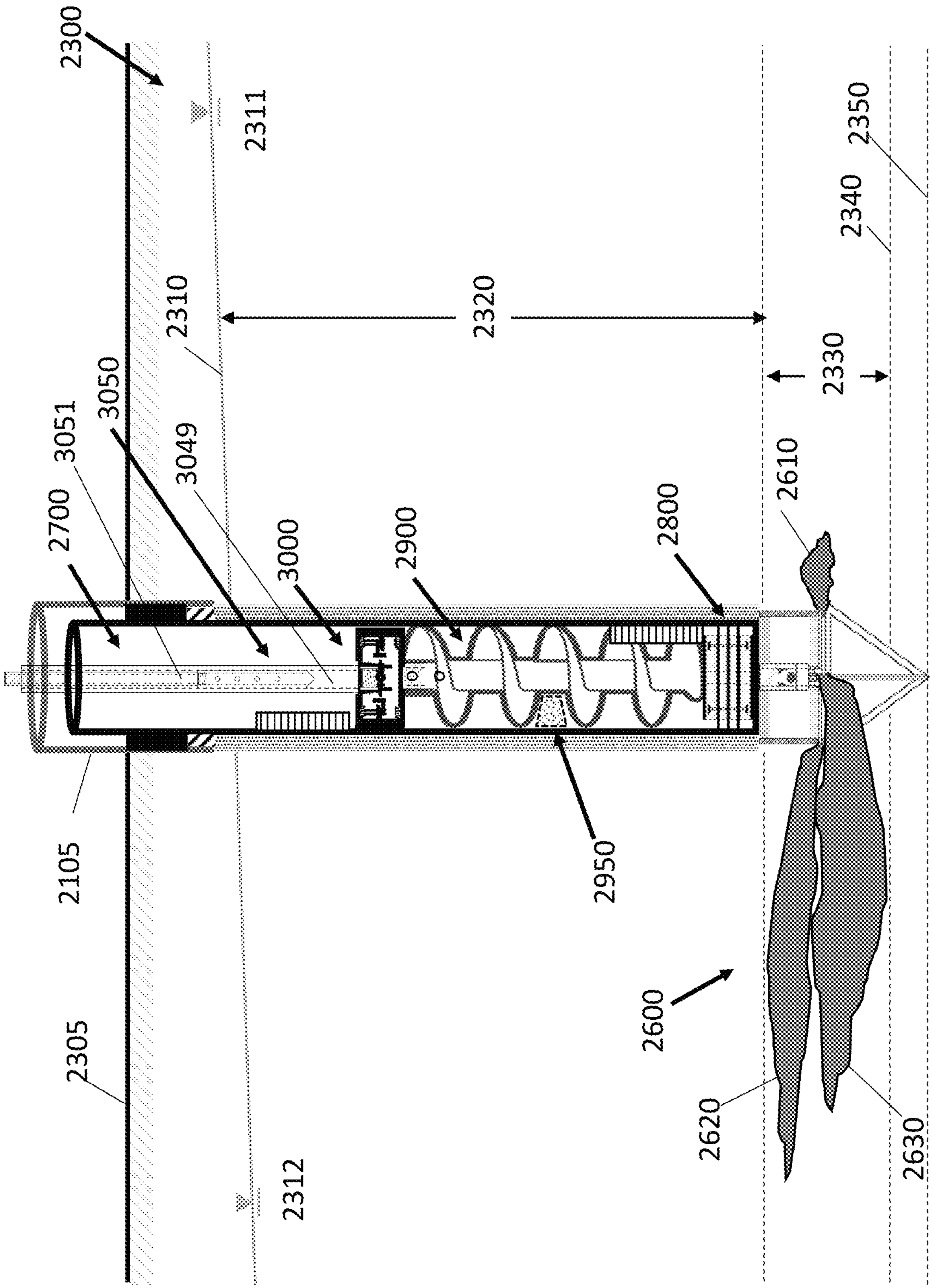
FIG. 75 is a side elevation view of a subsurface environment showing completed installation of an MP seated on the SSTD inside the PileGate before actuation.

FIG. 75 is a side elevation view of a subsurface environment 2300 showing completed installation of an MP 3000 seated on the SSTD 2900 inside the PileGate 2700 before actuation. An actuation tool 3050 (referred to in the present disclosure as a Packtivator) is lowered inside the hollow-core extension 3049 to activate the MP 3000.

Figure 76:
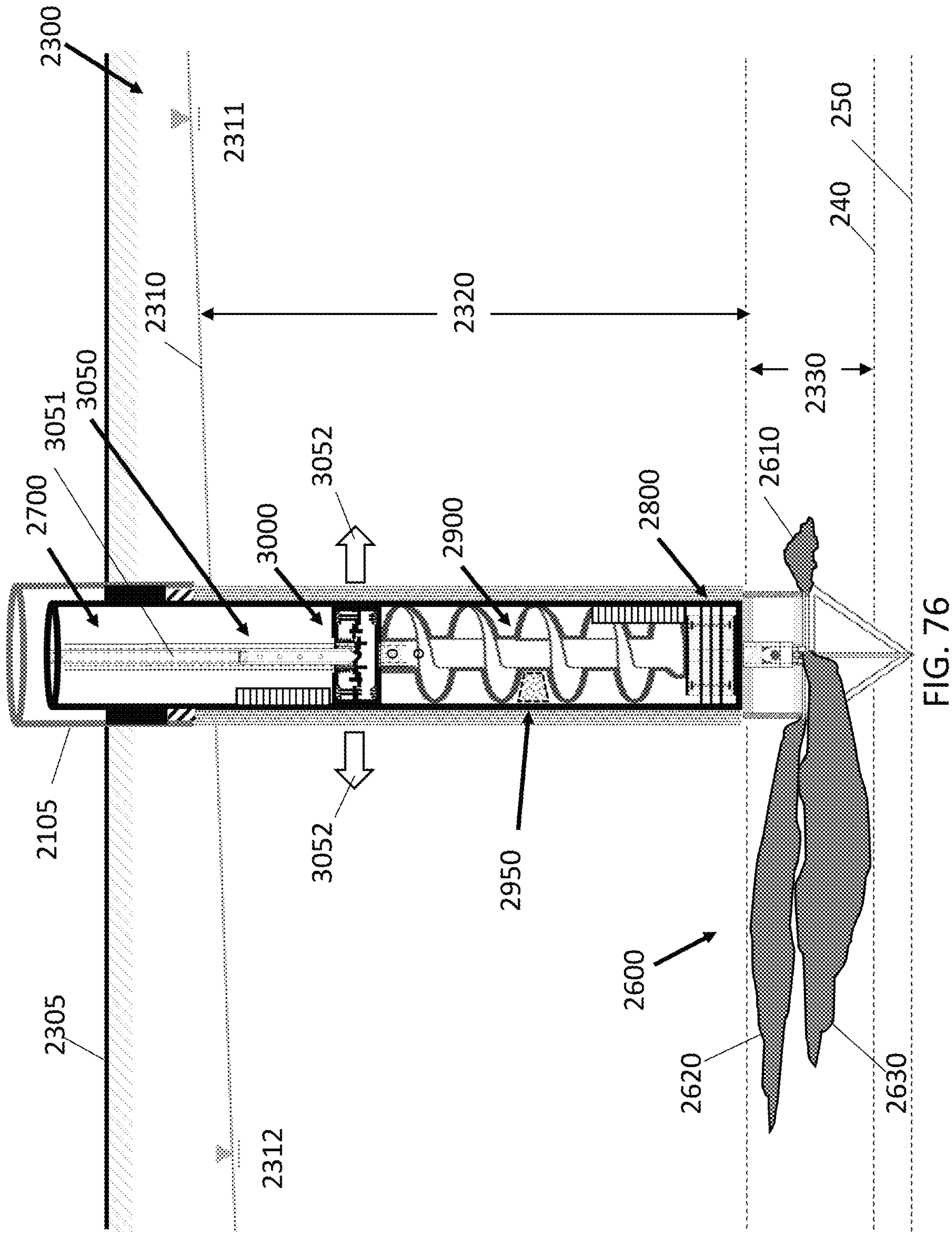
FIG. 76 is a side elevation view of a subsurface environment showing actuation of the MP by the downward emplacement of an activation tool thereby sealing the interior walls of the PileGate from groundwater flow.

FIG. 76 is a side elevation view of a subsurface environment 2300 showing actuation of the MP 3000 by the downward emplacement of the Packtivator 3050 thereby causing an outward expansion 3052 and sealing the interior walls of the PileGate 2700. Details of the MP 3000 and associated tools are provided in FIGS. 88 and 89.

Figure 77:
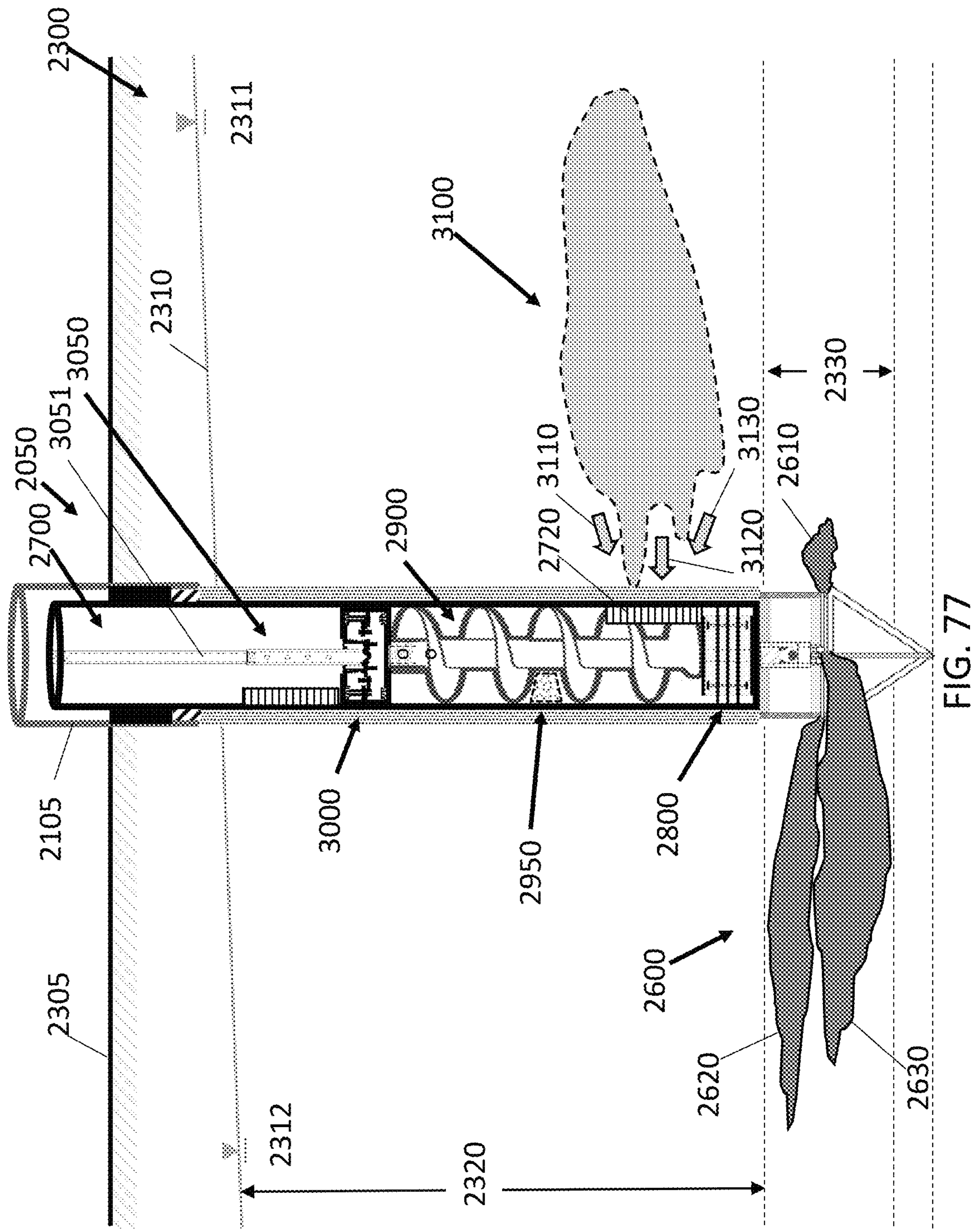
FIG. 77 is a side elevation view of a subsurface environment showing the horizontal flow of a contaminated groundwater plume diverted toward the lower elevation screen of the PileGate instead of flowing beneath the PileGate as a result of the coagulated barrier system created in the formation underlying the PileGate.

FIG. 77 is a side elevation view of a subsurface environment 2300 showing the horizontal flow of a contaminated groundwater plume 3100 flowing from the upgradient 2311 to downgradient 2312 sections of the aquifer. The contaminated groundwater plume 3100 is diverted toward the lower elevation screen 2720 serving as the inlet screen of the PileGate 2700 instead of flowing beneath the PileGate 2700 through the less permeable section of the aquifer 2330 as a result of the coagulated barrier system 2600 as shown by flow arrows 3110, 3120, and 3130.

Figure 78:
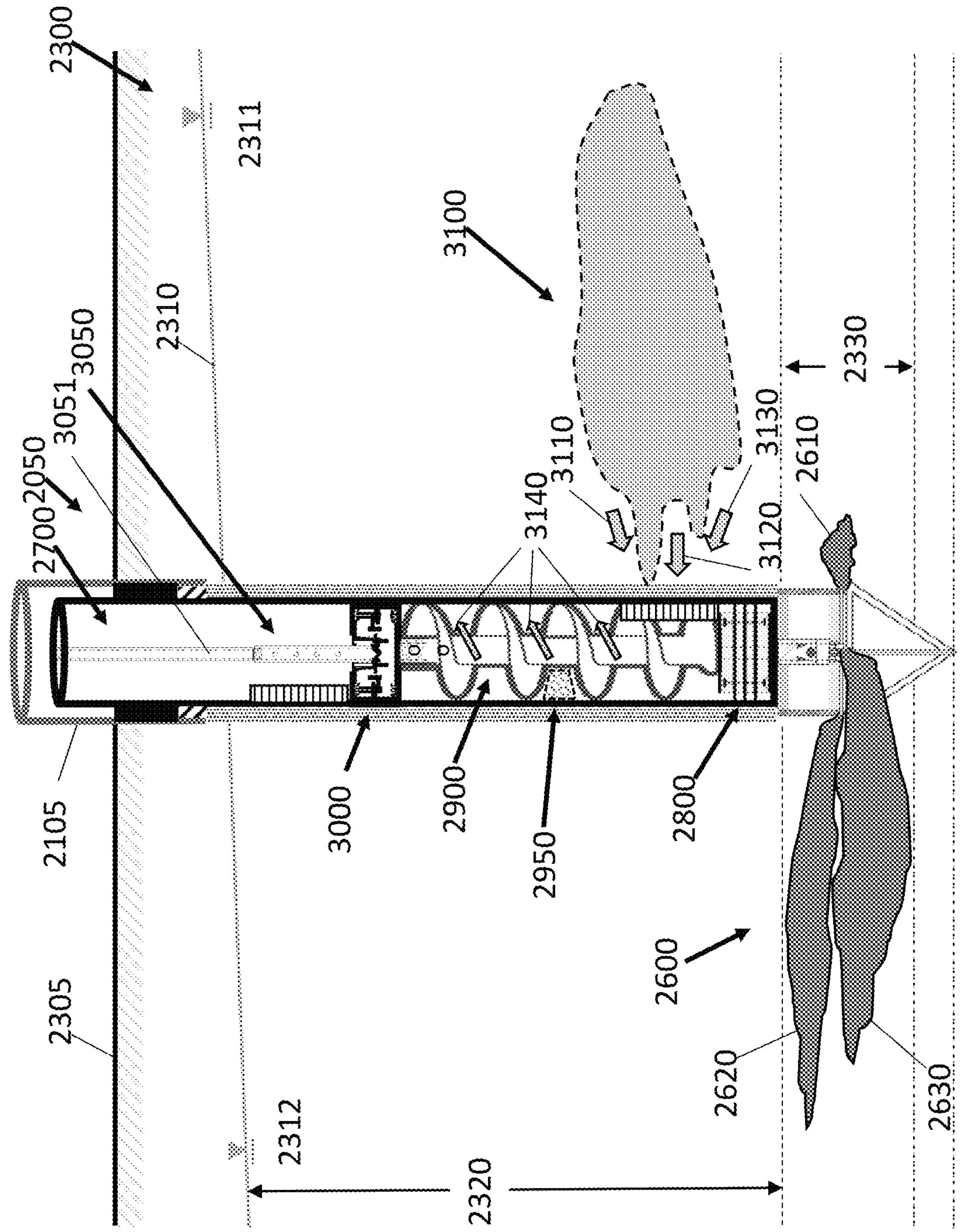
FIG. 78 is a side elevation view of a subsurface environment showing the spiraling upward flow of contaminated groundwater within the SSTD inside the PileGate wherein an increased reaction time occurs between the contaminated groundwater and the treatment media contained within the SSTD.

FIG. 78 is a side elevation view of a subsurface environment 2300 showing the spiraling upward flow of contaminated groundwater 3140 within the SSTD 2900 inside the PileGate 2700 wherein an increased reaction time occurs between the contaminated groundwater and the solid treatment media 2950 contained within the SSTD 2900.

Figure 79:
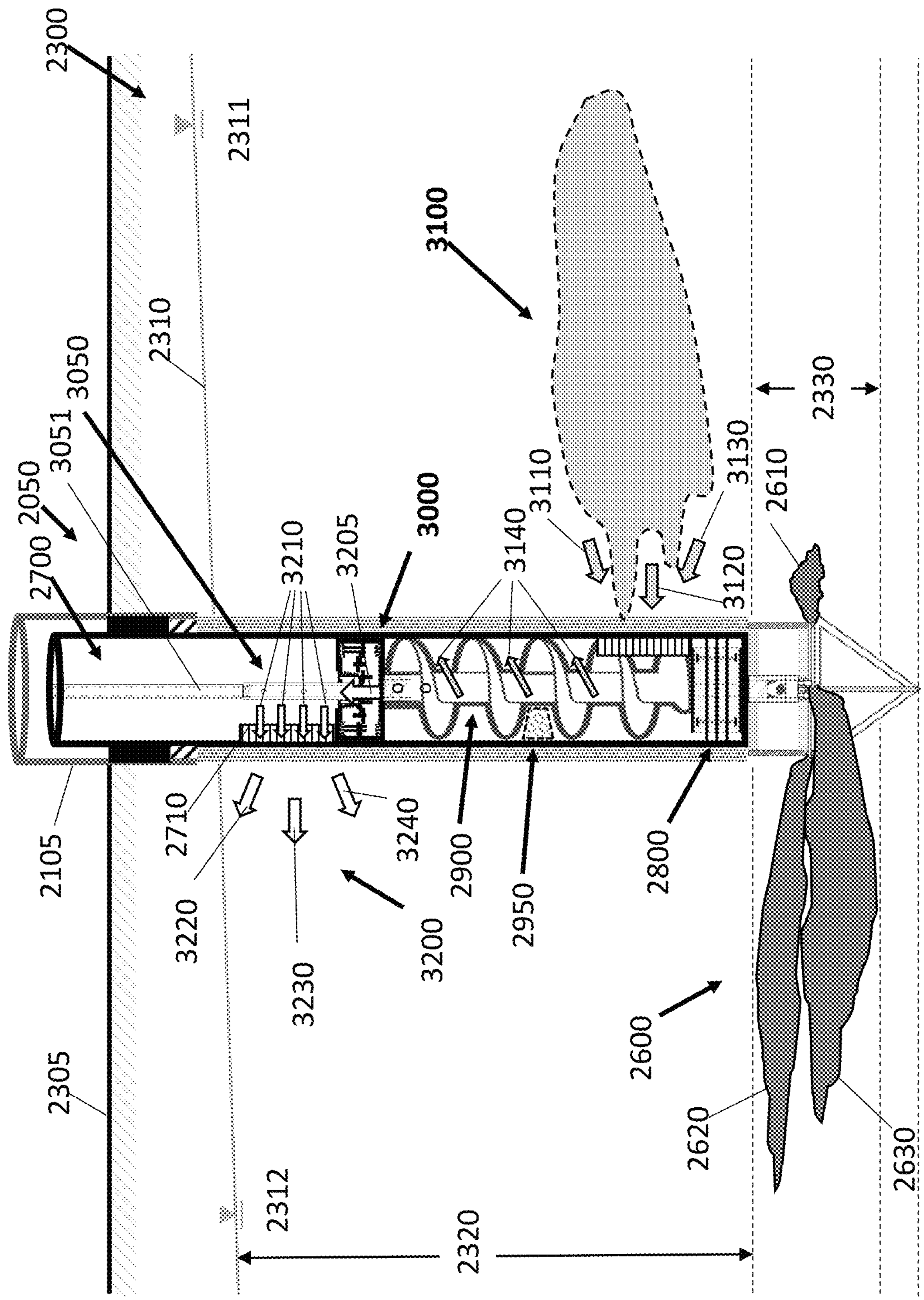
FIG. 79 is a side elevation view of a subsurface environment showing the vertical upward flow of treated groundwater diverted through the center of the MP, into the activation tool, and horizontally from the upper elevation outlet screen of the PileGate into the formation.

FIG. 79 is a side elevation view of a subsurface environment 2300 showing the vertical upward flow of treated groundwater 3205 diverted through the center of the MP 3000. Treated groundwater flows horizontally out of holes 3210 of the hollow core Packtivator 3050 and into the upper elevation screen 2710 serving as the outlet screen of the PileGate 2700 in this example. The treated groundwater then flows into the more permeable section 2320 of the downgradient section 2312 of the aquifer as shown by flow areas 3220, 3230, and 3240.

Figure 80:
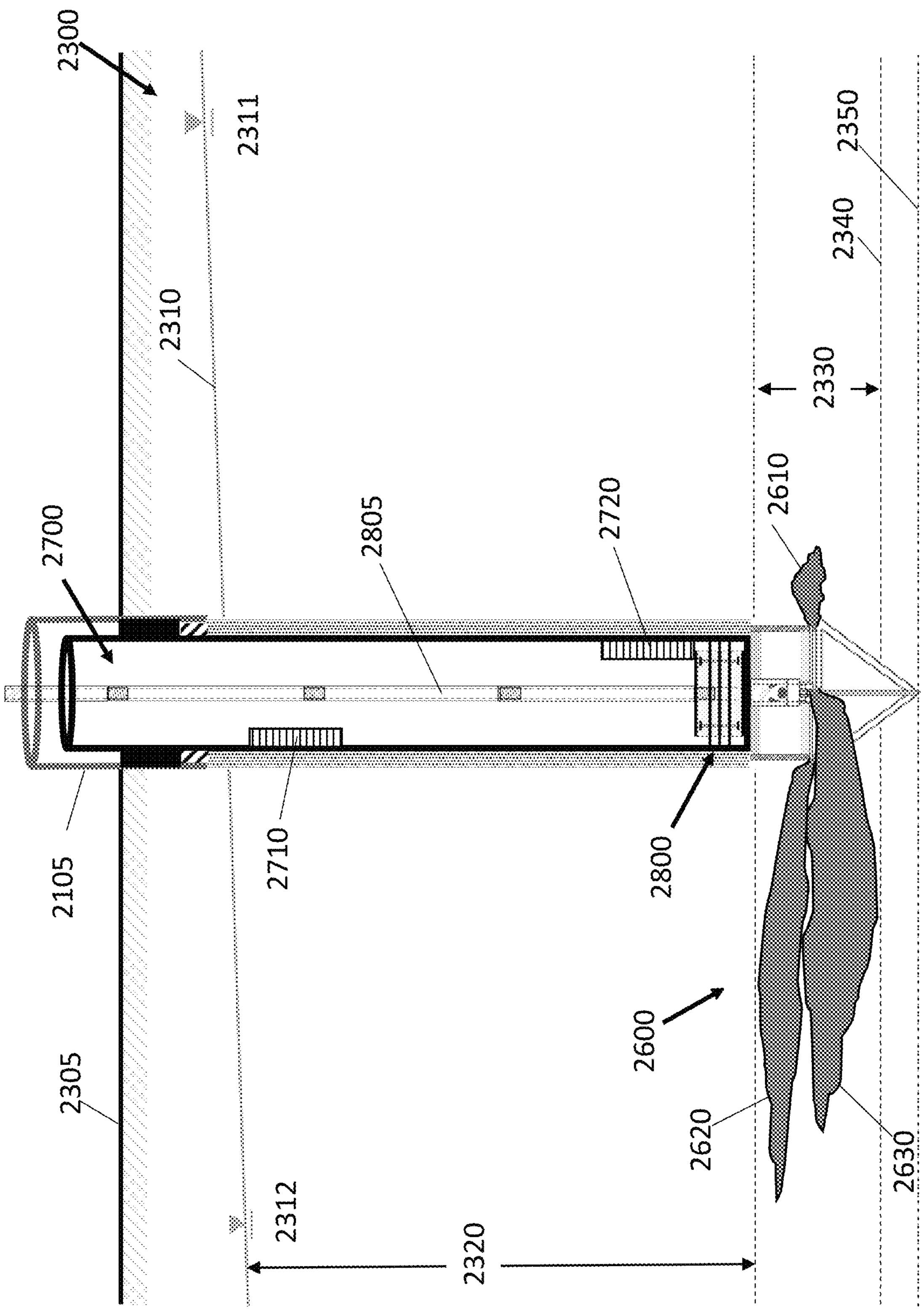
FIG. 80 is a side elevation view of a subsurface environment showing the removal of all devices except for the MCD and its placement tool.

FIG. 80 is a side elevation view of a subsurface environment 2300 showing the removal of all devices from the PileGate 2700 except for the MCD 2800 and the extensions 2805 detachably secured to the MCD 2800.

Figure 81:
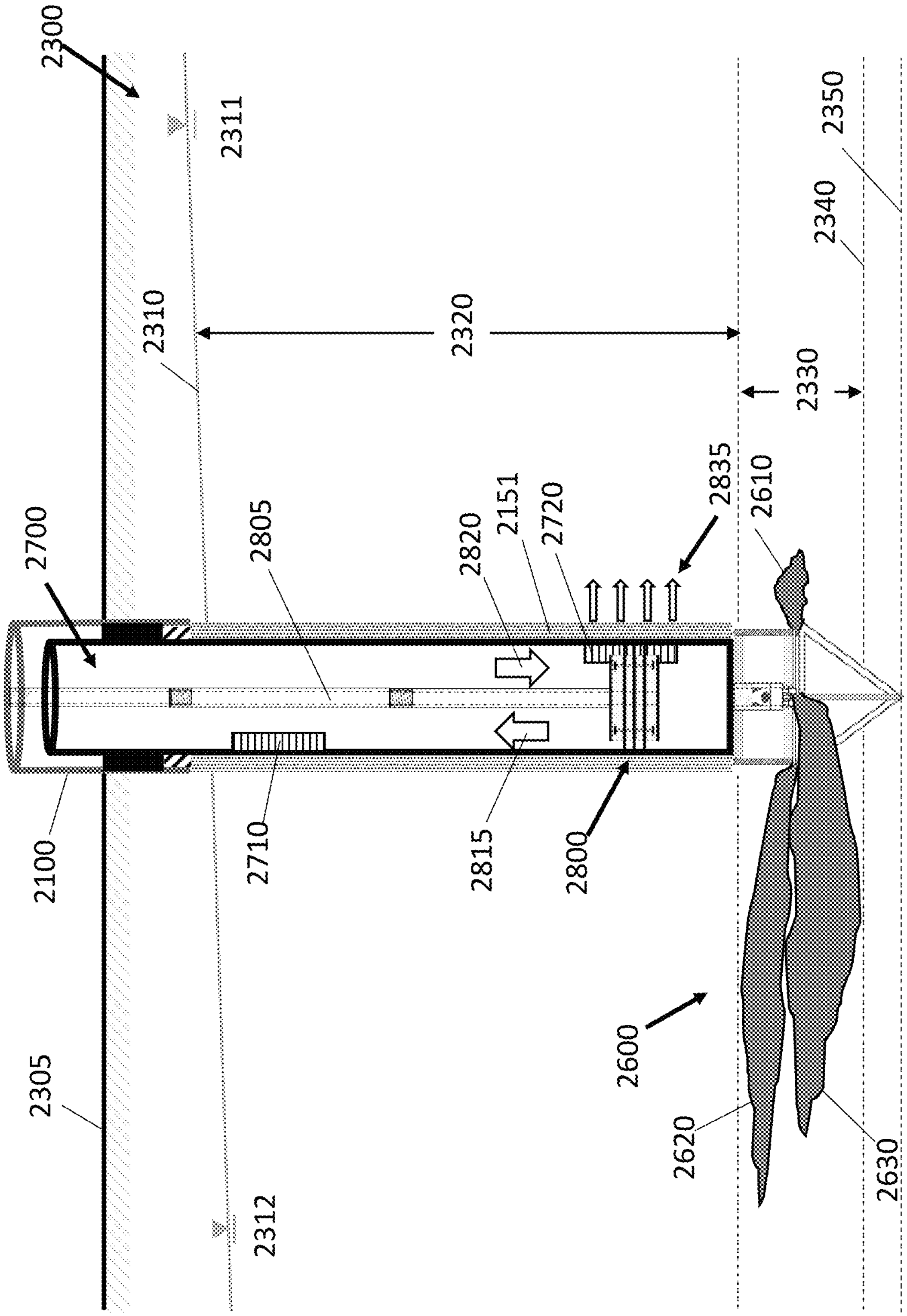
FIG. 81 is a side elevation view of a subsurface environment showing the upward and downward surging of the MCD in the vicinity of the lower elevation screen inside the PileGate by raising and lowering the placement tool.

FIG. 81 is a side elevation view of a subsurface environment 2300 showing the upward 2815 and downward 2820 surging of the MCD 2800 in the vicinity of the lower elevation screen 2720 inside the PileGate 2700 by raising and lowering the extensions 2805. The upward 2815 and downward 2820 surging of the MCD 2800 forces particulates to be flushed out the lower elevation screen 2720 and gravel pack 2151 into the more permeable section 2320 of aquifer on the upgradient 2311 side of the PileGate 2700.

Figure 82:
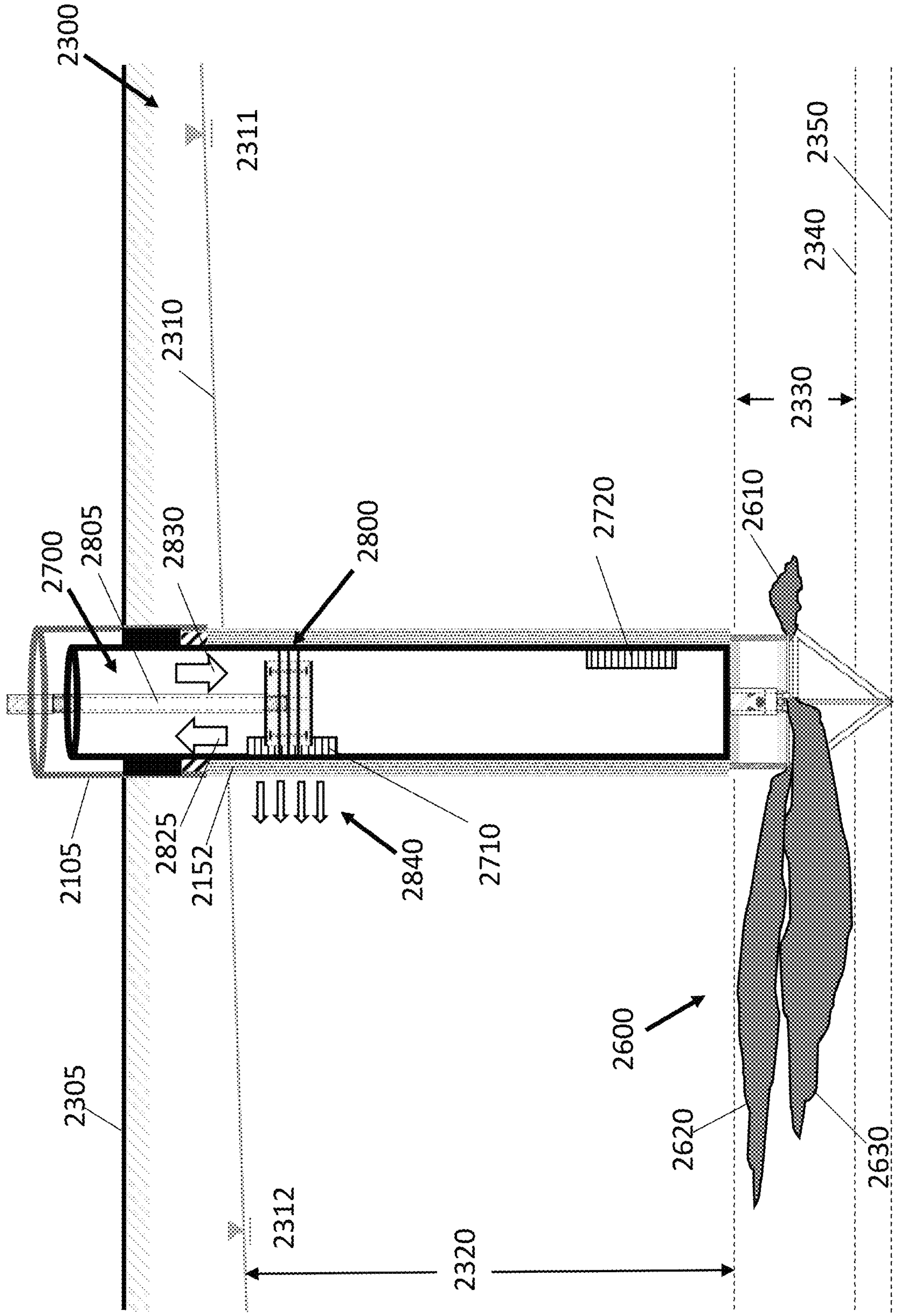
FIG. 82 is a side elevation view of a subsurface environment showing the upward and downward surging of the MCD in the vicinity of the upper elevation screen inside the PileGate by raising and lowering the placement tool.

FIG. 82 is a side elevation view of a subsurface environment 2300 showing the upward 2825 and downward 2830 surging of the MCD 2800 in the vicinity of the upper elevation screen 2710 inside the PileGate 2700 by raising and lowering the extensions 2805. The upward 2825 and downward 2830 surging of the MCD 2800 forces particulates to be flushed out the upper elevation screen 2710 and gravel pack 2152 into the more permeable section 2320 of aquifer on the downgradient 2312 side of the PileGate 2700.

Figure 83:
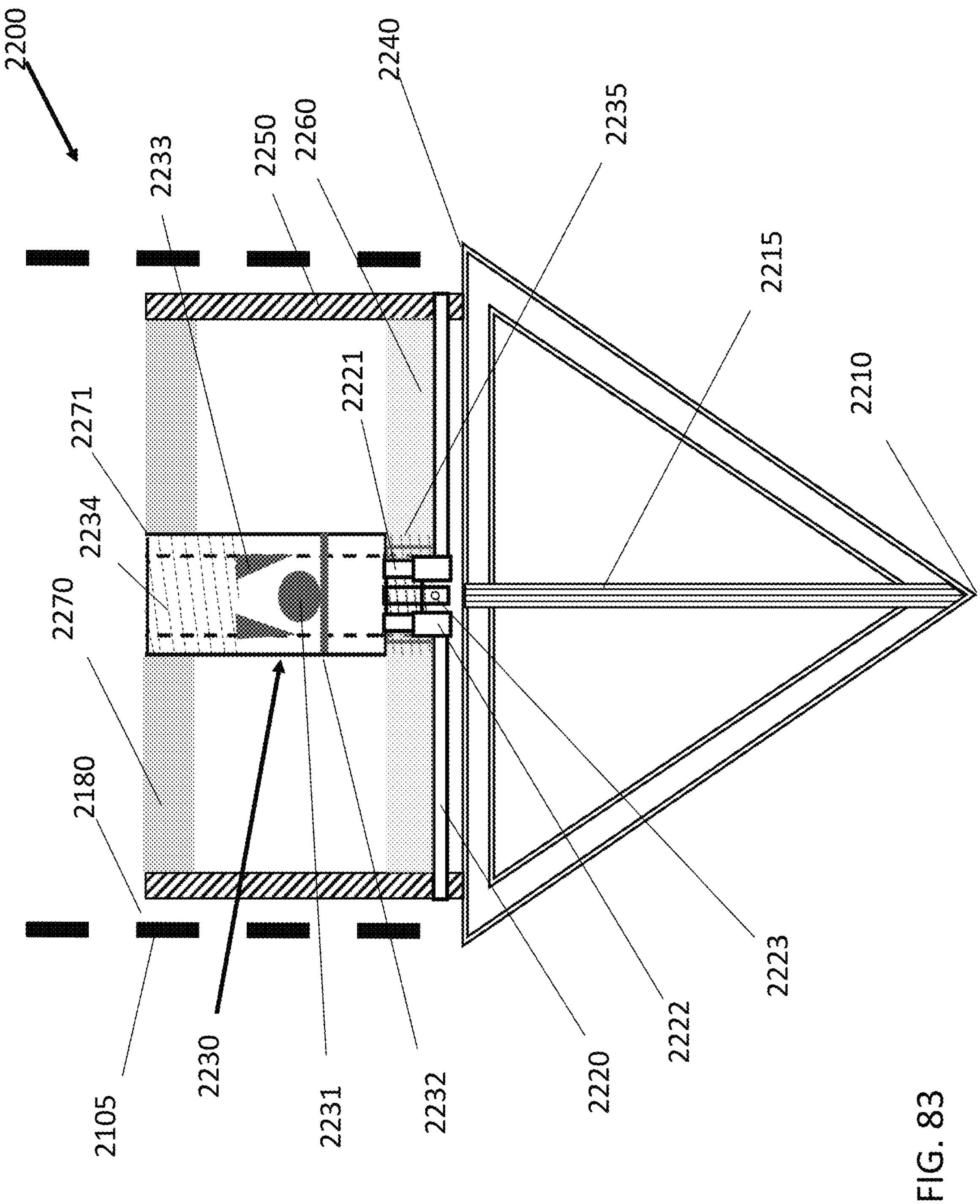

FIG. 83 is an enlarged side elevation view showing the details of the dedicated DPIT 2200. The bottom point 2210 of the rigid conical structure forming the drive point is internally supported by reinforcement rods 2215. A circular collar 250 is secured to the top plate 2240 of the DPIT 2200. The plurality of horizontal injection tubes 2220 extend through the collar 2250 the exterior portion of which form injection ports 2223 covered with wire cloth or screen (not shown). The interior portions of the horizontal injection tubes 2220 are secured to elbows 2222 which in turn are secured to vertical injection tubes 2221 housed inside a lower circular plate 2260 which is externally secured to the collar 2250. The lower circular plated 2260 has a center hole with internal female threads. The foot-valve sub 2230 is secured to the lower circular plate 2260 by exterior male threads 2235 on the bottom of the foot-valve sub 2230. An upper circular plate 2270 secured to the upper portion of the collar 2250 secures the top of the foot-valve sub 2230 inside an unthreaded circular hole 2271.

The foot-valve sub 2230 shown in FIG. 83 is comprised of a ball 2231 and an internally tapered cylinder 2233 in the top of the foot-valve sub 2230 which serves as a ball stop and seal when fluids are flowing upwardly (such as the condition represented by FIG. 59). A horizontal rod 2232 serves as a ball stop in the bottom of the foot-valve sub 2230 when fluids are flowing downwardly and the foot-valve sub 2230 is open (such as that during an injection represented by FIG. 61).

Figures 84A, 84B:
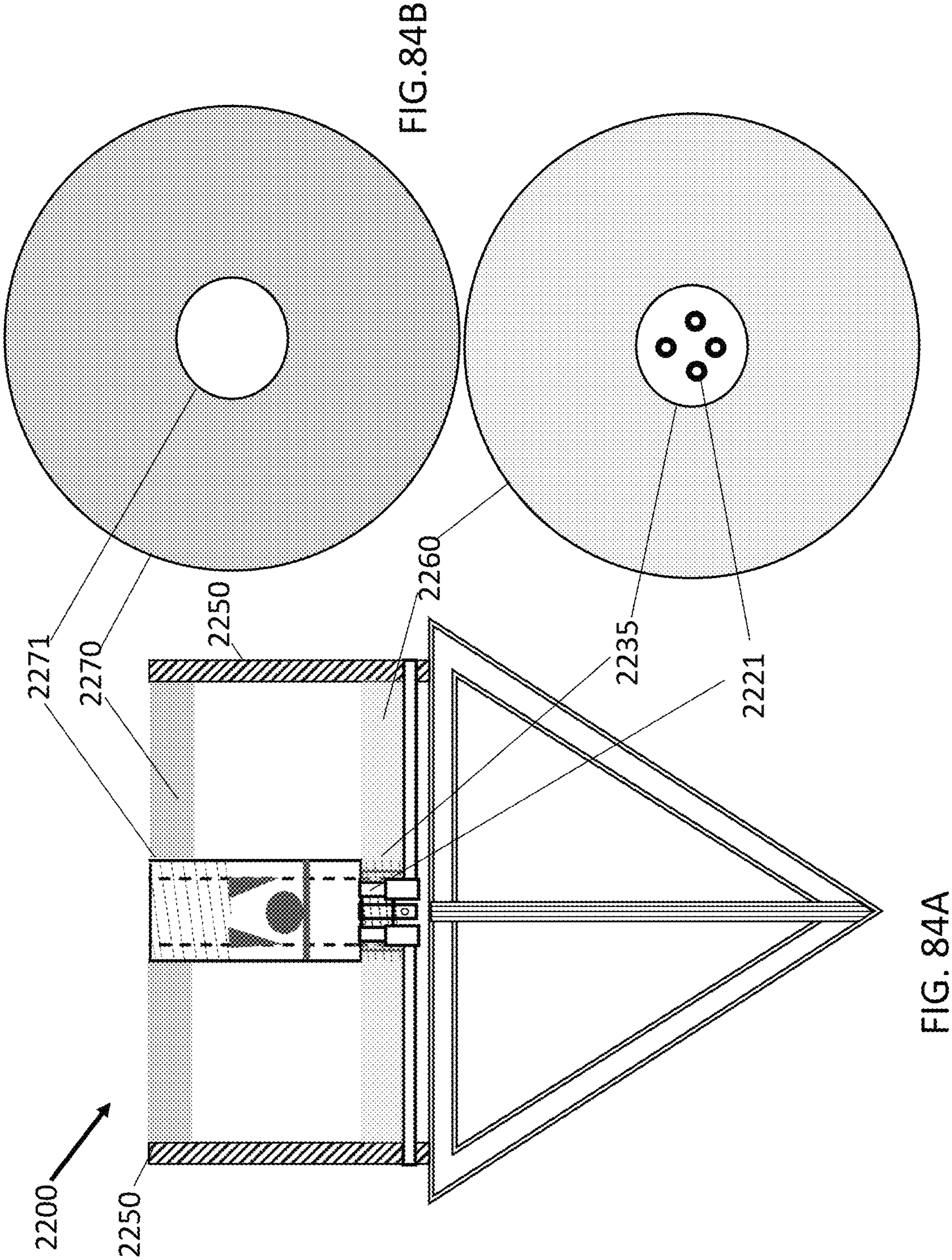

FIG. 84A is a side elevation view of the DPIT 2200. FIG. 84B is an overhead view of the upper circular plate 2270 with the unthreaded circular hole 2271. The central female threaded hole 2235 in the lower circular plate 2260 (FIG. 84) is shown housing a plurality of vertical injection tubes 2221 in the overhead view in FIG. 84B.

Figure 85B:
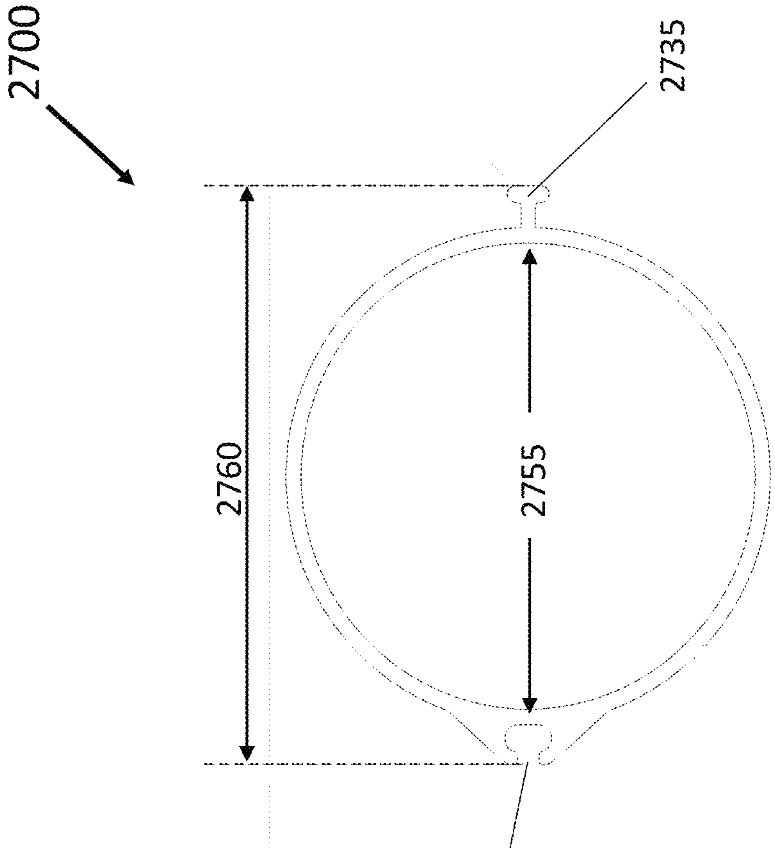
Figure 85A:
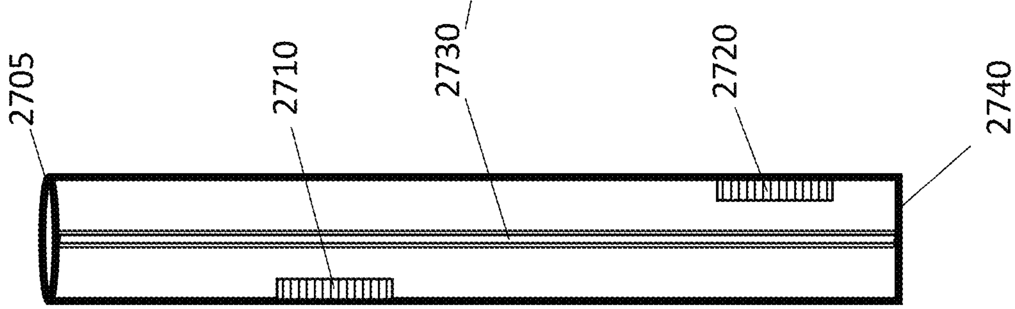

FIG. 85A is a side elevation view of the PileGate 2700 and FIG. 85B is an overhead view of the PileGate 2700. The position of the upper elevation screen 2710 and lower elevation screen 2720 are shown with respect to each other and the top 2705 and bottom 2740 of the PileGate 2700 in FIG. 85A. The female vertical interlock 2730 centered between the upper elevation screen 2710 and lower elevation screen 2720 (FIG. 85A) is shown in an overhead view in FIG. 85B along with the male vertical interlock 2735. The inner diameter 2755 of the PileGate 2700 is less than the outer diameter 2760 as shown in FIG. 85B. The two vertical interlocks are used to either connect the PileGate 2700 to another PileGate 2700 or to sheet piling (not shown) to form a vertical physical barrier wall in a subsurface environment.

Figure 86:
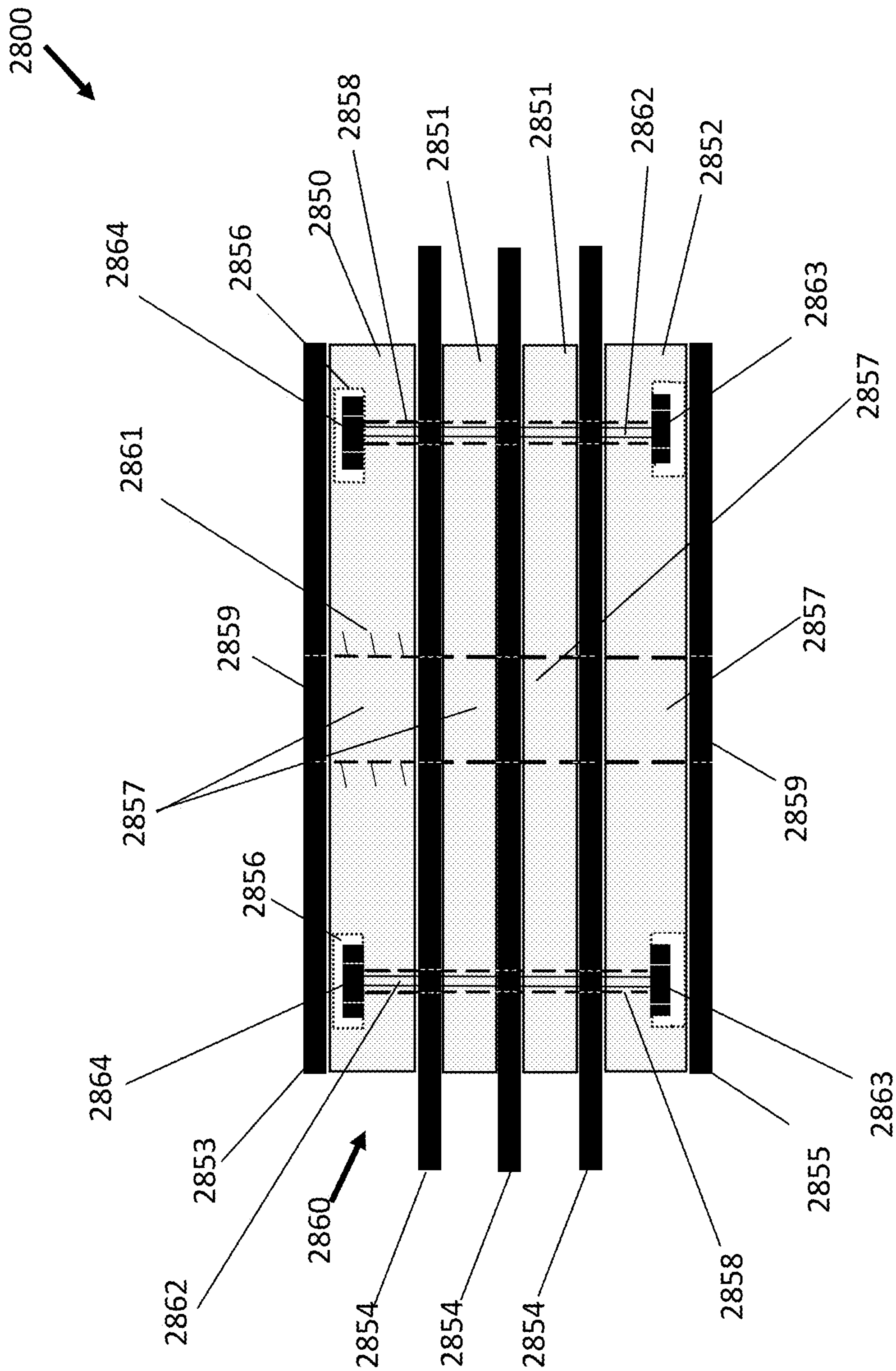

FIG. 86 is a side elevation view showing the details of one embodiment of an assembled multilayer MCD 2800 as described in more detail in U.S. patent application Ser. No. 17/559,138. Bolts 2862 and nuts 2863 detachably secure an upper plate 2850, two intervening plates 2851, and a lower plate 2852 and compress intervening layers 2854 of a rubber material. Central holes 2857 are shown through all the rigid plates; the upper plate 2850 of which is a tapered female thread 2861. Central holes 2859 are also shown in the rubber material 2853 above the upper plate 2850 and below 2855 the lower plate 2852. Central holes 2868 are also in the three intervening layers of rubber material 2854.

Figures 87A, 87B, 87C:
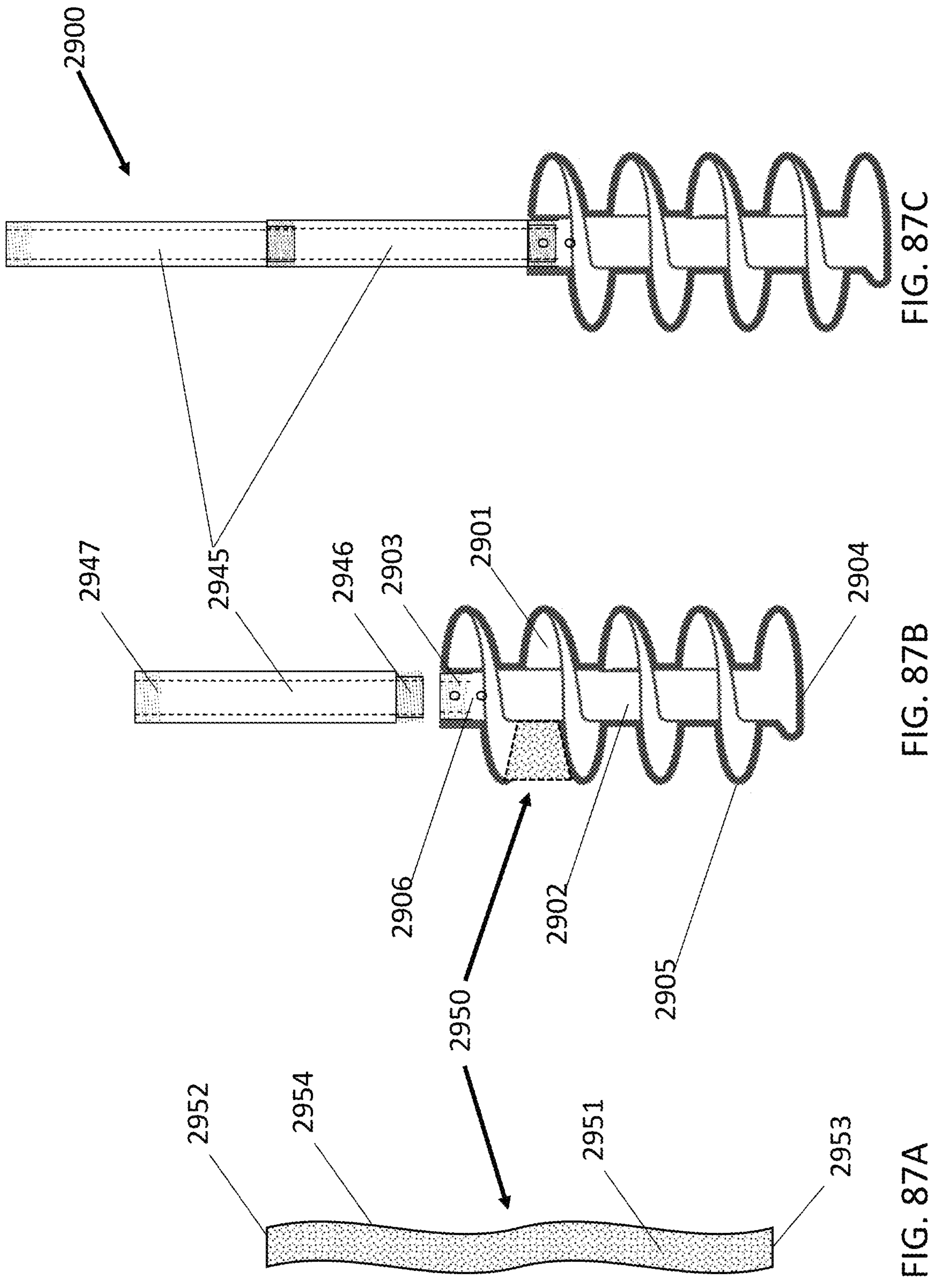

FIG. 87A, FIG. 87B, and FIG. 87C are side elevation views showing the detailed components of the SSTD 2900. A coiled porous stocking configured to contain solid permeable reactive media 2950 is shown in FIG. 87A including a top 2952, bottom 2953, and sides 2954 of the porous stocking with solid permeable reactive media 2951 shown on the inside.

FIG. 87B shows the flights 2901 of the SSTD 2900 with a solid core cylinder 2902, flatbottom 2904, and internally threaded top 2903. The plurality of flights 2901 secured to the external walls of the solid core cylinder 2902 have a slot in an outer edge configured to hold a rubber material 2905 inserted in the edges of the flights preventing the bypass of contaminated groundwater from receiving treatment when the SSTD 2900 is installed in a PileGate 2700 (or inside a $\text{CartridgeR}_x$ which is not shown). The internally threaded top 2903 of the SSTD 2900 has a plurality of holes 2906 allowing groundwater that has been treated to flow into the holes 2906. As described in the example shown in FIG. 79, vertical upward flow of treated groundwater 3205 from the holes 2906 is diverted through the center of the MP 3000. An extension 2945 with male threads 2903 on the bottom detachably secure the extension 2945 to the internal female threads 2903 on the top of the SSTD 2900. The top of the extension 2945 has internal female threads 2947 for detachable securement with other extensions 2945 as shown in FIG. 87C for positioning the SSTD 2900 in the PileGate 2700.

Figure 88:
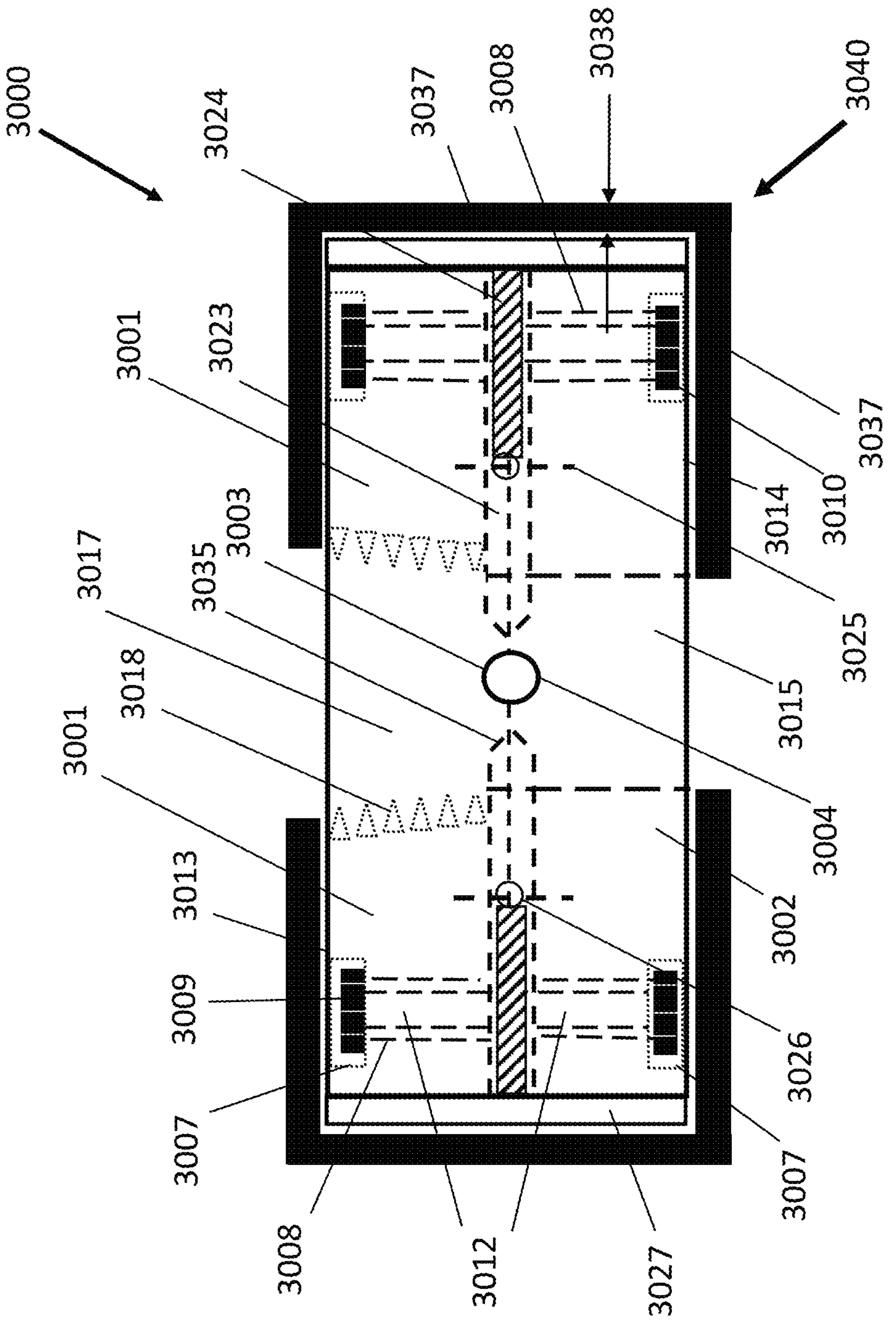

FIG. 88 is a side elevation view showing details of the MP 3000 as further described in application Ser. No. 17/537,696. The MP 3000 is largely encased within a rubber material 3037. The MP 3000 is shown in a retracted or deactivated state 3040 as noted by position of the cylindrical rods 3023 where the beveled ends 3035 of the cylindrical rods 3023 are near the center of the vertical hole 3015 in the center of the lower plate 3002 and near the center of the tapered vertical hole 3017 with threads 3018 in the center of the upper plate 3001. The bolt heads 3009 have been assembled in the recessed holes 3007 in the top 3013 of the upper plate 3001 and the shank of the bolt 3012 extends through the bolt holes 3008 in the upper plate 3001 and lower plate 3002 where threads (not shown) near the bottom of the bolt 3012 are detachably secured to nuts 3010 in the recessed holes 3007 in the bottom 3014 of the lower plate 3002 such than when threads (not shown) on the shank of the bolt 3012 are tightened into the nuts 3010, the upper plate 3001 and lower plate 3002 are detachably secured to each other holding the plurality of inner workings (i.e., cylindrical rods 3023, extension springs 3024, small-diameter pins 3025, and disc assemblies 3027) in their respective channels, holes, and positions shown in FIG. 88.

The resulting MP 3000 shown in FIG. 88 has no exposed hardware allowing for a smooth surface on which a rubber material 2185 can operate (i.e., laterally expand or contract when forces activate or deactivate the MP 3000, respectively) without interference or damage to the rubber material 3037.

FIG. 89A, FIG. 89B, and FIG. 89C are side elevation views showing details of the components of the MP 3000. The sub to the hollow core Packtivator 3050 is shown in FIG. 89A which includes in one embodiment the beveled tip 3054, a hollow core 3055, a plurality of holes 3056, and a male threaded top 3057. A circular seat 3058 is formed between the wider wall thickness 3059 of the sub of the hollow core Packtivator 3050 compared with the thinner wall thickness 3060 of the upper male threaded section 3057. An extension 3051 with a hollow core 3055 and internal female threads 3061 at the bottom of extension 3051 detachably secures the sub to the hollow core Packtivator 3050 by the male threads 3057 at the top of the sub. Male threads 3062 at the top of the extension 3051 enable additional extensions to be added to each other so that the Packtivator 3050 can be positioned where required inside a PileGate 2700 for engagement with an MP 3000.

The sub of the hollow core Packtivator 3050 is a relatively short segment of pipe or equivalent the lower tip 3054 of which is beveled to match the beveled ends 3035 of the cylindrical rods 3023 in the MP 3000 assembly (previously shown in FIG. 88). The MP 3000 is activated as shown in FIG. 89B where a downward force 3063 on the sub to the Packtivator results in a horizontal actuation 3064 of the cylindrical rods 3063 sealing the inner diameter 2755 of the PileGate 2700.

FIG. 89B shows a hollow core positioning tool 3049 detachably secured to an activated MP 3000 in the inner diameter 2755 of a PileGate 2700. In addition to positioning the MP 3000 at a required elevation in the PileGate 2700, the hollow core positioning tool 3049 accommodates the sub of the hollow core Packtivator 3050 and any required extensions 3051.

FIG. 89C shows additional components of the hollow core 3069 positioning tool 3049 including a beveled sub 3065 with a male threaded bottom 3066, a stem 3067, and a joint 3068 that detachably secures the sub 3065 and the stem 3067.

Particular embodiments and features have been described with reference to the drawings. It is to be understood that these descriptions are not limited to any single embodiment or any particular set of features, and that similar embodiments and features may arise or modifications and additions may be made without departing from the scope of these descriptions and the spirit of the appended claims.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

What is claimed is:

1. An in situ groundwater treatment and flow diversion system comprising:
- a mechanical packer assembly comprising a mechanical packer and an actuator;
- an external casing system;
- a subsurface cylindrical casing;
- a multipurpose casing device positioned inside the subsurface cylindrical casing, wherein the multipurpose casing device comprises an upper plate, a lower plate, at least two intervening plates positioned between the upper plate and the lower plate, and at least one layer of a rubber material and a positioning tool;
- a spiral-shaped treatment device including a fluid treatment media inside a coiled porous stocking; and
- a drive injection tool detachably secured to the external casing system, wherein the drive injection tool includes at least two injections tubes, wherein the at least two injection tubes are designed to release at least one chemical;
  - wherein the mechanical packer assembly, the multipurpose casing device, and the spiral-shaped treatment device are positioned within the subsurface cylindrical casing;
  - wherein the drive injection tool is positioned below a bottom of the subsurface cylindrical casing;
  - wherein the positioning tool is operable to move a position of the mechanical packer assembly within the subsurface cylindrical casing;
  - wherein the positioning tool is operable to receive the actuator of the mechanical packer assembly; and
  - wherein the actuator is designed to move the mechanical packer between an activated state and a nonactivated state, wherein, moving from the nonactivated state to the activated state, the mechanical packer is operable to radially extend to come into contact with sidewalls of the subsurface cylindrical casing to create a seal.

2. The in situ groundwater treatment and flow diversion system of claim 1, wherein the mechanical packer assembly comprises an upper plate including a plurality of first channels, a first central hole, and a plurality of first holes; and a lower plate including a plurality of second channels, a second central hole, and a plurality of second holes; wherein the upper plate and the lower plate are detachably securable to each other; wherein, when the upper plate and the lower plate are attached to each other; the plurality of first channels and the plurality of second channels are aligned to form a plurality of cylindrical bores and the first central hole and the second central hole are aligned.

3. The in situ groundwater treatment and flow diversion system of claim 2, wherein the mechanical packer assembly further comprises a plurality of disc assemblies, each comprising: a disc; and a cylindrical rod with a first end and a second end, the first end attached to the disc; and the second end is beveled, and each of the plurality of cylindrical bores house the cylindrical rod of a disc assembly, with each disc positioned on an outer circumference of the upper plate and the lower plate, and the second ends of each cylindrical rod extending into the first central hole and the second central hole.

4. The in situ groundwater treatment and flow diversion system of claim 3, wherein the actuator further includes a beveled tip configured to contact a beveled end of at least one cylindrical rod of the plurality of disc assemblies positioned in the aligned central hole of the upper plate and the lower plate.

5. The in situ groundwater treatment and flow diversion system of claim 3, wherein the central hole of the upper plate includes a plurality of tapered threads, wherein the positioning tool includes a plurality of tapered threads, wherein the plurality of tapered threads of the positioning tool is operable to attach to the plurality of tapered threads of the central hole of the upper plate.

6. The in situ groundwater treatment and flow diversion system of claim 1, wherein the spiral-shaped treatment device includes a cylinder with external flights, wherein the coiled porous stocking resides on the external flights of the cylinder, wherein, when the packer assembly is positioned within the subsurface cylindrical casing, the spiral-shaped treatment device is configured to interface with the packer assembly and/or the multipurpose casing device.

7. The in situ groundwater treatment and flow diversion system of claim 1, wherein the spiral-shaped treatment device includes a solid core cylinder including a plurality of walls, wherein the plurality of walls of the solid core cylinder include a plurality of flights secured to an exterior, wherein the plurality of flights are configured to spiral upwardly from a bottom to a top of the solid core cylinder.

8. The in situ groundwater treatment and flow diversion system of claim 7, wherein the spiral-shaped treatment device further comprises a slot in an outer edge of the flights configured to hold a rubber material further configured to form a seal when the spiral-shaped treatment device is positioned inside the subsurface cylindrical casing.

9. The in situ groundwater treatment and flow diversion system of claim 1, further comprising a cylindrical cartridge including media for treatment of a contaminated fluid forming a fluid-treatment cartridge, wherein the fluid-treatment cartridge is positioned on top of the multipurpose casing device, wherein the multipurpose casing device and the fluid-treatment cartridge are in fluid communication with the subsurface cylindrical casing, wherein the subsurface cylindrical casing includes an inlet screen and an outlet screen, wherein the multipurpose casing device and the fluid-treatment cartridge receives fluid from the inlet screen and the fluid treatment media contacts the fluid as the fluid flows from the inlet screen to the outlet screen.

10. An in situ groundwater treatment and flow diversion system comprising:

a mechanical packer assembly comprising a mechanical packer and an actuator;

an external casing system;

a subsurface cylindrical casing;

a multipurpose casing device positioned inside the subsurface cylindrical casing, wherein the multipurpose casing device comprises an upper plate, a lower plate, and at least one layer of a rubber material and a positioning tool; wherein the subsurface cylindrical casing further includes an inlet screen and an outlet screen;

a fluid-treatment cartridge including media for treatment of a contaminated fluid, wherein the fluid-treatment cartridge is in fluid communication with the multipurpose casing device; and a drive injection tool detachably secured to the external casing system;

wherein the mechanical packer assembly, the multipurpose casing device, and the fluid-treatment cartridge are positioned within the subsurface cylindrical casing;

wherein the positioning tool is operable to move a position of the packer assembly within the subsurface cylindrical casing;

wherein the positioning tool is operable to receive the actuator of the mechanical packer assembly; and wherein the actuator is designed to move the mechanical packer between an activated state and a nonactivated state, wherein moving from the nonactivated state to the activated state, the mechanical packer is operable to radially extend to come into contact with sidewalls of the subsurface cylindrical casing, wherein the mechanical packer creates a seal to prevent the flow of water; and wherein the multipurpose casing device and the fluid-treatment cartridge receive fluid from the inlet screen and the fluid treatment media contacts the fluid as the fluid flows from the inlet screen to the outlet screen.

11. The in situ groundwater treatment and flow diversion system of claim 10, wherein the multipurpose casing device further comprises a plurality of plates positioned between the upper plate and the lower plate, wherein the plurality of plates are detachably secured to each other, wherein each plate of the plurality of plates includes a layer of a rubber material on top of the plate.

12. The in situ groundwater treatment and flow diversion system of claim 11, wherein the packer assembly comprises an upper plate including a plurality of first channels, a first central hole, and a plurality of first holes, and a lower plate including a plurality of second channels, a second central hole, and a plurality of second holes, wherein the upper plate and the lower plate are detachably securable to each other, wherein, when the upper plate and the lower plate are attached to each other; the plurality of first channels and the plurality of second channels are aligned to form a plurality of cylindrical bores and; the first central hole and the second central hole are aligned.

13. The in situ groundwater treatment and flow diversion system of claim 10, wherein the drive injection tool includes at least two injection ports, wherein the at least two injection ports are operable to release at least one chemical into a subsurface environment, wherein the at least one chemical includes a first chemical and a second chemical, wherein the injection tool is designed to release the first chemical and the second chemical to create a coagulated barrier system.

14. The in situ groundwater treatment and flow diversion system of claim 12, wherein the mechanical packer assembly further comprises a plurality of disc assemblies, each comprising: a disc, and a cylindrical rod with a first end and a second end, the first end attached to the disc, wherein the second end is beveled, wherein each of the plurality of cylindrical bores house the cylindrical rod of a disc assembly, with each disc positioned on an outer circumference of the upper plate and the lower plate, and the second ends of each cylindrical rod extending into the first central hole and the second central hole; wherein, when moving from in the nonactive state to the active state, the actuator is configured to radially extend the plurality of disc assemblies.

15. An in situ groundwater treatment and flow diversion system comprising:

a mechanical packer assembly comprising a mechanical packer, an actuator, and a plurality of disc assemblies;

a subsurface cylindrical casing;

a multipurpose casing device positioned inside the subsurface cylindrical casing, wherein the multipurpose casing device comprises an upper plate, a lower plate, at least two intervening plates positioned between the upper plate and the lower plate, and at least one layer of a rubber material and a positioning tool;

a spiral-shaped treatment device including a fluid treatment media inside a coiled porous stocking; and a drive injection tool, wherein the drive injection tool includes at least two injections ports, wherein the at least two injection ports are designed to release at least one chemical;

wherein the mechanical packer assembly, the multipurpose casing device, and the spiral-shaped treatment device are positioned within the subsurface cylindrical casing;

wherein the drive injection tool is positioned below a bottom of the subsurface cylindrical casing;

wherein the positioning tool is operable to move a position of the mechanical packer assembly to a predetermined position within the subsurface cylindrical casing;

wherein the positioning tool is operable to receive the actuator of the mechanical packer assembly; and wherein the actuator is designed to move the mechanical packer between an activated state and a nonactivated state, wherein moving from the nonactivated state to the activated state, the mechanical packer is operable to radially extend the plurality of disc assemblies to come into contact with sidewalls of the multipurpose casing device to create a seal.

16. The in situ groundwater treatment and flow diversion system of claim 15, further comprising a cylindrical cartridge including media for treatment of a contaminated fluid forming a fluid-treatment cartridge, wherein the fluid-treatment cartridge is positioned on top of the multipurpose casing device, wherein the multipurpose casing device and the fluid-treatment cartridge are in fluid communication with the subsurface cylindrical casing, wherein the subsurface cylindrical casing includes an inlet screen and an outlet screen, wherein the multipurpose casing device and the fluid-treatment cartridge receive fluid from the inlet screen and the fluid treatment media contacts the fluid as the fluid flows from the inlet screen to the outlet screen.

17. The in situ groundwater treatment and flow diversion system of claim 15, wherein the spiral-shaped treatment device includes a cylinder with external flights, wherein the coiled porous stocking is configured to reside on the external flights of the cylinder, and the coiled porous stocking of which contains the fluid treatment media further comprising a solid permeable reactive media, wherein, when the packer assembly is positioned within the subsurface cylindrical casing the spiral-shaped treatment device is configured to interface with the packer assembly and/or the multipurpose casing device.

18. The in situ groundwater treatment and flow diversion system of claim 17, wherein the packer assembly comprises an upper plate including a plurality of first channels, a first central hole, and a plurality of first holes, and a lower plate including a plurality of second channels, a second central hole, and a plurality of second holes; wherein the upper plate and the lower plate are detachably securable to each other; wherein, when the upper plate and the lower plate are attached to each other; the plurality of first channels and the plurality of second channels are aligned to form a plurality of cylindrical bores and; the first central hole and the second central hole are aligned, wherein the mechanical packer assembly further comprises a plurality of disc assemblies, each comprising: a disc, and a cylindrical rod with a first end and a second end, the first end attached to the disc, and the second end is beveled, and each of the plurality of cylindrical bores house the cylindrical rod of a disc assembly, with each disc positioned on an outer circumference of the upper plate and the lower plate, and the second ends of each cylindrical rod extending into the first central hole and the second central hole.

19. The in situ groundwater treatment and flow diversion system of claim 18, wherein the central hole of the upper plate includes a plurality of tapered threads, wherein the positioning tool includes a plurality of tapered threads, wherein the plurality of tapered threads of the positioning tool is operable to attach to the plurality of tapered threads of the central hole of the upper plate.

20. The in situ groundwater treatment and flow diversion system of claim 15, wherein the at least one chemical includes a first chemical and a second chemical, wherein the injection tool is designed to release the first chemical and the second chemical to create a coagulated barrier system.

* * * * *